(12) United States Patent
Kelley et al.

(10) Patent No.: US 8,805,879 B2
(45) Date of Patent: *Aug. 12, 2014

(54) TECHNIQUES FOR INTEGRATING PARAMETERIZED INFORMATION REQUEST INTO A SYSTEM FOR COLLABORATIVE WORK

(75) Inventors: Kevin Kelley, Wakefield, MA (US); Gideon Moran, Westford, MA (US); Hung Phan, Dorchester, MA (US); Nhat Phan, Canton, MA (US); Stuart Rudolph, Winchester, MA (US)

(73) Assignee: VirtualAgility Inc., Alexandria, VA (US)

(*) Notice: Subject to any disclaimer, the term of this patent is extended or adjusted under 35 U.S.C. 154(b) by 355 days.

This patent is subject to a terminal disclaimer.

(21) Appl. No.: 12/921,744

(22) PCT Filed: Mar. 11, 2009

(86) PCT No.: PCT/US2009/036804
§ 371 (c)(1),
(2), (4) Date: Sep. 9, 2010

(87) PCT Pub. No.: WO2009/114615
PCT Pub. Date: Sep. 17, 2009

(65) Prior Publication Data
US 2011/0004621 A1 Jan. 6, 2011

Related U.S. Application Data

(60) Provisional application No. 61/035,489, filed on Mar. 11, 2008.

(51) Int. Cl.
*G06F 17/30* (2006.01)
(52) U.S. Cl.
USPC .......................................................... 707/779
(58) Field of Classification Search
None
See application file for complete search history.

(56) References Cited

U.S. PATENT DOCUMENTS

| | | | | |
|---|---|---|---|---|
| 6,076,092 A * | 6/2000 | Goldberg et al. | ............. | 707/683 |
| 6,584,491 B1 * | 6/2003 | Niemi et al. | .................. | 709/202 |
| 7,299,471 B2 * | 11/2007 | Cheung et al. | ................ | 718/107 |
| 7,860,875 B2 * | 12/2010 | Bird et al. | ...................... | 707/759 |
| 2002/0049749 A1 | 4/2002 | Helgeson et al. | | |
| 2002/0120741 A1 * | 8/2002 | Webb et al. | .................. | 709/225 |
| 2002/0138582 A1 | 9/2002 | Chandra et al. | | |
| 2003/0200253 A1 * | 10/2003 | Cheung et al. | ................ | 709/107 |
| 2003/0229529 A1 * | 12/2003 | Mui et al. | .......................... | 705/8 |
| 2005/0149907 A1 * | 7/2005 | Seitz et al. | ..................... | 717/108 |
| 2005/0154699 A1 | 7/2005 | Lipkin et al. | | |
| 2005/0234894 A1 * | 10/2005 | Tenazas | ............................ | 707/3 |
| 2006/0095576 A1 * | 5/2006 | Perry et al. | ..................... | 709/227 |
| 2006/0235900 A1 * | 10/2006 | Anonsen | ....................... | 707/200 |
| 2008/0034281 A1 * | 2/2008 | Handsaker et al. | ........... | 715/219 |
| 2008/0195578 A1 * | 8/2008 | Hueske et al. | .................... | 707/2 |
| 2009/0129285 A1 * | 5/2009 | Lin | ................ | 370/252 |
| 2011/0252093 A1 * | 10/2011 | Spataro et al. | ................ | 709/204 |

* cited by examiner

*Primary Examiner* — Bai D. Vu
(74) *Attorney, Agent, or Firm* — Dickinson Wright PLLC

(57) ABSTRACT

Techniques used in a system for collaborative work which gives collaborators unskilled in data processing technologies access to a variety of information resources to provide the collaborators with information resources which are obtained in response to parameterized information requests such as queries. The techniques use records in database tables to represent a class of parameterized information requests. Information for instances of the class includes queries that may be used in the instances and default values for bind parameters in the queries. Values for the bind parameters may also be specified for classes of user interfaces that employ the information sources returned by the parameterized information requests and for instances of the user interface. A user may also use specify values for bind parameters in his or her instance of the user interface.

15 Claims, 110 Drawing Sheets

338

| T_RES_TMPLT_FIELD_OPTION | |
|---|---|
| ☐ ID | VARCHAR2(32) |
| NAME | VARCHAR2(1000) |
| ☐ FIELD_ID | VARCHAR2(32) |
| SEQUENCE_NUM | NUMBER(4) |
| ARCHIVED_DATE | DATE(7) |
| ARCHIVED_BY | VARCHAR2(32) |
| LOCKED_DATE | DATE(7) |
| LOCKED_BY | VARCHAR2(64) |
| CREATED_DATE | DATE(7) |
| UPDATED_DATE | DATE(7) |
| OBJ_VERSION | NUMBER(22) |

ID=FIELD_ID

337

| T_RES_TMPLT_FIELD | |
|---|---|
| ☐ ID | VARCHAR2(32) |
| NAME | VARCHAR2(128) |
| DESCRIPTION | VARCHAR2(2000) |
| ☐ RES_TMPLT_ID | VARCHAR2(32) |
| ☐ FIELD_TYPE_ID | VARCHAR2(32) |
| MAX_LENGTH | NUMBER(10) |
| REQUIRED_FLAG | CHAR(1) |
| SEQUENCE_NUM | NUMBER(4) |
| ARCHIVED_DATE | DATE(7) |
| ARCHIVED_BY | VARCHAR2(32) |
| LOCKED_DATE | DATE(7) |
| LOCKED_BY | VARCHAR2(32) |
| CREATED_DATE | DATE(7) |
| UPDATED_DATE | DATE(7) |
| OBJ_VERSION | NUMBER(22) |

ID=RES_TMPLT_ID

ID=FIELD_TYPE_ID

336

| T_RES_TMPLT_FIELD_TYPE | |
|---|---|
| ☐ ID | VARCHAR2(32) |
| NAME | VARCHAR2(128) |
| DESCRIPTION | VARCHAR2(2000) |
| HTML_CLASS | VARCHAR2(255) |
| MAX_DEFAULT_OPTIONS | NUMBER(4) |
| CATEGORY | VARCHAR2(16) |

| T_USER_PROFILE_WORK | |
|---|---|
| ☐ USER_ID | VARCHAR2(32) |
| JOB_TITLE | VARCHAR2(64) |
| JOB_DESCRIPTION | VARCHAR2(4000) |
| SPECIALTIES | VARCHAR2(4000) |
| CERTIFICATIONS | VARCHAR2(4000) |
| WORK_ID | VARCHAR2(128) |
| BADGE_NUMBER | VARCHAR2(128) |
| ADDRESS1 | VARCHAR2(64) |
| STREET | VARCHAR2(64) |
| CITY | VARCHAR2(64) |
| COUNTY | VARCHAR2(64) |
| STATE | VARCHAR2(128) |
| POSTAL_CODE | VARCHAR2(16) |
| COUNTRY | VARCHAR2(128) |
| ☐ COMPANY_ID | VARCHAR2(32) |
| ☐ DIVISION_ID | VARCHAR2(32) |
| ☐ DEPARTMENT_ID | VARCHAR2(32) |
| OFFICE_BUILDING | VARCHAR2(64) |
| OFFICE_FLOOR | VARCHAR2(12) |
| OFFICE_ROOM | VARCHAR2(12) |
| OFFICE_PHONE | VARCHAR2(24) |
| PHONE | VARCHAR2(24) |
| MOBILE | VARCHAR2(24) |
| PAGER | VARCHAR2(24) |
| OBJ_VERSION | NUMBER(22) |

ID=USER_ID

341

| T_USER_PROFILE | |
|---|---|
| ☐ ID | VARCHAR2(32) |
| TITLE | VARCHAR2(32) |
| FIRST_NAME | VARCHAR2(32) |
| MIDDLE_NAME | VARCHAR2(32) |
| LAST_NAME | VARCHAR2(32) |
| SUFFIX | VARCHAR2(32) |
| EMAIL | VARCHAR2(255) |
| ADDRESS1 | VARCHAR2(64) |
| STREET | VARCHAR2(64) |
| CITY | VARCHAR2(64) |
| STATE | VARCHAR2(128) |
| COUNTY | VARCHAR2(64) |
| POSTAL_CODE | VARCHAR2(16) |
| COUNTRY | VARCHAR2(128) |
| PHONE | VARCHAR2(24) |
| MOBILE | VARCHAR2(24) |
| PAGER | VARCHAR2(24) |
| FIRST_LOGIN | CHAR(1) |
| LICENSE_AGREEMENT | DATE(7) |
| CREATED_DATE | DATE(7) |
| UPDATED_DATE | DATE(7) |
| OBJ_VERSION | NUMBER(22) |

T_USER_LOGIN

| | |
|---|---|
| ☐ USER_ID | VARCHAR2(32) |
| PASS_WORD | VARCHAR2(64) |
| PASS_WORD_DATE | DATE(7) |
| AUTO_LOCKED_DATE | DATE(7) |
| ARCHIVED_DATE | DATE(7) |
| ARCHIVED_BY | VARCHAR2(32) |
| LOCKED_DATE | DATE(7) |
| LOCKED_BY | VARCHAR2(32) |
| CONNECTED_DATE | DATE(7) |
| CREATED_DATE | DATE(7) |
| UPDATED_DATE | DATE(7) |
| OBJ_VERSION | NUMBER(22) |

ID=USER_ID

343

T_USER_LOGIN_HISTORY

| | |
|---|---|
| ☐ HISTORY_ID | VARCHAR2(32) |
| ☐ USER_ID | VARCHAR2(32) |
| LOGIN_DATE | DATE(7) |
| LOGOUT_DATE | DATE(7) |
| OBJ_VERSION | NUMBER(22) |

ID=USER_ID

344

T_USER_PREFERENCES

| | |
|---|---|
| ☐ USER_ID | VARCHAR2(32) |
| DEFAULT_WORKSPACE_ID | VARCHAR2(32) |
| DEFAULT_NAVIGATOR | VARCHAR2(16) |
| DEFAULT_LANGUAGE | VARCHAR2(2) |
| EMAIL_ALERTS | CHAR(1) |
| EMAIL_MESSAGES | CHAR(1) |
| OBJ_VERSION | NUMBER(22) |

ID=USER_ID

| T_MANAGER_PROPERTY | |
|---|---|
| ID | VARCHAR2(32) |
| MANAGER_CLASS | VARCHAR2(255) |
| NAME | VARCHAR2(128) |
| VALUE | VARCHAR2(2000) |
| CREATED_DATE | DATE(7) |
| UPDATED_DATE | DATE(7) |
| OBJ_VERSION | NUMBER(22) |

302

| T_APPLICATION_LICENSE | |
|---|---|
| LICENSE_ID | VARCHAR2(32) |
| LICENSE_KEY | VARCHAR2(4000) |
| PASS_WORD | VARCHAR2(32) |
| OBJ_VERSION | NUMBER(22) |

313

| T_MD_COUNTRY | |
|---|---|
| ID | VARCHAR2(3) |
| NAME | VARCHAR2(128) |

303

| T_APPLICATION_LOGO | |
|---|---|
| ID | VARCHAR2(32) |
| LOGO_DATA | LONG RAW(0) |
| MIMETYPE | VARCHAR2(255) |
| OBJ_VERSION | NUMBER(22) |

| # | FULL NAME | LOGIN DATE | LOGOUT DATE |
|---|---|---|---|
| 0 | PHAN, NHAT | APRIL 14, 2006 5:29:42 PM EDT | APRIL 14, 2006 5:29:42 PM EDT |
| 1 | RUDOLPH, STUART | APRIL 14, 2006 5:29:42 PM EDT | APRIL 14, 2006 5:29:42 PM EDT |
| 2 | PHAN, NHAT | APRIL 14, 2006 5:29:42 PM EDT | APRIL 14, 2006 5:29:42 PM EDT |
| 3 | CHANG, ANDY | APRIL 14, 2006 5:29:42 PM EDT | APRIL 14, 2006 5:29:42 PM EDT |
| 4 | PHAN, NHAT | APRIL 14, 2006 5:29:42 PM EDT | APRIL 14, 2006 5:29:42 PM EDT |
| 5 | RUDOLPH, STUART | APRIL 14, 2006 5:29:42 PM EDT | APRIL 14, 2006 5:29:42 PM EDT |
| 6 | CHANG, ANDY | APRIL 14, 2006 5:29:42 PM EDT | APRIL 14, 2006 5:29:42 PM EDT |
| 7 | CHANG, ANDY | APRIL 14, 2006 5:29:42 PM EDT | APRIL 14, 2006 5:29:42 PM EDT |
| 8 | RUDOLPH, STUART | APRIL 14, 2006 5:29:42 PM EDT | APRIL 14, 2006 5:29:42 PM EDT |
| 9 | CHANG, ANDY | APRIL 14, 2006 5:29:42 PM EDT | APRIL 14, 2006 5:29:42 PM EDT |

WORKCENTER ADMINISTRATION
- APPLICATION PROPERTIES
- GLOBAL OBJECTS
- SYSTEM MANAGERS
- USERS
  - IMPORT/EXPORT HISTORY — 1023

| NAME |
|---|
| ADMINISTRATOR, WORKCENTER |
| BILLUP, STEVE |
| CHANG, ANDY |

Fig. 10F

VirtualAgility WorkCenter™ | Personal Profile & Preferences

Please update your personal information and your preferences below. This can always be updated from the application.

Personal Profile

| | | |
|---:|:---|:---|
| First Name | Steve | —1201 |
| Last Name | Johnson | —1202 |
| Address | Suite A | —1203 |
| Street | 100 Broadway | —1204 |
| City | Boston | —1205 |
| State | MA | —1206 |
| Country | USA | —1207 |
| Postal Code | 10000 | —1208 |
| Phone | 555-555-1000 | —1209 |
| Mobile Phone | | —1210 |
| Pager | | —1211 |

Preferences

| | | |
|---:|:---|:---|
| Default Workspace | Default Workspace ▼ | —1212 |
| Default Navigator Tab | Domain ▼ | —1213 |
| Default Language | English ▼ | —1214 |
| Email Alerts | ☐ | —1215 |
| Email Messages | ☐ | —1216 |

Resource Link Details
Details

FBI- Most Wanted List                                   ─1916

1910 ── Name         FBI- Most Wanted List

1911 ── Description   The FBI ten most wanted web site

1912 ── Url           http://www.fbi.gov/wanted/terrorists/fugitives.htm

1913 ── Created By    Federal User

1914 ── Created Date  August 9, 2007 - 5:38:20 PM EDT

1915 ── Updated Date  ..

FIG. 19C

Resource Link Details
                                          Edit ──1920

FBI- Most Wanted List

1921 ── Name         [FBI- Most Wanted List]

1922 ── Description  [The FBI ten most wanted]

1923 ── Link Type    ● External   ○ Internal

1924 ── Url          [http://www.fbi.gov/wante]

[Submit] [Reset] [Cancel]
                      1925    1926    1927

FIG. 19D

| Information | | | | |
|---|---|---|---|---|
| Name | Type | Ver. | Updated | Actions |
| FBI Press Release Feed | rss | -- | 8/14/07 - 10:53 AM | Details |
| FBI- Most Wanted List | link | -- | 8/8/07 - 6:31 PM | Details |
| Judy Baker | link | -- | 8/14/07 - 11:20 AM | Details |

1970 — Name
1971 — Type
1972 — Ver.
1973 — Updated
1974 — Actions

FIG. 19G

Resource Link Details

Details

Judy Baker

1930 — Name — Judy Baker
1936
1931 — Description — Judy Baker link
1932 — Url — Judy Baker
1933 — Created By — Federal User
1934 — Created Date — August 14, 2007 - 11:20:54 AM EDT
1935 — Updated Date — --

FIG. 19H

Resource Link Details

Edit ──1947

Judy Baker

1940 — Name: Judy Baker
1941 — Description: Judy Baker link
1942 — Link Type: ○ External ● Internal
1943 — Url: Judy Baker 1944  1945  1946

FIG. 19I

Workspace

Details

Add an RSS Feed

2001 — Title: FBI Press Release Feed
2002 — Description: Press Releases from the FBI
2003 — Url: http://www.fbi.gov/rss/pressrel.xml 2004  2005  2006

FIG. 20A

| Information | | | | |
|---|---|---|---|---|
| Name | Type | Ver. | Updated | Actions |
| FBI Press Release Feed | rss | -- | 8/14/07 - 10:53 AM | Details |
| FBI Most Wanted List | link | -- | 8/9/07 - 6:31 PM | Details |

RSS Viewer | FBI Press Release Feed

FBI in the News

9 Charged in Sex Trafficking (Mon, 13 Aug 2007 11:26:48 -0400)
Six members of a Guatemalan family and three associates were indicted for their roles in a sex trafficking ring that recruited young women in Guatemala with false promises of high-paying jobs, smuggled the victims into the United States, and forced them to work as prostitutes to pay smuggling fees.

MD Teacher Child Porn Sentence (Mon, 13 Aug 2007 11:26:47 -0400)
Patrick Bogan, 41, of Edgewood, Maryland, was sentenced to 78 months in prison followed by 10 years of supervised release on child pornography charges in one of the most significant child pornography cases ever prosecuted in Maryland due to the sheer volume of child pornography possessed by the defendant.

Software Trafficking Sentence (Mon, 13 Aug 2007 11:26:46 -0400)
Justin E. Harrison, 26, of Oxford, Georgia, was sentenced on charges of trafficking in illicit

FIG. 20C

Resource RSS Feed Details
Details

FBI Press Release Feed

- 2010 — Name: FBI Press Release Feed
- 2011 — Description: Press Releases from the FBI
- 2012 — Url: http://www.fbi.gov/rss.pressrel.xml
- 2013 — Created By: Federal User
- 2014 — Created Date: August 14, 2007 - 10:53:16 AM EDT
- 2015 — Updated Date: --

Resource RSS Feed Details
Edit — 2017

FBI Press Release Feed

- Title: FBI Press Release Fee — 2020
- Description: Press Releases from th — 2021
- Url: http://www.fbi.gov/rss/pr — 2023

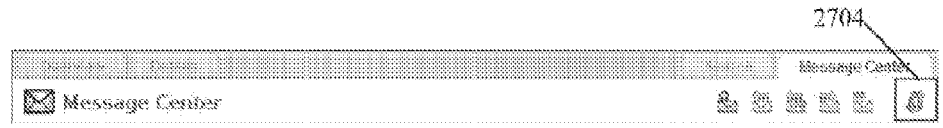
FIG. 27B
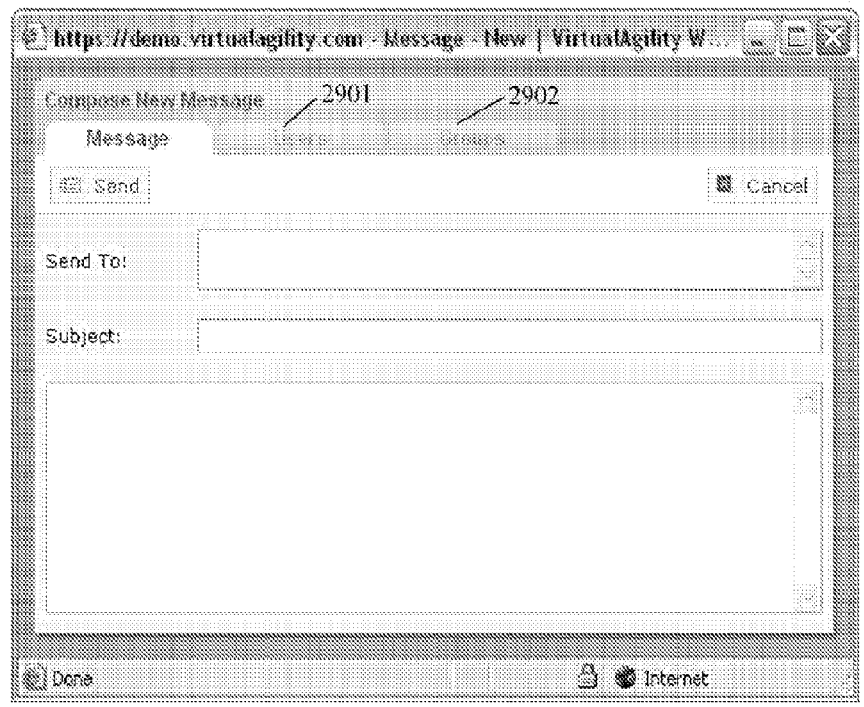
FIG. 28
FIG. 29A

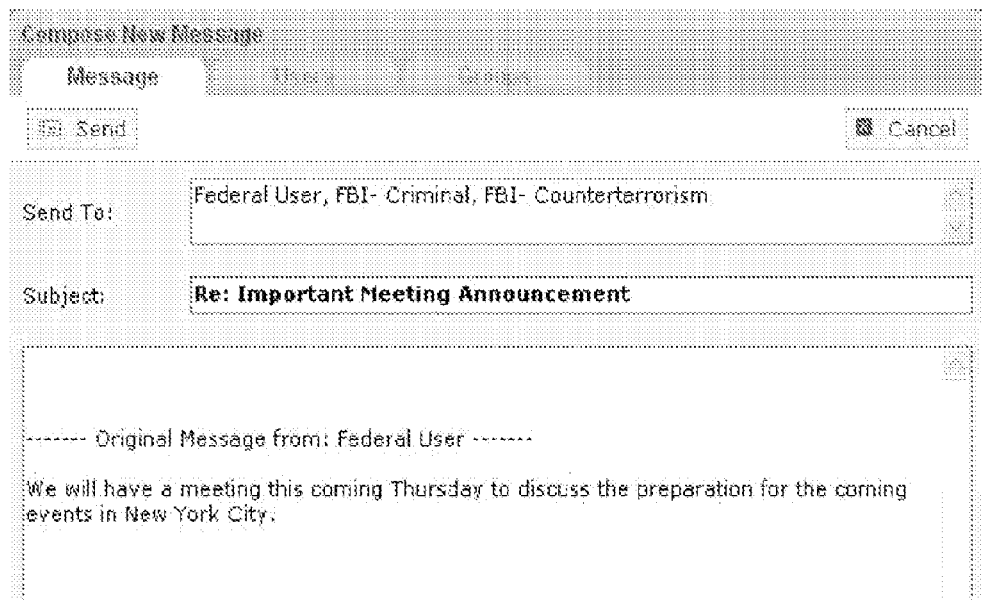
FIG. 29F
FIG. 30
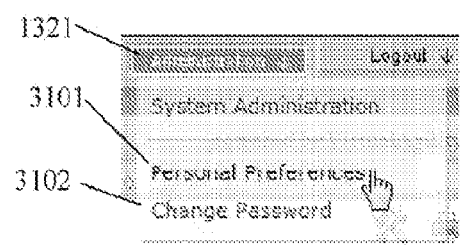
FIG. 31A

```
SELECT t.CURRENT_STATUS, t.INCIDENT_TYPE,
t.DATE_TIME, t.LOCATION_NAME,    t.INCIDENT_NAME, t.NUMBER_OF_FATALITIES, t.NUMBER_OF_INJURIES,
t.INCIDENT_ID, t.NUMBER_of_EVACUATIONS, t.PROGNOSIS, t.LEAD_AGENCY, t.SEVERITY, t.DAMAGE_BUILDING,
t.INCIDENT_NUMBER, t.DAMAGE_UTILITIES, t.DAMAGE_ROAD,
glm.SHOW_ON_MAP, glm.GEO_LOCATED_BY, glm.LATITUDE, glm.LONGITUDE
FROM TBL_INCIDENT AS T JOIN BTEAM.TBL_REPORT AS R ON T.INCIDENT_ID=R.GLOBAL_REPORT_ID
JOIN TBL_PICKLIST_VALUE AS S ON T.CURRENT_STATUS=S.PICKLIST_VALUE_ID
JOIN TBL_PICKLIST_VALUE AS P ON T.PROGNOSIS=P.PICKLIST_VALUE_ID
LEFT JOIN TBL_PICKLIST_VALUE sev ON t.SEVERITY = sev.PICKLIST_VALUE_ID
LEFT JOIN TBL_RELATED_REPORT rr ON r.GLOBAL_REPORT_ID=rr.GLOBAL_REPORT_ID
LEFT JOIN TBL_INCIDENT_LAW_ENFORCEMENT l ON t.LAW_ENFORCEMENT_ID=l.GLOBAL_LAW_ENFORCEMENT_ID
LEFT JOIN TBL_INCIDENT_MEDICAL_HEALTH m ON t.MEDICAL_HEALTH_ID=m.GLOBAL_MEDICAL_HEALTH_ID
LEFT JOIN TBL_INCIDENT_MASS_CARE_SHELTER sh ON t.MASS_CARE_SHELTER_ID=sh.GLOBAL_MASS_CARE_SHELTER_ID
LEFT JOIN TBL_INCIDENT_FIRE_RESCUE fr ON t.FIRE_RESCUE_ID=fr.GLOBAL_FIRE_RESCUE_ID
LEFT JOIN TBL_INCIDENT_HAZ_MAT hz ON t.HAZ_MAT_ID=hz.GLOBAL_HAZ_MAT_ID
LEFT JOIN TBL_INCIDENT_CASUALTIES cas ON t.CASUALTIES_ID=cas.GLOBAL_CASUALTIES_ID
LEFT JOIN TBL_NOTIFICATION noty ON r.NOTIFICATION_ID=noty.NOTIFICATION_ID
LEFT JOIN TBL_NOTIFICATION_OTHER_LIST notyOther ON r.NOTIFICATION_ID=notyOther.NOTIFICATION_ID
LEFT JOIN TBL_LOCATION loc ON r.LOCATION_ID=loc.LOCATION_ID
LEFT JOIN TBL_DATA_SHARING ds ON r.DATA_SHARING_ID=ds.DATA_SHARING_ID
LEFT JOIN TBL_GEO_LOCATION_MAPPING glm ON r.GEO_LOCATION_MAPPING_ID=glm.GEO_LOCATION_MAPPING_ID
WHERE R.STATUS = ('A')  and LATITUDE <> ''  and LONGITUDE <> ''
```

Fig. 35-1

```
<?xml#version="1.0"#?><table#class="jdbcConnTab">
<tr><th><![CDATA[CURRENT STATUS]]></th><th><![CDATA[INCIDENT_TYPE]]></th><th>
<![CDATA[DATE_TIME]]></th><th><![CDATA[LOCATION NAME]
]></th><th><![CDATA[INCIDENT NAME]]></th><th><![CDATA[NUMBER OF FATALITIES]]></th>
<th><![CDATA[NUMBER_OF_INJURIES]]></th><th><![CDATA[INCIDENT_ID]]></th><th><![CDATA
[NUMBER OF EVACUATIONS]]></th><th><![CDATA[PROGNOSIS]]></th><th><![CDATA[LEAD_AGENCY]]>
</th><th><![CDATA[SEVERITY]]></th><th><![CDATA
[DAMAGE BUILDING]]></th><th><![CDATA[INCIDENT_NUMBER]]></th><th><![CDATA[
DAMAGE UTILITIES]]></th><th><![CDATA[DAMAGE ROAD]]></th>
<th><![CDATA[SHOW ON_MAP]]></th><td><![CDATA[GEO_LOCATED_BY]]></th><th><![CDATA[
LATITUDE]]></th><th><![CDATA[LONGITUDE]]></th> </tr>
<tr> <td><![CDATA[130]]></td><th><![CDATA[Gate/Fence#Intrusion]]></td>
<![CDATA[2008-05-20#00:54:09.0]]></td><td><![CDATA[Fort#Sam#Houston-#South#Gate]
]></td><td><![CDATA[Fort#Sam#Houston-#South#Gate#Gate/Fence#Intrusion]]>
</td><td><![CDATA[0]]></td><td><![CDATA[0]]></td>
<td><![CDATA[null-ETeam-12134678706400679 750]]></td><td><![CDATA[0]]></td>
<td><![CDATA[60]]></td><td><![CDATA[Police#Dept]]></td><td><![CDATA[290]
]></td><td><![CDATA[]]></td>
<td><![CDATA[Inc-005444-679-052008]]></td><td><![CDATA[]]></td><td><![CDATA[]]>
</td><td><![CDATA[Y]]></td><td><![CDATA[Manual#Entry]]></td><td><!
[CDATA[29.445064]]></td><td><![CDATA[-98.450467]]></td>
</tr><tr><td><![CDATA[130]]></td><td><![CDATA[Police#Incident]]></td><td><!
[CDATA[2008-11-06#20:30:00.0]]></td><td><![CDATA[Fremont#(John#C.)
#High#School]]></td><
![CDATA[FREMONT#(John#C.)#High#School#Police#Incident]]></td><td><![CDATA[0]]></td><td>
<![CDATA[0]]></td><td><![CDATA[null-ETeam-12260298217030867 7120]]>
</td><td><![CDATA[0]]></td>
<td><![CDATA[60]]></td><td><![CDATA[Police#Dept]]></td><td>
<![CDATA[290] ]></td><td><![CDATA[]]></td><td><![CDATA[
Inc-224607-786-110608]]></td><td><![CDATA[]]></td><td><![CDATA[
]]></td><td><![CDATA[Y]]></td><td><![CDATA[Manual#Entry]]></td>
<td><![CDATA[33.969970]]></td><td><![CDATA[-118.269404]]></td></tr><tr><td>
```

```
<?xml version="1.0" ?>
<xsl:stylesheet xmlns:SOAP-ENV="http://schemas.xmlsoap.org/soap/envelope/"
xmlns:ns1="urn:GoogleSearch"
xmlns:xsl="http://www.w3.org/1999/XSL/Transform" exclude-result-
prefixes="SOAP-ENV ns1" version="1.0">
<xsl:template match="/">

<script type="text/javascript">
    function windowPopup(url) {
    window.open( url );
    return false;
}
</script>

<xsl:for-each select="SOAP-ENV:Envelope/SOAP-ENV:Body/
ns1:doGoogleSearchResponse/return/resultElements/item">

<a>
    <xsl:attribute name="href"><xsl:value-of select="URL" /></
xsl:attribute>
    <xsl:attribute name="onclick">return windowPopup(this.href)</
xsl:attribute>
        <div style="color: blue;"><xsl:value-of select="title" /></div>
</a>
<div style="font-weight: normal"><xsl:value-of select="snippet" /></div>
<div style="color: green;"><xsl:value-of select="URL" /> -
<xsl:value-of select="cachedSize" /></div>
<xsl:if test="position()!=last()">
<br/>
</xsl:if>

</xsl:for-each>
</xsl:template>
</xsl:stylesheet>
```

TECHNIQUES FOR INTEGRATING PARAMETERIZED INFORMATION REQUEST INTO A SYSTEM FOR COLLABORATIVE WORK

CROSS-REFERENCE TO RELATED APPLICATIONS

This application claims priority from U.S. provisional patent application 61/035,489, Rudolph et al, System for Delivery of External Data to Support Collaborative Activity, filed 11 Mar. 2008.

The present application is a Continuation-In-Part of, and claims priority from, co-pending application, U.S. Ser. No. 11/939,250, Ahlgren, et al, "System for supporting collaborative activity", filed 13 Nov. 2007). The new material may be found at the following locations in the present application:
- the portion Background concerning Parameterized Information Requests in the section BACKGROUND OF THE INVENTION.
- the section BRIEF SUMMARY OF THE INVENTION.
- the portion Connectors in the section DETAILED DESCRIPTION, and
- starting at FIG. 35 in the figures.

The present application hereby incorporates both of these patent applications by reference for all purposes.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

This invention relates to systems for improving communication among people who are collaborating in the performance of a task 2. Description of Related Art Computers coupled to networks have made collaborative work easier than ever before. At the most fundamental level, file sharing and email have eliminated the requirement that collaborators be in physical proximity to each other. The change tracking arrangements that are provided by most document processing systems further support collaborative work, as do computer-implemented scheduling and tracking systems. Integrated systems for collaborative work provide features such as file sharing, email, change tracking, scheduling, and tracking in a single package. A problem with these tools and integrated systems for collaborative work is that they are very general. It is up to the user to adapt them to his or her needs. To be sure, a skilled user of a tool such as a spreadsheet can adapt the tool to almost any purpose, but to do this, extensive programming is required. Such programming requires a specialist, and the result of the programming is often opaque to those who are not masters of the tool and of what is being represented. Indeed, a general problem with tools that require extensive programming to adapt them to a user's needs is that the programming is usually done by a specialist who understand the tools or the system, but not the nature of the collaboration, and as is usual in such situations, communication between the programming specialist and the users is usually difficult and sometimes impossible.

Another approach to collaborative work has been systems that are specialized for collaborative work in a particular special area, such as bookkeeping. For example, the Quickbooks small business accounting software provides a model of a small business as seen from the point of view of an accountant that the user of Quickbooks can customize for his or her own purposes. While the model of the small business that Quickbooks provides is very useful for accounting, it has no relevance whatever to other aspects of the business.

Another approach is described in U.S. patent application Ser. No. 10/765,424 ('424 application). FIG. 34 shows a diagram of a model 4101 as described in the '424 application. A number of collaborators 4005 (1 ... n) are organized into one or more collaborator groups 4003 (1 ... m). A collaborator 4005 may belong to more than one group 4003. The context in which the collaborators 4005 work is represented by a domain hierarchies 4009 (1 ... k), goal-project hierarchies 4011 (1 ... m), and initiative hierarchies 4109 (1 ... o).

Each goal-project hierarchy 4011 has at its head a project or a goal. A goal may have other goals and projects 4015 as its children. A project 4015 may have other projects as its children, but may not have a goal as a child. Any goal, project, domain, or initiative may have one or more items of information 4017 associated with it, as indicated by arrows 4105. The information may include documents, messages, discussions, reminders, Web links, and alerts. The ability to relate information 4017 directly to any kind of hierarchy entity is particularly useful when the information is global to the entire domain or initiative.

An initiative 4109 is not a member of any domain hierarchy 4010 or goal-project hierarchy 4011, but is rather the root of an initiative hierarchy 4111 which may include sub-initiatives and a single level of goals and/or projects from any of the goal-project hierarchies. A goal or project may belong to any number of initiatives. Information may be related to an initiative in the same way that it may be related to any hierarchy entity.

Access to domains, goals, and projects is by collaborator groups 4003. A given collaborator group 4003(i) may have access to any combination of domains, goals, projects, and initiatives in model 4101. The kinds of access which a collaborator belonging to a particular group has to a particular domain, goal, project, or initiative depend on the group's group type and the permissions which the group has for the particular domain, goal, project, or initiative.

Collaborators with the proper permissions may modify not only the information 4017 associated with a goal, project, domain, or initiative, but may also modify the form of the respective hierarchy.

A limitation of the model 4101 is that it provides only one view of the hierarchies' structure. This limits the usefulness of the model to more complex processes or organizations, where multiple views of the hierarchies would be helpful.

Background Concerning Parameterized Information Requests

The system of the parent application, while providing access to a number of information sources in useful ways, did not support information sources that respond to parameterized information requests. For example, it did not provide access to relational database management systems (RDBMS). The complexity of supporting parameterized information requests is illustrated in FIG. 35 for an example RDBMS system:

3500 shows the request parameter for a parameterized information request for this information source. The request parameter for this information source must be expressed in a dialect of the SQL query language.

3550 shows the data text of the information response, after special programming has converted it from the on-the-wire format for this particular information source.

The example in FIG. 35 is for an RDBMS information source that provides information about security incidents. The request parameter at 3500 requests a list of recent security incidents and information about them. The response is a list of incidents and information as specified in the request parameter Neither of the examples of FIG. 35 is understandable to general users Parameterized information requests are an important feature of a system for information sharing and collaborative work:

Parameterized information requests allow a client of an information source to request specifically desired information.

Many information sources require support for parameterized information requests: they provide information only as a response to such requests in proper form.

The difficulty with supporting parameterized information requests is that they are complex. They involve special programming at multiple levels, special languages for specifying what is requested, and special expertise.

For a system supporting real-time collaborative work, it is also important that appropriate users of the system can add new information sources and new parameterized information requests to the system quickly and with minimal difficulty.

There are many information sources that provide information in response to parameterized information requests. For example, an information source with real-time information about hospitals may be able to provide many kinds of information, such as the number of emergency-patent beds currently available in hospitals near a certain location. An information source about the weather may be able to provide many kinds of current information about weather conditions and weather forecasts for different locales on different days.

However, these systems provide the information only in response to parameterized information requests, in the form for the particular information source, that specify what information is requested.

The technical aspects of supporting parameterized information requests are a barrier to and a limitation on their use. There are difficulties and burdens associated with parameterized information request at several levels.

One burden is the need to have an appropriate user interface for requesting and presenting particular information from particular information sources as needed by the user. The user interface must provide support for parameterized information requests in a fashion that is not difficult for a general user.

Another burden is that query request parameters often must be expressed in a special query language. The example of 3500 uses a dialect of the SQL language.

However, many languages for query request parameters exist: while SQL is used for many RDBMS information sources, SQL is implemented in a number of dialects by different vendors. Another relevant language standard is SOAP, which involves the complex language XML. The ISO 8583 standard describes yet another such language for financial information, and the OCSP standard describes yet another language for computer security status. Many information sources involve yet other languages, and a language may even be unique to the particular information source.

General users of collaborative systems will not have expertise in these languages. Even for users who have some expertise in one particular language, the languages can be complex and awkward to use, and interfere with the tasks of real-time collaboration and information sharing.

A further barrier is that accessing multiple information sources generally requires expertise in multiple different programming systems, as different information sources are programmed differently. A further barrier is that different kinds of information sources must be accessed by different programming protocols and interfaces.

For example, Relational data base systems require programming according to JDBC Java classes, or another programming interface. Many information sources implemented as web services require programming according to SOAP method calls or other programming standards. Information sources implemented according to IBM's ESB Enterprise Service Bus require yet different programming. Yet other information sources require specialized programming unique to the particular source. There is also considerable variation in the programming for authentication, encryption, network protocols, and other aspects of the necessary programming, even for systems of the same kind.

It is thus an object of the present invention to overcome these limitations and to provide a system for collaborative work that permits collaborators to make parameterized information requests.

SUMMARY OF THE INVENTION

Objects of the invention are attained by apparatus for specifying a class of parameterized information requests and making instances of parameterized information requests that belong to the class. The apparatus is implemented in a system having a processor and data storage accessible the processor. The data storage includes a connector object that represents the class of parameterized information requests, a request parameter object that defines a request parameter for parameterized information requests belonging to the class, and an information source access object that specifies attributes of an information source which will receive the instances of the parameterized information request that belong to the class. The processor responds to an input specifying creation of an instance of the class of parameterized information requests represented by the connector by using the request parameter defined in the request parameter object and the attributes of the source of information to make an instance of the class.

Further aspects of the apparatus include:

the request parameter object specifies a plurality of request parameters and the input further specifies one of the request parameters and the processor uses the specified request parameter to make the instance of the class.

a request parameter may include a bind parameter, the objects of the apparatus include a bind parameter object that specifies a value for the bind parameter, and the processor uses the value specified for the bind parameter in making the instance of the class. The bind parameter object may specify a default value for the bind parameter, a first overriding value for the bind value which is employed in a particular class of user interfaces and which overrides a default value for the bind value, or a second overriding value which is employed in a particular instance of the user interface and which overrides both the default value and any first overriding value. The default value for the bind parameter may also be overridden by a value specified in the particular instance of the user interface.

the objects of the apparatus also include a response processing object that specifies how the processor is to process the response resulting from the instance of the parameterized request the request parameter is a query that can be interpreted by the information source.

the connector objects, request parameter objects, information source access objects, bind parameter objects, and the response processing objects are rows in tables in a relational database system.

In another aspect, the objects are attained by an improved system for providing a user with a graphical user interface. The graphical user interface permits specification of an information resource and the system responds to the specification by providing the information resource to the user. In the improved system, the specification is of an information resource that is obtained using an instance of a parameterized information request and the system responds to the specification by providing the instance of a parameterized information request to the information source and providing the information source's response to the instance of the parameterized information request to the user. A storage device accessible to a processor includes objects as described above that represent a class of parameterized information requests that includes the instance and the processor uses the objects to make the instance of the parameterized information request.

In a still further aspect, the objects are attained by a graphical user interface for specifying a class of parameterized information requests. The class is specified by objects as described above and the graphical user interface includes a connector specification interface for specifying a connector object that represents the class of information request, a request parameter specification interface for specifying a request parameter for parameterized information requests belonging to the class, and an information source access specification that specifies the attributes of the information source. The objects are contained in storage accessible to a processor and the processor responds to the connector specification interface by producing the connector object, to the request parameter specification interface by producing a request parameter object for the request parameter and to the information source access object specification interface by producing an information source access object for the attributes of the information source.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIGS. 4A-4K show more detailed views of entity-relationship diagrams for select groups of tables.

FIGS. 7-8B illustrate the set up of resources.

FIGS. 9A-9E illustrate the set up of workspaces.

FIGS. 10A-10F illustrate the set up of users.

FIGS. 11A-12 illustrate a login by a user.

FIGS. 17A-17C show the creation of a resource.

FIGS. 19A-19I show the set up of links for a resource.

FIGS. 20A-20E show the set up of RSS feeds for a resource.

FIGS. 22A-22F show the adding of a document to the workspace.

FIGS. 22G-22I show the updating of a resource.

FIGS. 23B-23D show the importing of resources for a workspace.

FIGS. 24A-24E show the set up of knowledge boards.

FIG. 27B shows the refreshing of the message center.

FIG. 28 shows the set up of alerts.

FIGS. 29A-29F show the set up of messages.

FIG. 30 shows the set up of permissions.

FIGS. 31A-31C illustrate the set up of user's personal preferences and password.

FIG. 33C shows the set up of the security manager.

FIG. 33F shows the set up of the email manager.

FIG. 33G shows the set up of the search manager.

FIG. 35 shows examples for programming a parameterized information request and the response from an information source to that request.

FIG. 37 shows an example of the GUI for specifying a parameterized information request for a connector

FIG. 42 shows an example of an XSL document that may be used with the present system.

FIG. 45 shows details of the GUI for specifying a query request parameter for a connector.

FIG. 49 shows further details of the GUI for specifying a connector field in a resource template.

Figure 1:
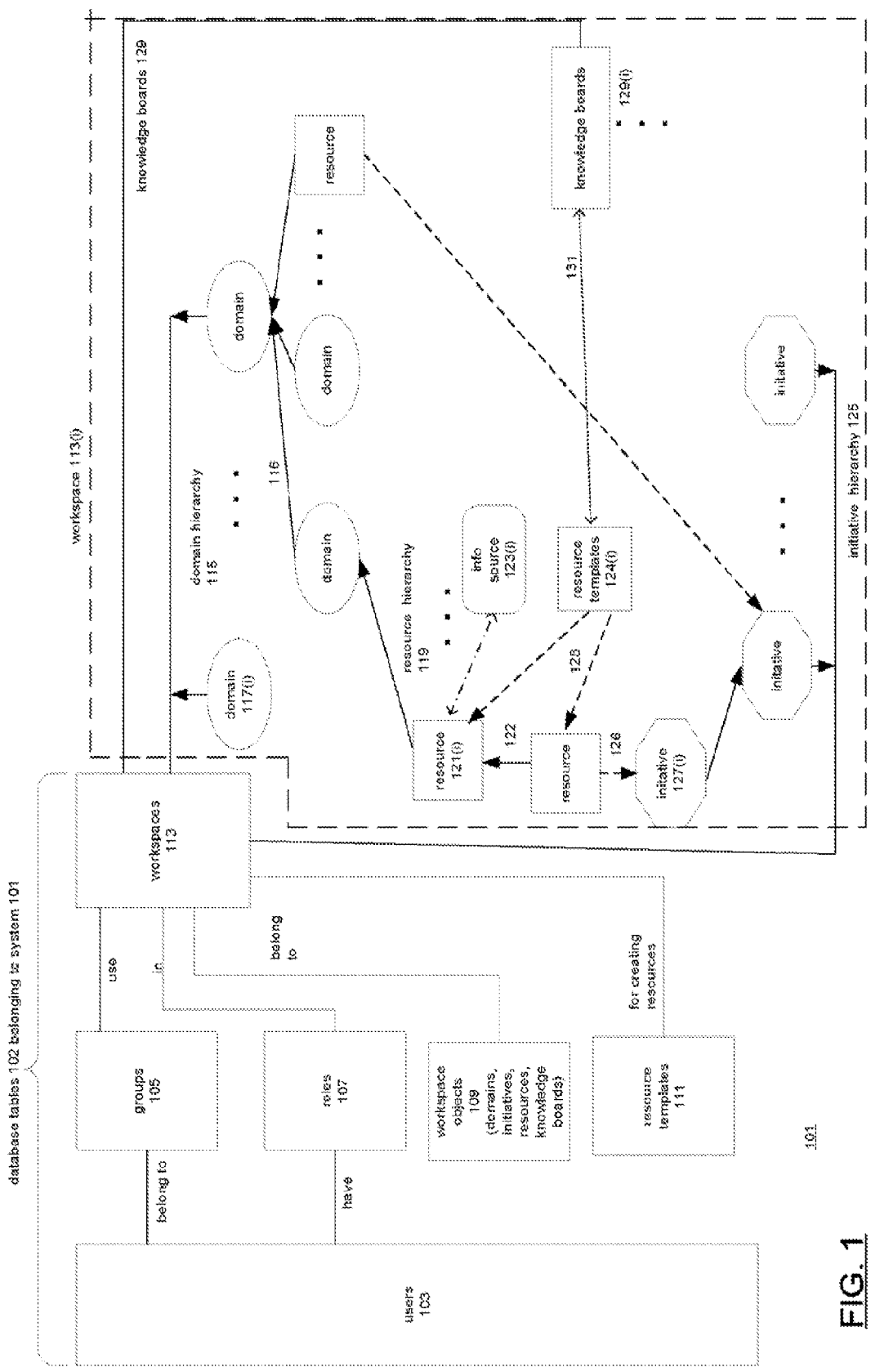
FIG. 1 provides an overview of the system 101 for supporting collaborative activity.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The new material in the Detailed Description begins at the portion entitled Connectors.

A system for supporting collaborative activity includes a processor and an interface that is provided to collaborators by the processor. The processor has access to a representation of a model of the activity. The form of the model is defined by the collaborators and the representation of the model provides access to information related to the activity. The interface permits a collaborator to perceive and modify the model's form and to perceive and modify the information to which the representation of the model provides access. The model is implemented using workspaces from which the user may access information and perform activities having to do with the collaboration. The workspaces are provided to users as part of a shared online collaboration software platform that connects people, strategies, technology, and resources in a rapidly developed and deployable on-line workspace.

A. Overview of the System

FIG. 1 provides an overview of the system 101 for supporting collaborative activity. The system is scalable to be usable in very large collaborative enterprises. The system contains two types of elements, those that are structural (domains and initiatives) and those that are shareable (resources). Domains 117 represent the organizational structure of the groups coming together in the system. Initiatives 127 represent one or more process structures for how the group or teams accomplish their goals. Domains and initiatives provide two different views of the resource without the need to duplicate the resources. Resources 121 are collections of elements defined by users that give the users access to information sources 123. The individual information sources to which the resource gives access are associated with fields in the resource.

Collaborating users can organize domains 117 and initiatives 127 into hierarchies 115 and 125. A user can associate a resource 121 with a domain, a sub-domain, or another resource associated with a domain. Resources can be presented as many times as required within the initiative, and therefore could be used in multiple scenarios, without the need to be duplicated. The domain and initiatives hierarchies thus provide users with ability to view objects of information (such as resources and/or knowledge boards (described below)) within an organization structure or an operational structure without need to duplicate the objects.

Domains, initiatives, and resources can be renamed by administrators to reflect the terminology used by their organization. For example, a domain can be renamed as an organization or an agency; an initiative can be renamed as an operation or a process; and a resource can be renamed as a record.

Resources may be organized into resource hierarchies, as shown by arrow 122, and the resource hierarchies belong to domains 117, which themselves may be hierarchically organized (115). A resource may have a domain as a parent, but a domain cannot have a resource as a parent. A given resource 121 may belong to only one domain 117. Generally, though not necessarily, the domain hierarchy reflects the organization chart of the collaboration. For example, if the collaboration is a business, there may be domains for manufacturing, engineering, sales, accounting, human resources, and corporate management, with sub-domains within the domains, for example, a sub-domain for hourly employees in human resources.

In addition to being related to a domain, a resource may also be related to an initiative 127. Initiatives may form hierarchies 125. The navigation GUI for system 101 permits the user to navigate to a resource either by means of the domain hierarchy or by means of the initiative hierarchy. Generally, though not necessarily, initiatives are created to deal with specific problems where the resources required to deal with the problem cut across domain lines. For example, if the domains are set up as described in the foregoing example and the business has a quality control problem, an initiative may be set up to deal with the quality control problem and may include resources from the manufacturing, engineering, and corporate management domains. Domains and initiatives thus give participants different perspectives on the resources needed for the collaboration.

Resource tempaltes 124 are global objects that define classes of resources, as defined by a system administrator. They specify what types of information are associated with resources belong to the class defined by the resource template by defining the number and types of data fields associated with them. When a user creates a resource, the user begins with a resource template. The fields of the resource template are filled in by the user when the resource is created or modified, according to the domain or initiative the resource relates to.

In addition to viewing resources within a domain or initiative, the resource template can be used to locate resources belonging to the class that the template defines. This location of resources is defined by users in knowledge boards or dashboards 129. When a user creates a knowledge board, the user uses the resource template to associate resources belonging to the resource template's class with the knowledge board and to select what information from resources of the class will be displayed in the knowledge board. The relationship between the resource template and the resources created from the template are maintained in the system for the knowledge boards. A knowledge board is defined for a workspace but does not belong to any of the hierarchies. The navigation GUI lists the workspace's knowledge boards along with both the initiative and domain hierarchies. The users select the columns (data fields) in the resource template to display and filter by parameters, such as specific text, dates, etc. These data fields are used to locate resources to which the template belongs and are then displayed in the knowledge board report in a table form.

The domains, initiatives, and resources are organized into a plurality of workspaces, each of which provides a managed environment. The system gives each collaborator/user access to one or more workspaces where a user may have different roles in different workspaces. The workspaces may be configured by non-technical people. The components of a workspace include domains 117, resources 121, initiatives 127, information sources 123, and dashboards or knowledge boards 129. These are termed in the following as the workspace's objects. Preferably, the system is implemented in a client-server architecture. The system server stores the workspace and its objects, as well as global objects, such as users and resource templates. The client comprises a processor which ahs access to the system elements. Users access the system's elements through a GUI at the client. Users may have different kinds of access to the objects in a workspace.

The workspace includes a navigation GUI as part of the online collaborative software platform that presents the content of its objects. A system administrator can create a unique workspace for a group of people, assign local administration responsibilities, and assign global resources from a global pool of resources. Users can be part of multiple workspaces and carry different access permissions. For example, a specific user can be a user only in one workspace and have administrator rights in another. User access permissions are described further below.

In an exemplary embodiment, information sources that can be related with a resource include documents, text files, links, RSS (Really Simple Syndication) feeds, and discussions. For documents already created and stored locally, a user can select from his workstation or from any shared drive a document to add to a resource. The document is then physically copied and loaded into the system server and will reside on its file directory system. All documents loaded on the system are maintained for the life of the system. This enables users to upload and store documents relevant to the resource. To modify the document after its association with the resource, a user "checks out" the document and downloads it from the server to the client for editing. When the editing's done, the user uploads the modified document from the client to the server.

The system also provides a simple text editor at a client of the system with which a user can create and upload a text file of the .txt type to the system server. This enables users to create a free format text file that can be created, uploaded, and opened by users without the need for a word processing application.

The system provides users the ability to relate links to the resource. Links provide quick access to information or tools. The link can be an external link or an internal link. External links provide access to an outside source, utilizing an address like an URL, or a link to a network source, utilizing a link to a shared device. This enables users to link to a shared document or other file types without the need to upload the files to the system. Other users on the network could access the same file without being part of the system. Internal links provide access to other resources within the system. When users want to use a resource that resides in a different structure of the system, they can provide a link that will launch that resource whenever it is called. This provides the flexibility to reuse resources without the need to create special initiatives for aggregation.

The system provides users the ability to relate an RSS feed to the resource. RSS feeds are web feeds in XML format that enable users to receive updated news or information articles through a special reader screen. The ability to provide these connections allow users to create a link that provides new, updated article every time the link is selected and articles are presented.

The system provides users the ability to relate discussions to the resource. Discussions are on-line, asynchronous, threaded chat boards that provide users a place to exchange questions, opinions, and remarks in relation to the resource topic. Users can initiate a discussion in-context to the resource's objective and either receives answers to the discussed topic or reply to a discussion topic started by another user.

Figure 2:
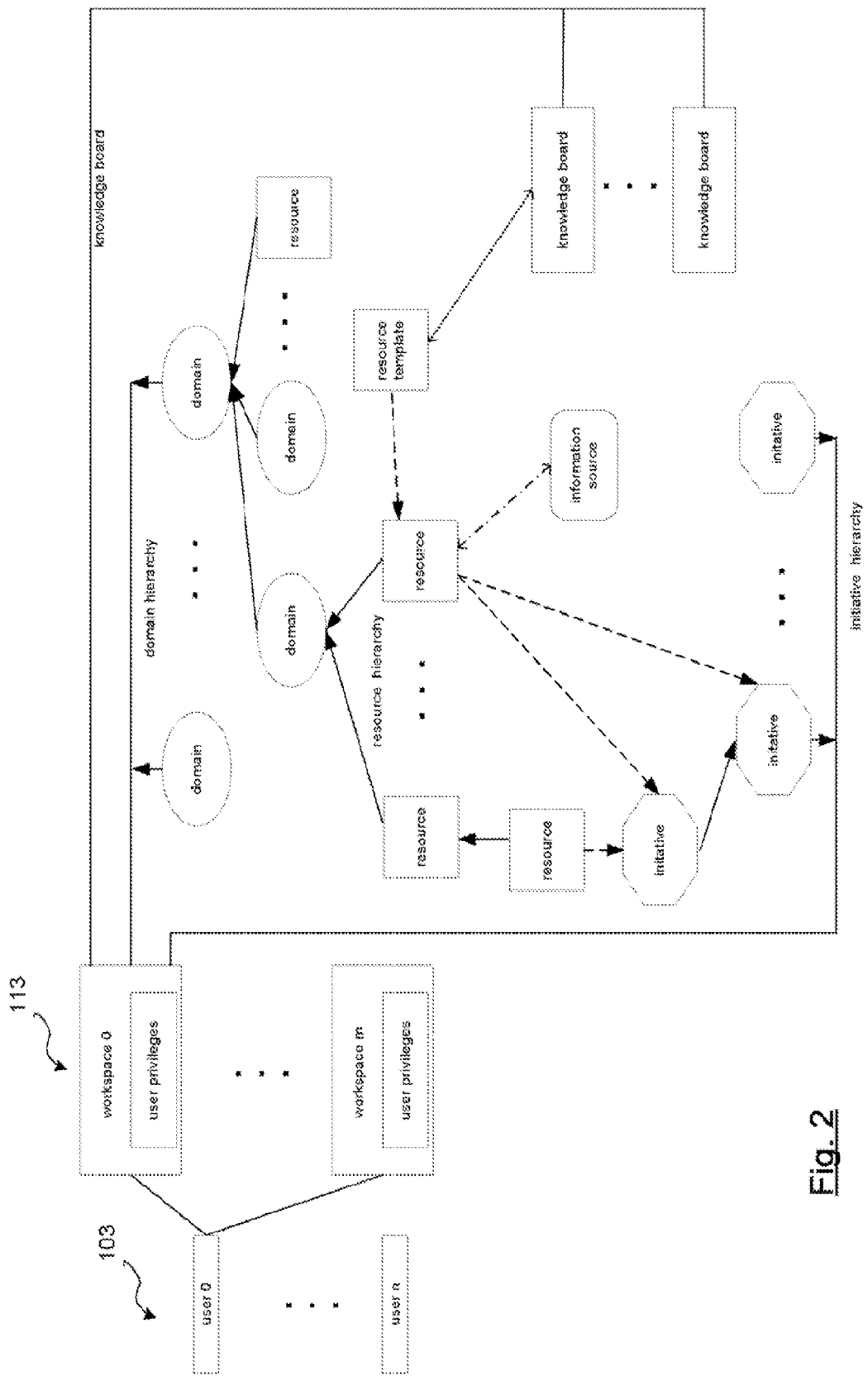
FIG. 2 illustrates a user's access to workspaces.

FIG. 2 illustrates a user's access to workspaces. Users 103 can be part of multiple workspaces 113 and carry different access permissions or privileges. The access that a given user has to a given object in a given workspace depends on the permissions that the user has to access the object in the workspace and the role that the user has in the workspace. The permissions in an exemplary embodiment are: no permission; read; read-create; read-create-update; read-create-update-delete. Permissions may be assigned to individual users and to groups of users. Group permissions override individual permissions. For example, if an individual user has no access to a given object but belongs to a group that has read-create access, the user will have read-create access as long as he or she is a member of the group. If a user has neither permission as an individual nor permission as a group member to access an object, that object will be invisible to the user.

Actual access to a given object may be limited by the given user's role in the workspace. The workspace roles in an exemplary embodiment are: viewer; user; manager; and administrator. For example, a user who has a viewer role may read but not create, update, or delete objects in the workspace. Consequently, such a user will see only those objects to which the user has some kind of access by virtue either of the user's individual permissions or by virtue of the group permissions of a group to which the user belongs. Because the user has the viewer role, the user will be able to do nothing with the objects to which he or she has access but read them.

Returning to FIG. 1, database tables 102 contain the information used to represent a workspace 113(i) and its components. In an exemplary embodiment, database tables 102 are implemented using a standard commercial database system such as those manufactured by Oracle Corporation™. The tables are shown in FIG. 1 in logical terms. A table of users 103 contains an entry for each user who has access to workspace in system 101. The users who have access to a given workspace are organized into groups in the workspace by a group table 105 and are assigned roles in the workspace by a role table 107.

A workspace table 113 has an entry for each workspace. Associated with the entry for the workspace are the groups that have access to the workspace, the roles these groups have, the resource templates used in the workspace (table 111), and the domains, initiatives, resources, and knowledge boards belonging to the workspace (table 109).

The system provides an internal messaging center to allow quick communication between users or whole groups of users. The message center does not rely on an email server so it can be used even when access to other systems in limited. The message center displays alerts generated by the system 101 and messages to specific users. Users can proactively select important resources within the system and let the system alert them whenever a new resource is added, changed, document are uploaded, links created, and others. This allows users to be selective as for what is important to them to be alerted of and reduce the need for users to send email messages alerting users of updates or changes to information. An email option is available for users who wish to receive the messages and/or the alerts on their email system as well. In this way, users who are away from the system can still be alerted to important information.

The system allows administrators to perform global setup of the navigation GUI. This includes the GUI for the application and the definitions of companies for which the workspaces are created. The system administrator can customize the application's logo, licensing keys, and application level administrative roles and names. The system administrator can define the companies that are sharing the GUI, including names and information of the companies, divisions, and departments.

B. Tables Implementing System

Figures 1, 3A:
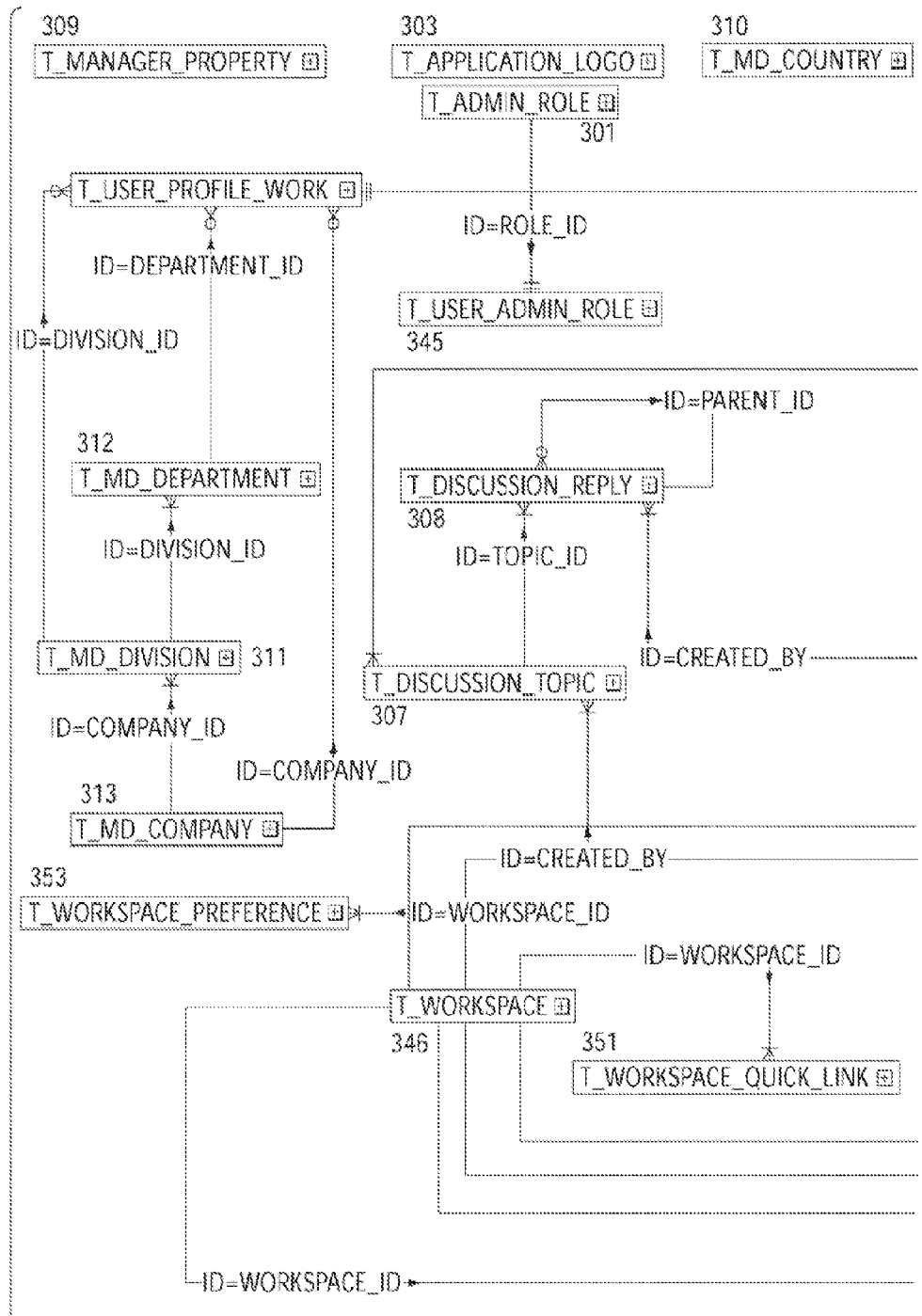
FIGS. 3A and 3B show the tables that are relevant to the implementation of the system.
Figures 2, 3A:
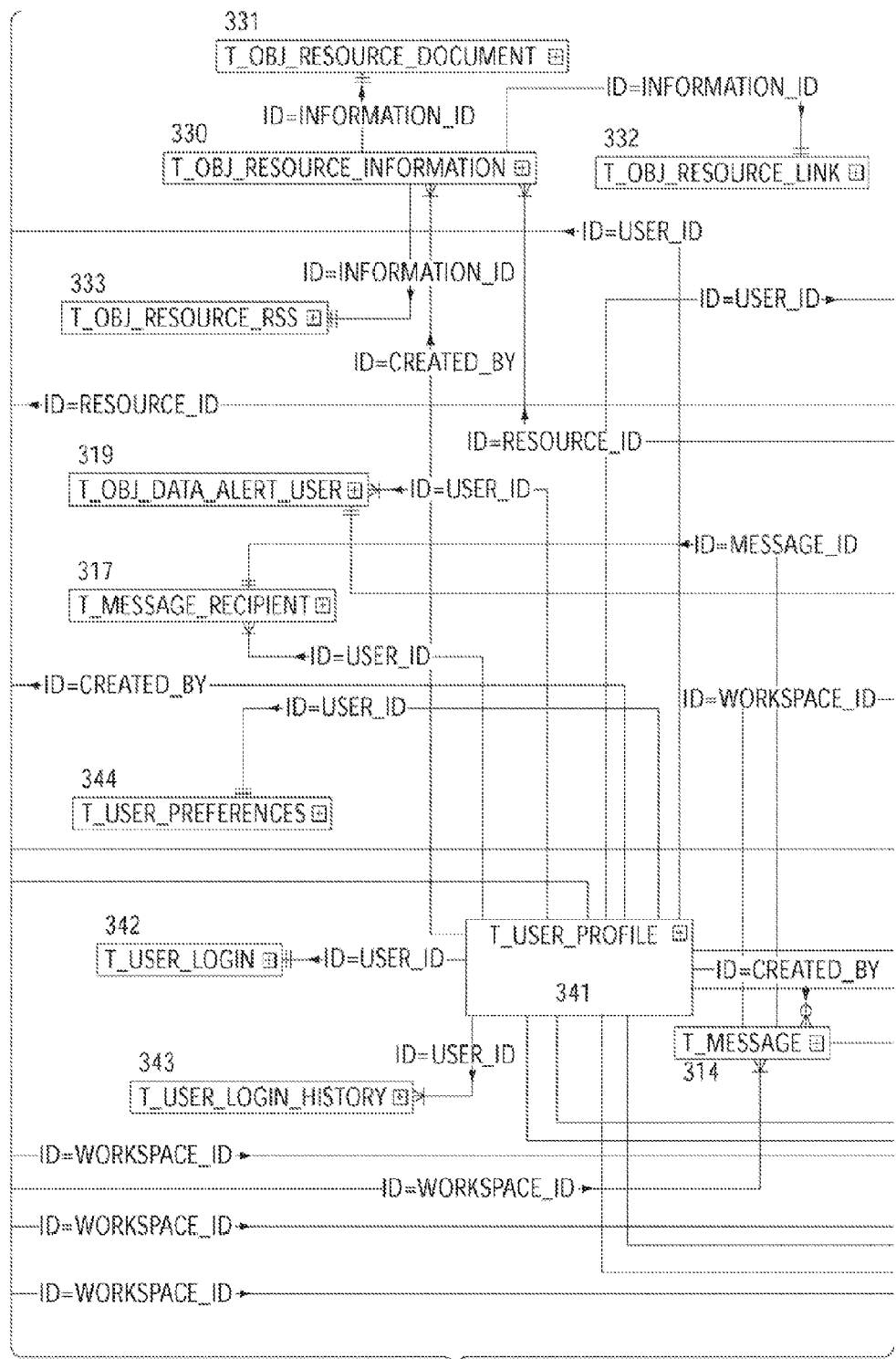
Figures 3, 3A:
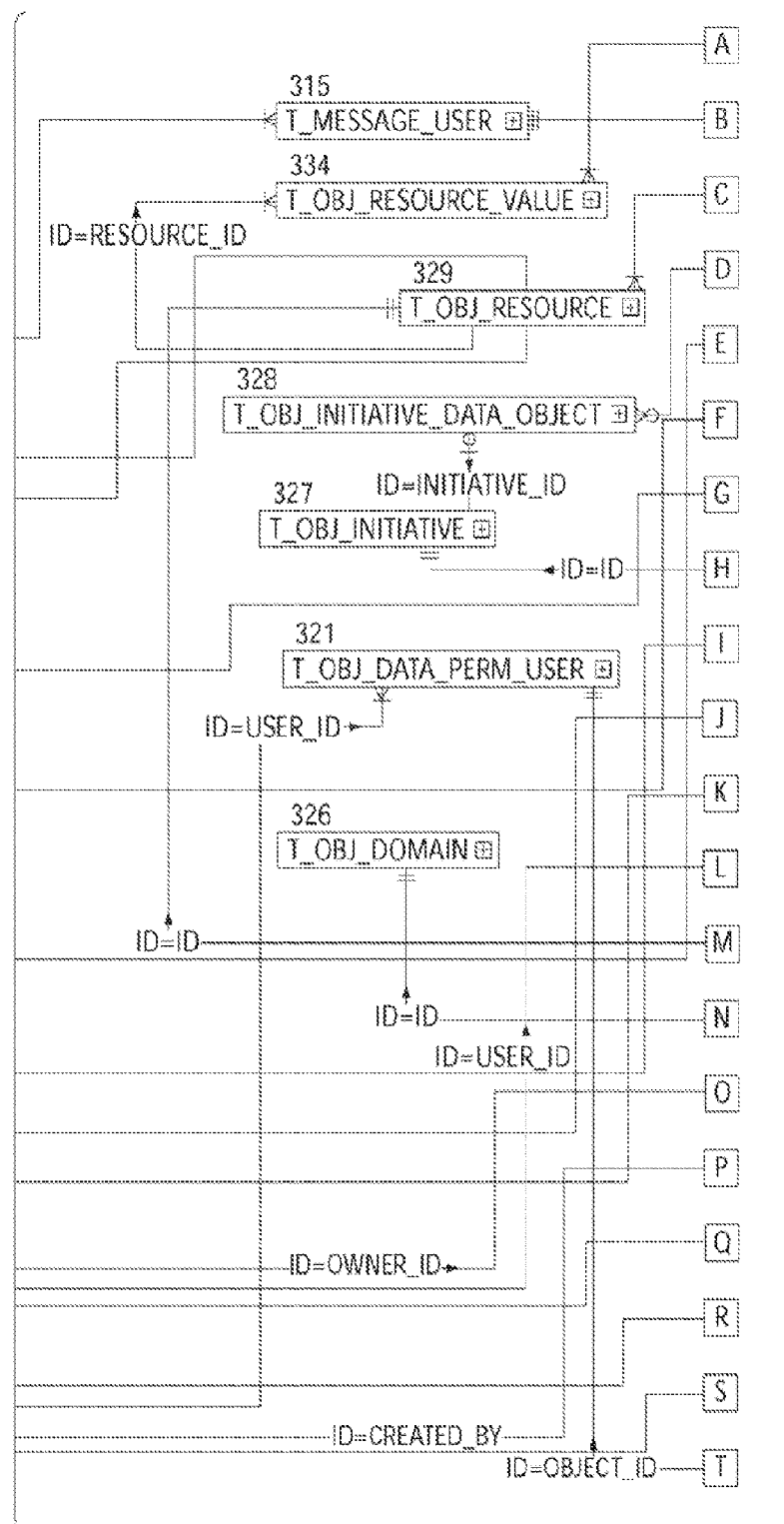
Figures 1, 3B:
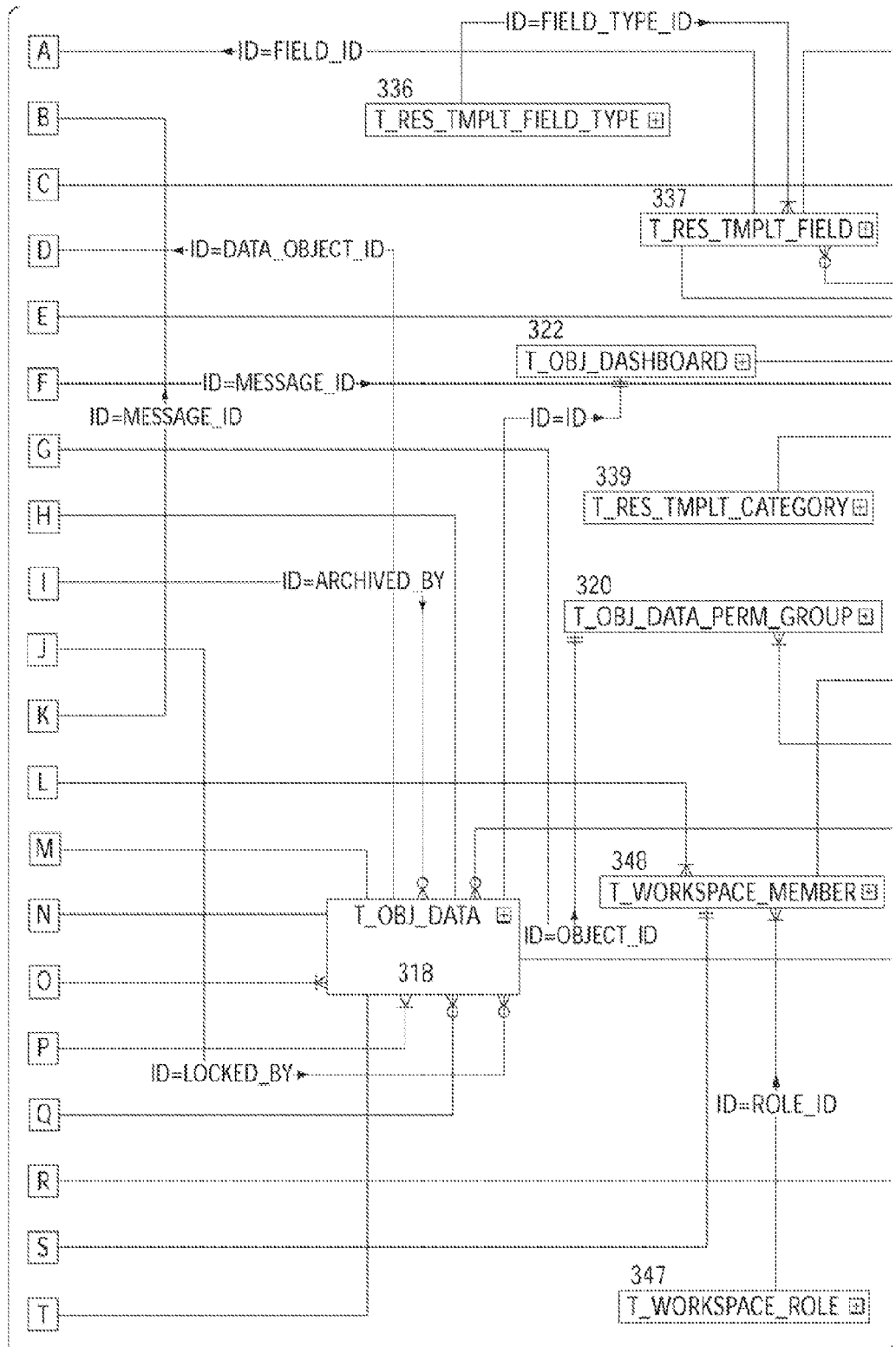
Figures 2, 3B:
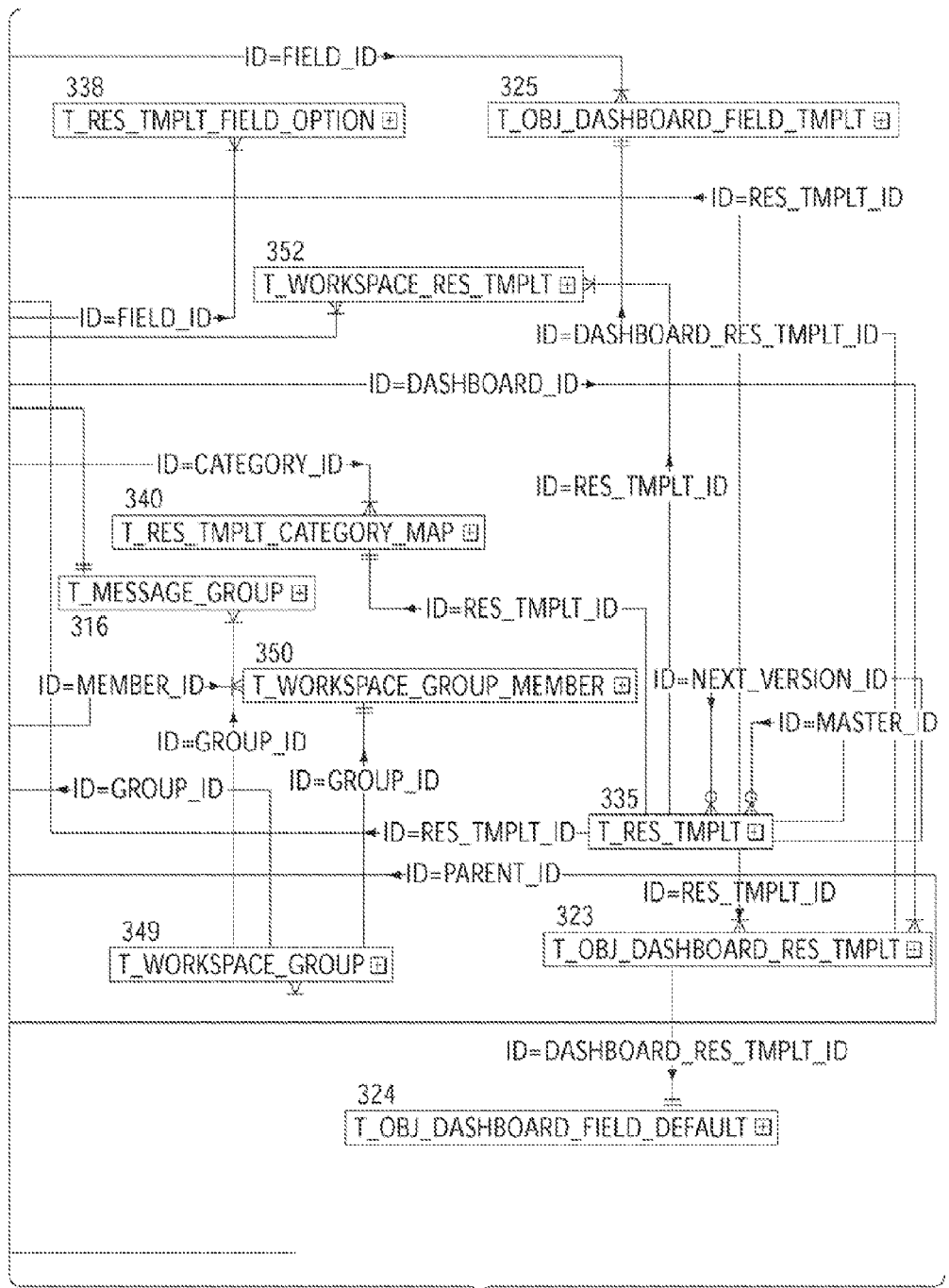

FIGS. 3A and 3B show the tables that are relevant to the implementation of the system as shown in FIGS. 1 and 2. FIGS. 3A and 3B are entity-relationship diagrams of the relevant tables. In such diagrams, arrows connecting the tables show relationships between them that are based on the occurrence of keys for rows in one table as values of non-key fields in rows in others of the tables. For example, each row of the table T_USER_ADMIN_ROLE table 345 contains a field whose value is a key for a record in the table T_ADMIN_ROLE 301. As shown there, the table in which the identifying value is a key is at the head of the arrow and the other table at the tail. In functional terms, what the arrow indicates is that the value of a field in a row of the table at the tail of the arrow can be used to retrieve a row from the table at the head of the arrow. The number of branches at the head of the arrows indicates how the numbers of rows in the two tables relate to each other. Multiple branches indicate a many-1 relationship, where many rows in the table at the tail of the arrow contain the key of a given row in the table at the head of the arrow. A single branch indicates a 1-1 relationship, where there will be a single row in the table at the tail of the arrow that has the key of the given record.

Figures 1, 4A:
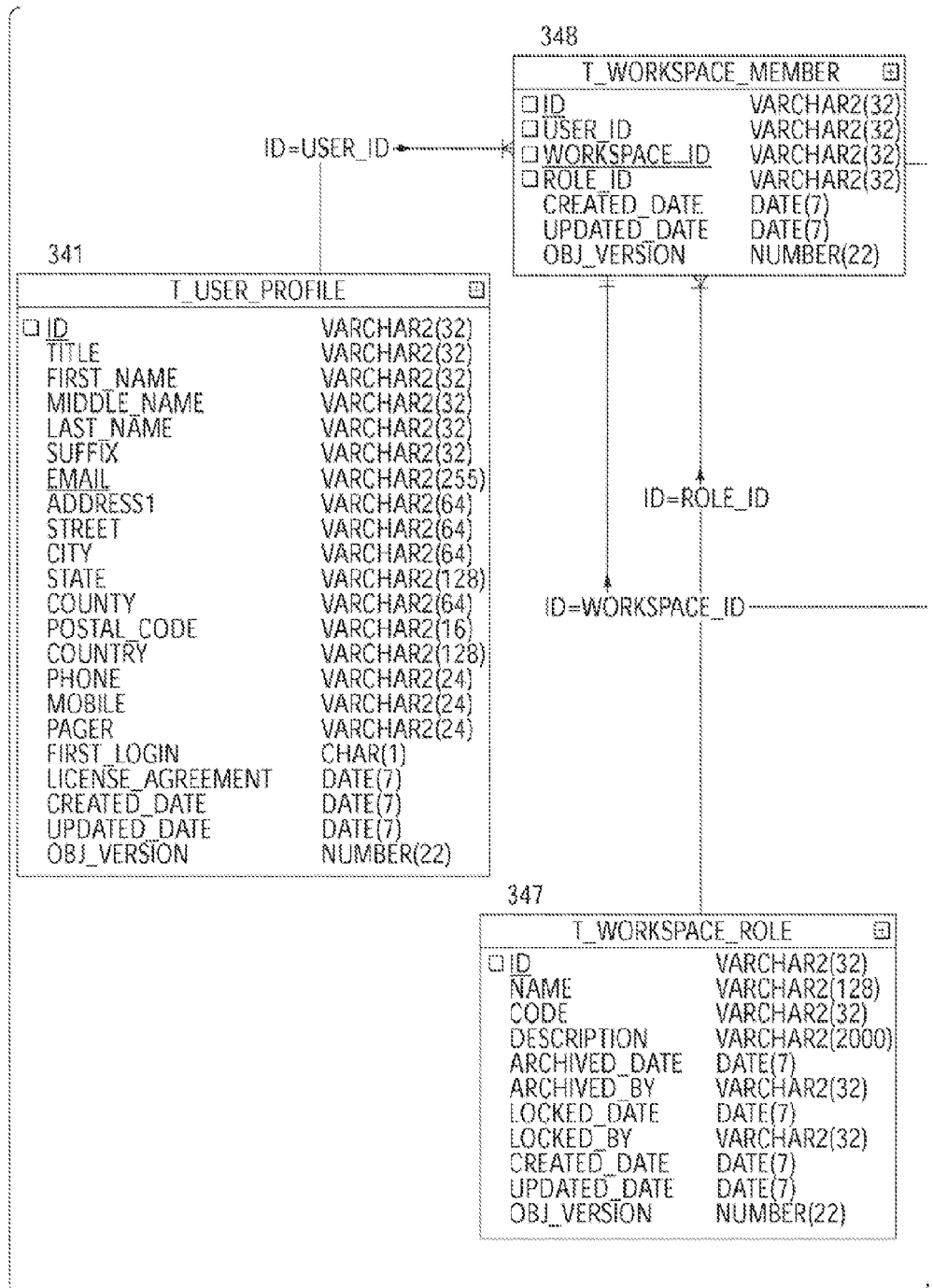
Figures 2, 4A:
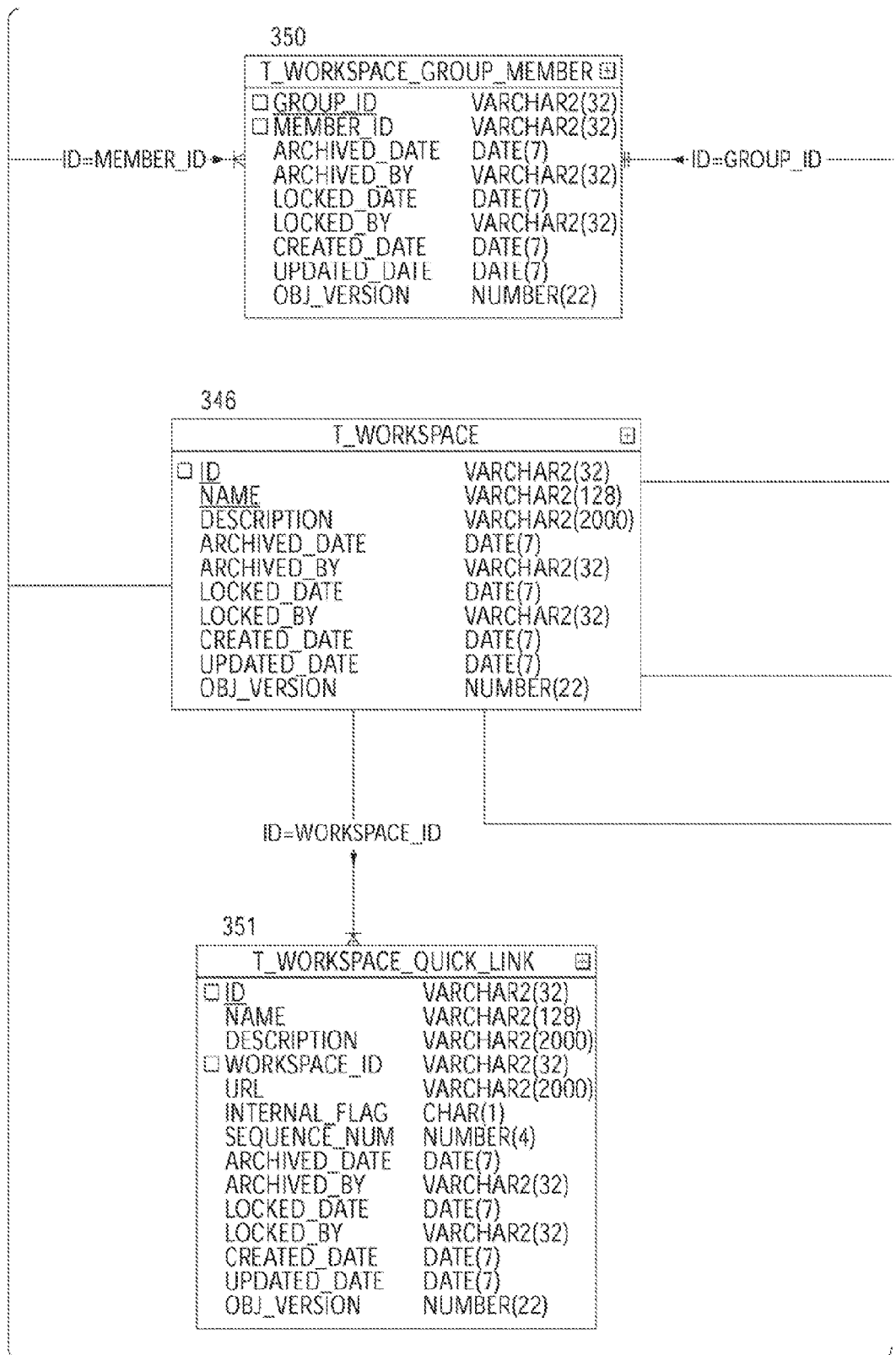
Figures 3, 4A:
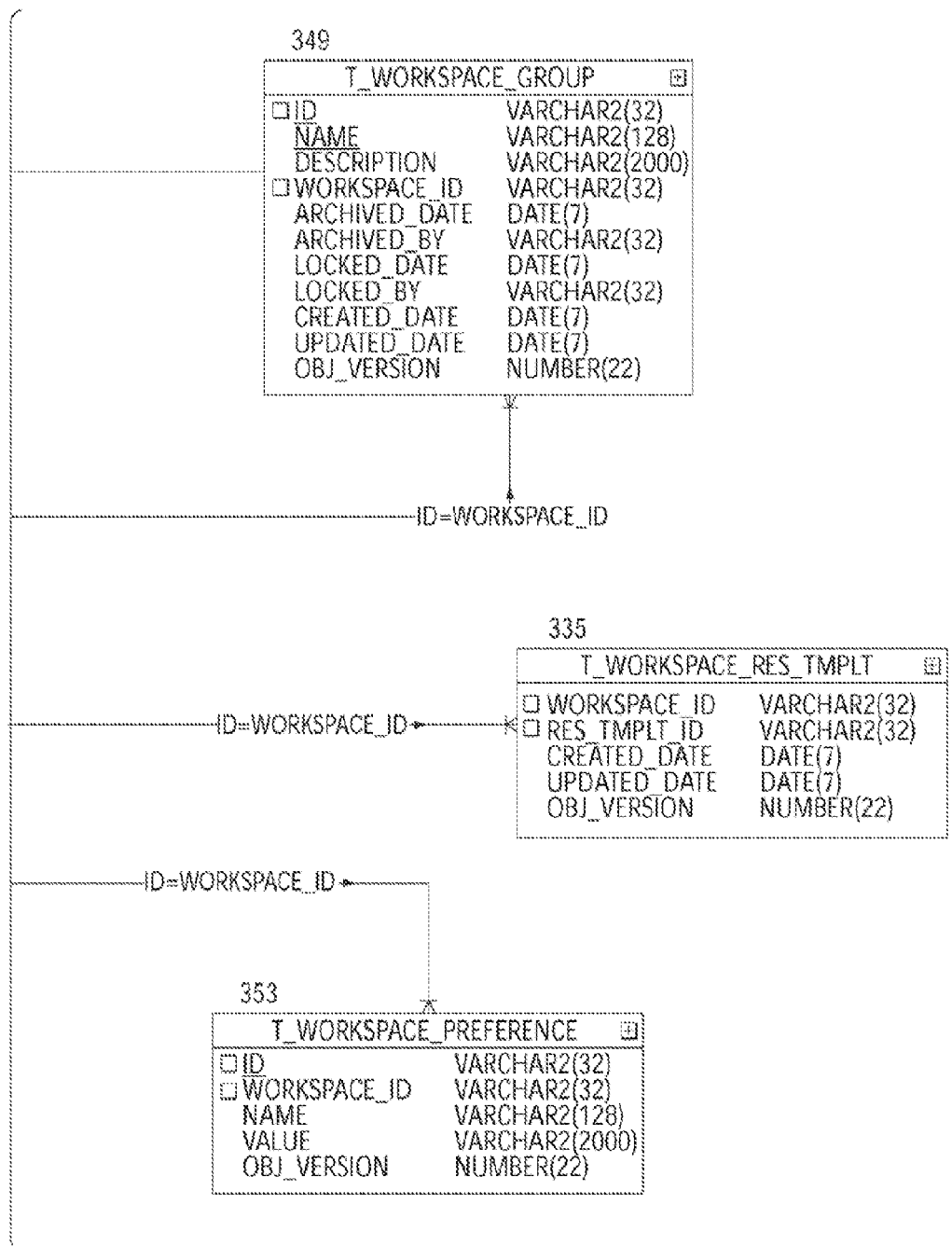
Figures 1, 4B:
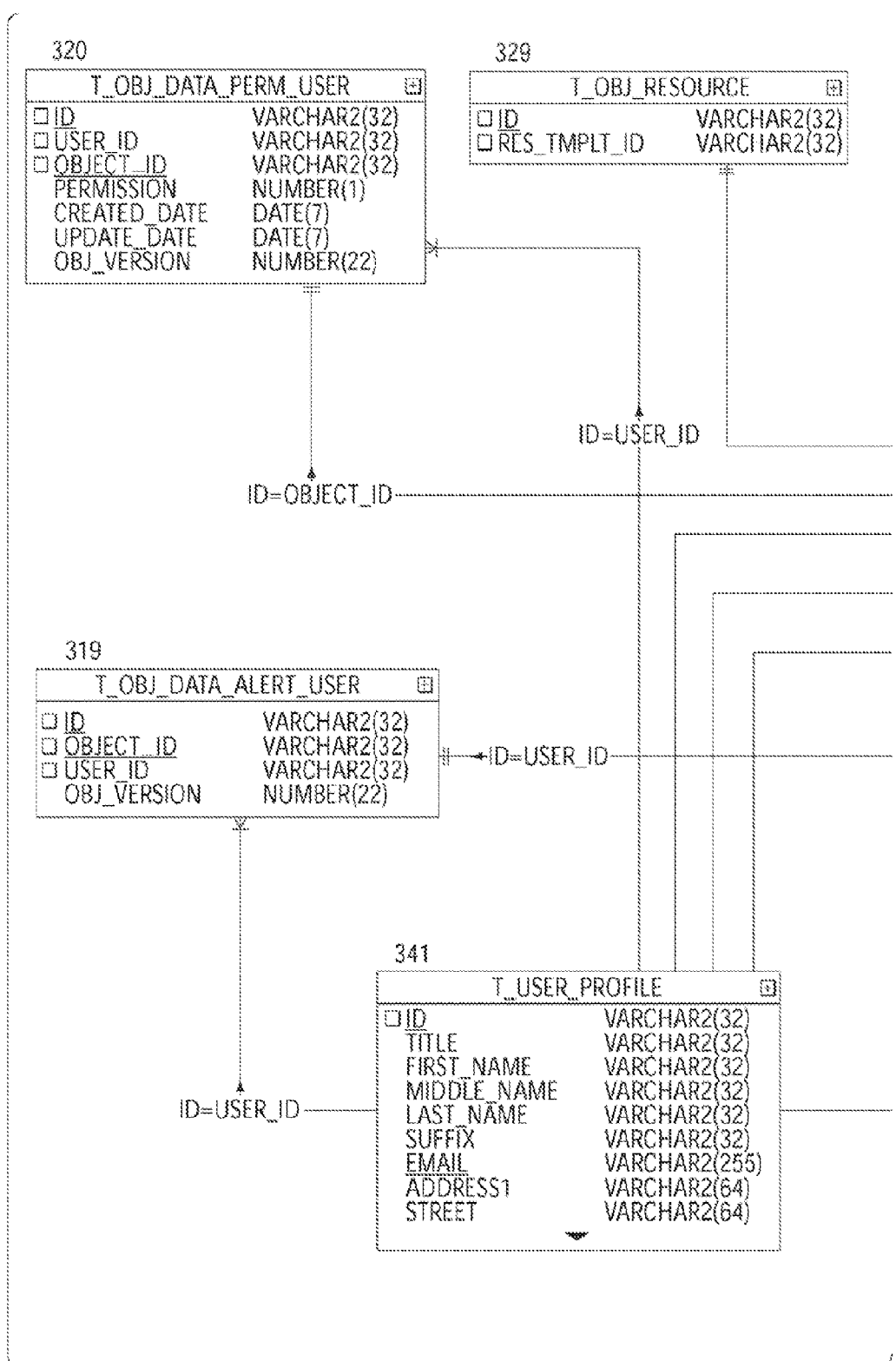
Figures 2, 4B:
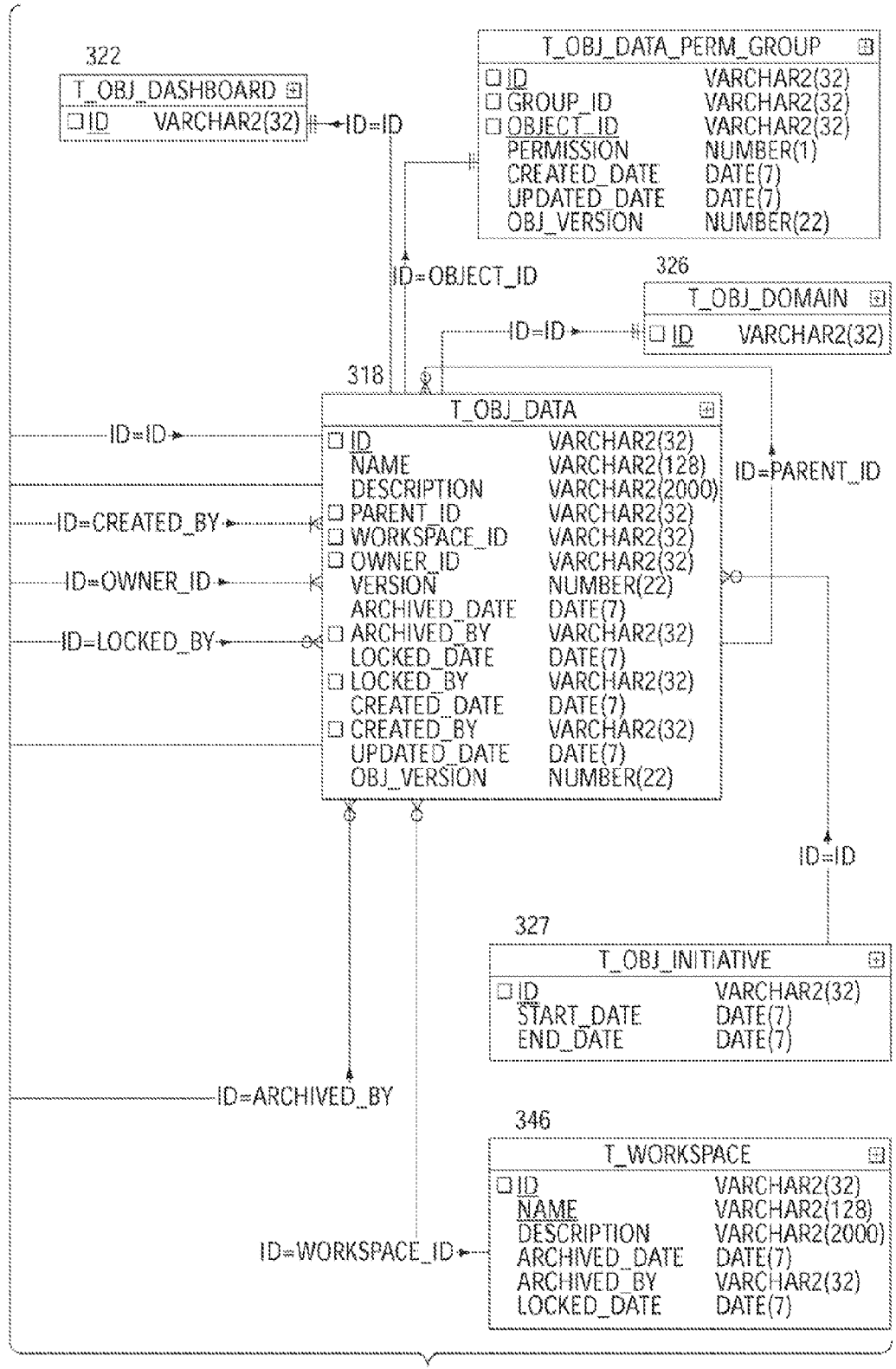
Figures 1, 4C:
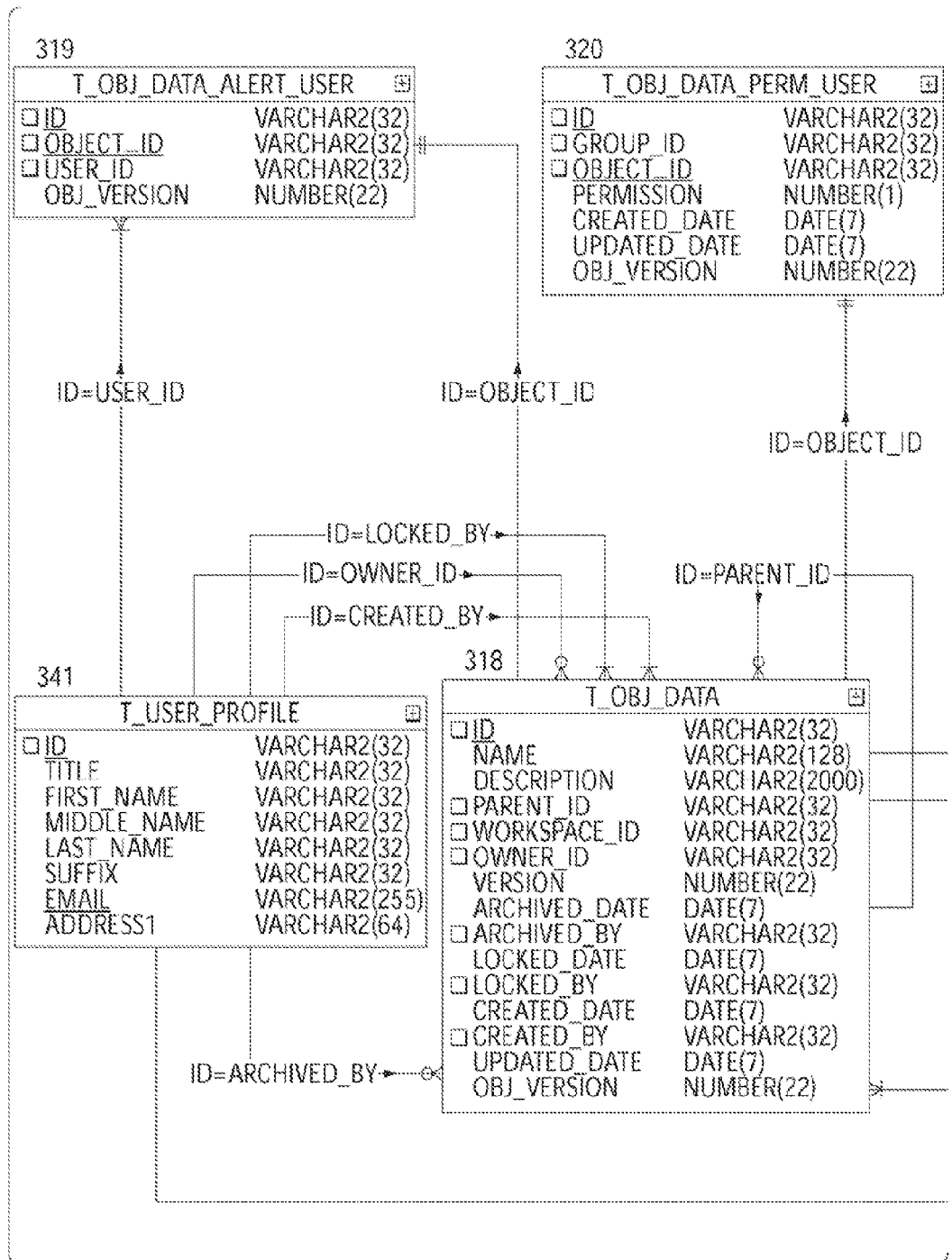
Figures 2, 4C:
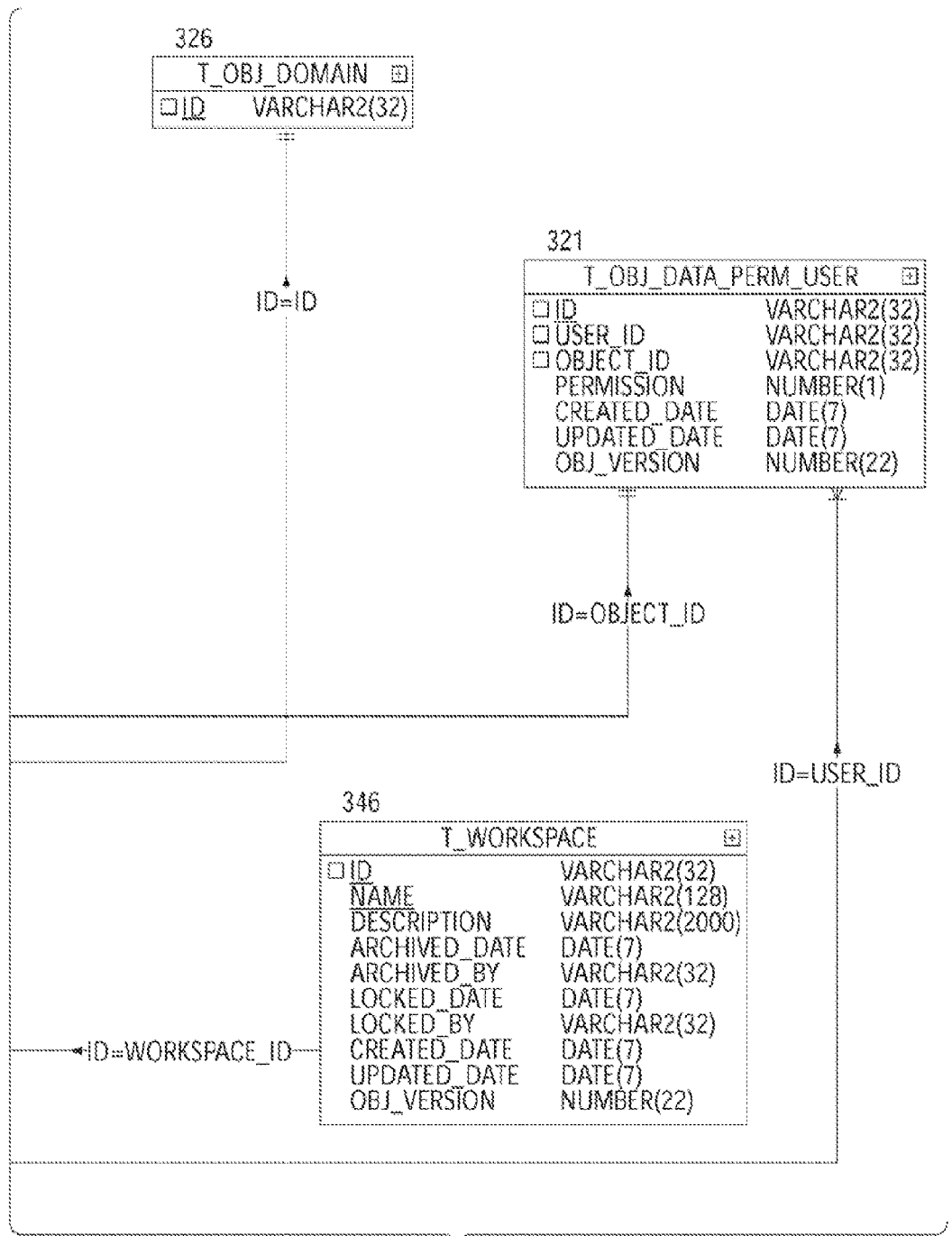
Figures 1, 4D:
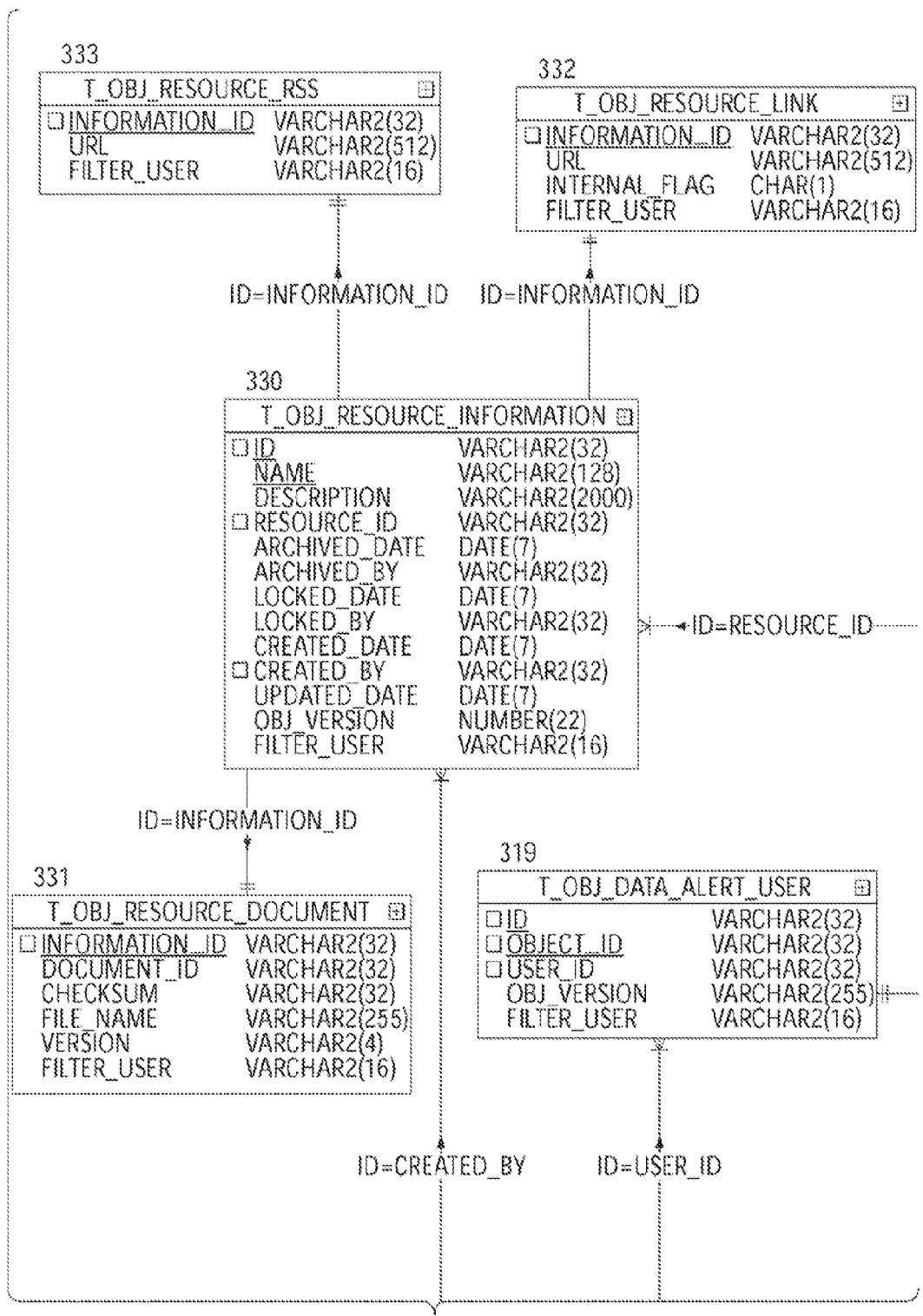
Figures 2, 4D:
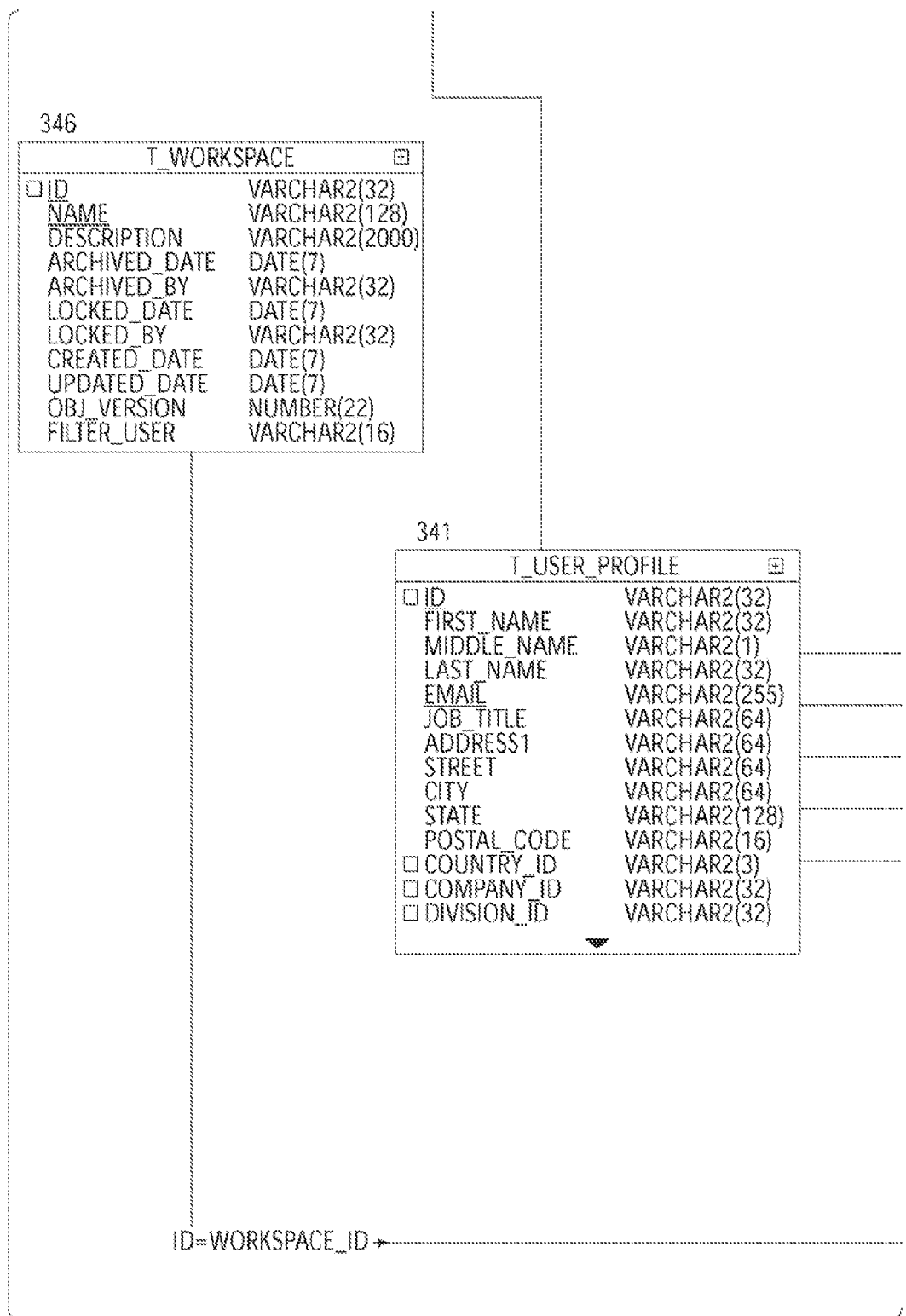
Figures 3, 4D:
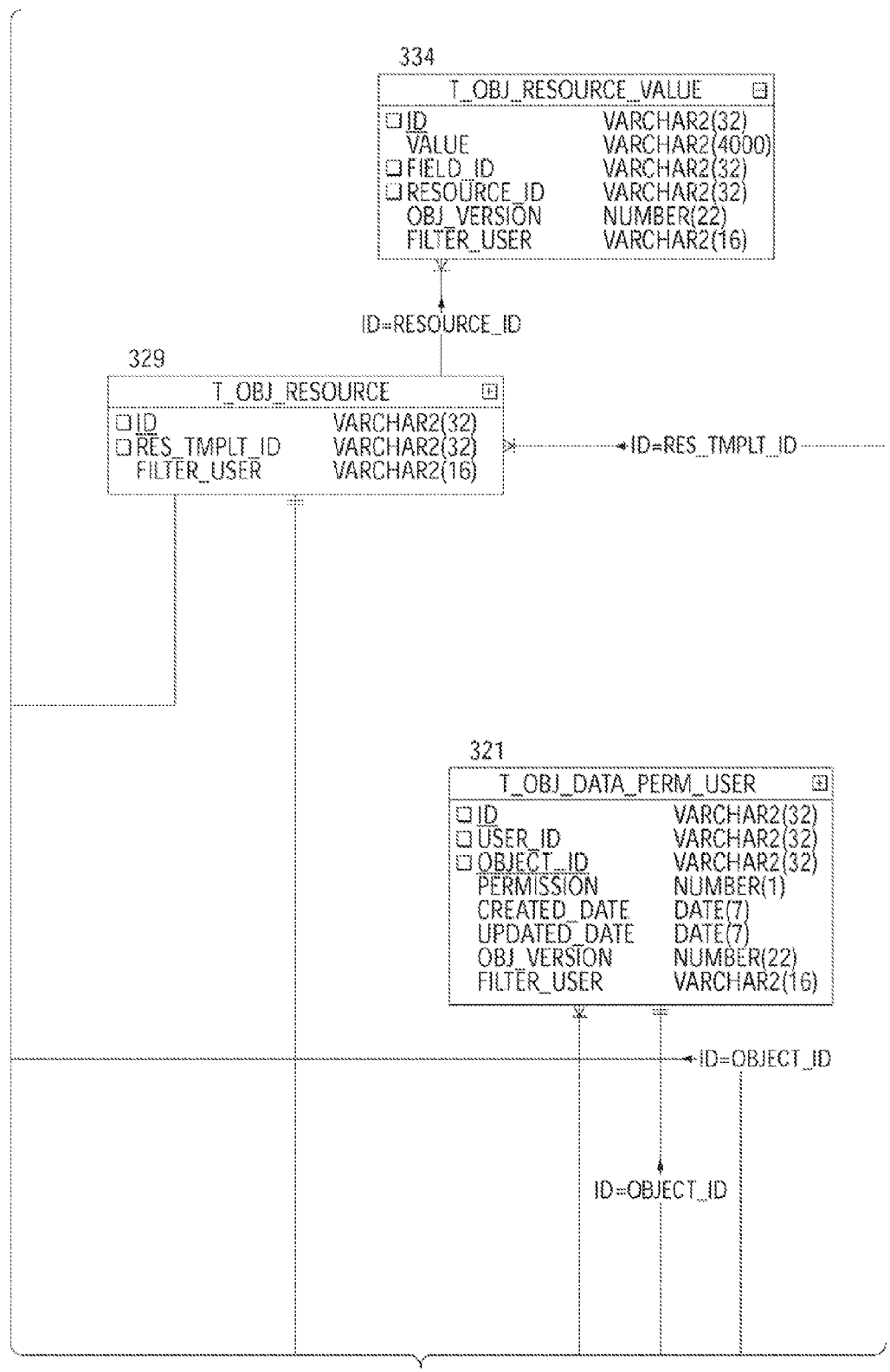
Figures 4, 4D:
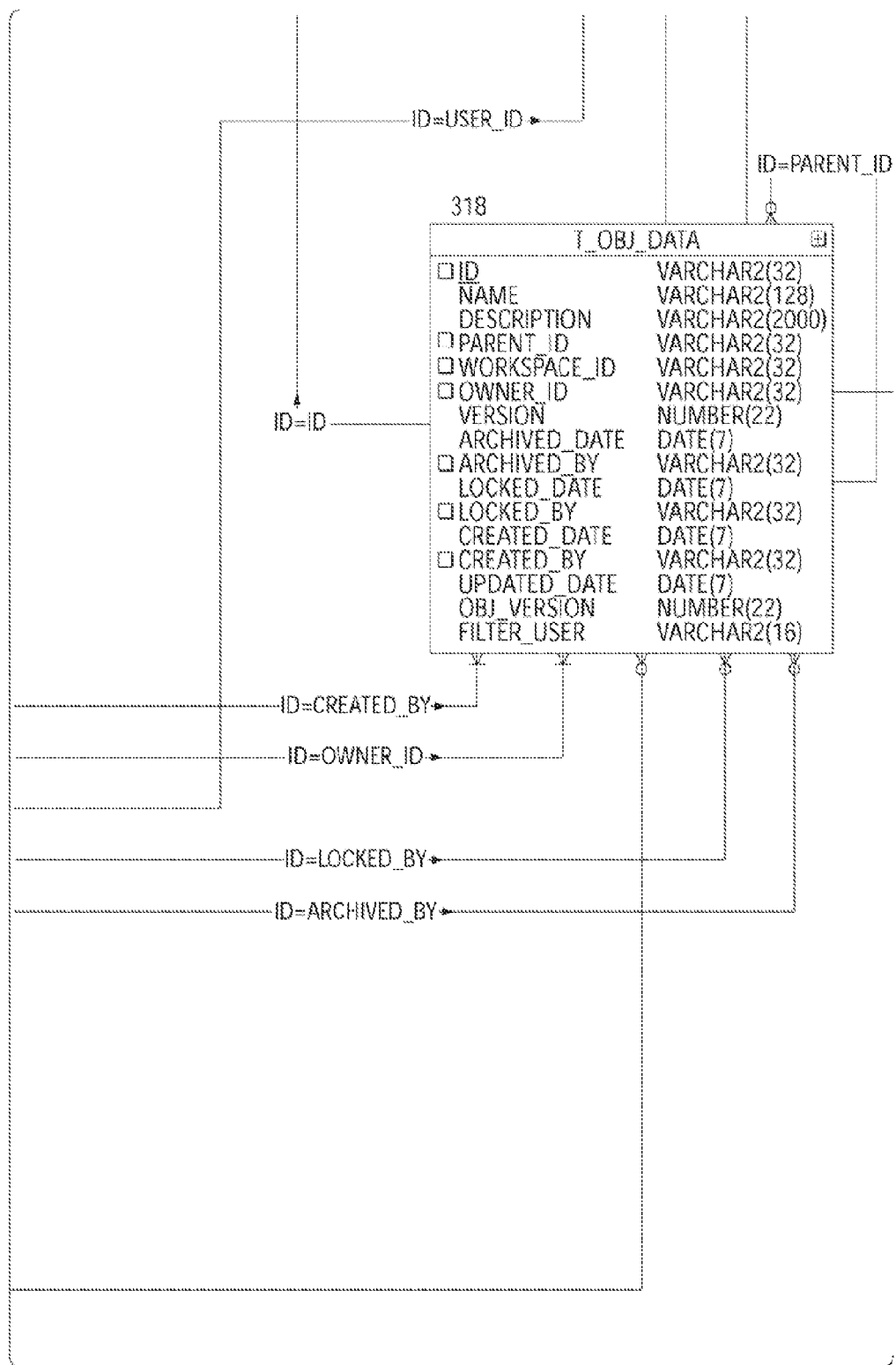
Figures 4, 4D, 5:
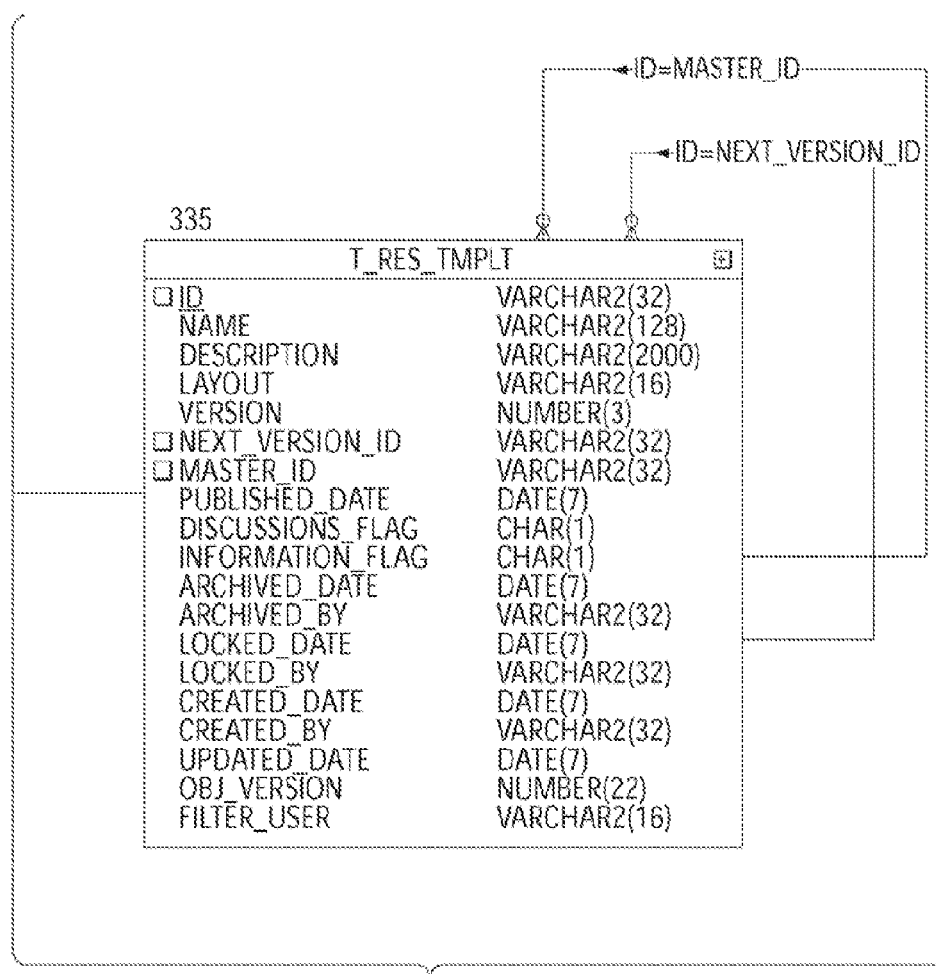
Figures 4, 4D, 5, 6:
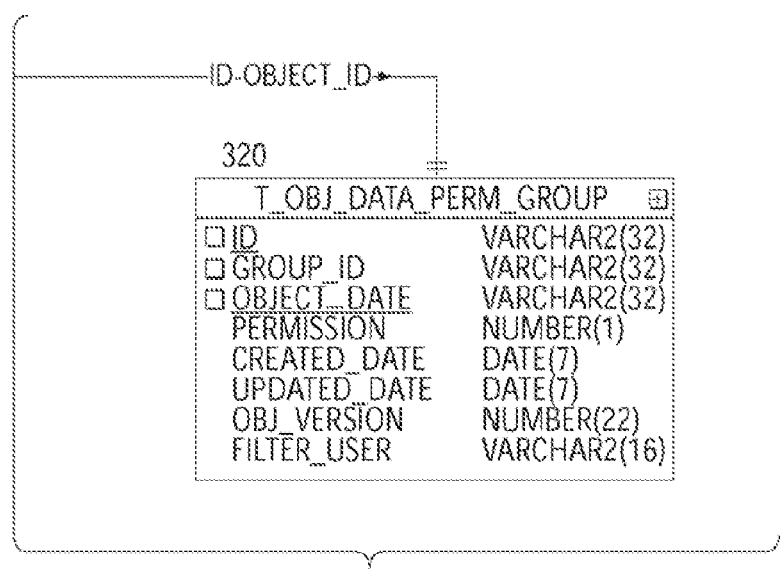
Figures 1, 4E:
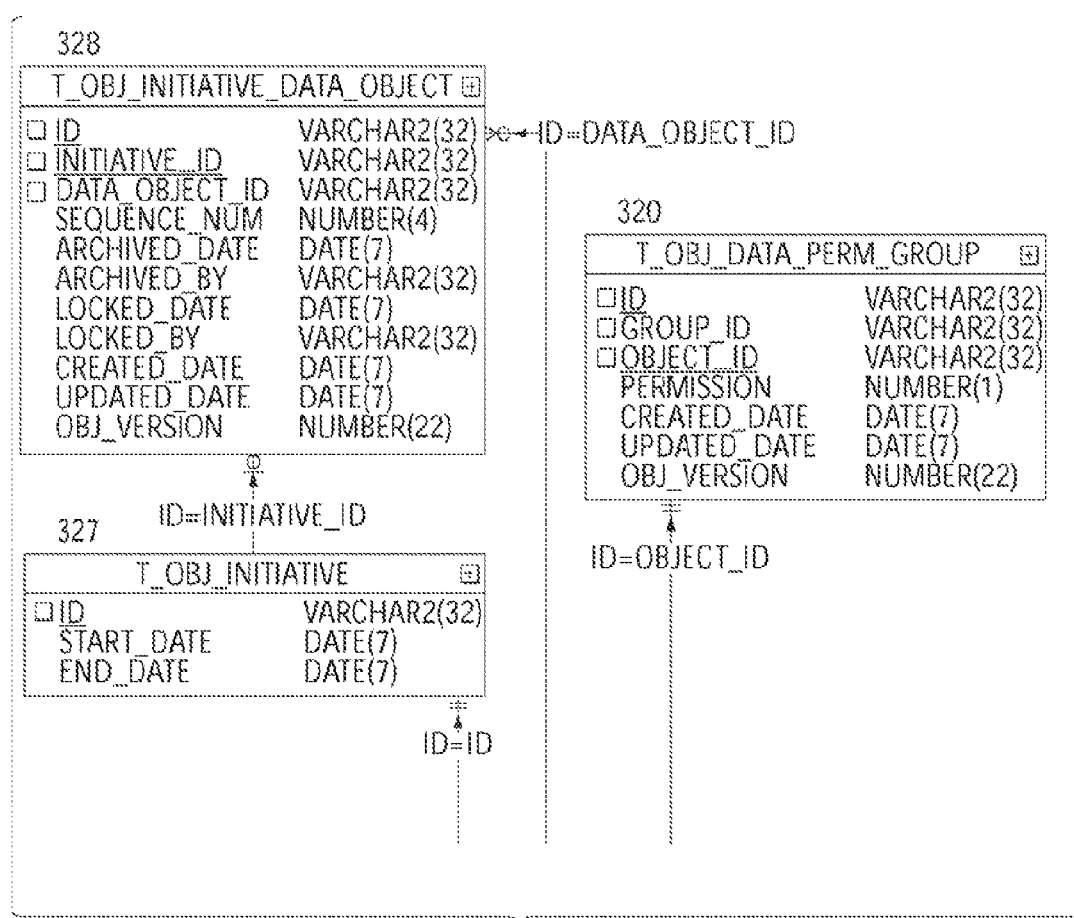
Figures 2, 4E:
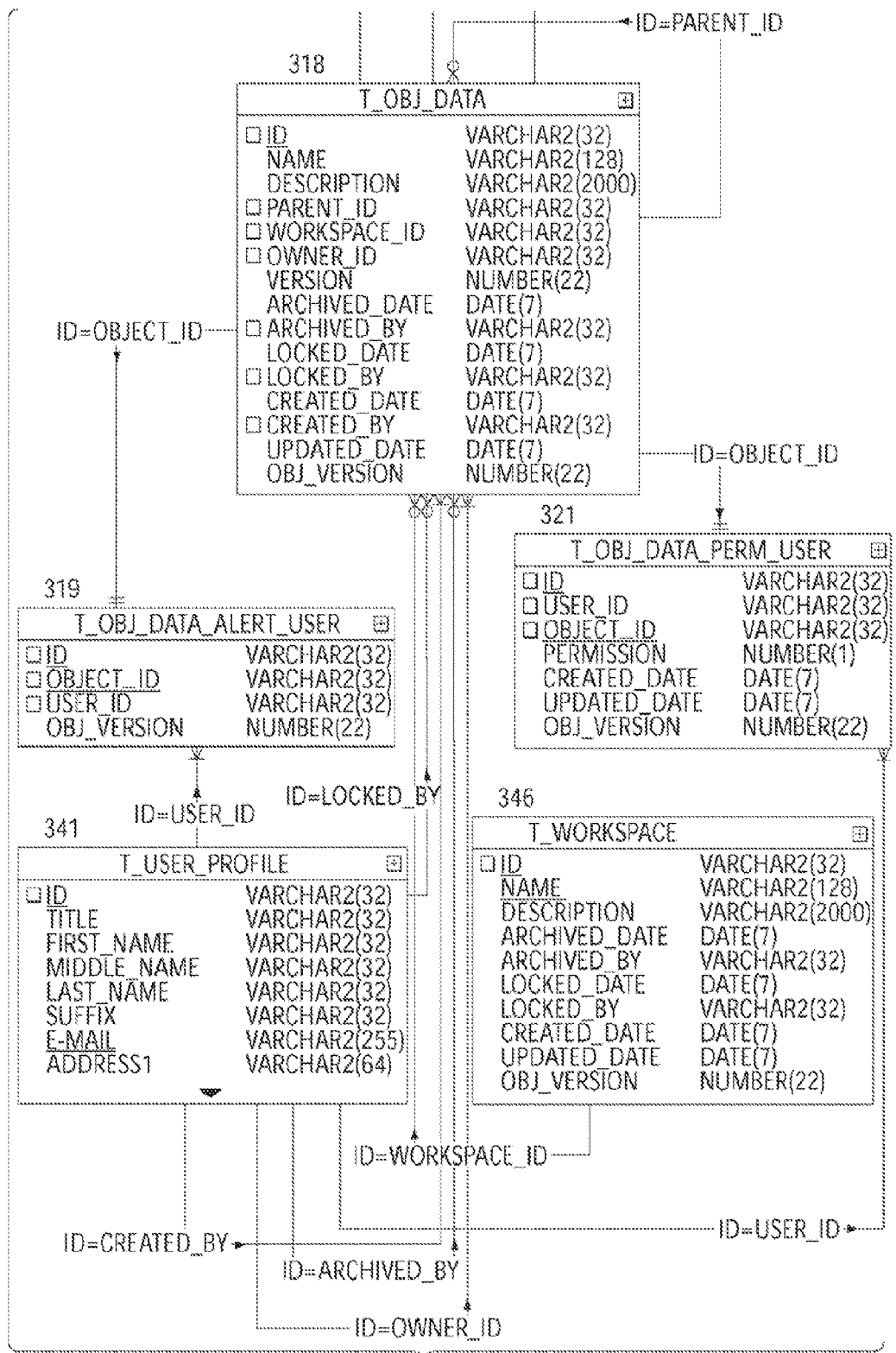
Figures 1, 4F:
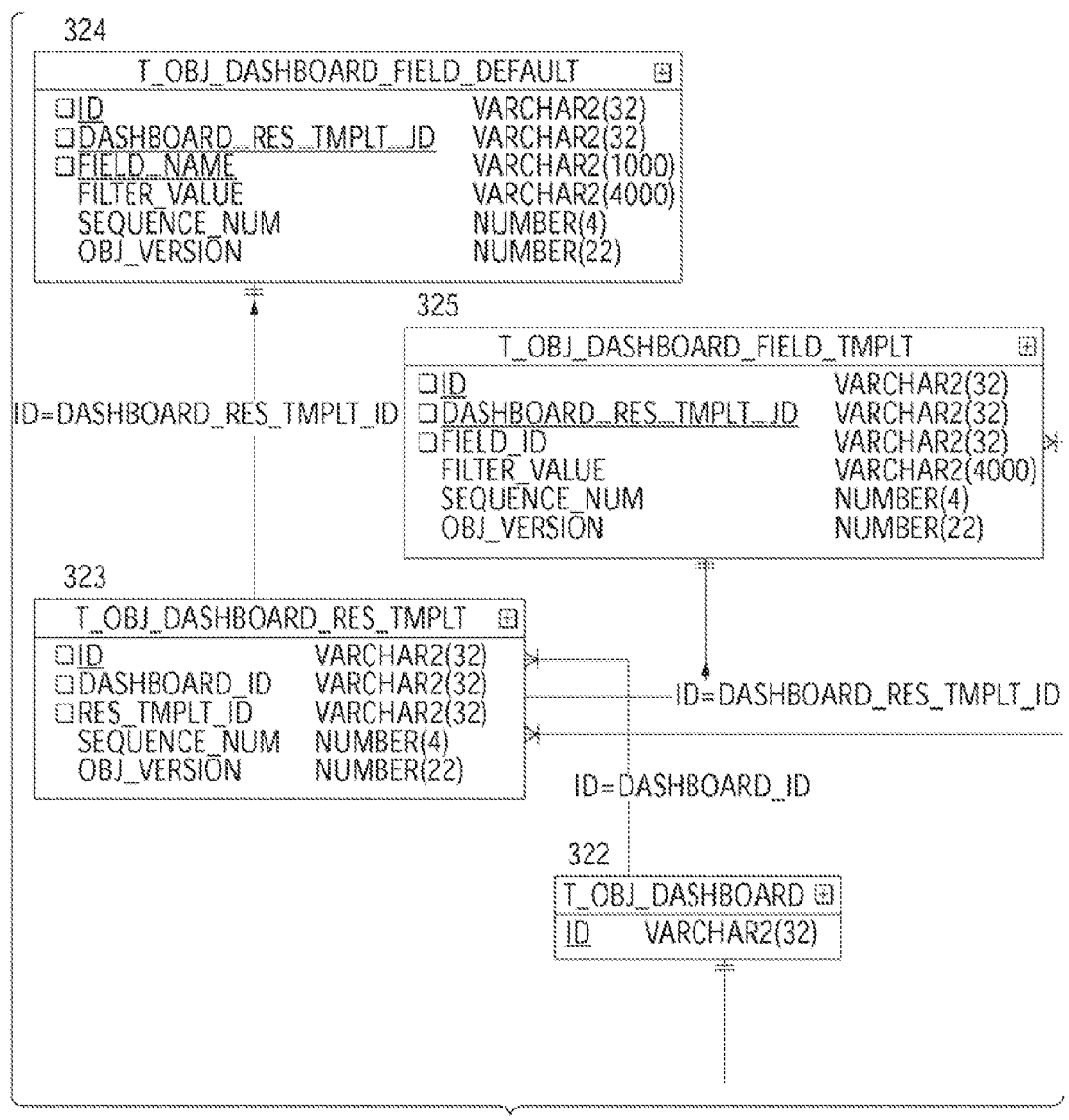
Figures 2, 4F:
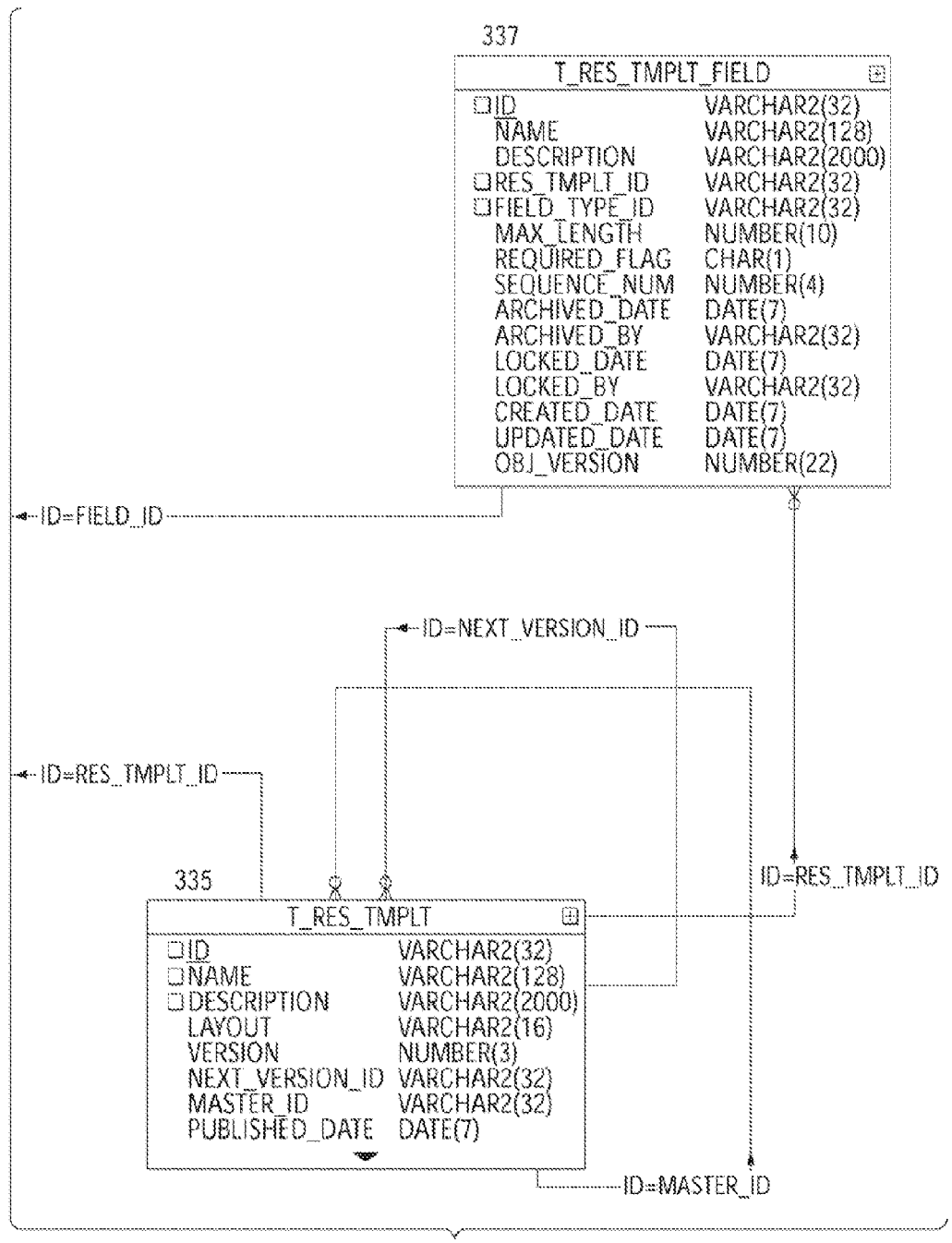
Figures 3, 4F:
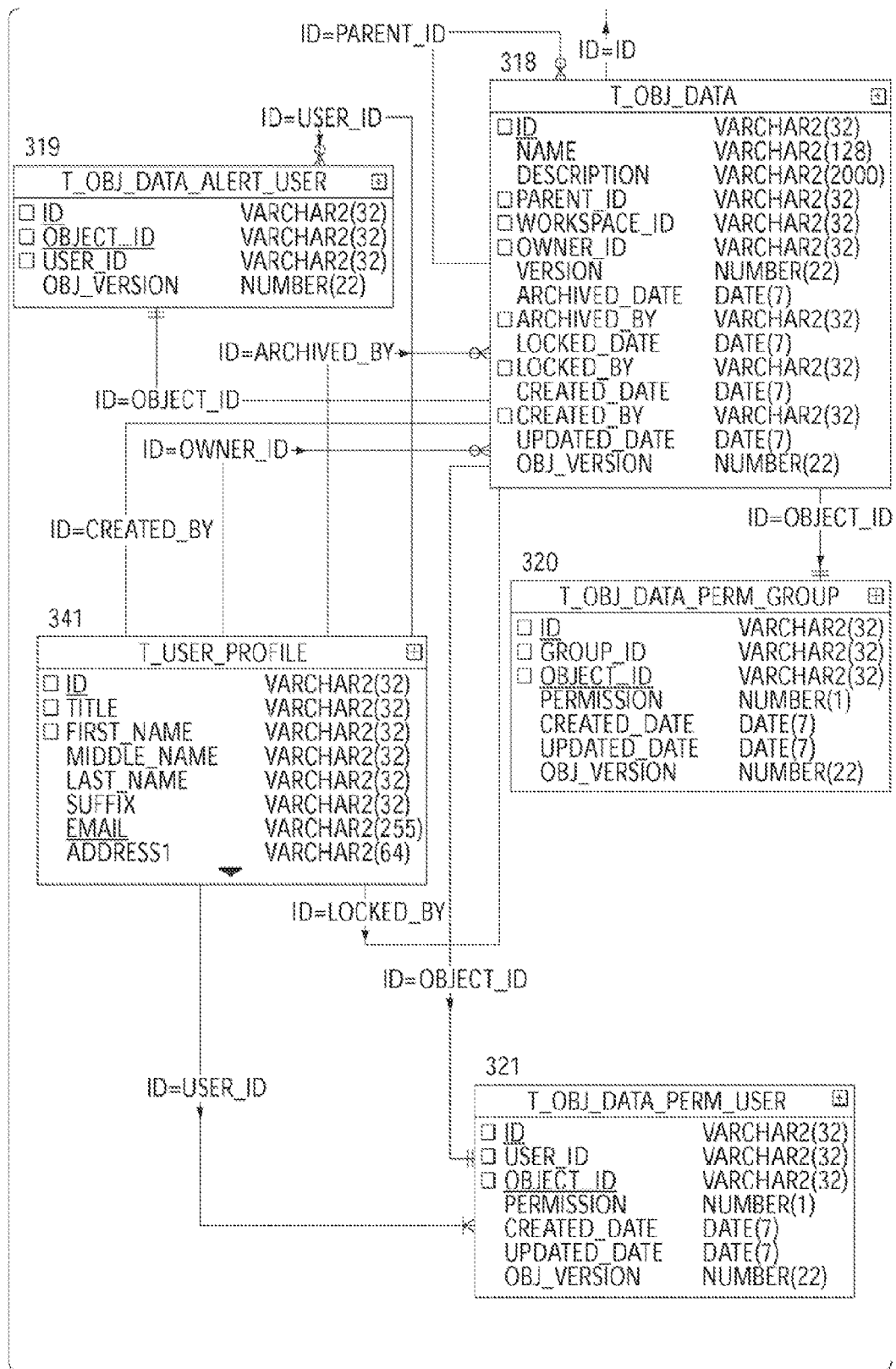
Figures 2, 4G:
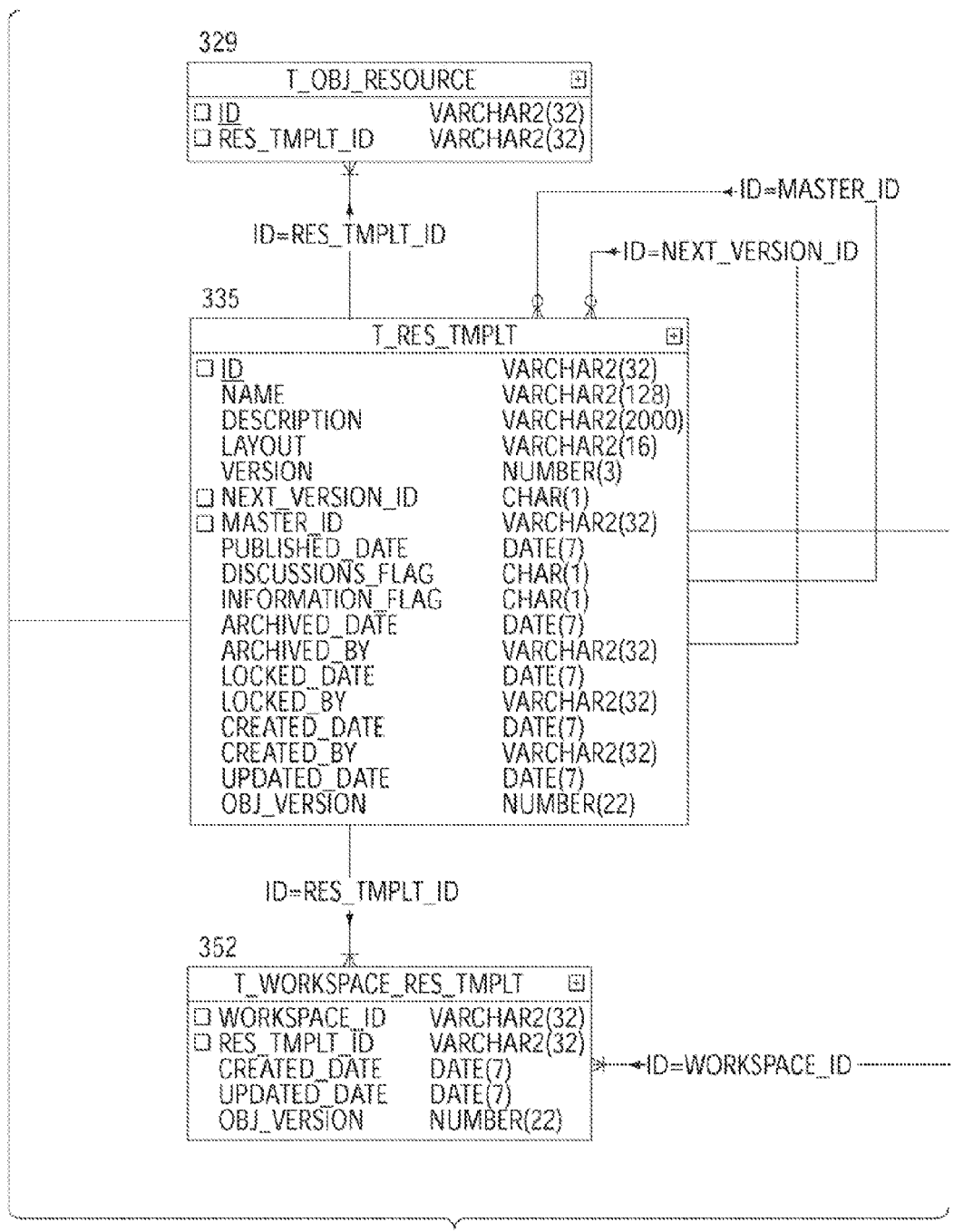
Figures 3, 4G:
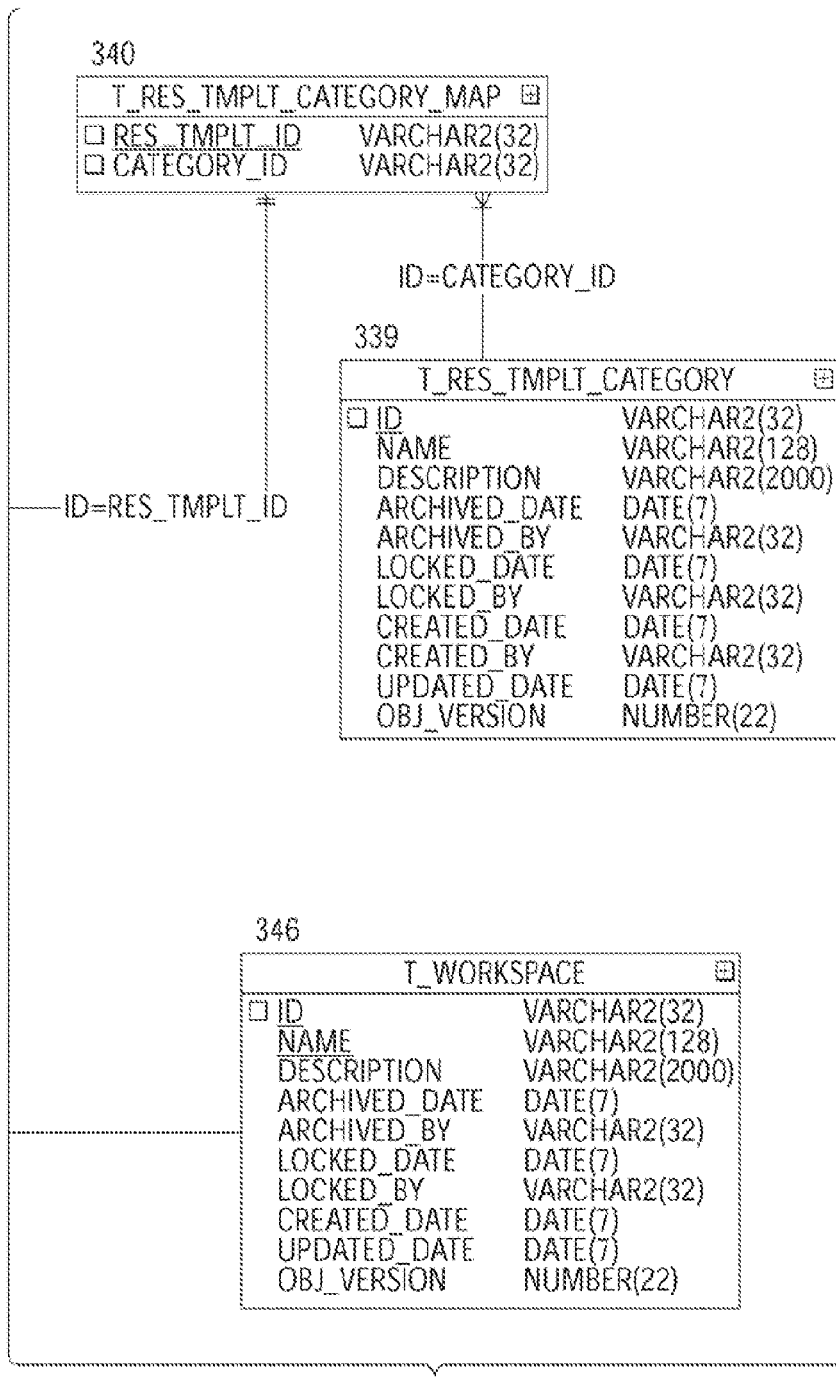
Figures 1, 4H:
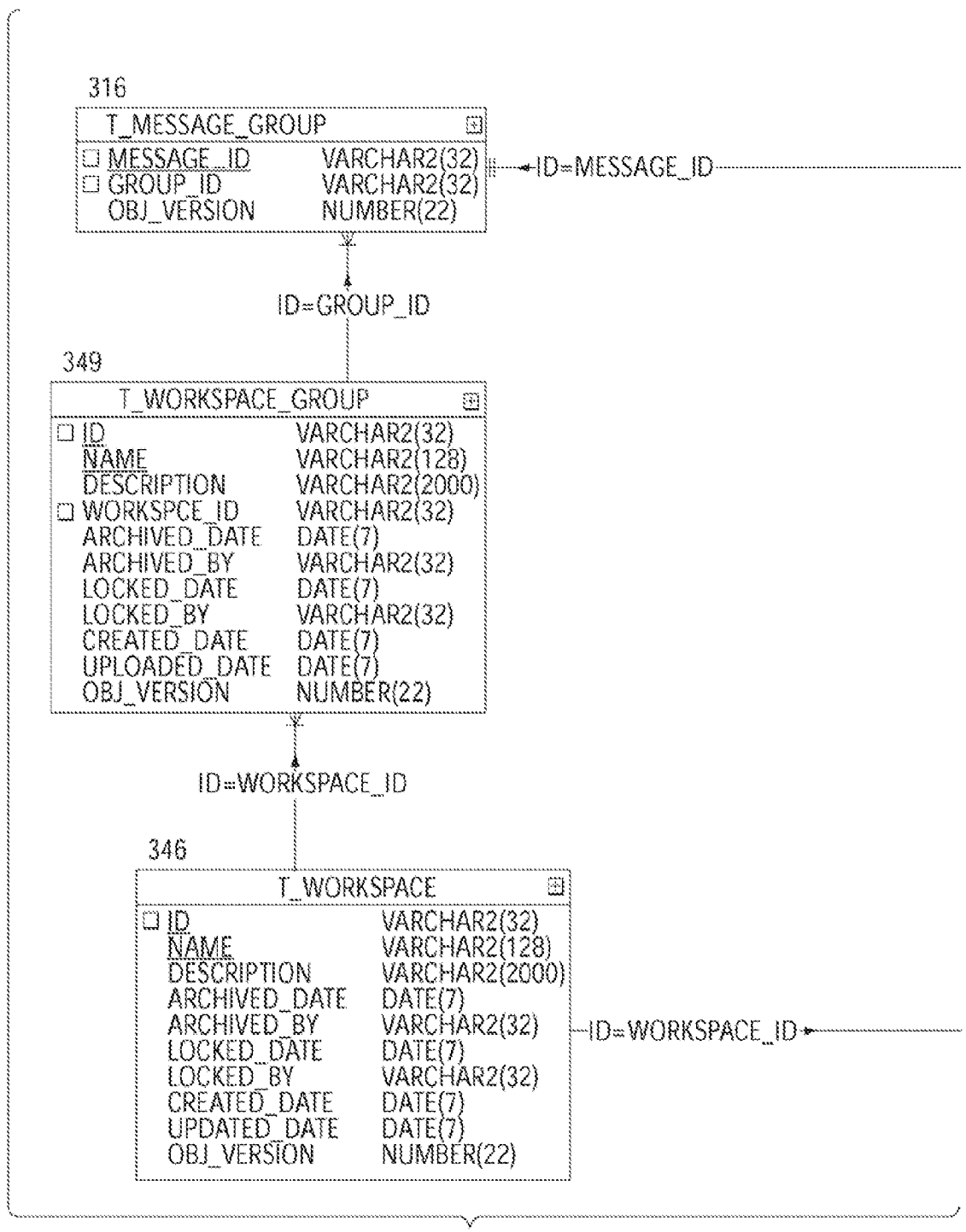
Figures 2, 4H:
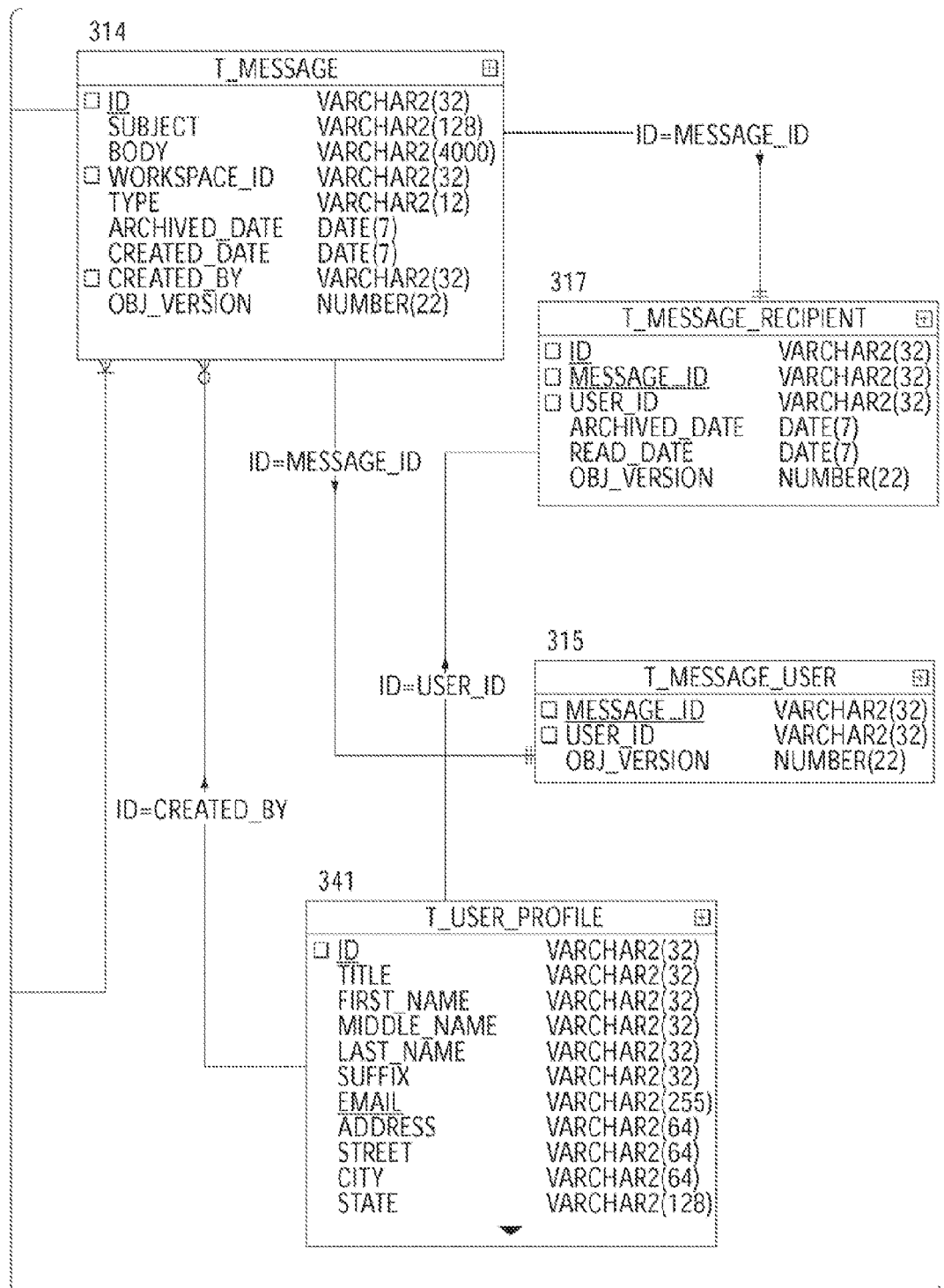
Figures 1, 4I:
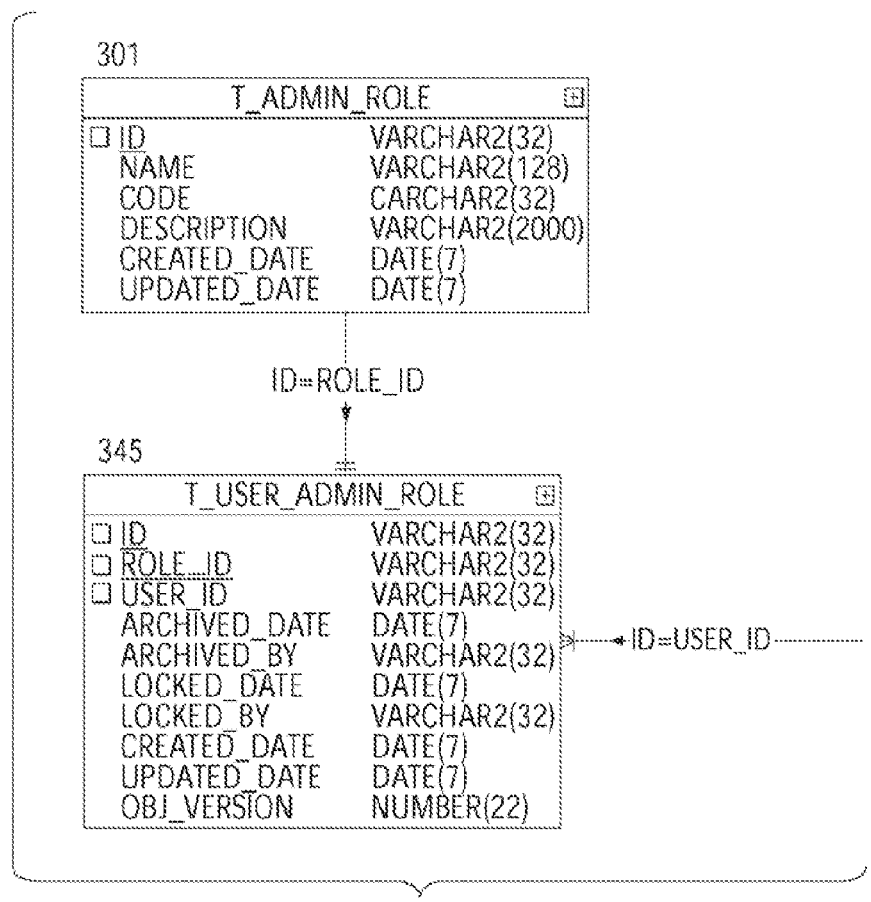
Figure 4K:
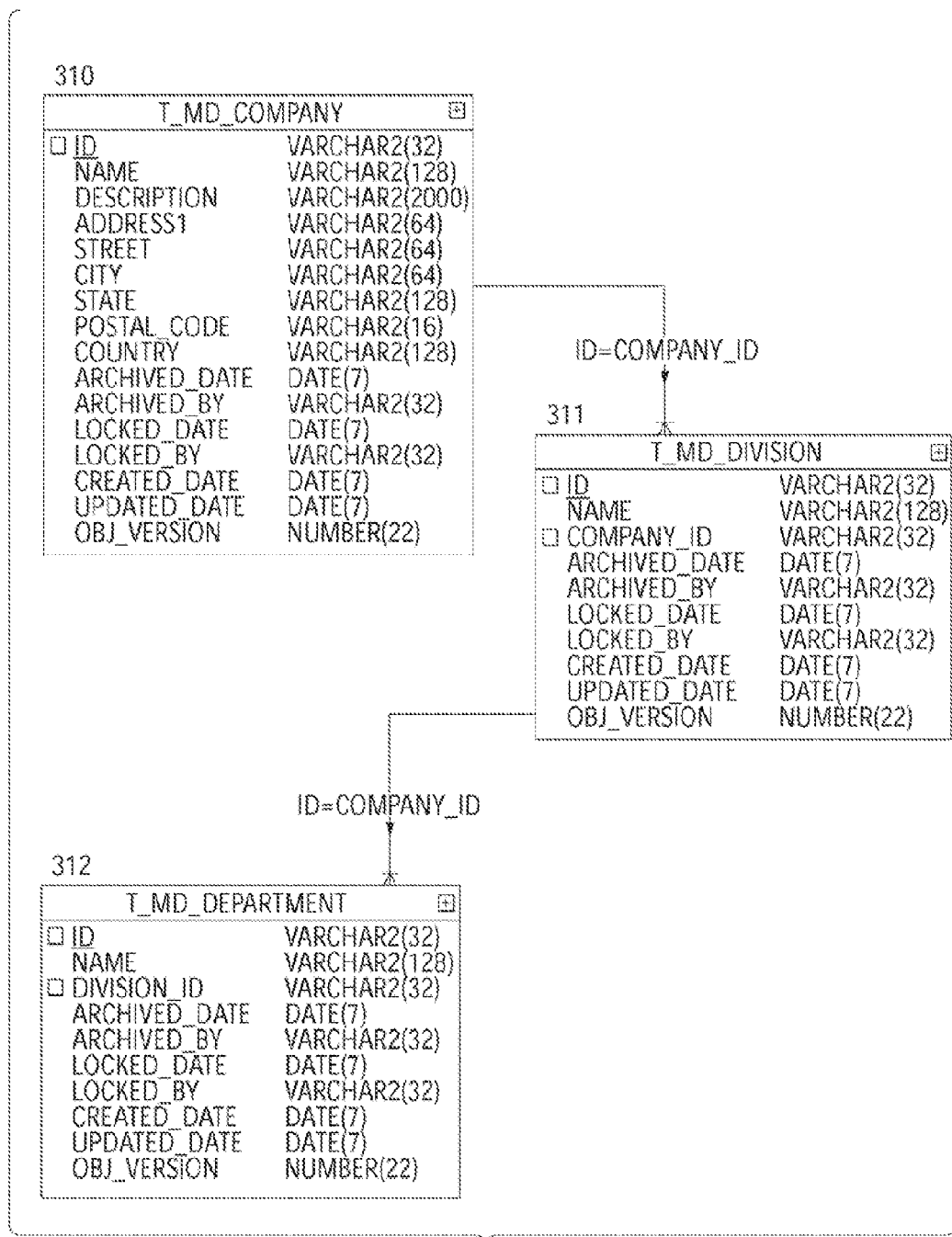
Figure 5:
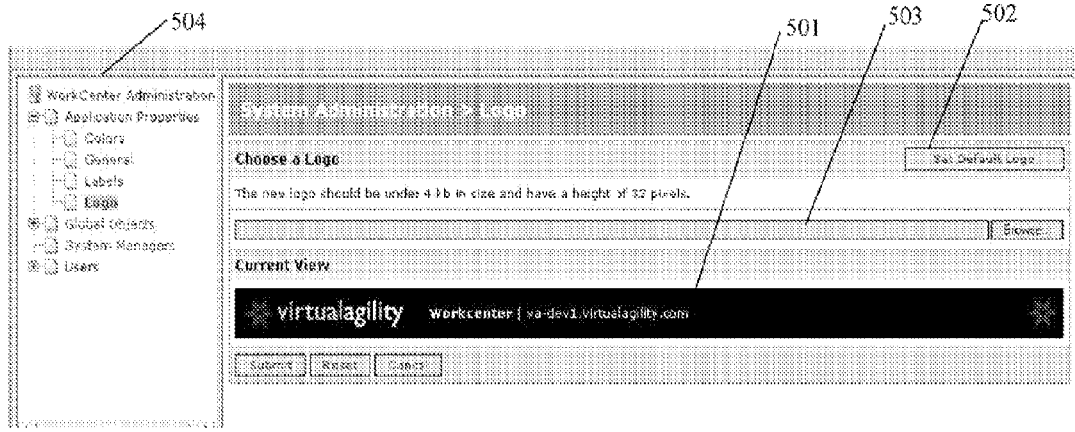
FIG. 5 illustrates the setup of the logo for the application.

FIGS. 4A-4K show more detailed views of entity-relationship diagrams for select groups of tables. FIG. 4A shows the tables relevant to workspaces 113. FIG. 4B shows the tables relevant to data objects, which are the super class for workspace objects 109, including domains 116, initiatives 127, knowledge boards 129, and resources 121. FIG. 4C shows the tables relevant to domains 116. FIG. 4D shows the tables relevant to resources 121. FIG. 4E shows the tables relevant to initiatives 127. FIG. 4F shows the tables relevant to knowledge boards 129. FIG. 4G shows the tables 111 relevant to resource tempaltes 124. FIG. 4H shows the tables relevant to messages. FIG. 4I shows the tables relevant to users 103, including groups 105 and their roles 107. FIG. 4J shows the tables relevant to applications. FIG. 4K shows the tables relevant to companies.

Descriptions of the tables shown in FIGS. 4A through 4K are provided below.

T_ADMIN_ROLE (301): The T_ADMIN_ROLE table 301 holds the application level administrator role identifiers and names. There is an entry for each administrator. There is a code that is used to easily identify the role when adding it to a user. The fields in the table's entries are as follows:

| Name | Type | Description |
| --- | --- | --- |
| ID | varchar2(32) | record identifier |
| NAME | varchar2(128) | name of administrative role |
| CODE | varchar2(132) | code for administrative role |
| DESCRIPTION | varchar2(2000) | description for administrative role |
| CREATED_DATE | date | date created |
| UPDATED_DATE | date | date last updated |

T_APPLICATION_LICENSE (302): The T_APPLICATION_LICENSE table 302 holds the license key that enables certain features in the system. There is an entry for each license key. The fields in the table's entries are as follows:

| Name | Type | Description |
| --- | --- | --- |
| LICENSE_ID | varchar2(32) | license identifier |
| LICENSE_KEY | varchar2(400) | license key |
| PASS_WORD | varchar2(32) | license password |
| OBJ_VERSION | integer | version number |

T_APPLICATION_LOGO (303): The T_APPLICATION_LOGO table 303 holds the default logo for the application. It can also store another row that contains an administrative uploaded logo. The LOGO_DATE row holds the binary data for the image file itself The fields in the table's entries are as follows:

| Name | Type | Description |
| --- | --- | --- |
| ID | varchar2(32) | record identifier |
| LOGO_DATA | long raw | data for logo image file |
| MIMETYPE | varchar2(255) | mime type |
| OBJ_VERSION | integer | version number |

T_DISCUSSION_TOPIC (307): The entries in the T_DISCUSSION_TOPIC table 307 relate discussion topics to a resource. There is an entry for each discussion topic. Each entry references the resource's record in the T_OBJ_RESOURCE table 329. The fields in the table's entries are as follows:

| Name | Type | Description |
| --- | --- | --- |
| ID | varchar2(32) | record identifier |
| NAME | varchar2(128) | discussion topic name |
| COMMENTS | varchar2(4000) | comments |
| RESOURCE_ID | varchar2(32) | record identifier from T_OBJ_RESOURCE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record from T_USER_PROFILE |
| UPDATED_DATE | date | date last updated |
| OBJ_VERSION | integer | version number |

T_DISCUSSION_REPLY (308): The entries in the T_DISCUSSION_REPLY table 308 relate discussion replies to a discussion topic. There is one entry for each reply. Each entry references the discussion topic's record in the T_DISCUSSION_TOPIC table 307 and the parent message. The parent can be another reply in the same table. Replies can be children of other replies in order to maintain a threaded discussion. The fields in the table's entries are as follows:

| Name | Type | Description |
| --- | --- | --- |
| ID | varchar2(32) | record identifier |
| TOPIC_ID | varchar2(32) | record ID from T_DISCUSSION_TOPIC |
| PARENT_ID | varchar2(32) | parent topic |
| NAME | varchar2(128) | topic name |
| COMMENTS | varchar2(4000) | comments |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record from T_USER_PROFILE |
| UPDATED_DATE | date | date last updated |
| OBJ_VERSION | integer | version number |

T_MANAGER_PROPERTY (309): The entries in the T_MANAGER_PROPERTY table 309 stores custom property values for various system managers. There is an entry for each property value. Each manager is configured with its own default values. When a system administrator updates those values, they are stored in this table. The fields in the table's entries are as follows:

| Name | Type | Description |
|---|---|---|
| ID | varchar2(32) | record identifier |
| MANAGER_CLASS | varchar2(255) | manager class |
| NAME | varchar2(128) | property name |
| VALUE | varchar2(2000) | property value |
| CREATED_DATE | date | date created |
| UPDATED_DATE | date | date updated |
| OBJ_VERSION | integer | version number |

T_MD_COMPANY (310): The T_MD_COMPANY table 310 has an entry for each entity, such as a company, that a user of the system may belong to. Entries for users in the system refer to this table to indicate the companies the users belong to. The fields in the table's entries are as follows:

| Name | Type | Description |
|---|---|---|
| ID | varchar2(32) | record identifier |
| NAME | varchar2(128) | company name |
| DESCRIPTION | varchar2(2000) | company description |
| ADDRESS1 | varchar2(64) | company address |
| STREET | varchar2(64) | street |
| CITY | varchar2(64) | city |
| STATE | varchar2(128) | state |
| COUNTRY_ID | varchar2(128) | country code |
| POSTAL_CODE | varchar2(16) | postal code |
| ARCHIVED_DATE | date | date archived |
| ARCHIVED_BY | varchar2(32) | archived by |
| LOCKED_DATE | date | date locked |
| LOCKED_BY | varchar2(32) | locked by |
| CREATED_DATE | date | date created |
| UPDATED_DATE | date | date last updated |
| OBJ_VERSION | integer | version number |

T_MD_DIVISION (311): The T_MD_DIVISION table 311 has an entry for each division under a company. Entries for users in the system refer to this table to indicate the division the users belong to. Each entry references a company's record in the T_MD_COMPANY table 310. The fields in the table's entries are as follows:

| Name | Type | Description |
|---|---|---|
| ID | varchar2(32) | record identifier |
| NAME | varchar2(128) | division name |
| COMPANY_ID | varchar2(32) | company ID from T_MD_COMPANY |
| ARCHIVED_DATE | date | date archived |
| ARCHIVED_BY | varchar2(32) | user arching record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_MD_DEPARTMENT (312): The T_MD_DEPARTMENT table 312 has an entry for each department under a division. Entries for users in the system refer to this table to indicate the department the users belong to. Each entry references a division's record in the T_MD_DIVISION table 311. The fields in the table's entries are as follows:

| Name | Type | Description |
|---|---|---|
| ID | varchar2(32) | record identifier |
| NAME | varchar2(128) | department name |
| DIVISION_ID | varchar2(32) | division ID from T_MD_DIVISION |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_MD_COUNTRY (313): The T_MD_COUNTRY table 313 holds the names for the countries. There is an entry for each country. These are used for address fields in user profiles and company profiles. The fields in the table's entries are as follows:

| Name | Type | Description |
|---|---|---|
| ID | varchar2(3) | record identifier |
| NAME | varchar2(128) | country name |

T_MESSAGE (314): The T_MESSAGE table 314 holds messages sent by users of the system. There is an entry for each message. Each entry references the record of a workspace in which the message was sent from the T_WORKSPACE table 346 and the record of the message creator from the T_USER_PROFILE table 341. The fields in the table's entries are as follows:

| Name | Type | Description |
|---|---|---|
| ID | varchar2(32) | record identifier |
| SUBJECT | varchar2(128) | message subject |
| BODY | varchar2(4000) | message body |
| WORKSPACE_ID | varchar2(32) | workspace ID from T_WORKSPACE |
| ARCHIVED_DATE | date | date archived |
| CREATED_DATE | date | date created |
| CREATED_BY | varchar2(32) | user creating message |
| OBJ_VERSION | integer | version number |

T_MESSAGE_USER (315): The entries in the T_MESSAGE_USER table 315 relate messages to the user to which they were addressed. There is an entry for each user message recipient for each message. Each entry references the message's record in the T_MESSAGE table 314 and the user's record in the T_USER_PROFILE table 341. The fields in the table's entries are as follows:

| Name | Type | Description |
|---|---|---|
| MESSAGE_ID | varchar2(32) | message ID |
| USER_ID | varchar2(32) | user ID from T_USER_PROFILE |
| OBJ_VERSION | integer | version number |

T_MESSAGE_GROUP (316): The entries in the T_MESSAGE_GROUP table 316 relates message to the groups to which the message was addressed. There is an entry for each group message recipient for each message. Each entry references the message's record in the T-MESSAGE table 314 and the group's record from the T_WORKSPACE_GROUP table 349. The fields in the table's entries are as follows:

| Name | Type | Description |
| --- | --- | --- |
| MESSAGE_ID | varchar2(32) | message ID |
| GROUP_ID | varchar2(32) | group ID from T_WORKSPACE_GROUP |
| OBJ_VERSION | integer | version number |

T_MESSAGE_RECIPIENT (317): The T_MESSAGE_RECIPIENT table 317 relates messages to users the message was sent to. It breaks out users from the groups that were addressed. There is an entry for each user regardless if the user was selected from the user or group side. There is an entry for each user message recipient for each message. Each entry references the message's record in the T_MESSAGE table 314 and the user's record in THE T_USER_PROFILE table 341. When a user reads the message, it is marked here. The fields in the table's entries are as follows:

| Name | Type | Description |
| --- | --- | --- |
| ID | varchar2(32) | record identifier |
| MESSAGE_ID | varchar2(32) | message ID from T_MESSAGE |
| USER_ID | varchar2(32) | user ID from T_USER_PROFILE |
| ARCHIVED_DATE | DATE | date archived |
| READ_DATE | DATE | date read |
| OBJ_VERSION | integer | version number |

T_OBJ_DATA (318): The T_OBJ_DATA table 318 holds the details of the data object. It's the superclass for all other data objects (Domains, Initiatives, Dashboards and Resources). There is an entry for each data object. The fields in the table's entries are as follows:

| Name | Type | Description |
| --- | --- | --- |
| ID | varchar2(32) | record identifier |
| NAME | varchar2(128) | name of object |
| DESCRIPTION | varchar2(2000) | description of object |
| WORKSPACE_ID | varchar2(32) | workspace ID from T_WORKSPACE |
| PARENT_ID | varchar2(32) | ID of parent object in this table |
| OWNER_ID | varchar2(32) | owner ID from T_USER_PROFILE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record |
| UPDATED_DATE | date | date last updated |
| OBJ_VERSION | integer | version number |

T_OBJ_DATA_ALERT_USER (319): The entries in the T_OBJ_DATA_ALERT_USER table 319 relate alerts to users and data objects. There is an entry for each user and each data object. Each entry references the object's record in the T_OBJ_DATA table 318 and the user's record in the T_USER_PROFILE table 341. The fields in the table's entries are as follows:

| Name | Type | Description |
| --- | --- | --- |
| ID | varchar2(32) | record identifier |
| OBJECT_ID | varchar2(32) | object ID from T_OBJ_DATA |
| USER_ID | varchar2(32) | user ID from T_USER_PROFILE |
| OBJ_VERSION | integer | version number |

T_OBJ_DATA_PERM_GROUP (320): The entries in the T_OBJ_DATA_PERM_GROUP table 320 relate permissions for groups to data objects. There is an entry for each permission for a group for each data object. Each entry references the object's record in the T_OBJ_DATA table 318 and the group's record in the T_WORKSPACE_GROUP table 349. Possible permission values are:

```
0 = no permission
1 = read
2 = read-create
3 = read-create-update
4 = read-create-update-delete
```

The fields in the table's entries are as follows:

| Name | Type | Description |
| --- | --- | --- |
| ID | varchar2(32) | record identifier |
| GROUP_ID | varchar2(32) | group ID from T_WORKSPACE_GROUP |
| OBJECT_ID | varchar2(32) | object ID from T_OBJ_DATA |
| PERMISSION | number(1) | permission code |
| CREATED_DATE | date | date created |
| UPDATED_DATE | date | date last updated |
| OBJ_VERSION | integer | version number |

T_OBJ_DATA_PERM_USER (321): The T_OBJ_DATA_PERM_USER table 321 relates permissions for a user to data objects. There is an entry for each permission for a user for each data object. Each entry references the object's record in the T_OBJ_DATA table 318 and the user's record in the T_USER_PROFILE table 341. Possible permission values are:

```
0 = no permission
1 = read
2 = read-create
3 = read-create-update
4 = read-create-update-delete
```

The fields in the table's entries are as follows:

| Name | Type | Description |
| --- | --- | --- |
| ID | varchar2(32) | record identifier |
| USER_ID | varchar2(32) | user ID from T_USER_PROFILE |
| OBJECT_ID | varchar2(32) | object ID from T_OBJ_DATA |
| PERMISSION | number(1) | permission code |
| CREATED_DATE | date | date created |
| UPDATED_DATE | date | date last updated |
| OBJ_VERSION | integer | version number |

T_OBJ_DASHBOARD (322): The T_OBJ_DASHBOARD table 322 holds the details of a knowledge board. The fields in the table's entries are as follows:

| Name | Type | Description |
| --- | --- | --- |
| ID | varchar2(32) | record identifier |

T_OBJ_DASHBOARD_RES_TMPLT (323): The entries in the T_OBJ_DASHBOARD_RES_TMPLT table 323 relates resource templates with a particular knowledge board. There is an entry for each resource template/knowledge board association. Each entry references a knowledge board's record in the T_OBJ_DASHBOARD_TABLE 322 and a resource's record in the T_OBJ_RESOURCE table 329. The fields in the table's entries are as follows:

| Name | Type | Description |
| --- | --- | --- |
| ID | varchar2(32) | record identifier |
| DASHBOARD_ID | varchar2(32) | knowledge board ID from T_OBJ_DASHBOARD |
| RES_TMPLT_ID | varchar2(32) | resource ID from T_OBJ_RESOURCE |
| SEQUENCE_NUM | number(4,0) | display sequence number |
| OBJ_VERSION | integer | version number |

T_OBJ_DASHBOARD_FIELD_DEFAULT (324): The T_OBJ_DASHBOARD_FIELD_DEFAULT table 324 holds the list of default fields that should be shown on a knowledge board for a particular resource template and any filter data. There is an entry for each field. Each entry references a knowledge board's record in the T_OBJ_DASHBOARD_RES_TMPLT table 323. The fields in the table's entries are as follows:

| Name | Type | Description |
| --- | --- | --- |
| ID | varchar2(32) | record identifier |
| DASHBOARD_RES_TMPLT_ID | varchar2(32) | knowledge board ID with resource from T_OBJ_DASHBOARD_RES_TMPLT |
| FIELD_NAME | varchar2(1000) | field name |
| FILTER_VALUE | varchar2(4000) | filter value |
| SEQUENCE_NUM | number(4,0) | display sequence number |
| OBJ_VERSION | integer | version number |

T_OBJ_DASHBOARD_FIELD_TMPLT (325): The T_OBJ_DASHBOARD_FIELD_TMPLT table 325 holds the list of dynamic fields that should be shown on a knowledge board for a particular resource template and any filter data. There is an entry for each field. Each entry references a knowledge board's record in the T_OBJ_DASHBOARD_RES_TMPLT table 325 and a field's record in the T_RES_TMPLT_FIELD table 337. The fields in the table's entries are as follows:

| Name | Type | Description |
| --- | --- | --- |
| ID | varchar2(32) | record identifier |
| DASHBOARD_RES_TMPLT_ID | varchar2(32) | knowledge board ID with resource from T_OBJ_DASHBOARD_RES_TMPLT |
| FIELD_ID | varchar2(32) | field ID from T_RES_TMPLT_FIELD |
| FILTER_VALUE | varchar2(4000) | filter value |
| SEQUENCE_NUM | number(4,0) | display sequence number |
| OBJ_VERSION | integer | version number |

T_OBJ_DOMAIN (326): The T_OBJ_DOMAIN table 326 holds the details of a domain. There is an entry for each domain. The fields in the table's entries are as follows:

| Name | Type | Description |
| --- | --- | --- |
| ID | varchar2(32) | record identifier |

T_OBJ_INITIATIVE (327): The T_OBJ_INITIATIVE table 327 holds the details of an initiative. There is an entry for each initiative. The fields in the table's entries are as follows:

| Name | Type | Description |
| --- | --- | --- |
| ID | varchar2(32) | record identifier |
| START_DATE | date | start date |
| END_DATE | date | end date |

T_OBJ_INITIATIVE_DATA_OBJECT (328): The entries in the T_OBJ_INITIATIVE_DATA_OBJECT table 328 relate data objects to initiatives. There is an entry for each initiative/data object association. Each entry references the initiative's record in the T_OBJ_INITIATIVE table 327 and the data object's record in the T_OBJ_DATA table 318. The initiative is related to a workspace through the Workspace_ID in the object's record. The fields in the table's entries are as follows:

| Name | Type | Description |
| --- | --- | --- |
| ID | varchar2(32) | record identifier |
| INITIATIVE_ID | varchar2(32) | initiative ID from T_OBJ_INITIATIVE |
| DATA_OBJECT_ID | varchar2(32) | data object ID from T_OBJ_DATA |
| SEQUENCE_NUM | number(4,0) | display sequence number |

-continued

| Name | Type | Description |
| --- | --- | --- |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_OBJ_RESOURCE (329): The T_OBJ_RESOURCE table 329 holds the details of a resource. There is an entry for each resource. Each entry references the resource template's record in the T_RES_TMPLT 335 from which the resource was created. This association is used in knowledge boards to find resources belonging to the resource template for the purpose of generating a report, as described above. The fields in the table's entries are as follows:

| Name | Type | Description |
|---|---|---|
| ID | varchar2(32) | record identifier |
| RESOURCE_TMPLT_ID | varchar2(32) | resource template ID from T_RES_TMPL |

T_OBJ_RESOURCE_INFORMATION (330): The entries in the T_OBJ_RESOURCE_INFORMATION table 330 relate information (documents, links & RSS feeds) to resources. There is an entry for each piece of information. Each entry references the resource's record in the T_OBJ_RESOURCE table 329. The fields in the table's entries are as follows:

| Name | Type | Description |
|---|---|---|
| ID | varchar2(32) | record identifier |
| NAME | varchar2(128) | information name |
| DESCRIPTION | varchar2(2000) | information description |
| RESOURCE_ID | varchar2(32) | resource ID from T_OBJ_RESOURCE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_OBJ_RESOURCE_DOCUMENT (331): The entries in the T_OBJ_RESOURCE_DOCUMENT table 331 relate documents to the information table. It subclasses the T_RESOURCE_INFORMATION table 330. There is an entry for each document. Each entry references an information's record in the T_OBJ_RESOURCE_INFORMATION table 330. The document is related to a resource through the Resource_ID in the information's record. The fields in the table's entries are as follows:

| Name | Type | Description |
|---|---|---|
| INFORMATION_ID | varchar2(32) | information ID from T_OBJ_RESOURCE_INFORMATION |
| DOCUMENT_ID | varchar2(32) | document ID |
| CHECKSUM | varchar2(32) | checksum value |
| FILE_NAME | varchar2(255) | file name |
| VERSION | varchar2(4) | version number |

T_OBJ_RESOURCE_LINK (332): The entries in the T_OBJ_RESOURCE_LINK 332 table relate links to information. It subclasses the T_RESOURCE_INFORMATION table 330. There is an entry for each link. Each entry references an information's recording the T_OBJ_RESOURCE_INFORMATION table 330. The link is related to a resource through the Resource_ID in the information's record. The fields in the table's entries are as follows:

| Name | Type | Description |
|---|---|---|
| INFORMATION_ID | varchar2(32) | information ID from T_OBJ_RESOURCE_INFORMATION |
| URL | varchar2(512) | URL for link |
| INTERNAL_FLAG | char(1) | set if internal link |

T_OBJ_RESOURCE_RSS (333): The entries in the T_OBJ_RESOURCE_RSS table 333 relate RSS feeds to information. It subclasses the T_RESOURCE_INFORMATION table 330. There is an entry for each RSS feed. Each entry references an information's record in the T_OBJ_RESOURCE_INFORMATION table 330. The RSS feed is related to a resource through the Resource_ID in the information's record. The fields in the table's entries are as follows:

| Name | Type | Description |
| --- | --- | --- |
| INFORMATION_ID | varchar2(32) | information ID from T_OBJ_RESOURCE_INFORMATION |
| URL | varchar2(512) | URL for RSS feed |

T_OBJ_RESOURCE_VALUE (334): The T_OBJ_RESOURCE_VALUE table 334 holds values for each field of each resource, as set by a user. There is an entry for each field of each resource. Each entry references a field's record in the T_RES_TMPLT_FIELD table 337 and a resource's record in the T_OBJ_RESOURCE table 329. The field ID's come from the resource template associated with this resource. The fields in the table's entries are as follows:

| Name | Type | Description |
| --- | --- | --- |
| ID | varchar2(32) | record identifier |
| VALUE | varchar2(4000) | field value |
| FIELD_ID | varchar2(32) | field ID from T_RES_TMPLT_FIELD |
| RESOURCE_ID | varchar2(32) | resource ID from T_OBJ_RESOURCE |
| OBJ_VERSION | varchar2 | version number |

T_RES_TMPLT (335): The T_RES_TMPLT table 335 holds the details of the resource templates. There is an entry for each resource template. The fields in the table's entries are as follows:

| Name | Type | Description |
| --- | --- | --- |
| ID | varchar2(32) | record identifier |
| NAME | varchar2(128) | template name |
| DESCRIPTION | varchar2(2000) | template description |
| LAYOUT | varchar2(16) | template display layout |
| VERSION | number(3) | version number |
| NEXT_VERSION_ID | varchar2(32) | next version record ID in this table |
| MASTER_ID | varchar2(32) | master template record ID in this table |

-continued

| Name | Type | Description |
| --- | --- | --- |
| PUBLISHED_DATE | date | date published |
| DISCUSSIONS_FLAG | char(1) | set if discussions associated |
| INFORMATION_FLAG | char(1) | set if information associated |
| ARCHIVED_DATE | date | date archived |
| ARCHIVED_BY | varchar2(32) | user archiving record |
| LOCKED_DATE | date | date locked |

-continued

| Name | Type | Description |
| --- | --- | --- |
| LOCKED_BY | varchar2(32) | user locking record |
| CREATED_DATE | date | date created |
| CREATED_BY | varchar2(32) | user creating record |
| UPDATED_DATE | date | date updated |
| OBJ_VERSION | integer | version number |

T_RES_TMPLT_FIELD_TYPE (336): The T_RES_TMPLT_FIELD_TYPE table 336 holds a number of different types a data field in a resource template can exist as. There is an entry for each data field type. This is used when producing a visual representation of the field. Each field type can be associated with a category. The fields in the table's entries are as follows:

| Name | Type | Description |
| --- | --- | --- |
| ID | varchar2(32) | record identifier |
| NAME | varchar2(128) | field name |
| DESCRIPTION | varchar2(2000) | field description |
| HTML_CLASS | varchar2(255) | HTML class |
| MAX_DEFAULT_OPTIONS | number(4.0) | default maximum number of options |
| CATEGORY | varchar2(16) | category of field type |

T_RES_TMPLT_FIELD (337): The T_RES_TMPLT_FIELD table 337 holds both global data fields that apply to multiple object types and resource template specific data fields. The difference is determined by the RES_TMPLT_ID field. If this field is null, the field is global. Global fields are used when creating a new resource template. There is an entry for each data field. The Each entry references the resource template's record in the T_RES_TMPLT table 335, and the field type's record in the T_RES_TMPLT_FIELD_TYPE table 336. The fields in the table's entries are as follows:

| Name | Type | Description |
|---|---|---|
| ID | varchar2(32) | record identifier |
| NAME | varchar2(128) | name of data field |
| DESCRIPTION | varchar2(2000) | description of data field |
| RES_TMPLT_ID | varchar2(32) | resource template ID from T_RES_TMPLT |
| FIELD_TYPE_ID | varchar2(32) | field type ID from T_RES_TMPLT_FIELD_TYPE |
| MAX_LENGTH | number(10,0) | maximum text length |
| REQUIRED_FLAG | char(1) | set if value required for field |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_RES_TMPLT_FIELD_OPTION (338): The T_RES_TMPLT_FIELD_OPTION table 338 holds options values for the various data fields in the resource templates. There is an entry for each option. Each entry references the field's record in the T_RES_TMPLT_FIELD table 337. For instance, a select list might contain 15 different predefined options. These can be setup for both global fields and resource template specific fields. The fields in the table's entries are as follows:

| Name | Type | Description |
|---|---|---|
| ID | varchar2(32) | record identifier |
| NAME | varchar2(128) | name of data field |
| FIELD_ID | varchar2(32) | field ID from T_RES_TMPLT_FIELD |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date updated |
| OBJ_VERSION | integer | version number |

T_RES_TMPLT_CATEGORY (339): The T_RES_TMPLT_CATEGORY table 339 holds the details of the resource template categories. There is an entry for each category. The fields in the table's entries are as follows:

| Name | Type | Description |
|---|---|---|
| ID | varchar2(32) | record identifier |
| NAME | varchar2(128) | category name |
| DESCRIPTION | varchar2 | category description |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| CREATED_BY | varchar2(32) | user creating record |
| UPDATED_DATE | date | date last updated |
| OBJ_VERSION | integer | version number |

T_RES_TMPLT_CATEGORY_MAP (340): The entries in the T_RES_TMPLT_CATEGORY_MAP table 340 relate categories to resource templates. There is an entry for each template/category association. Each entry references the resource template's record in the T_RES_TMPLT table 335 and the category's record in the T_RES_TMPLT_CATEGORY table 339. The fields in the table's entries are as follows:

| Name | Type | Description |
|---|---|---|
| RES_TMPLT_ID | varchar2(32) | resource template ID from T_RES_TMPLT |
| CATEGORY_ID | varchar2(32) | category ID from T_RES_TMPLT_CATEGORY |

T_USER_PROFILE (341): The T_USER_PROFILE table 341 holds the information of users in the system and relates the user to a company, division, and department. There is an entry for each user. Each entry references a company's record in the T_MD_COMPANY table 310, a division's record in the T_MD_DIVISION table 311, and a department's record in the T_MD_DEPARTMENT table 312. The fields in the table's entries are as follows:

| Name | Type | Description |
|---|---|---|
| ID | varchar2(32) | record identifier |
| TITLE | varchar2(32) | user job title |
| FIRST_NAME | varchar2(32) | first name |
| MIDDLE_NAME | varchar2(32) | middle name |
| LAST_NAME | varchar2(32) | last name |
| SUFFIX | varchar2(32) | name suffix |
| EMAIL | varchar2(255) | email address |
| ADDRESS1 | varchar2(64) | address |
| STREET | varchar2(64) | street |
| CITY | varchar2(64) | city |
| COUNTY | varchar2(64) | county |
| STATE | varchar2(128) | state |
| COUNTRY | varchar2(128) | country |
| POSTAL_CODE | varchar2(16) | postal code |
| PHONE | varchar2(24) | phone number |
| MOBILE | varchar2(24) | mobile number |
| PAGER | varchar2(24) | page number |
| FIRST_LOGIN | char(1) | whether logged in for first time |
| LICENSE_AGREEMENT | date | date accept license agreement |
| CREATED_DATE | date | date created |
| UPDATED_DATE | date | date last updated |
| OBJ_VERSION | integer | version number |

T_USER_PROFILE_WORK (354): The T_USER_PROFILE_WORK table holds the information of users in the system. There is an entry for each user, and each entry references the user's record in the T_USER_PROFILE table 341. The fields in the table's entries are as follows:

| Name | Type | Description |
| --- | --- | --- |
| USER_ID | varchar2(32) | user ID from T_USR_PROFILE |
| JOB_TITLE | varchar2(64) | user job title |
| JOB_DESCRIPTION | varchar2(4000) | job description |
| SPECIALTIES | varchar2(4000) | user specialties |
| CERTIFICATIONS | varchar2(4000) | user certifications |
| WORK_ID | varchar2(128) | user work ID |
| BADGE_NUMBER | varchar2(128) | user badge number |
| ADDRESS1 | varchar2(64) | address |
| STREET | varchar2(64) | street |
| CITY | varchar2(64) | city |
| COUNTY | varchar2(64) | county |
| STATE | varchar2(128) | state |
| COUNTRY | varchar2(128) | country |
| POSTAL_CODE | varchar2(16) | postal code |
| COMPANY_ID | varchar2(32) | company ID from T_MD_COMPANY |
| DIVISION_ID | varchar2(32) | division ID from T_MD_DIVISION |
| DEPARTMENT_ID | varchar2(32) | department ID from T_MD_DEPARTMENT |
| PHONE | varchar2(24) | phone number |
| MOBILE | varchar2(24) | mobile number |
| PAGER | varchar2(24) | page number |
| OFFICE_BUILDING | varchar2(64) | office building |
| OFFICE_FLOOR | varchar2(12) | office floor |
| OFFICE_ROOM | varchar2(12) | office room |
| OFFICE_PHONE | varchar2(24) | office phone number |
| OBJ_VERSION | integer | version number |

T_USER_LOGIN (342): The entries in the T_USER_LOGIN table 342 relate login information to users in the system, if authenticating users through the application. There is one entry for each user. Each entry references the user's record in the T_USER_PROFILE table 341. The fields in the table's entries are as follows:

| Name | Type | Description |
| --- | --- | --- |
| USER_ID | varchar2(32) | user ID from T_USER_PROFILE |
| PASS_WORD | varchar2(64) | password |
| PASS_WORD_DATE | date | date password set |
| AUTO_LOCKED_DATE | date | date auto locked set |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CONNECTED_DATE | date | date connected |
| CREATED_DATE | date | date created |
| UPDATED_DATE | date | date last updated |
| OBJ_VERSION | integer | version number |

T_USER_LOGIN_HISTORY (343): The entries in the T_USER_LOGIN_HISTORY table 343 relate the login/logout dates/times to individual users. There is an entry for each login and each logout. Each entry references a user's record in the T_USER_PROFILE table 341. The fields in the table's entries are as follows:

| Name | Type | Description |
| --- | --- | --- |
| HISTORY_ID | varchar2(32) | history ID |
| USER_ID | varchar2(32) | user ID from T_USER_PROFILE |
| LOGIN_DATE | date | date of login |
| LOGOUT_DATE | date | date of logout |
| OBJ_VERSION | integer | version number |

T_USER_PREFERENCES (344): The entries in the T_USER_PREFERENCES table 344 relate preferences to individual users. There is an entry for each user. Each entry references a user's record in the T_USER_PROFILE table 341. The fields in the table's entries are as follows:

| Name | Type | Description |
| --- | --- | --- |
| USER_ID | varchar2(32) | user ID from T_USER_PROFILE |
| DEFAULT_WORKSPACE_ID | varchar2(32) | default workspace |
| DEFAULT_NAVIGATOR | varchar2(16) | default navigator view |
| DEFAULT_LANGUAGE | varchar2(2) | default language |
| EMAIL_ALERTS | char(1) | set to receive email alerts |
| EMAIL_MESSAGES | char(1) | set to receive email message |
| OBJ_VERSION | integer | version number |

T_USER_ADMIN_ROLE (345): The entries in the T_USER_ADMIN_ROLE table 345 relate application level admin role assignments to users. Users can have multiple admin roles. There is an entry for each role assignment. Each entry references the role's record in the T_ADMIN_ROLE table 301 and the user's record in the T_USER_PROFILE table 341. The fields in the table's entries are as follows:

| Name | Type | Description |
| --- | --- | --- |
| ID | varchar2(32) | record identifier |
| ROLE_ID | varchar2(32) | role ID from T_ADMIN_ROLE |
| USER_ID | varchar2(32) | user ID from T_USER_PROFILE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date updated |
| OBJ_VERSION | integer | version number |

T_WORKSPACE (346): The T_WORKSPACE table 346 holds information about workspaces. There is an entry for each workspace. The fields in the table's entries are as follows:

| Name | Type | Description |
| --- | --- | --- |
| ID | varchar2(32) | record identifier |
| NAME | varchar2(128) | workspace name |

| Name | Type | Description |
| --- | --- | --- |
| DESCRIPTION | varchar2(2000) | workspace description |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_ROLE (347): The T_WORKSPACE_ROLE table 347 holds the four workspace roles available: Viewer, User, Manager, and Administrator. There is an entry for each workspace role The fields in the table's entries are as follows:

| Name | Type | Description |
| --- | --- | --- |
| ID | varchar2(32) | record identifier |
| NAME | varchar2(128) | role name |
| CODE | varchar2(32) | role code |
| DESCRIPTION | varchar2(2000) | role description |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_MEMBER (348): The entries in the T_WORKSPACE_MEMBER table 348 relate users to a workspace and assign their role within the workspace. Users can have different roles in different workspaces. There is an entry for each user/workspace relationship. Each entry references the user's record in the T_USER_PROFILE table 341, the workspace's record in the t-WORKSPACE table 346, and the role's record in the T_WORKSPACE_ROLE table 347. The fields in the table's entries are as follows:

| Name | Type | Description |
| --- | --- | --- |
| ID | varchar2(32) | record identifier |
| USER_ID | varchar2(32) | user ID from T_USER_PROFILE |
| WORKSPACE_ID | varchar2(32) | workspace ID from T_WORKSPACE |
| ROLE_ID | varchar2(32) | role ID from T_WORKSPACE_ROLE |
| CREATED_DATE | date | date created |
| UPDATED_DATE | date | date last updated |
| OBJ_VERSION | integer | version number |

T_WORKSPACE_GROUP (349): The entries in the T_WORKSPACE_GROUP table 349 relate groups to a workspace. Groups are just a way of grouping a number of users together for easy reference. There is an entry for each group/workspace relationship. Each entry references a workspace's record in the T_WORKSPACE table 346. The fields in the table's entries are as follows:

| Name | Type | Description |
| --- | --- | --- |
| ID | varchar2(32) | record identifier |
| NAME | varchar2(128) | group name |
| DESCRIPTION | varchar2(2000) | group description |
| WORKSPACE_ID | varchar2(32) | workspace ID from T_WORKSPACE |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date updated |
| OBJ_VERSION | integer | version number |

T_WORKSPACE_GROUP_MEMBER (350): The entries in the T_WORKSPACE_GROUP_MEMBER table 350 relate users to workspace groups. Users can belong to any number of groups. There is an entry for each user/workspace relationship. Each entry references the group's record in the T_WORKSPACE_GROUP table 349 and a member's record in the T_WORKSPACE_MEMBER table 348. The fields in the table's entries are as follows:

| Name | Type | Description |
| --- | --- | --- |
| GROUP_ID | varchar2(32) | group ID from T_WORKSPACE_GROUP |
| MEMBER_ID | varchar2(32) | member ID from T_WORKSPACE_MEMBER |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_QUICK_LINK (351): The entries in the T_WORKSPACE_QUICK_LINK table 351 relate links to workspaces. They can be used to quickly access information for the entire workgroup. There is an entry for each link/workspace relationship. Each entry references the workspace's record in the T_WORKSPACE table 346. The fields in the table's entries are as follows:

| Name | Type | Description |
| --- | --- | --- |
| ID | varchar2(32) | record identifier |
| NAME | varchar2(128) | link name |
| DESCRIPTION | varchar2(2000) | link description |
| WORKSPACE_ID | varchar2(32) | workspace ID from T_WORKSPACE |
| URL | varchar2(2000) | URL for link |
| TARGET | varchar2(32) | target of link |
| SEQUENCE_NUM | number(4,0) | display sequence number |
| ARCHIVED_DATE | date | date archived |
| ARCHIVED_BY | varchar2(32) | user archiving record |
| LOCKED_DATE | date | date locked |
| LOCKED_BY | varchar2(32) | user locking record |
| CREATED_DATE | date | date created |
| UPDATED_DATE | date | date last updated |
| OBJ_VERSION | integer | version number |

T_WORKSPACE_RES_TMPLT (352): The entries in the T_WORKSPACE_RES_TMPLT table 352 relate resources templates to workspaces. There is an entry for each workspace/template relationship. Each entry references the workspace's record in the T_WORKSPACE table 346, and the resource template's record in the T_RES_TMPLT table 335. The fields in the table's entries are as follows:

| Name | Type | Description |
|---|---|---|
| WORKSPACE_ID | varchar2(32) | workspace ID from T_WORKSPACE |
| RES_TMPLT_ID | varchar2(32) | resource template ID from T_RES_TMPLT |
| CREATED_DATE | date | date created |
| UPDATED_DATE | date | date last updated |
| OBJ_VERSION | integer | version number |

T_WORKSPACE_PREFERENCE (353): The T_WORKSPACE_PREFERENCE table 353 has a many-to-one relationship with T_WORKSPACE 345 and holds an array of preferences for each workspace. There is an entry for each workspace preference. Each entry references the workspace's record in the T_WORKSPACE table 346. The fields in the table's entries are as follows:

| Name | Type | Description |
|---|---|---|
| ID | varchar2(32) | record identifier |
| WORKSPACE_ID | varchar2(32) | workspace ID from T_WORKSPACE |
| NAME | varchar2(128) | preference name |
| VALUE | varchar2(2000) | preference value |
| OBJ_VERSION | integer | version number |

C. Administrative Setup

1. Company

FIGS. 5-10F show administrative tools for setup and management of the system. Administrators can customize non-workspace objects, such as logos to provide a corporate identity to the navigation GUI. The non-workspace objects are displayed in the left navigation GUI 504. As illustrated in FIG. 5, the current logo 501 is shown on the screen. An administrator can choose to set the default logo by selecting the "Set Default Logo" button 502 and selecting the file of the logo in field 503. The logo information is stored in the T_APPLICATION_LOGO table 303.

Figure 6A:
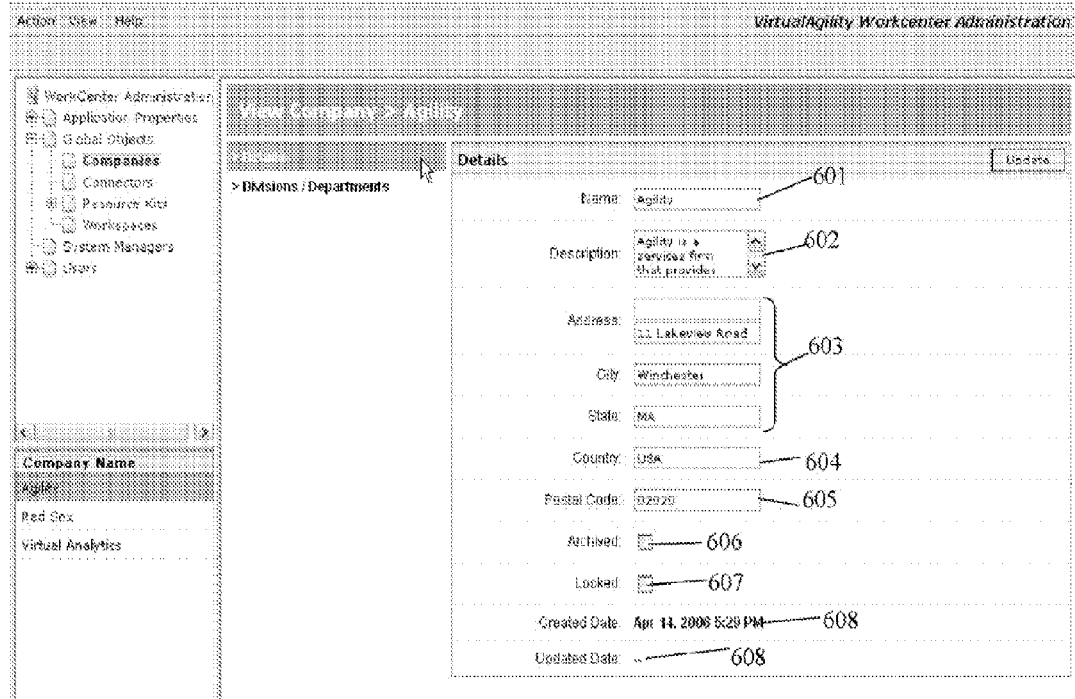
FIGS. 6A-6C illustrate the set up of companies that will be sharing the navigation GUI.
Figure 6B:
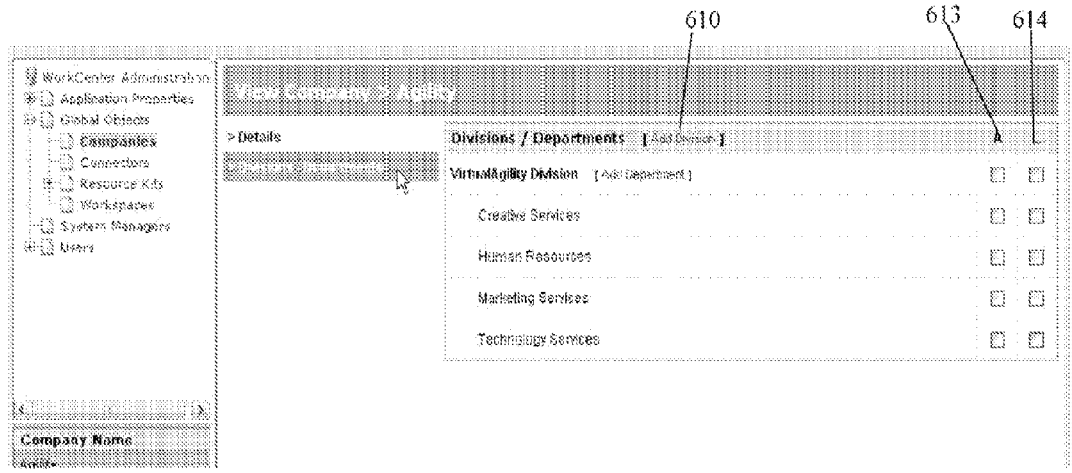
Figure 6C:
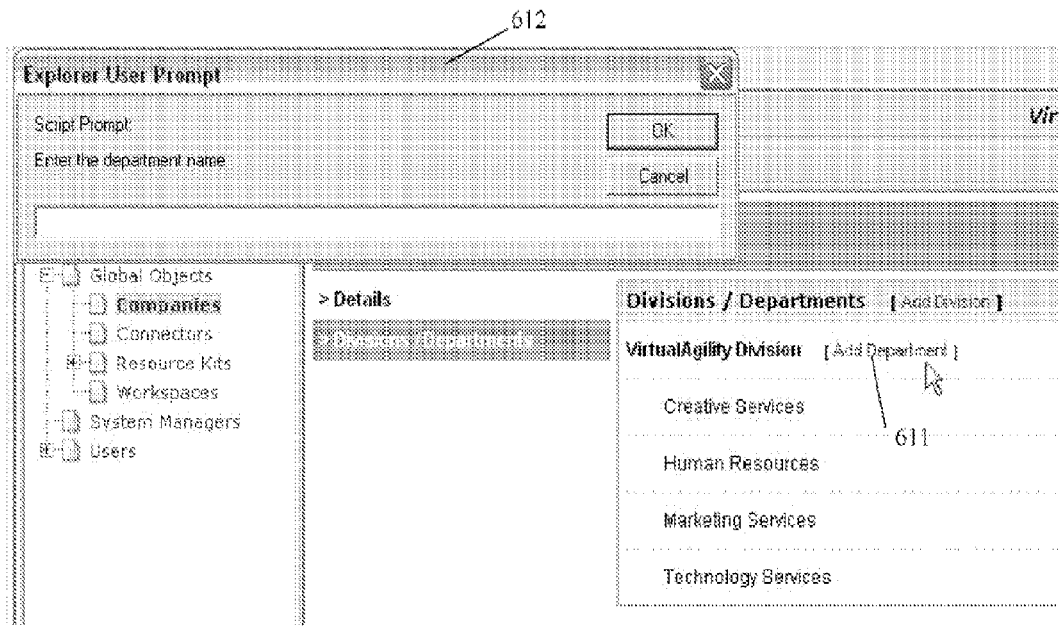

FIGS. 6A-6C illustrate the set up of companies that will be sharing the navigation GUI. An administrator can set the companies, divisions, and departments in the system. Information for a company is stored in an entry in the T_MD_COMPANY table 310. As illustrated in FIG. 6A, the administrator sets the name 601, description 602, the address, city, and state 603, country 604, and postal code 605. The date that the company's record was created 608 and the date that the company information was last updated 609 are also stored in the T_MD_COMPANY table 310.

An administrator can further select the Archive 606 or Lock 607 options. These options provide the ability to lock or archive the system's elements or documents. These options are important in supporting the compliance aspect of the system, where any user, company or element, including any document ever put in the system, is maintained forever. Selection of the Lock option 607 provides the ability to protect an entity so that no other person can change or remove it from the system. The selection of the Archive option 606 means that the record for the company will be removed from the view on the system but will remain within the system's database and could be retrieved if needed.

As illustrated in FIG. 6B, a division can be created and associated with the company by selecting "Add Division" 610. The administrator is then prompted for information for the division. Division information is stored in an entry in the T_MD_DIVISION table 311. The administrator sets the name of the division, the company with which the division is associated, the date the division's record was created, and the date the division information was last updated, which are stored in the entry. The entry references the company in the Company_ID field. The administrator can further select the archive option 613 and/or the lock option 614 for this division.

As illustrated in FIG. 6C, a department can be created and associated with the division by selecting "Add Department" 611. The administrator is then prompted for information for the department, such as through a prompt window 612 for the department name. Information for the department is stored in an entry in the T_MD_DEPARTMENT table 312. The administrator sets the name of the department, the division with which the department is associated, the date the department's record was created, and the date the department information was last updated, which are stored in the entry. The entry references the division in the Division_ID field. The administrator can further select the archive option and/or the lock option (not shown).

2. Resources

Figure 7:
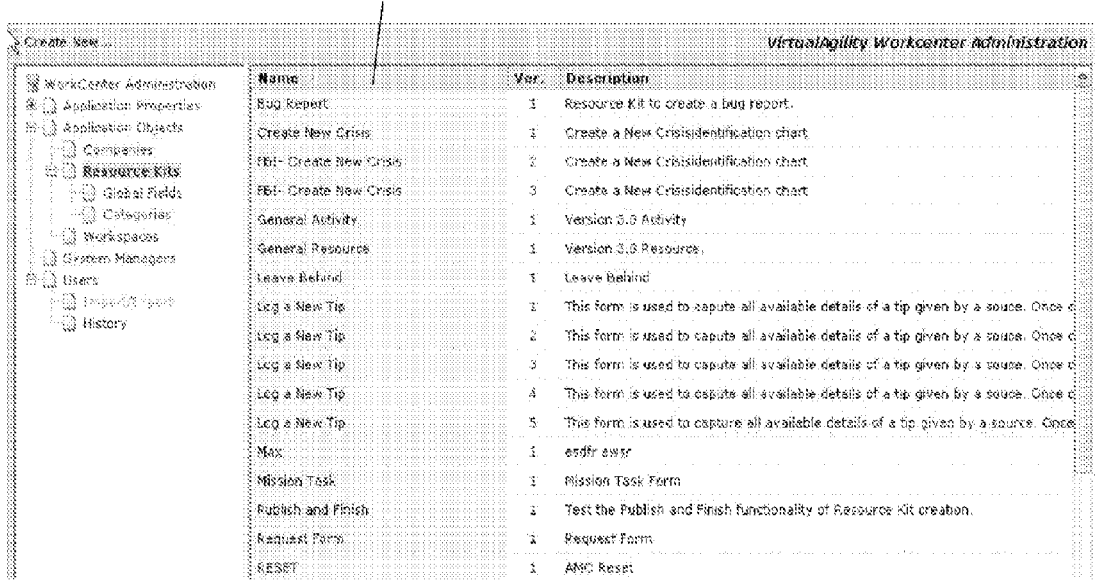
Figure 8A:
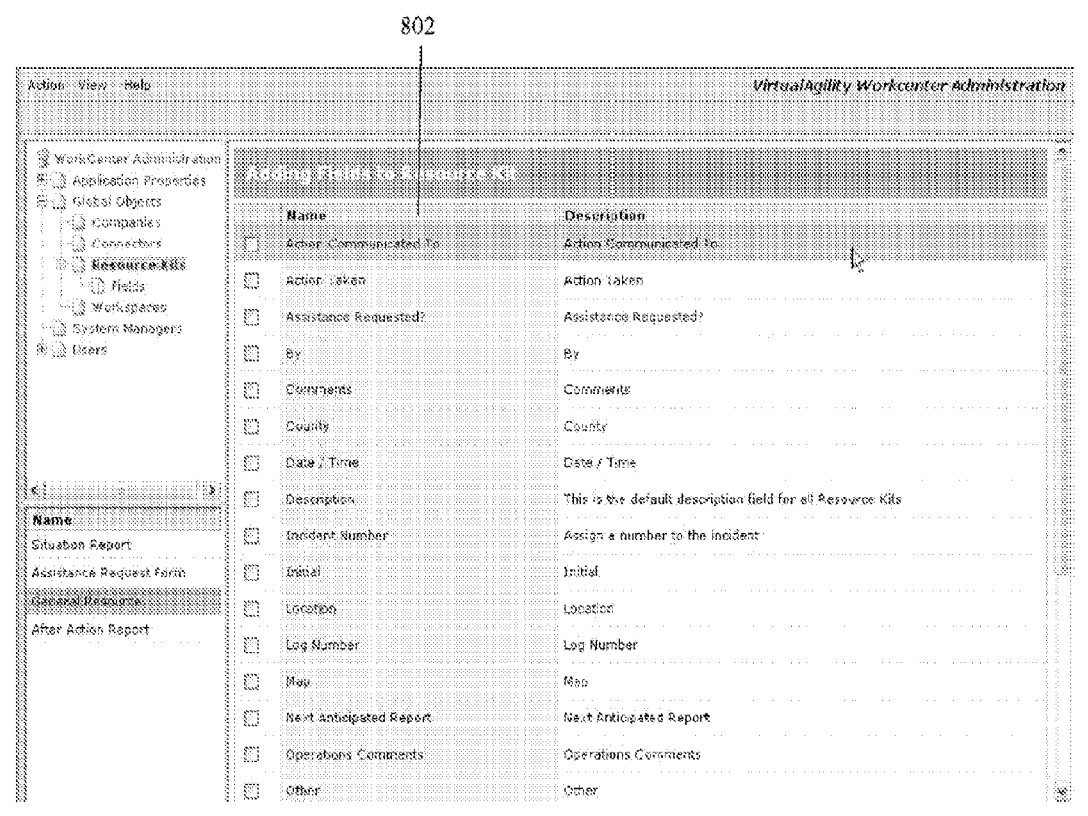
Figure 8B:
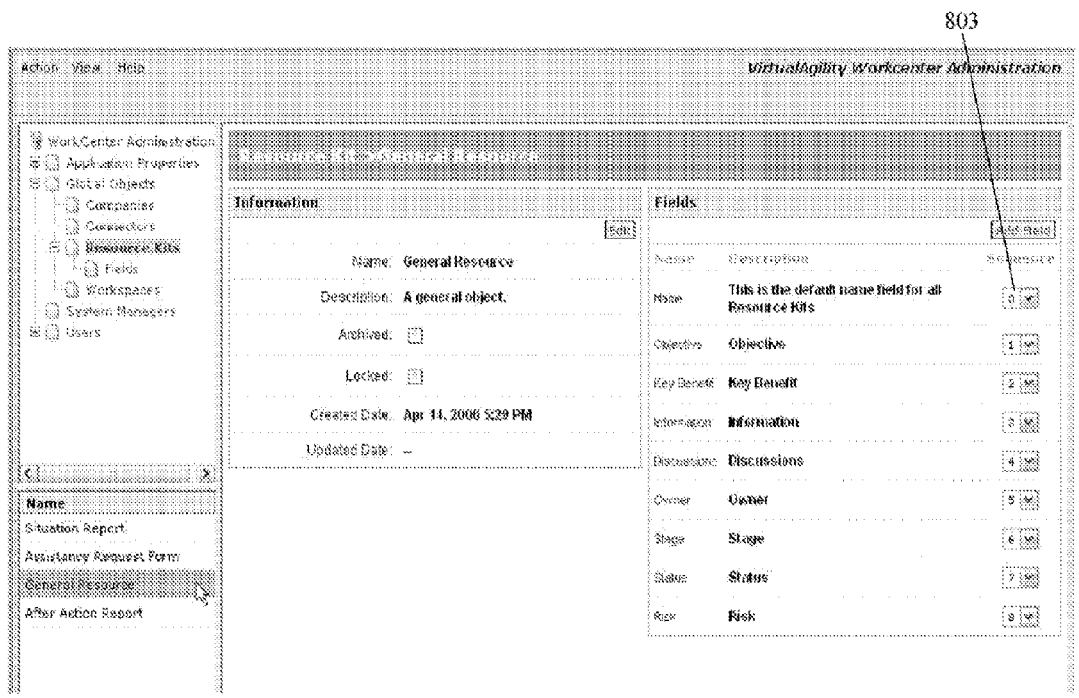

FIGS. 7-8B illustrate the set up of resources. Resource information is stored in the T_OBJ_RESOURCE table 329. As illustrated in FIG. 7, the system first displays the available resources templates 701, which are stored in the T_RES_TMPLT table 335. The fields in a resource template are stored in the T_RES_TMPLT_FIELD_TYPE table 336, the T_RES_TMPLT_FIELD table 337, and the T_RES-TMPLT_FIELD_OPTION table 338. An administrator can choose one of the available resource templates 701 from which to create a new resource template. As illustrated in FIG. 8A, when creating a new resource template, an administrator selects the field(s) they want to use in the resource that will be created from the resource template. The system will contain a list of available fields 802, such as Action Communicated To, Action Taken, Assistance Requested, and others as shown in FIG. 8A. In addition, an administrator can add new fields by defining the type of field and the elements presented. As illustrated in FIG. 8B, the fields can then be placed in the order in which they will appear in the resource template by setting the sequence 803. The creation of a resource from the resource template is described further below in the User's Experience section.

The administrator can further create template categories (not shown) to which the resource template can be related. The template categories are stored in the T_RES_TMPLT_CATEGORY table 339, with the resource template/category association stored as an entry in the T_RES_TMPLT_CATEGORY_MAP table 340.

3. Workspaces

Figure 9A:
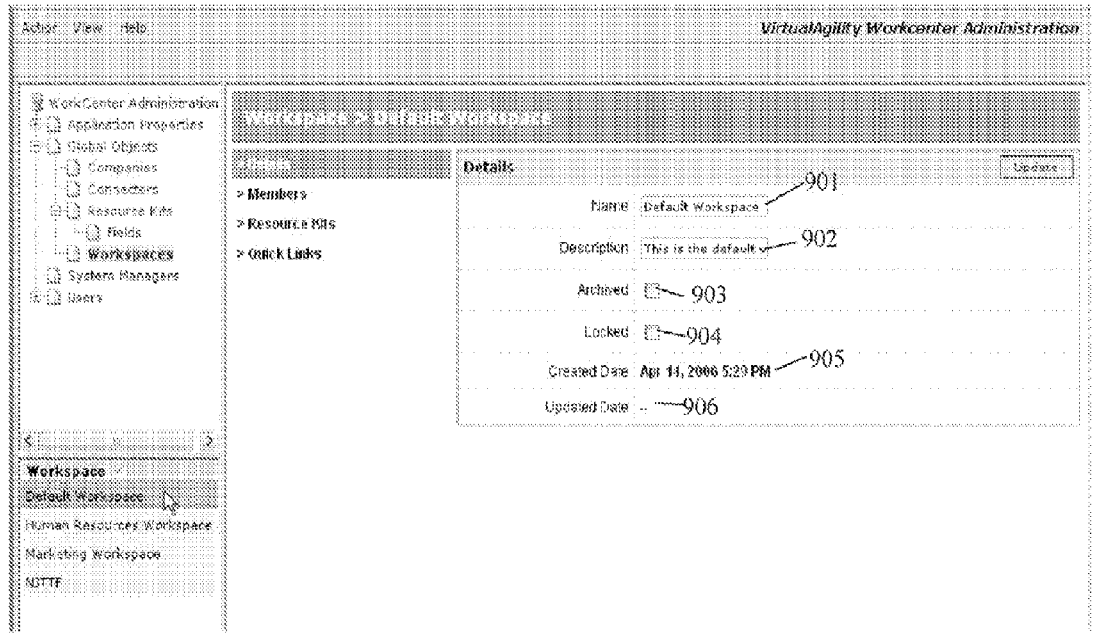

FIGS. 9A-9E illustrate the set up of workspaces. An administrator sets workspace information, which is stored in the T_WORKSPACE table 346. As illustrated in FIG. 9A, workspace information includes the name of the workspace 901, a description of the workspace 902, the date the workspace record was created 905, and the date the workspace information was last updated 906. The administrator can further select the archive option 903 and/or the lock option 904.

Figure 9B:
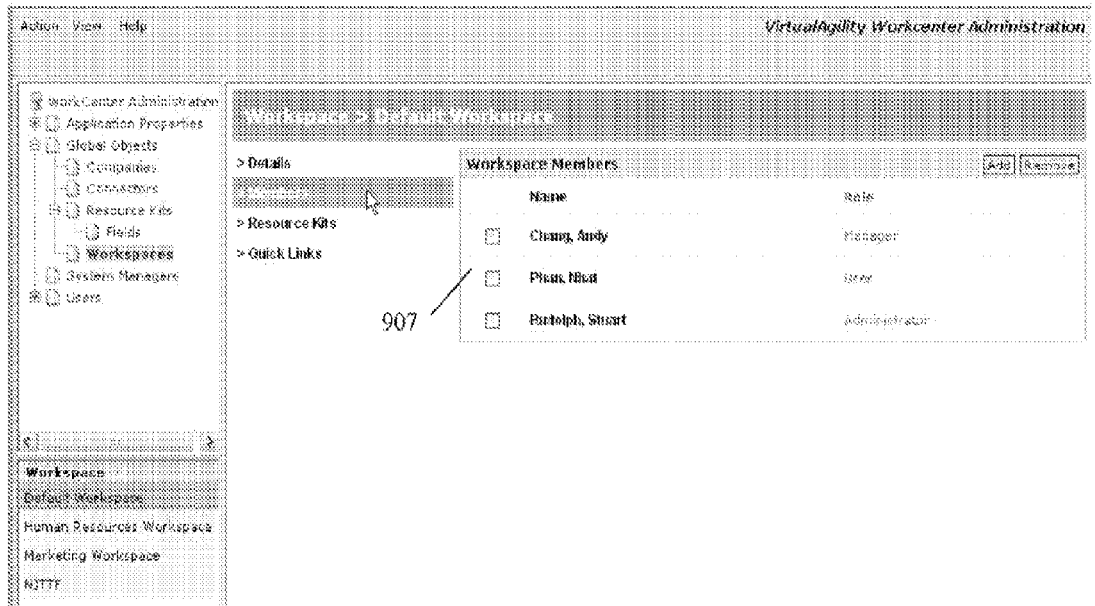
Figure 9C:
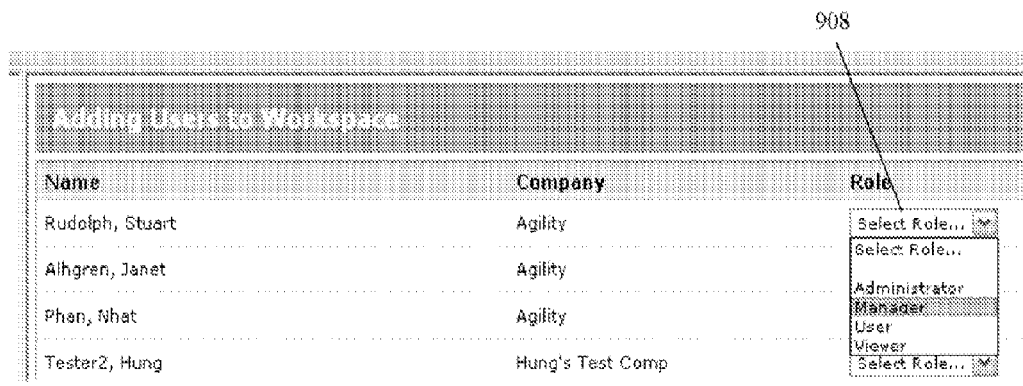

As illustrated in FIG. 9B, the administrator can add users 907 as members of the workspace. Information for each user member is stored in the T_WORKSPACE_MEMBER table 348. The information includes the identity of the user member, the User_ID coming from the T_USER_PROFILE table 341. The workspace to which the user is a member is stored in the Workspace_ID field, the workspace ID coming from the T_WORKSPACE table 346. As illustrated in FIG. 9C, each member is assigned privileges or roles 908. The role of a member is stored in the Role_ID field in the T_WORK- SPACE_MEMBER TABLE 348, the Role_ID coming from the T_WORKSPACE_ROLE table 347.

If a workspace group is created (not shown), then the workspace group information is stored in the T_WORKSPACE_GROUP table 349. Users are then added as members of the workspace group by adding an entry to the T_WORKSPACE_GROUP_MEMBER table 350 with a user's Member_ID and a Group_ID for a workspace group. The Member_ID comes from the T_WORKSPACE_MEMBER table 348. This links users to the workspace group.

Figure 9D:
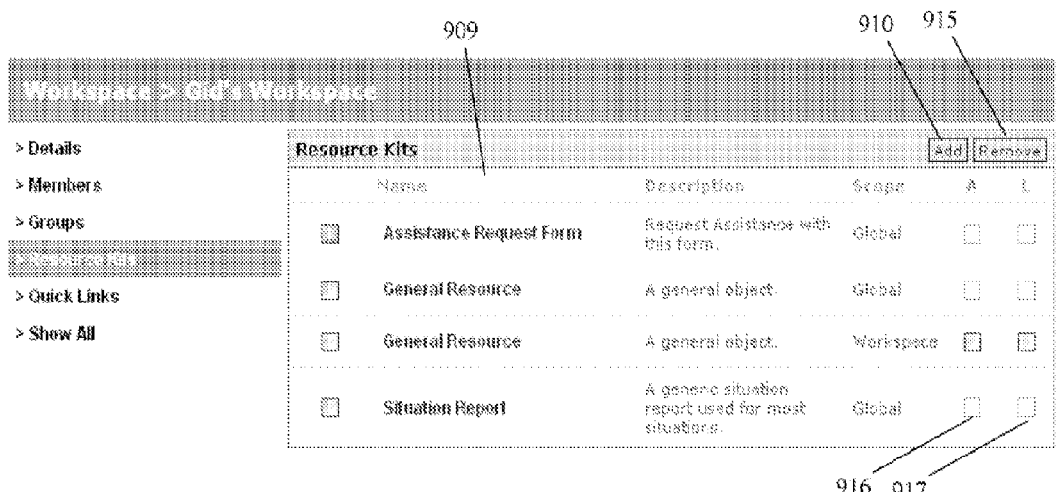

As illustrated in FIG. 9D, resource templates 909 can be associated or disassociated with the workspace by checking the appropriate resource template and selecting the Add button 910 or Remove button 915. The association is stored in the T_WORKSPACE_RES_TMPLT table 352, which stores the Workspace_ID from the T_WORKSPACE table 346 and the Res_Tmplt_ID FROM THE T_RES_TMPLT table 335 in the same record. The administrator can further select the archive option 916 or the lock option 917 for any of the resource templates 909.

Figures 9E, 10A:
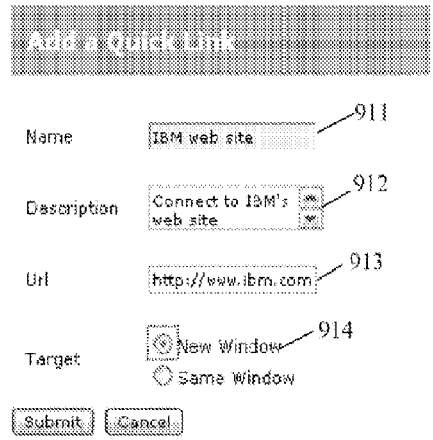

As illustrated in FIG. 9E, quick links can also be added to the workspace. The quick links are stored in the T_WORKSPACE_QUICK_LINK table 351, including the name 911 of the quick link in the Name field, the description 912 of the quick link, the URL 913 for the quick link, and whether the Target 914 of the quick link is to be displayed in a new window or the same window as the workspace.

4. Users

FIGS. 10A-10F illustrate the set up of users. Setting up users is a key function of the system administrator. Users can be added to and removed from the system at any point in time. Since the activities of a user are recorded and information loaded by users might be in use after the user's departure, there is a need to maintain the identity of a user even after he has left or has been terminated from using the system. Therefore, a user is never deleted but rather "archived". The administrator can create a new user by setting the personal information, provide passwords, and associate the user's role within the system. Users are associated with a company, division, and department as set in the company's profile option. The administrator can update users' information or archive them.

Figure 10B:
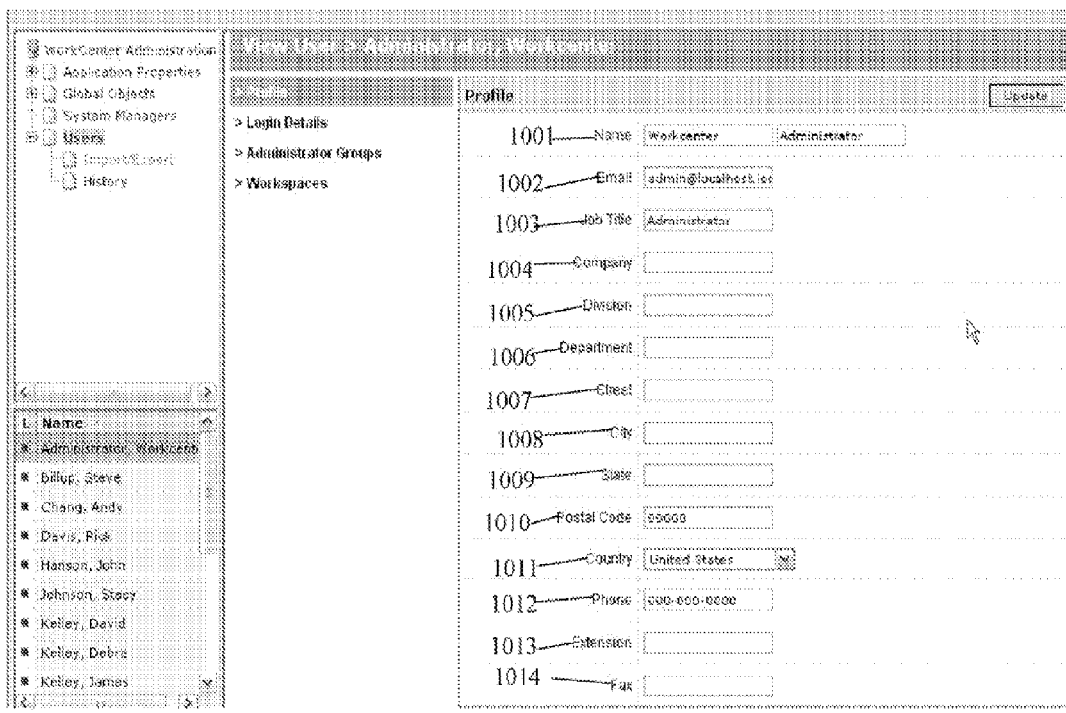

As illustrated in FIG. 10A, the administrator is first shown a list of existing users 1030. From this screen, the administrator can select the archive option 1031 or the lock option 1032 for any of the users 1030. When the administrator selects an "Add User" option (not shown), a blank profile is displayed, as illustrated in FIG. 10B. The administrator fills in the fields, and the field values are stored in the T_USER_PROFILE table 341 and the T_USER_PROFILE_WORK table 354. The user information includes the user name 1001, the email address 1002, the job title 1003, the company 1004, which comes from the T_MD_COMPANY table 310, the division, which comes from the T_MD_DIVISION table 311, and the department, which comes from the T_MD_DIVISION table 312. Also set are the street 1007, city 1008, state 1009, postal code 1010, and country 1011 of the user's address, and the user's phone 1012, extension 1013, and fax 1014 numbers. Also stored in the T_USER_PROFILE table 341 are the first time the user logs in the system, the date the user accepts the application license agreement, the date the user's profile was created, and the date the user's profile was last updated. Drop down menu can be used for any of these fields.

Figure 10C:
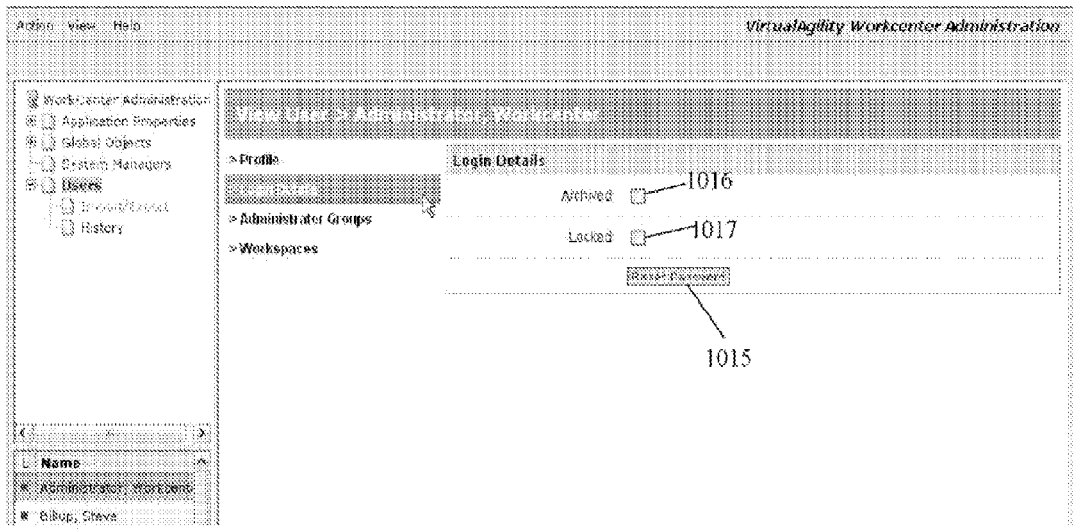

As illustrated in FIG. 10C, the administrator can reset the user's password by selecting the reset password button 1015. The password is stored as part of the user's record in the T_USER_LOGIN table 342, which also stores the date the password was created, the date the login record was created, and the date the login record was last updated. Users can be archived by selecting the archive option 1016, and/or or locked by selecting the lock option 1017.

Figure 10D:
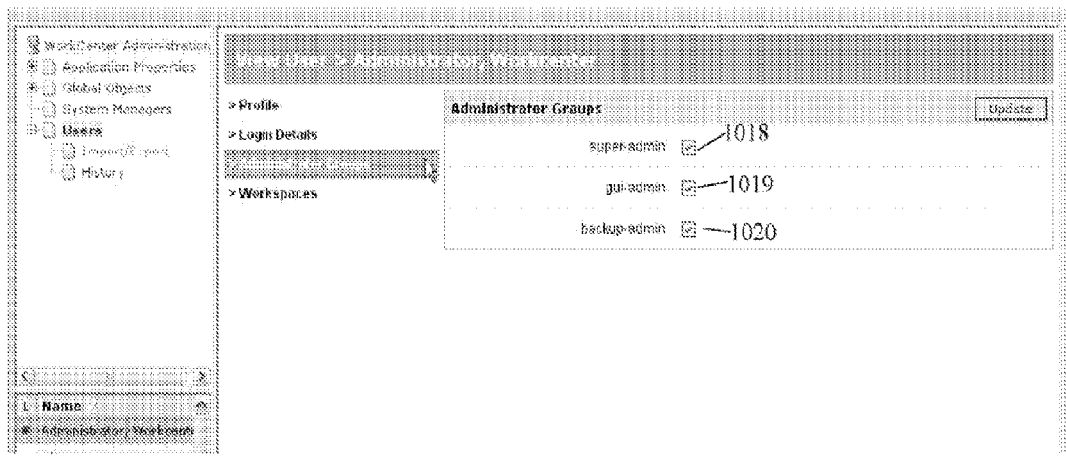

As illustrated in FIG. 10D, the administrator can authorize the user for administrative roles by selecting a super-admin (site administrator) option 1018, a GUI administrator option 1019, or a backup administrator option 1020. The super-admin has authority to manage anything in the system. The GUI administrator has authority only to manage the navigator GUI. The backup administrator has authority to manage only the backup of the system. The user's role is stored in the T_USER_ADMIN_ROLE table 345, which includes the User_ID and the Role_ID fields. The User_ID comes from the T_USER_PROFILE table 341, and the Role_ID comes the T_ADMIN_ROLE table 301.

Figure 10E:
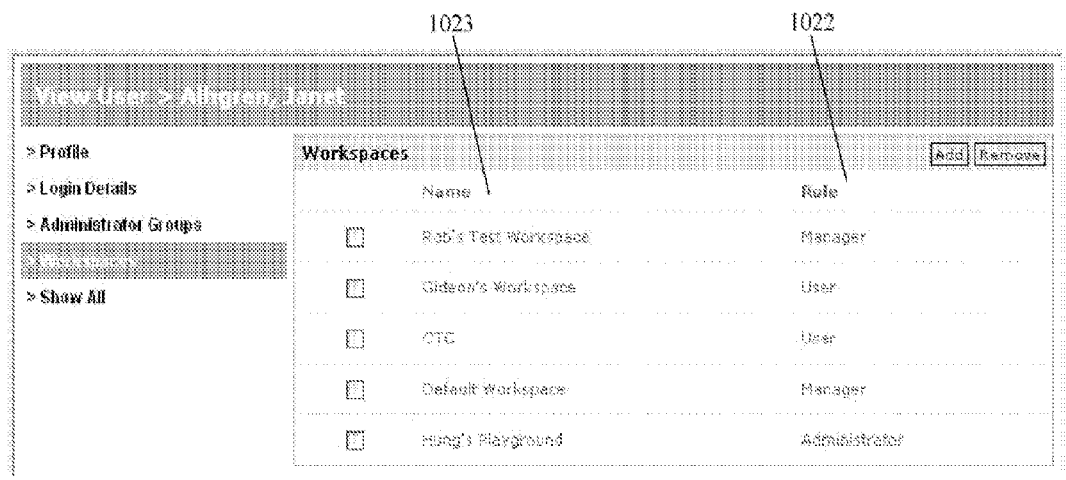

The administrator can assign users 1021 to each workspace. At the time of selecting a workspace, the administrator can assign to users roles and privileges. Possible roles include Workspace administrator, Manager, User, and Viewer. These assignments are stored in the T_WORKSPACE_MEMBER table 348, which includes the User_ID field from the T_USER_PROFILE table 341, and the Role_ID field from the T_WORKSPACE_ROLE table 347. Users can have different roles in different workspaces. For example, as illustrated in FIG. 10E, user Janet Alhgren is given access to the workspaces listed 1021 and assigned the roles listed 1022 in each respective workspace.

As illustrated in FIG. 10F, the administrator can select History and view the log of each user' access to the system. The login history is stored in the T_USER_LOGIN_HISTORY table 343.

D. User Experience

Once the system administrator sets up an account for a user, the user has the ability to log into the system and access the workspaces. The user is provided with a URL for accessing the workspaces, as well as a unique username and password. The user, through a web enabled application, accesses the site at the URL. FIGS. 11A-33G show an example user's experience in using the system to access workspaces.

1. Login

Figure 11A:
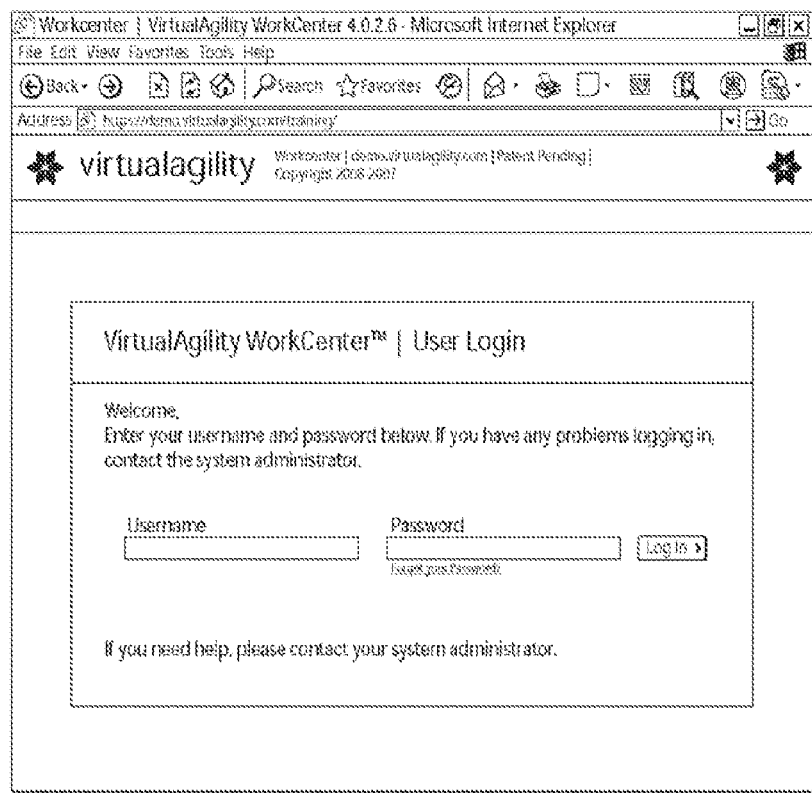
Figure 11B:
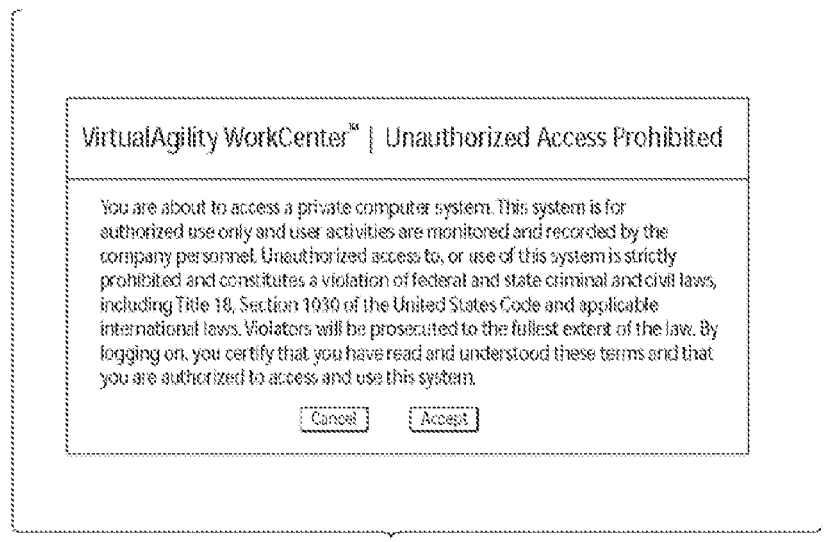

The user launches an Internet browser application at a client and enters the URL address in the browser address field. The user enters the user name and password provided by the administrator in the logon screen, illustrated in FIG. 11A. A corporate network and server usage message may show, as illustrated in FIG. 11B. The user continues by accepting the terms.

Figure 11C:
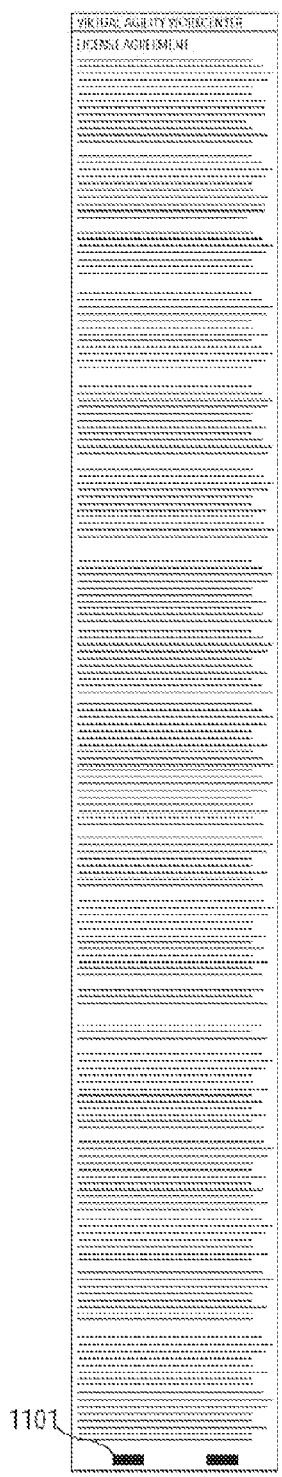

For first time users, a screen will display the licensing agreement and terms of use, as illustrated in FIG. 11C. The user continues by selecting an accept button 1101. The user is then provided an opportunity to add, update, or correct his personal profile information, as illustrated in FIG. 12. The personal profile information is stored in the T_USER_PROFILE table 341 and the T_USER_PROFILE_WORK table 354, and the preferences are stored in the T_USER_PREFERENCES table 344.

The person profile information includes the user's first name 1201 and last name 1202, address 1203, street 1204, city 1205, state 1206, country 1207, and postal code 1208, and the phone 1209, mobile phone 1210, and pager 1211 numbers.

The user preferences include the default workspace 1212, the default navigator tab 1213, and the default language 1214. The user can further choose whether or not to receive email alerts and/or email messages by selecting/deselecting the email alerts option 1215 and email messages option 1216.

Future logons by the user will bypass the licensing agreement and the personal profile setup.

2. Overview Screen

Figure 13:
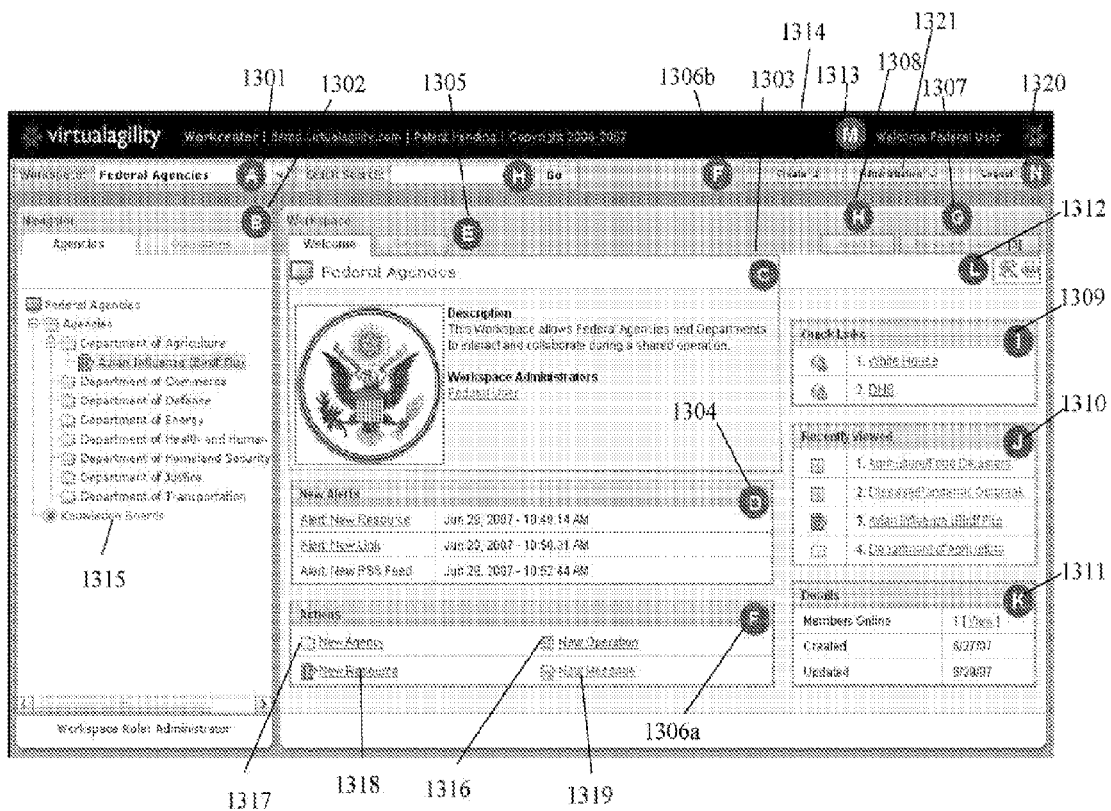
FIG. 13 illustrates an overview screen of a default workspace.

After logging on, the user is displayed the overview screen of the default workspace, an example of which is illustrated in FIG. 13. The overview screen is divided into areas that provide the tools to interact with the system and navigate through the system. The areas include: (A) Default workspace 1301 and a pull down selection to navigate to other workspaces (if applicable); (B) Navigator screen 1302, which is divided into two tables for agencies (domains) and operations (initiatives); (C) overview workspace screen 1303, which includes the logo, a description of the displayed workspace, and a list of administrators; (D) List of new alerts 1304; (E) Detail view 1305 (hidden) which shows the agency, operation, or resource when selected; (F) List of actions 1306a through which the user can start working in the workspace, which can also be taken through pull down tabs 1306b; (G) Message Center 1307 (hidden), providing the ability to see all alerts and messages and the ability for the user to read, send, forward, or reply to alerts and messages; (H) Search 1308 (hidden), for searching the agency, operation, or resource of the workspace; (I) Quick links 1309, which provide general purpose links to web sites or tools; (J) Recently viewed information 1310 for quick reference to last visited pages; (K) Details 1311, which includes creation date and updated date for the workspace, and a list of workspace members on-line or off-line; (L) Tools and print 1312 for editing the welcome screen, if the user has permission to do so, or to print the page; (M) User name display 1313; and (N) Logout button 1320 to ensure that sessions are terminated.

Figure 14:
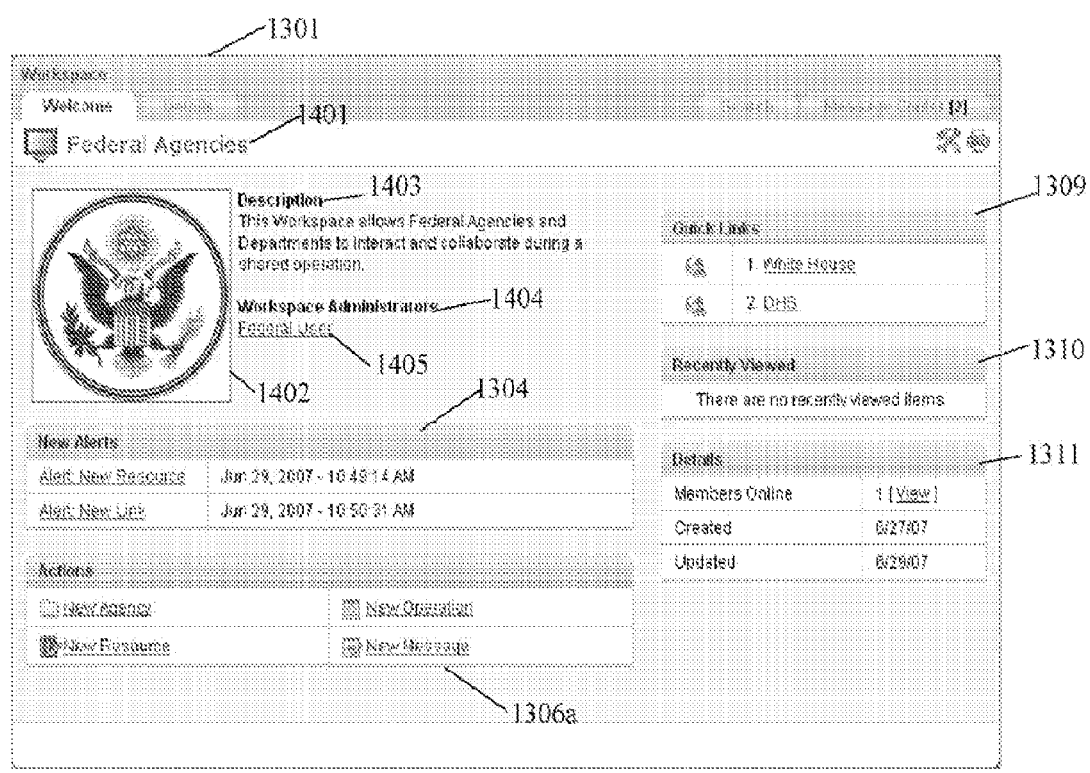
FIG. 14 shows an isolated view of the default workspace screen.

FIG. 14 shows an isolated view of the default workspace screen 1301. The default workspace 1301 includes a title or name of the workspace 1401, a logo or graphic 1402 representing the agency, department or any unique identity for the workspace or its users, a description 1403 that explains the workspace's goal or its purpose, and a list of workspace administrators 1404 and a link 1405 for sending a message to any of the administrators with issues like access, permissions or guidelines. The logo is stored in the T_APPLICATION_LOGO table 303. The name 1401 and description 1402 are stored in the T_WORKSPACE table 346. The list of administrators 1404 is stored in the T_WORKSPACE_MEMBER table 348 as users with a Role_ID field that indicates an administrator role.

The workspace 1301 further includes the list of unread alerts 1304 that are in the user's Message Center, actions 1306a, quick links 1309, recently viewed list 1310, and details 1311. The alerts 1304 are stored in the T_OBJ_DATA_ALERT_USER table 319. Selecting any of the alerts will open the Message Center and the appropriate alert for reference. The Message Center will be further described later in this specification.

The actions 1306a provide direct access to respective Creates dialog where users create new structures or shareable resource element for an agency, operation, resource or message. The create dialogues are shown and described later below. The agency (domain) is stored in the T_OBJ_DOMAIN table 326. The operation (initiative) is stored in the T_OBJ_INTIATIVE table 327. The resource is stored in the T_OBJ_RESOURCE table 329. The agency, operation, and resource are associated with a workspace through the T_OBJ_DATA table 318 as illustrated in FIGS. 4C-4E.

The quick links 1309 provide quick access to general purpose information (or tools) related to the main function of a workspace. The quick links are stored in the T_WORKSPACE_LINK table 350.

The recently viewed list 1310 shows the last screens the user visited. The list is refreshed during logon. Selecting any of the presented entries will open the page in detail view. This enables a user to "jump" to recently visited pages without the need to use the navigator 1302 (FIG. 13).

The details 1311 provide information on the date the workspace was created or modified, stored in the T_WORKSPACE table 346. Depending on the options set up by the administrator for the user, the details 1311 may provide the ability to view other workspace members and whether they are online or offline.

Figure 15A:
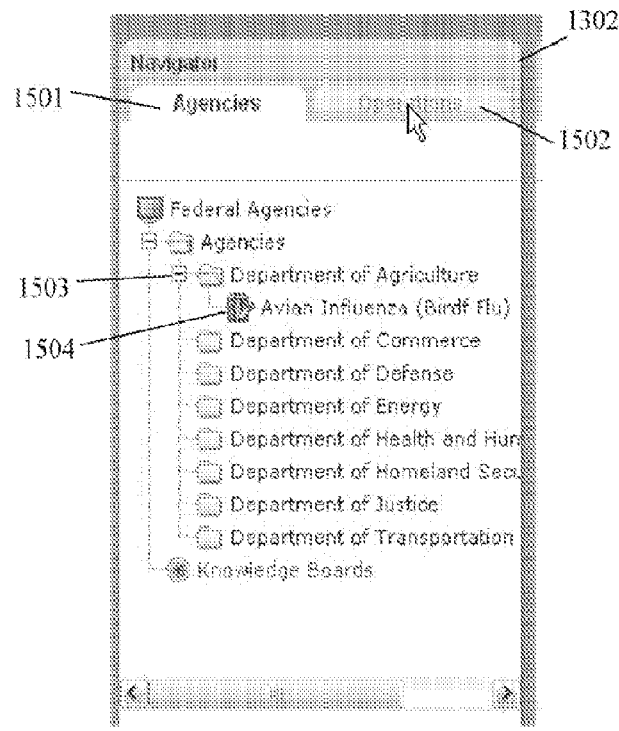
FIGS. 15A-15C show isolated views of the navigator 1302.
Figure 15B:
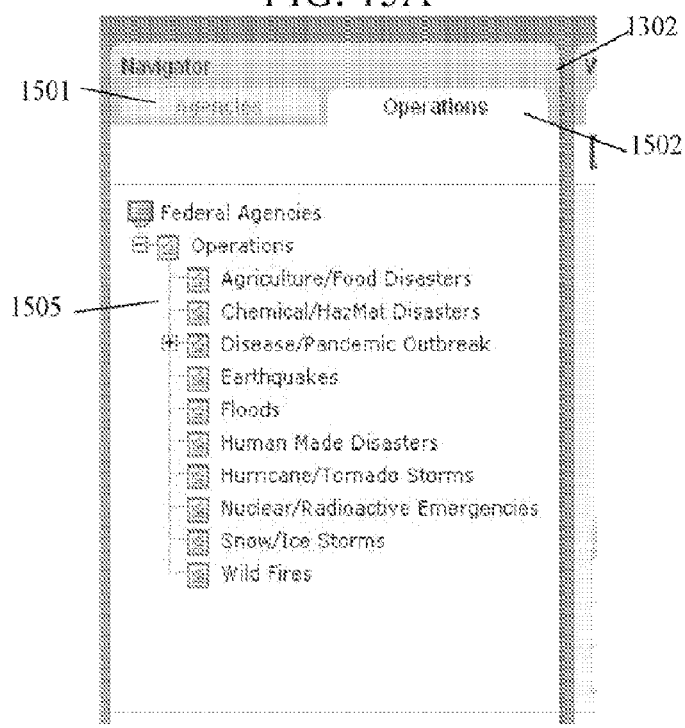
Figure 15C:
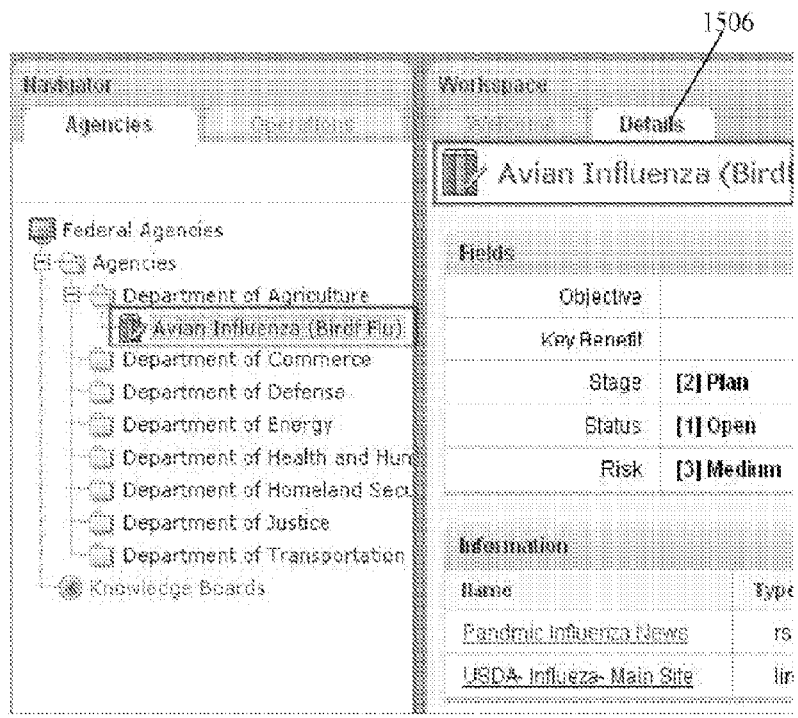

FIGS. 15A-15C show isolated views of the navigator 1302. The navigator 1302 shows the two different views of the resources: the agencies (domains) 1501 and the operations (initiatives) 1502. The two views are selectable through the tabs at the top. Through these views, the entire domain 115 and initiatives 125 hierarchies (FIG. 1) can be accessed. The Agencies 1501 are stored as domains in the T_OBJ_DOMAIN table 326, and the Operations 1502 are stored as initiatives in the T_OBJ_INITIATIVE table 327. These labels can have different names to address the type or function of the organization. Renaming the labels can be done by the administrator.

FIG. 15A shows an example agency view 1501 in the navigator 1302. The agencies represent the organizational structure of the groups coming together, whether they are multiple agencies 1503 or departments 1504 within an organization. These structural elements organize the available information and tools, while indicating who is responsible for creating and maintaining the resources gathered within their domain of responsibility. Here, Federal Agencies is the workspace. Under the Federal Agencies workspace are the agencies (domains) hierarchy. The agencies hierarchy includes sub-domains/sub-agencies, including the Department of Agriculture, Department of Commerce, etc. Under the Department of Agriculture sub-agency 1503 is the resource named Avian Influenza 1504. Selecting the resource 1504 displays the resource's objects in the workspace details view 1506, as shown in FIG. 15C.

FIG. 15B shows an example operation view 1502 in the navigator 1302. The operations represent one or more process structures or how the groups or teams accomplish the goals of the workspace. The operations process structure enables users to bring together at each step the resources (tools and information) needed to accomplish that task. The resources 1505 are predefined structure modules created from resource templates. Each resource 1506 can contain fields for data entry, attached documents, and presentations, links to web sites and tools, discussion forums and more. The creation of a resource is described further below.

The resources can be renamed by an administrator to better represent their usage. They can be presented as many times as desired both the agency and operation hierarchies without duplication. This allows users to update and add information in a single place and instantly provide these upgrades to all users without replication. Here, Federal Agencies is the workspace. Under the Federal Agencies workspace are the operations (initiatives). The operation hierarchy 1505 includes sub-operations, including the Agriculture/Food Disasters, Chemical/HazMat Disasters, etc. Under the operations are the objects (hidden) associated with the operations. Selecting one of the objects displays the object's details in the workspace details view 1305. During the launching of the application, the navigator 1302 will be displayed and remain continuously on the screen.

3. Agency (Domain) Screens

Figure 16A:
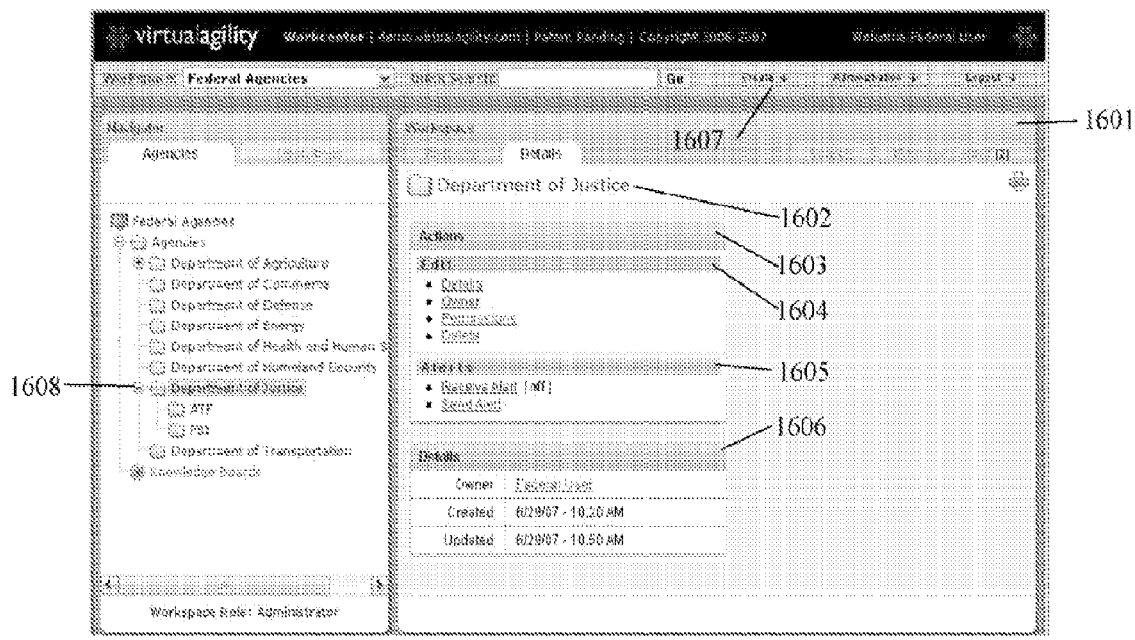
FIGS. 16A-16D show views of the agency information.

Selecting any of the agencies 1503 from the navigator 1302 will display the agency information within the workspace details view. FIGS. 16A-16D show views of the agency information. FIG. 16A shows the agency main screen. The agency main screen 1601 includes the name of the agency 1602, actions 1603, and details 1606. The actions 1603 include edit 1604 and alerts 1605.

Figure 16B:
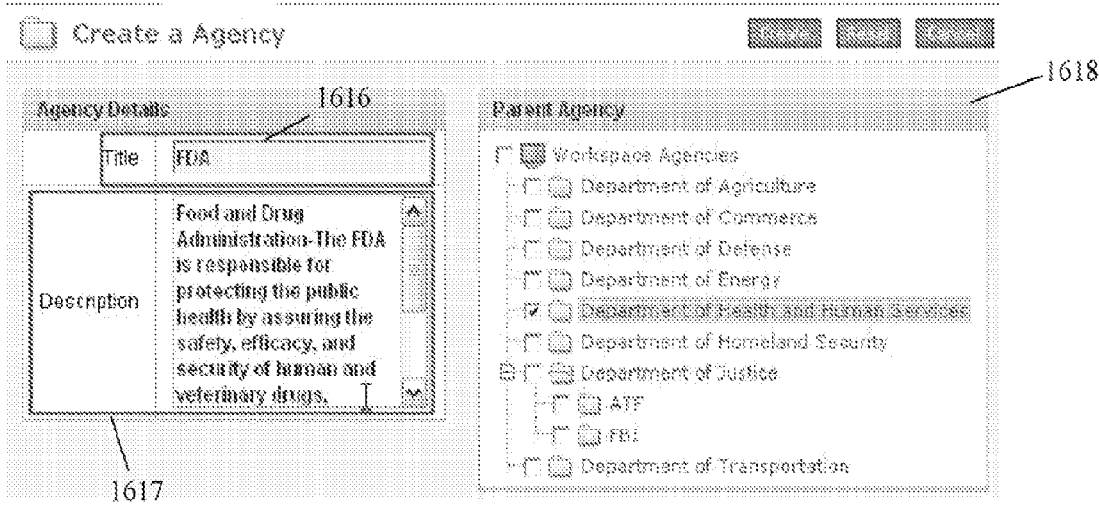

When a user selects the create button 1607 to create a new agency entry, or selects the New Agency option 1317 (FIG. 13) in the overview screen 1301, the screen illustrated in FIG. 16B is shown. The user sets the title 1616 of the agency and the description 1617 of the agency. Both are stored in the T_OBJ_DATA table 318, with the ID of the agency stored in the T_OBJ_DOMAIN table 326 referenced in the Parent_ID field in the T_OBJ_DATA table 318. (See FIG. 4C.) The placement in the parent/daughter domain hierarchy 1618 can also be set, with the parent domain stored in the Parent_ID field of the daughter domain record in the T_OBJ_DATA table 318. The daughter will carry the permissions setup of the parent.

Figure 16C:
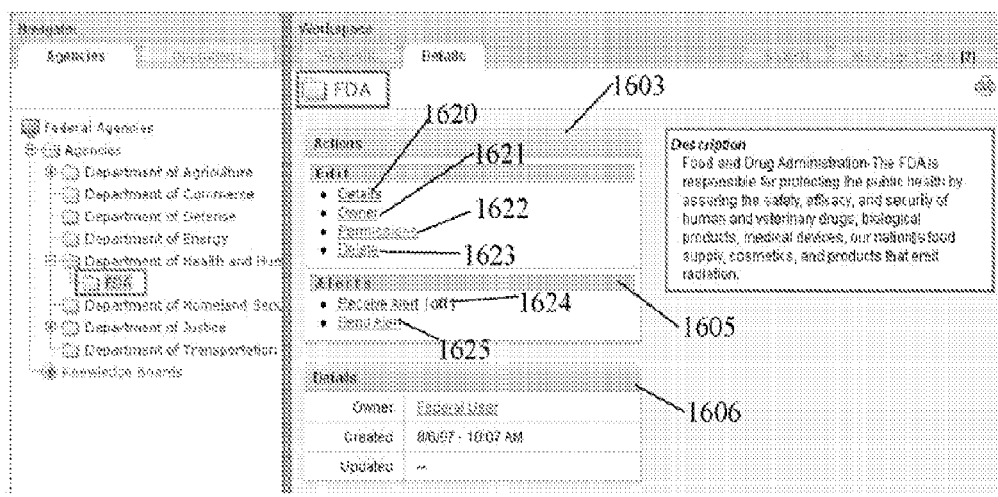
Figure 16D:
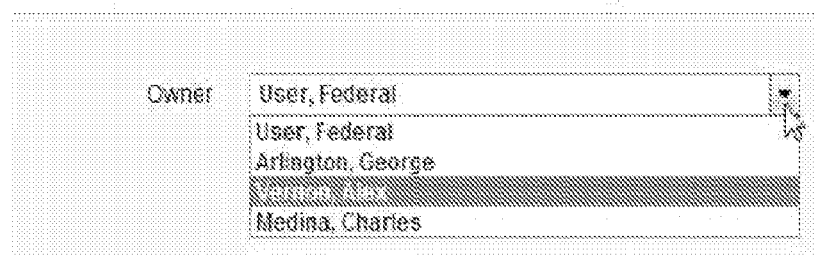

Once created, the new entry is displayed, as illustrated in FIG. 16C. Agency elements can be managed by selection any of the action options: details 1620, owner 1621, permissions 1622, and delete 1623. Selecting details 1620 will open a window similar to the create window shown in FIG. 16B and will allow users to change the title, description, or reposition the agency under another parent agency. Selecting owner 1621 will open a window illustrated in FIG. 16D, which will provide users the option to reassign the responsibility for the agency element to another user. The owner is stored in the Owner_ID field in the T_OBJ_DATA table 318. This feature provides accountability for maintenance of the system's elements because there must always be a user named as the primary owner for each object. Returning to FIG. 16C, selecting permissions 1622 provide users with the option to change the pre-assigned permissions that were granted during the creation of the parent agency. Users can add or remove groups or individual users, or change the permission level for viewer, user, manager, or administrator. These permissions are stored in the T_OBJ_DATA_PERM_GROUP table 320 and the T_OBJ_DATA_PERM_USER table 321. Selecting delete 1623 will archive the agency entry and remove it from view.

Every change to the agency will be marked as an update and will be displayed in the details window 1606.

Users can elect to be or not be alerted of any changes to agency elements by toggling the receive alert option 1624. When toggled "on", an alert entry will be generated within the message center. The message center is described later below. The receive alert option 1624 is transferred to all daughter domains. To send an alert to other users, the send alert option 1625 is selected. This will open a message window where groups and users are selected and a message to accompany the alert can be typed.

4. Resources

The resources are the main working elements of the application. They contain information, tools, links, and data. Resources are created from resource templates as set by the administrator and assigned to specified workspaces. How a resource template is built is described above in the administrative setup section. Each resource is "owned" by a specific user who is responsible for creating and maintaining the contents.

Figure 17A:
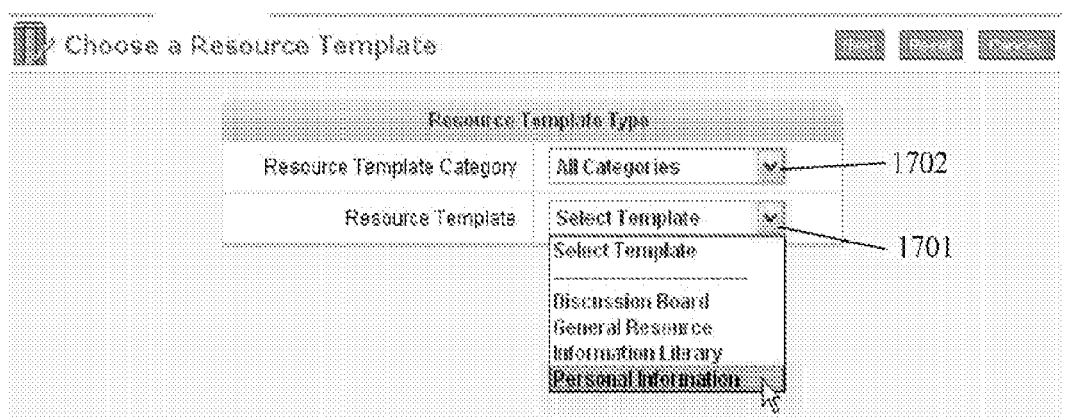
Figure 17B:
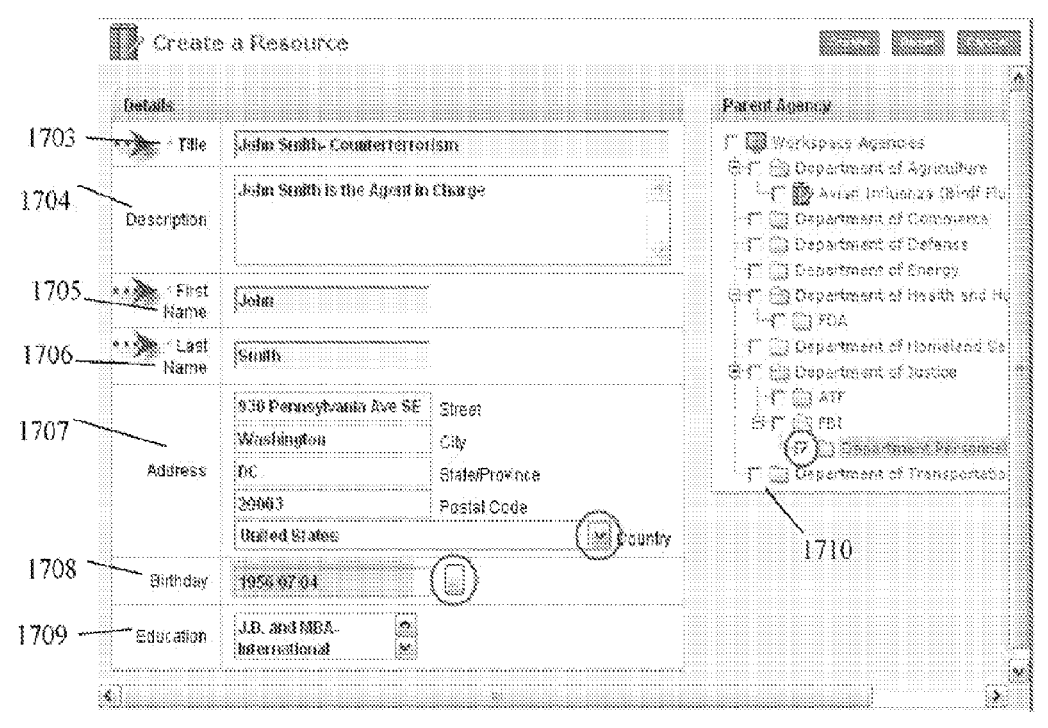
Figure 17C:

FIGS. 17A-17C show the creation of a resource. To create a resource, the New Resource option 1318 (FIG. 13) on the overview screen 1301 is selected, and a new resource creation dialog is shown to the user, as illustrated in FIG. 17A. The user selects a resource template 1701 to be used for building the resource. An administrator might have defined the template within a category 1702 to help reduce the number of templates presented to the users. The resource templates are stored in the T_RES_TMPLT table 335, and the resource template categories are stored in the T_RES_TMPLT_CATEGORY table 339. A resource template related to a template category through an entry in the T_RES_TMPLT_CATEGORY_MAP table 340.

Once the resource template is selected, a blank resource template screen is opened, as illustrated in FIG. 17B. The user enters the title 1703 and description 1704, as well as the name 1705-1706, address 1707, birthday 1708, and education 1709 of the owner of the resource. The user further sets the default placement of the resource in the navigator tree by selecting the parent resource 1710. These pieces of information are stored as records in the T_OBJ_DATA table 318. A completed resource view is shown in FIG. 17C.

Access to the resource is based on permissions. The permissions are automatically set when a resource is created and, during the creation process only, are inherited from the original parent domain/agency or resource in which it is created. At any time, users can confirm the permissions set up or make changes to users and groups by selecting the permissions option 1711. These permissions are stored in the T_OBJ_DATA_PERM_GROUP table 320 and the T_OBJ_DATA_PERM_USER table 321 and were set by the system administrator.

Once a resource is created, content can be added to the resource through the create options 1712. The create options include discussion topic 1713, link 1714, RSS feed 1715, text document 1716, and upload document 1717. These options are optional and are selected to be included with the resource template by the system administrator.

a. Discussion Topics

Figure 18A:
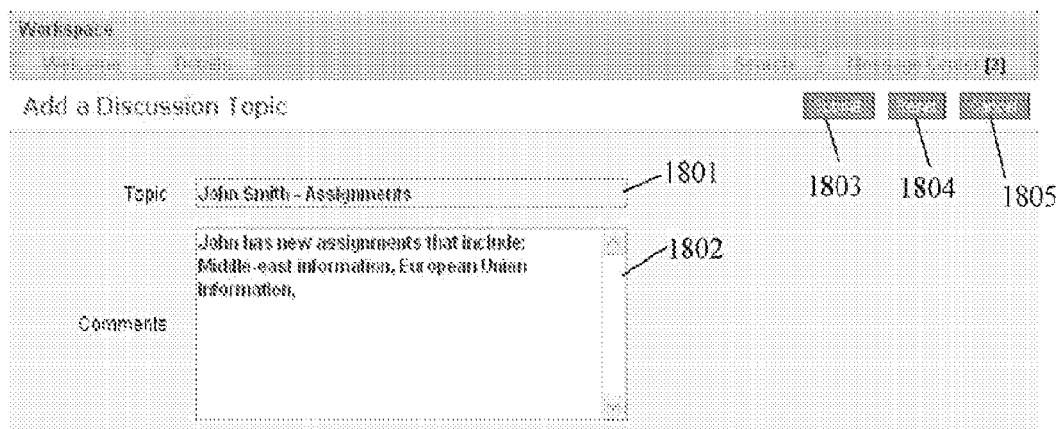
FIGS. 18A-18D show the set up of discussion topics for a resource.

FIGS. 18A-18D show the set up of discussion topics for a resource. Discussions are asynchronous chat boards that provide users with a place to exchange questions, opinions, and remarks in relation to the resource topic. Being asynchronous, it provides the ability to exchange information even when members are offline By selecting the discussion topic option 1713 (FIG. 17C), an add a discussion topic dialog is opened, as illustrated in FIG. 18A. The user enters a topic name 1801 and enters text into the comments field 1802. The user selects the submit button 1803 to upload the discussion, the reset button 1804 to start over, and the cancel button 1805 to close and return to the previous screen. Once submitted, the discussion topic is stored in the T_DISCUSSION_TOPIC table 307 and linked to the resource by storing the resource's ID in the Resource_ID field.

Figure 18B:
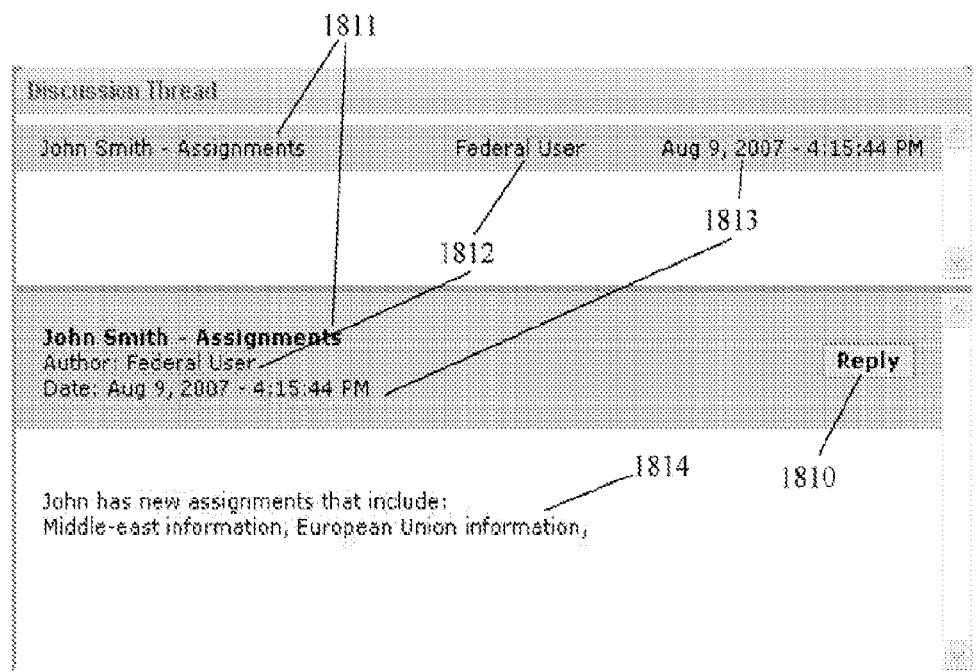
Figure 18C:
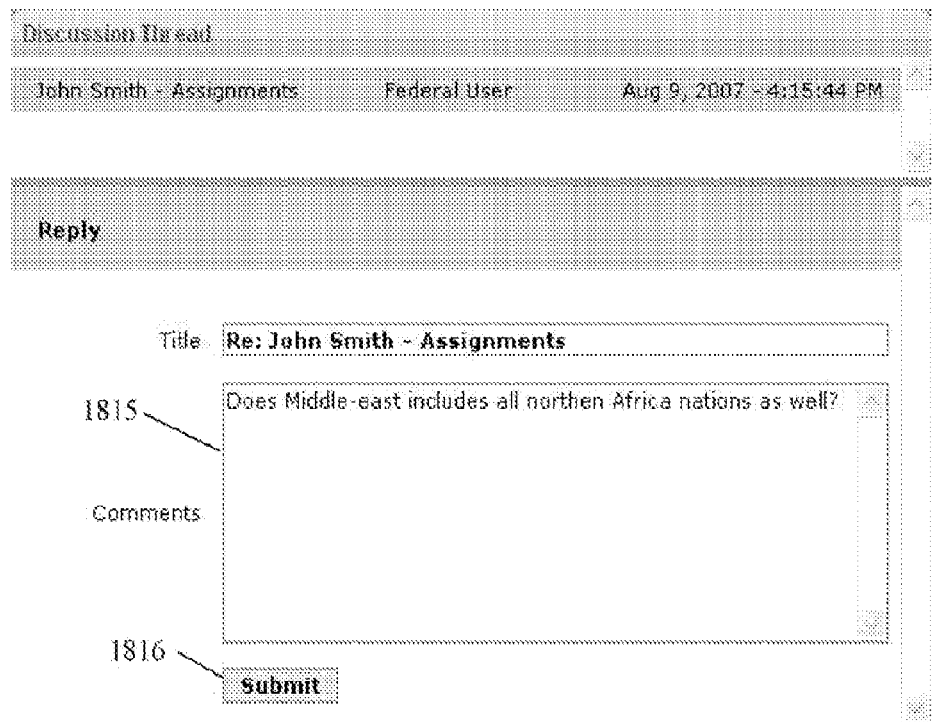

FIG. 18B shows an example discussion topic new. The view includes the topic name 1811, the author 1812, the date and time of the posting 1814. A user with the proper permissions can read the topic and reply by selecting the reply button 1810. A reply dialog is then displayed, as illustrated in FIG. 18C, in which the user can type his reply in the comments field 1815. When the submit button 1816 is selected, the reply is stored in the T_DISCUSSION_REPLY table 308.

Figure 18D:
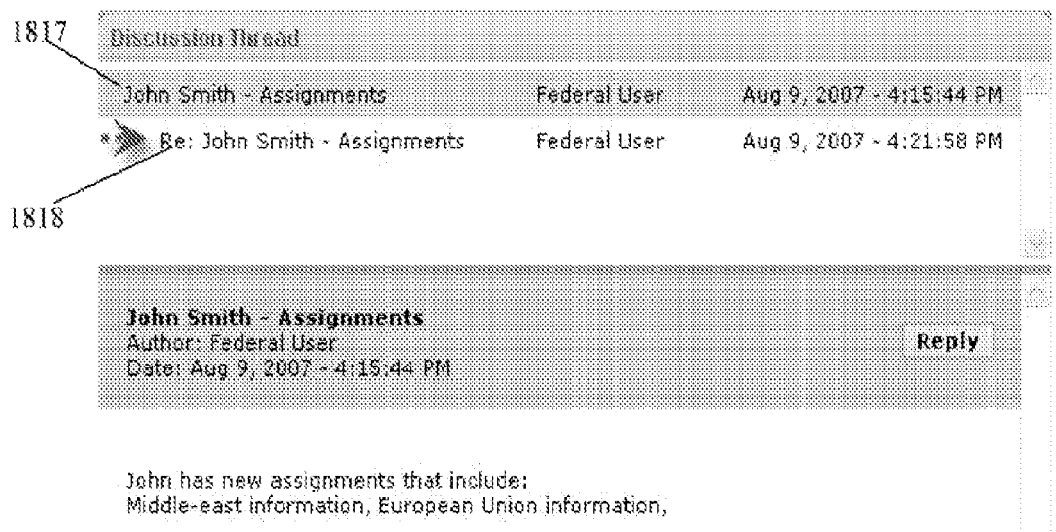

The discussion topic is then shown with the original discussion 1817 and its replies 1818, as illustrated in FIG. 18D. Discussions are organized as threaded discussions, and the replies are indented to present a visual hierarchy of replies.

b. Links

FIGS. 19A-19I show the set up of links for a resource. Links provides quick access to information or tools through providing a network path, like a URL (Uniform Resource Locator). Other types of links can point to or documents on a shared file server. Links are also provided for connecting various resources or knowledge boards within the application so people can access them within the resource topic they are currently utilizing.

Figures 19A, 19B:
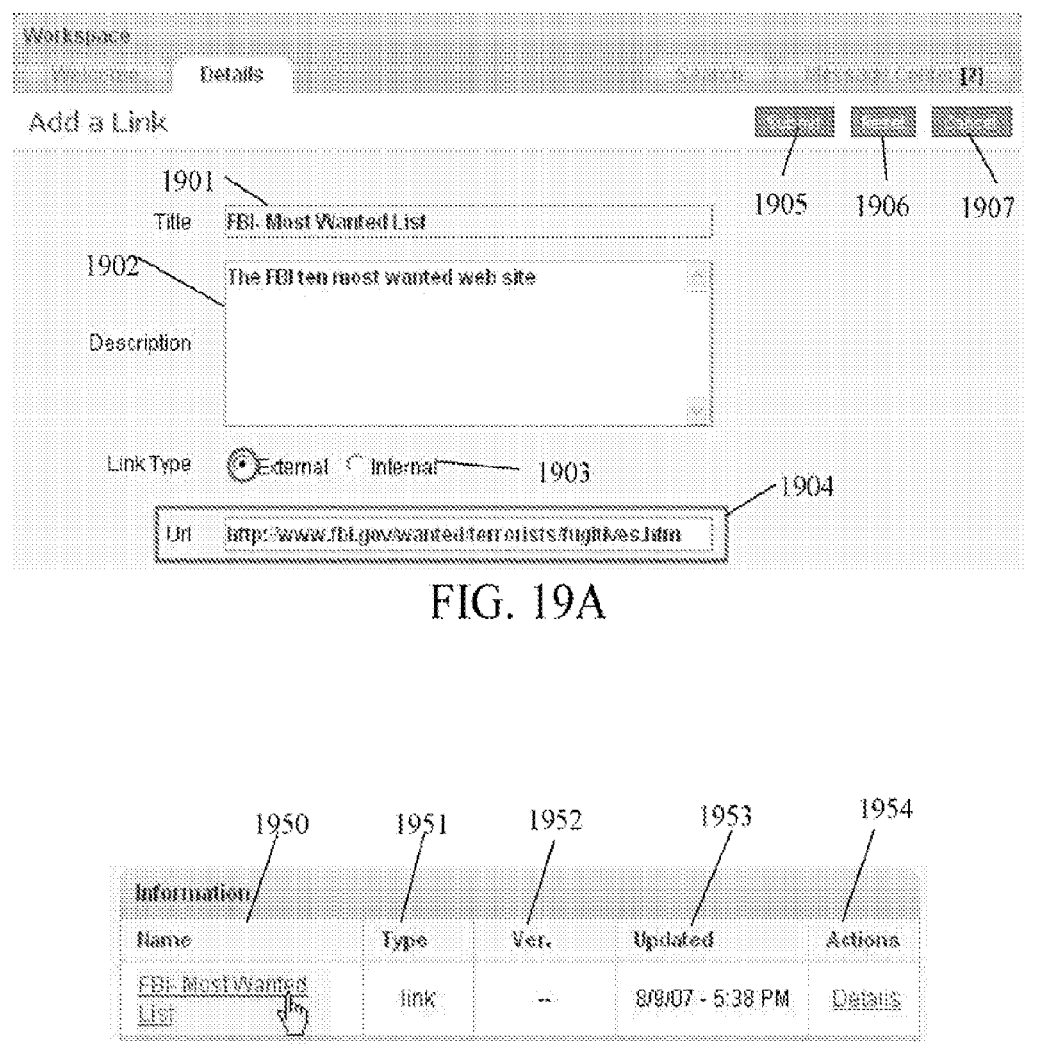

To create a link, the link option 1714 (FIG. 17C) is selected. An add a link dialog is displayed, as illustrated in FIG. 19A. The user enters a title 1901 and a description 1902 of the link. The link type 1903 of either external or internal is selected. External link type is for links to external web sites or other systems. Internal link type is for links to resources or knowledge boards within the application. The URL for the link 1904 is entered. The user selects the submit button 1905 to upload the link, the reset button 1906 to start over, and the cancel button 1907 to close and return to the previous screen. Once submitted, the link is stored in the T_OBJ_RESOURCE_INFORMATION table 330 and the T_OBJ_RESOURCE_LINK table 332. The link is then shown in the resource workspace, as shown in FIG. 19B, which includes the title 1950, type 1951, version 1952, date updated 1953, and a details option 1954.

Selection of the title 1950 opens a new window in the web browser to display the contents of the listed URL file or tools, or to launch the appropriate software application. To view details of the link, the details option 1954 is selected, and a link details dialog is displayed, as illustrated in FIG. 19C. The dialog displays the title 1910, description 1911, URL 1912, name of the creator 1913, date created 1914, and date updated 1915. To archive the link and remove it from view, the archive button 1916 is selected.

To change any of the link parameters, the edit tab 1920 is selected, as illustrated in FIG. 19D. The user can modify or update a name 1921, description 1922, link type 1923, and/or URL 1924. The user selects the submit button 1925 to upload the changes, the reset button 1926 to start over, and the cancel button 1927 to close and return to the previous screen.

Figure 19E:
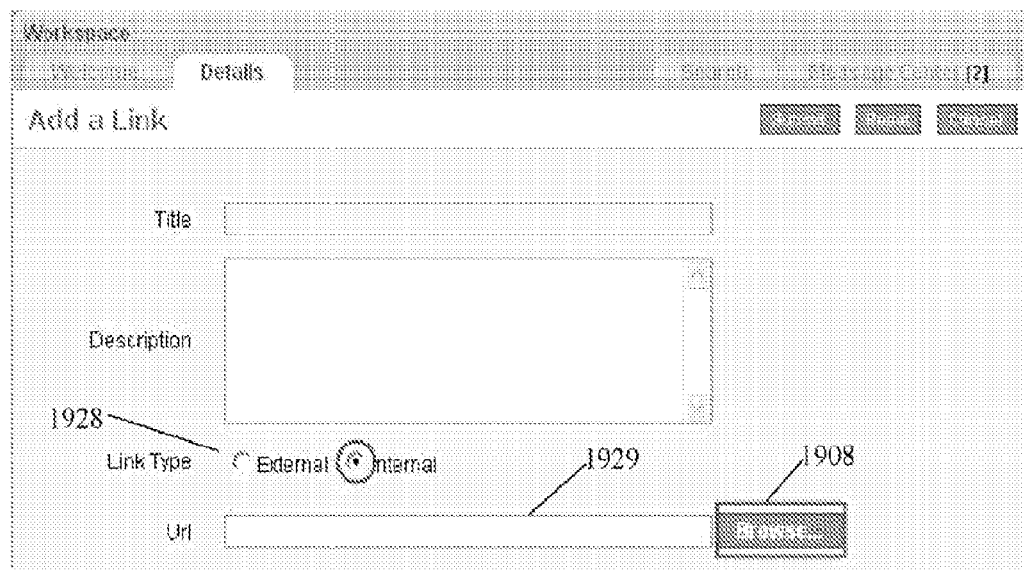
Figure 19F:
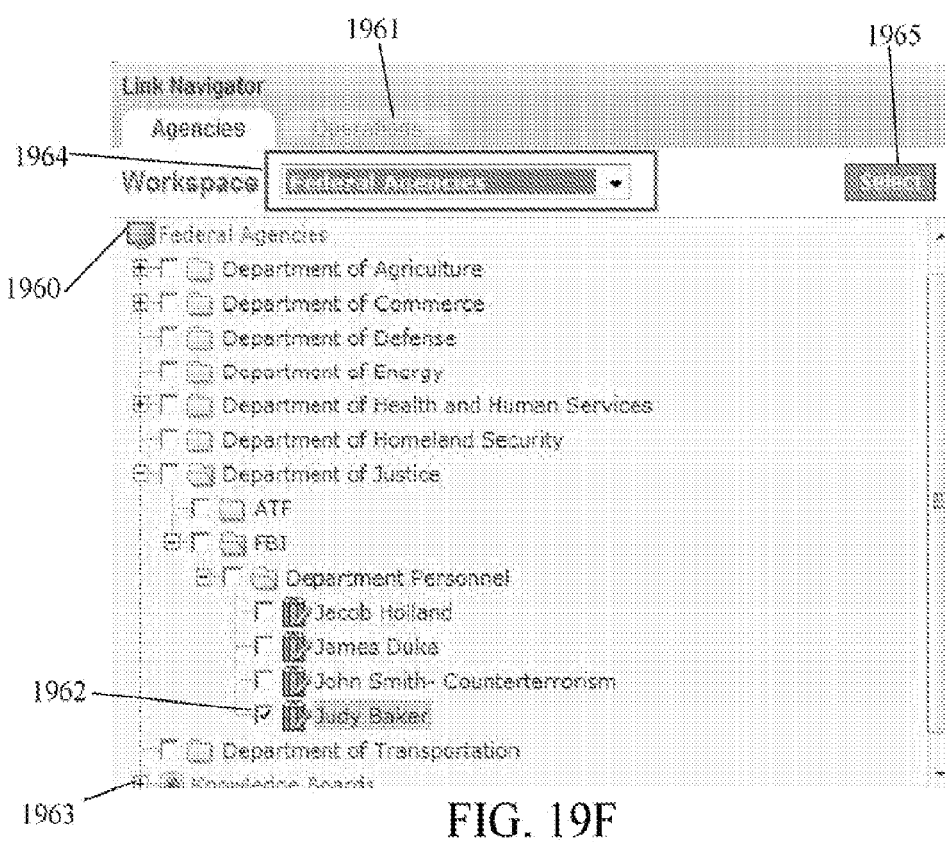

Some resource topics can benefit from an internal link connecting to another element in the workspace. A user with permission to access multiple workspaces can also link the resources across workspaces. FIG. 19E shows the creation of an internal link. The internal link provides a link internally to another agency, resource, operation or knowledge board. On the link dialog, the internal link option 1928 is selected. The browse button 1908 is selected to display, as illustrated in FIG. 19F, a list of agencies 1960, operations 1961 (hidden), resources 1962, and knowledge boards 1963, under various workspaces 1964. One of these objects is selected by selecting the select button 1965. A link to the object is automatically entered in the field 1929 in FIG. 19E. Once the internal link is uploaded, it is displayed in the resource workspace, as shown in FIG. 19G, including the title 1970, type 1971, version 1972, date updated 1973, and a details option 1974.

Selection of the details option 1974 displays the link details in a new window, as illustrated in FIG. 19H. The internal link details presents all the information related to the link, including name 1930, description 1931, link 1932, name of the creator 1933, date created 1934, and date updated 1935. To archive the link and remove it from view, the archive button 1936 is selected.

To change any of the link parameters, the edit tab 1947 is selected, as illustrated in FIG. 19I. The user can modify or update a name 1940, description 1941, link type 1942, and/or URL 1943. The user selects the submit button 1944 to upload the changes, the reset button 1945 to start over, and the cancel button 1946 to close and return to the previous screen.

c. RSS Feeds

Some resources can benefit from regular and automatic information updates provided through RSS feeds. An RSS feed is a web feed format used to publish frequently updated content from Internet websites. RSS content is read in a special web browser window called an RSS reader. To link to an RSS feed, the user needs to define the link/address of the feed. Many news providers provide RSS feed links on their web sites.

FIGS. 20A-20E show the set up of RSS feeds for a resource. The user first locates a site providing the RSS feed and captures the URL. To add an RSS feed to the workspace, the RSS Feed option 1715 (FIG. 17C) is selected. An add a RSS feed dialog is displayed, as illustrated in FIG. 20A. The user enters a title 2001, a description 2002 of the RSS feed, and the URL 2003 for the RSS feed. The user selects the submit button 2004 to upload the RSS feed, the reset button 2005 to start over, and the cancel button 2006 to close and return to the previous screen. Once submitted, the RSS feed is stored in the T_OBJ_RESOURCE_INFORMATION table 330 and the T_OBJ_RESOURCE_RSS table 333. The RSS feed is then shown in the resource workspace as shown in FIG. 20B, including the title 2030, type 2031, version 2032, date updated 2033, and a details option 2034.

Selection of the RSS feed title 2030 launches the web site with a full article, as illustrated in FIG. 20C. The user can choose to view the details of the RSS feed by selecting the details option 2024, as illustrated in FIG. 20D. The RSS feed details presents the information related to the RSS feed, including the name 2010, description 2011, URL 2012, name of the creator 2013, date created 2014, and date updated 2015. To archive the RSS feed and remove it from view, the archive button 2016 is selected.

To change any of the RSS feed parameters, the edit tab 2017 is selected, as illustrated in FIG. 20E. The user can modify or update a name 2020, description 2021, and/or URL 2022. The user selects the submit button 2023 to upload the changes, the reset button 2024 to start over, and the cancel button 2025 to close and return to the previous screen.

d. Text Files

The option to create a text file provides users with the ability to create text and add a ".txt" file to the system without using a work processing program. A text file (.txt) can be opened with a standard text editor program provided by all computers. This is a simple and easy way to create and share written documents with other users. It is also an easy way to share and preserve emails by simply copying the email, paste it into an open text document, and storing it in a resource. The email information thereby becomes part of the resource and can be shared.

Figures 21A, 21B:
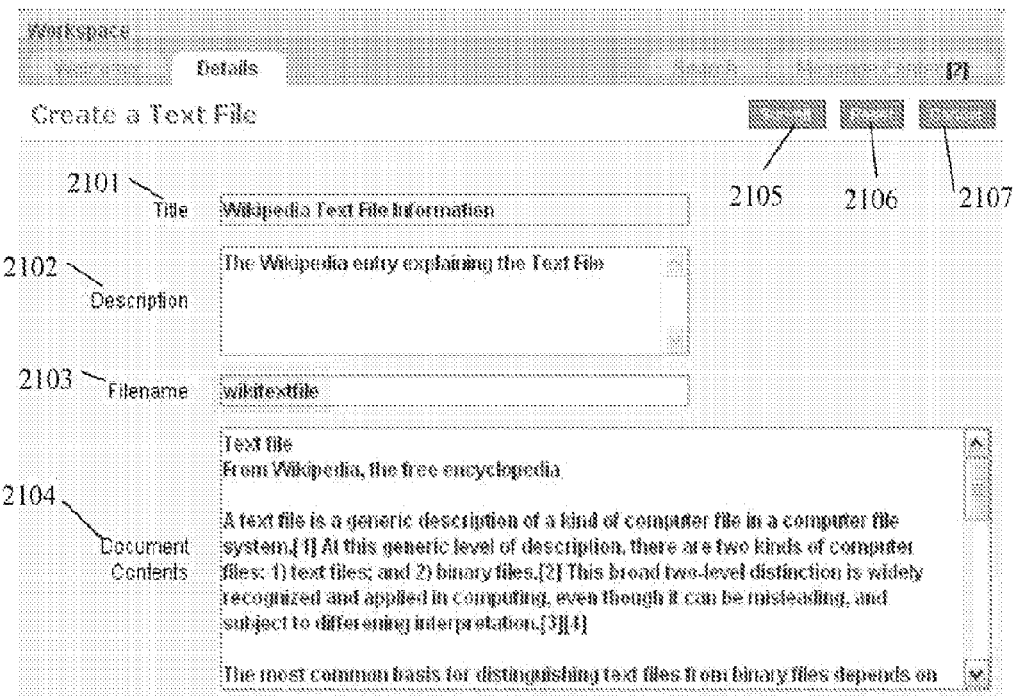
FIGS. 21A-21F show the set up of text documents for a workspace.

FIGS. 21A-21F show the set up of text files for a workspace. To add a text file, the Text Document option 1716 (FIG. 17C) is selected. A create a text file dialog is displayed, as illustrated in FIG. 21A. The user enters a title 2101, a description 2102 of the text file, a file name 2103, and the document contents 2104. The user selects the submit button 2105 to create and save the text file, the reset button 2106 to start over, and the cancel button 2107 to close and return to the previous screen. Once submitted, the text file is stored in the T_OBJ_RESOURCE_INFORMATION table 330 and the T_OBJ_RESOURCE_DOCUMENT table 331. The text file is then shown in the resource workspace as shown in FIG. 21B, including the title 2140, type 2141, version 2142, date updated 2143, and a details option 2144.

Figures 21C, 21D:
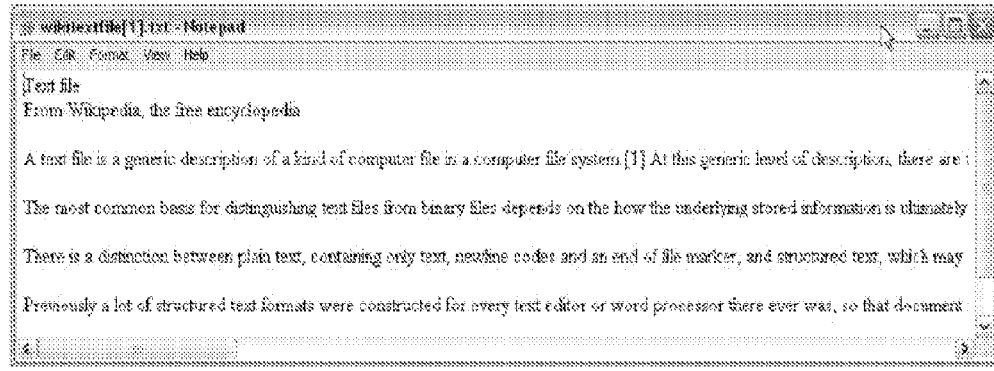

Selection of the text file title 2140 displays the text content in a text editor program, as illustrated in FIG. 21C, where it can be viewed, edited or save to the user's computer under a different file name. The save allows users to add the file to their local computer for future use, re-naming it as necessary.

The user can choose to view details of the information on the text file by selecting the details option 2144, as illustrated in FIG. 21D. The text file details include the file name 2110, description 2111, latest version 2112, file size 2113, name of the creator 2114, date created 2115, whether the file is compressed 2116, whether the file is encrypted 2117, the MD5 checksum 2118 for the file, and the mime type 2119. To archive the text file and remove it from view, the archive button 2120 is selected.

Figures 21E, 21F:
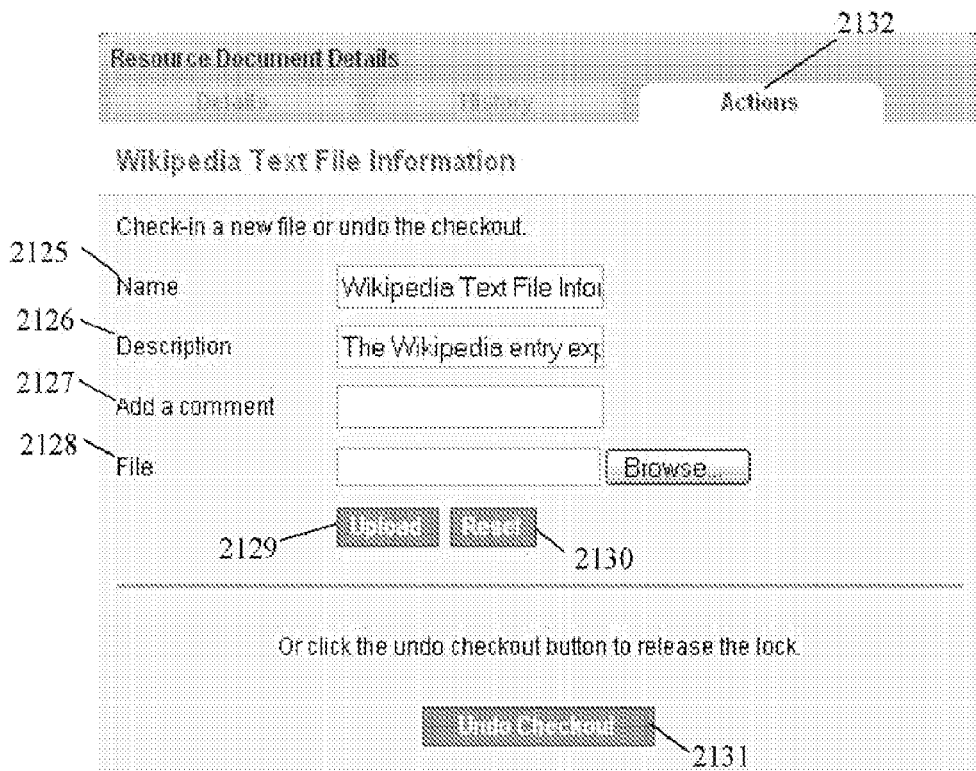

To change any of the text file parameters, the actions tab 2132 is selected, as illustrated in FIG. 21E. The user can modify or update a name 2125 and/or description 2126. The user can add a comment 2127 and/or upload a new version of the file 2128. The user selects the upload button 2129 to upload the changes or the reset button 2130 to start over. In order to upload a new version of the text file, the user must first check the file out of the repository. If no changes were made and the user elects to permit the use of the currently loaded text file, the user selects the undo checkout button 2131.

To view the history of the file and changes made to it, the user selects the history tab 2133, as illustrated in FIG. 21F.

e. Documents

The system enables the loading and storing of document files in any format, such as Microsoft Word™, Excel™, PowerPoint™ files and most other multimedia formats (sound, pictures, graphics, text). For the purpose of simplicity, these file formats are referred to herein as "documents". To share documents with other users will require those users to have the appropriate software application on their computer to launch and open the specific file format.

The adding of a document here differs from the adding of a text file above in that the documents are not in a *.txt format. The documents also exist locally to a user prior to being added to the workspace.

Figures 22A, 22B:
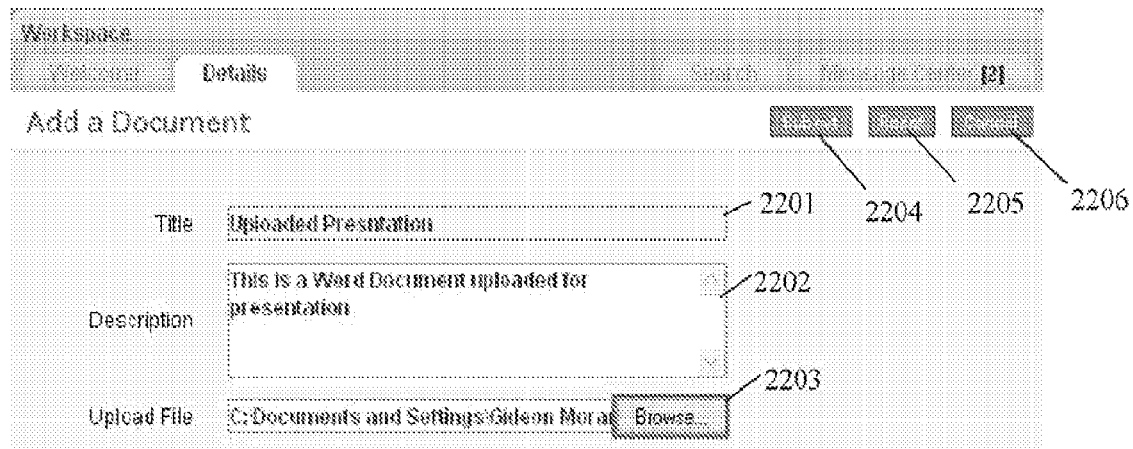

FIGS. 22A-22F show the adding of a document to the workspace. To upload a document, the Upload Document option 1717 is selected (FIG. 17C). An add a document dialog is displayed, as illustrated in FIG. 22A. The user enters a title 2201, a description 2202, and the file to upload 2203. The user selects the submit button 2204 to upload the document, the reset button 2205 to start over, and the cancel button 2206 to close and return to the previous screen. Once submitted, the document is stored in the T_OBJ_RESOURCE_INFORMATION table 330 and the T_OBJ_RESOURCE_DOCUMENT table 331. The document is then shown in the resource workspace as shown in FIG. 22B, including the name 2250, type 2251, version 2252, date updated 2253, and a details option 2254.

Figure 22C:
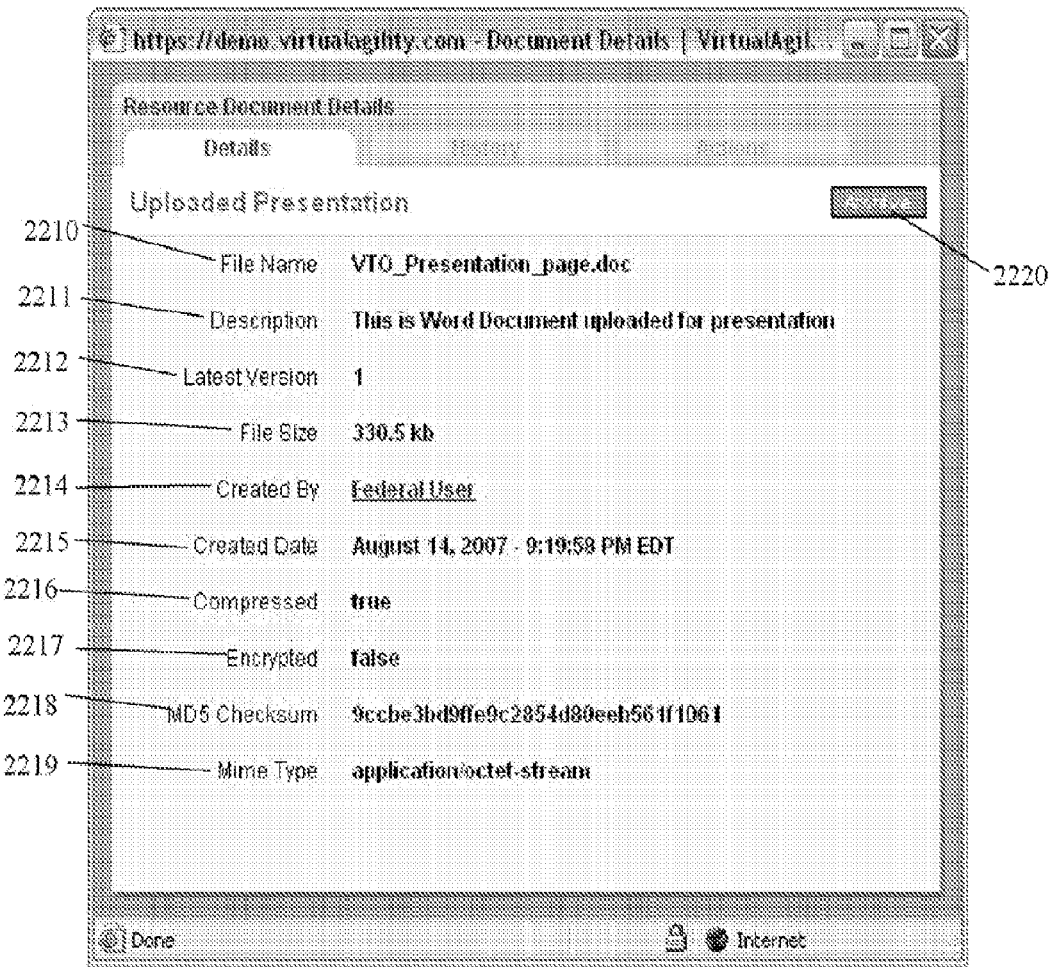

Selection of the document name 2250 launches the application with which the document is associated and displays the document contents in the application. The user can choose to view details of the document by selecting the details option 2254, as illustrated in FIG. 22C. The document details include the file name 2210, description 2211, latest version 2212, file size 2213, name of the creator 2214, date created 2215, whether the document is compressed 2216, whether the document is encrypted 2217, the MD5 checksum 2218 for the document, and the mime type 2219. To archive the text document and remove it from view, the archive button 2220 is selected.

Figure 22D:
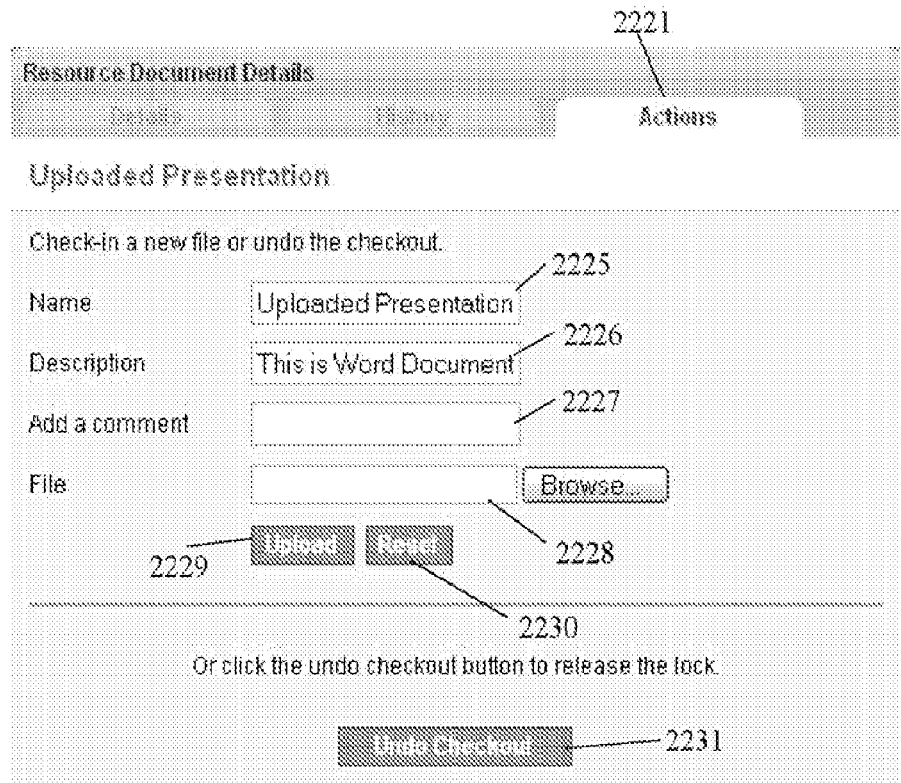
Figure 22E:
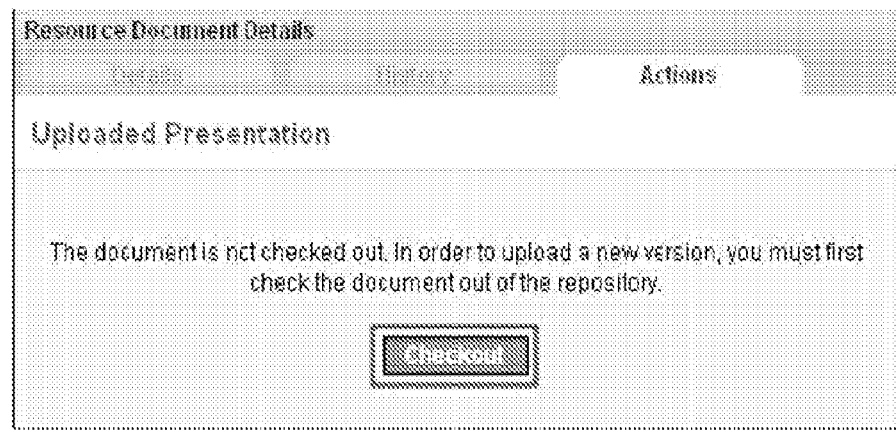

To change any of the document parameters, the action tab 2221 is selected, as illustrated in FIG. 22D. The user can modify or update a name 2225 and/or description 2226. The user can add a comment 2227 and/or select a new version of the document to upload 2228. The user selects the upload button 2229 to upload the changes or the reset button 2230 to start over. In order to upload a new version of the document, the user must first check the document out of the repository, as shown in FIG. 22E. If no changes were made and the user elects to permit the use of the currently loaded document, the user selects the undo checkout button 2231 (FIG. 22D).

Figures 22F, 22G:
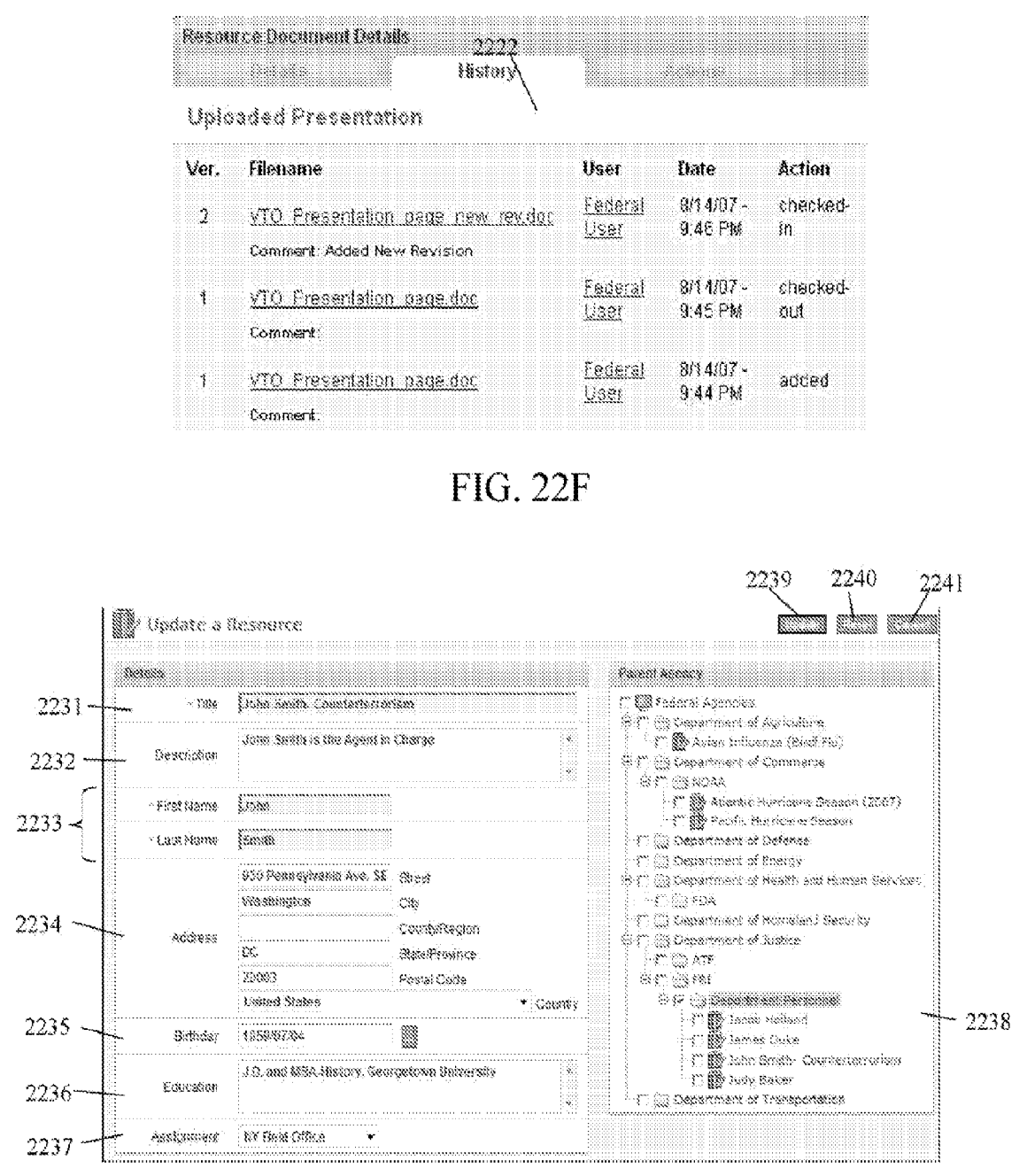

To view the history of the file and changes made to it, the user selects the history table 222, as illustrated in FIG. 22F.

f. Updating a Resource

Figure 22H:
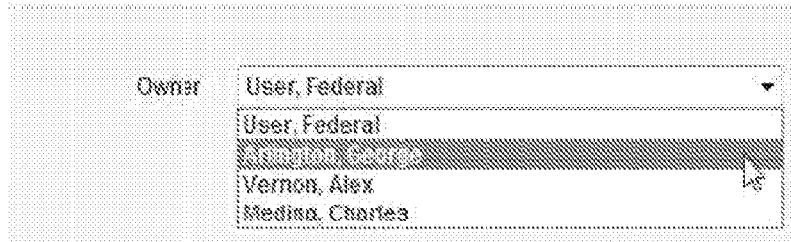
Figure 22I:
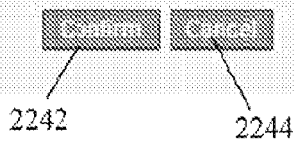

FIGS. 22G-22I show the updating of a resource. A resource can be updated by selecting the details option 1720 (FIG. 17C). An update a resource dialog is displayed, as illustrated in FIG. 22G. The user can modify or update the title 2231, description 2232, owner's name 2233, address 2234, birthday 2235, education 2236, assignment 2237, and/or the parent agency 2238. The user selects the update button 2239 to submit the changes, the reset button 2240 to start over, or the cancel button 2241 to terminate the operation and return to the previous screen. Discussions, links, RSS feeds, text documents, and/or loaded documents are not affected and will not be changed, moved, or deleted.

The owner is the original creator of a resource. When there is a need to assign a resource to a different owner due to personnel changes, new responsibilities, or any other reason, a user can select the owner option 1721 (FIG. 17C). A change ownership dialog is displayed, as illustrated in FIG. 22H. A new owner can then be selected from the pull down menu.

A resource can be deleted by selecting the delete option 1722 (FIG. 17C). A delete confirmation dialog is displayed, as illustrated in FIG. 22I. The user selects the confirm button 2242 to complete the process and the cancel button 2243 to terminate and return to the previous screen. Deleted resources are removed from the users' view and archived in the system archive storage. No information is permanently deleted. Administrators can un-archive "deleted" resources as required.

g. Alerts

Figure 23A:
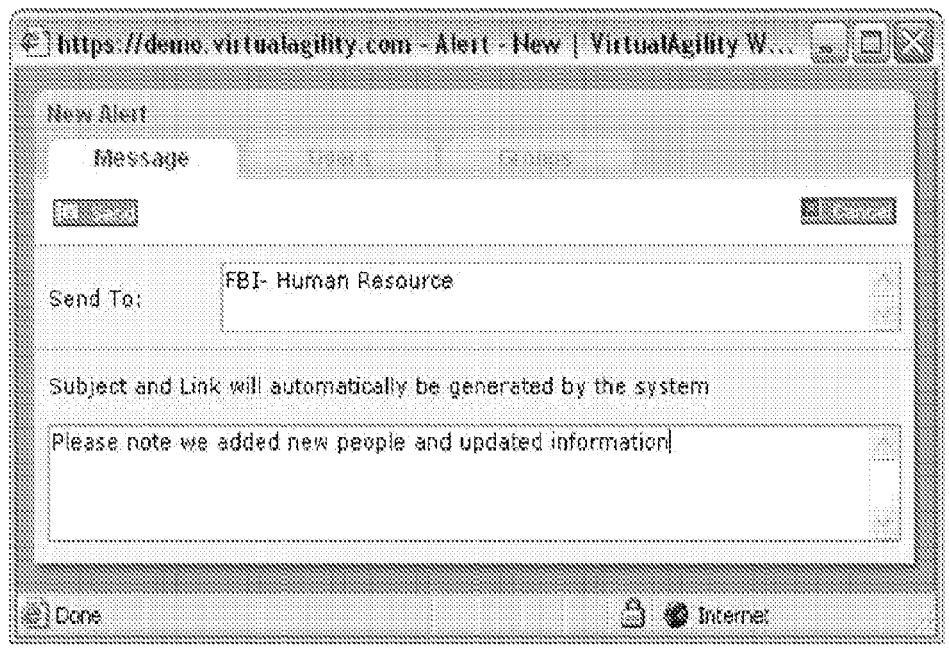
FIG. 23A illustrates a message window.

Users can receive an alert message for any change made to each resource listed. FIG. 23A shows the set up of alerts for a workspace. When the user selects the Receive Alert option 1718 (FIG. 17C), an alert entry is generated within the message center. The message center is described further below. Selection of the Receive Alert option 1718 toggles the option on and off. To send an alert to other users, the Send Alert option 1719 is selected. This will open a message window, as illustrated in FIG. 23A, where groups or users are selected and a message to accompany the alert can be typed. The alerts and the users to which the alerts are sent are stored in the T_OBJ_DATA_ALERT_USER table 319.

h. Resource Details

The resource details 1723 (FIG. 17C) provide users with information on the owner who originally created the resource, or the owner who has the resource re-assigned to them. Users can communicate with the owner of the resource by selecting the owner's highlighted name 1724. A new message dialog will then open, as described further below in the context of the message center. The resource details further display the name of the resource template and the version used to create the resource, the date the resource was created, and the last modified date.

i. Importing Resources

The system allows users to import information from an application, such as an Excel worksheet, and automatically create multiple resources. These resources will be created within a selected organization/domain and will automatically be assigned the permission of the parent organization in which they are created.

Users can import any Excel file that contains information organized in columns and rows where the first row defines the field names and the following rows are the records of information. Each row will be imported as a single resource. The system attempts to match column names with the resource template fields. Users can manually match columns and fields as well.

The administrators who create the resource templates have the option to export an Excel file that exactly matches the fields and columns and provide it to users as a guide. This Excel template will guide users to create a data source that can be easily and directly imported into specific resources in the system. An Excel file exported directly from the resource template will have the fields of the template already posted in the first row and represent all the fields as columns. Users will fill out the Excel file with the required information in a format organized as rows of data for each resource. This will simplify the import of data from an Excel file to a resource.

Figures 23B, 23C:
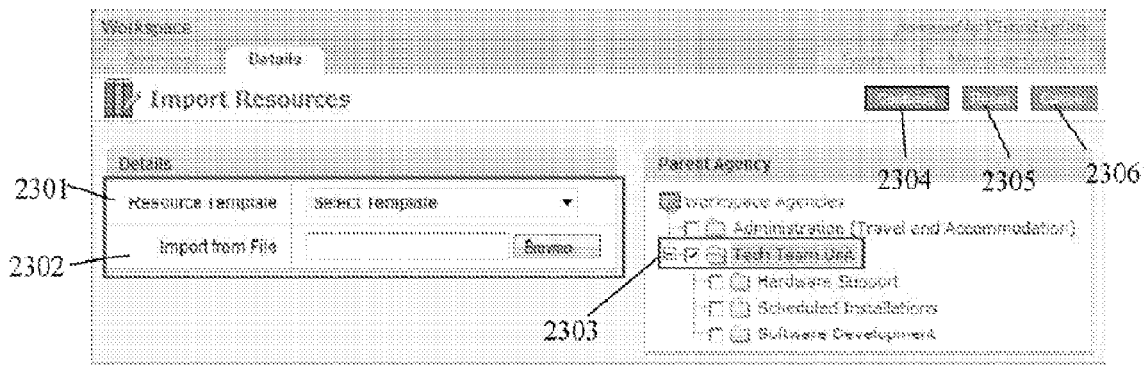
Figures 23D, 24A:
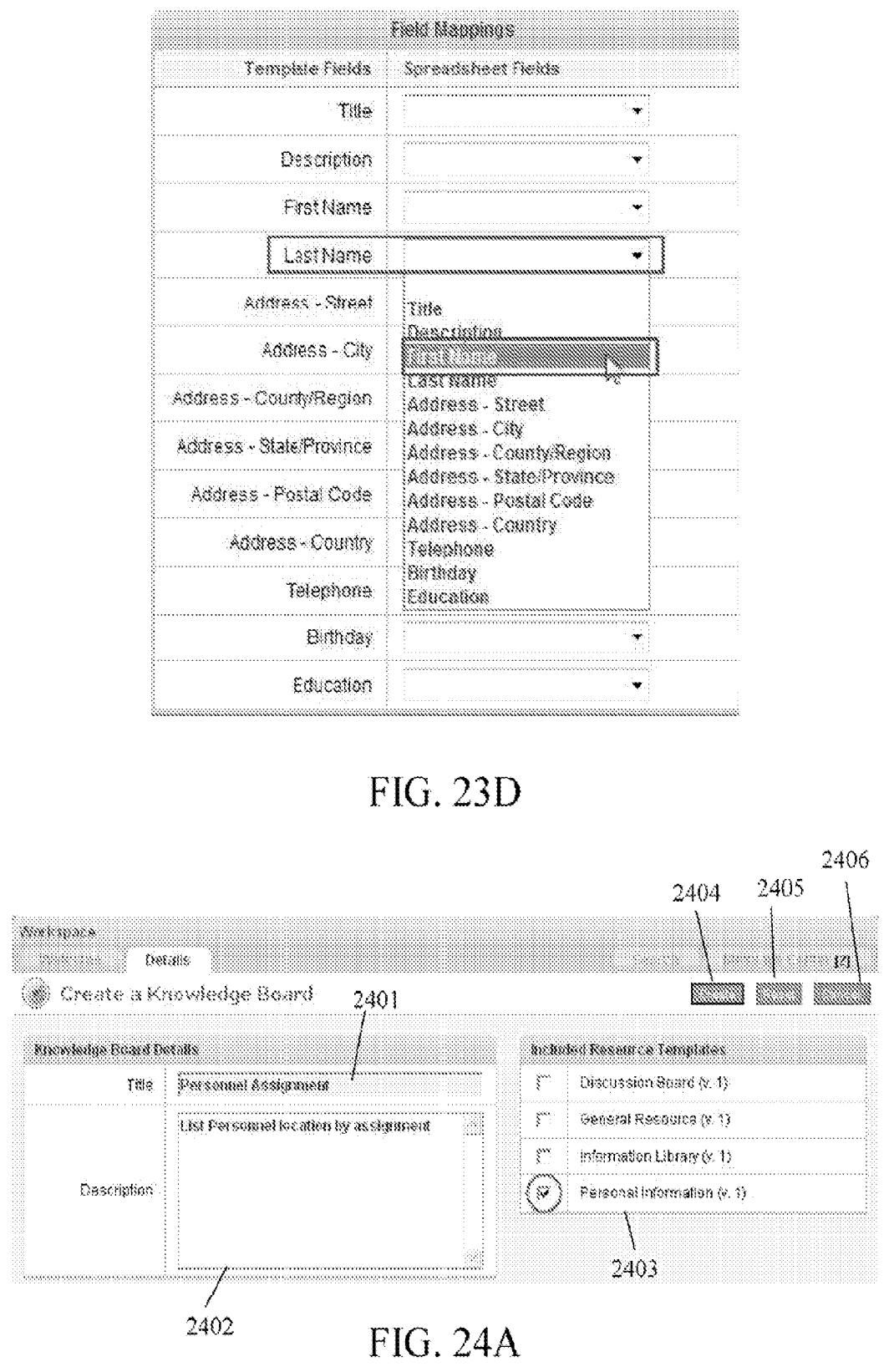

FIGS. 23B-23D show the importing of resources for a workspace. To import an Excel sheet, the user selects the Import Resources option (not shown) from the create pull down menu 1314 (FIG. 13). An import resources dialog is displayed, as illustrated in FIG. 23B. The user selects the resource template 2301 that the user wants to use as the format for the imported data, the source data file 2302 to import, and the parent domain 2303 where the new resource will reside. The user selects the continue button 2304 to import the resource, the reset button 2305 to start over, and the cancel button 2306 to terminate and return to the previous screen.

When importing, the system attempts to match the field names in the resource template with the column headers, and displays the matched fields as shown in FIG. 23C. If the system cannot match fields, it will leave those fields blank. The user can manually select the column headers and match them to the selected fields, as shown in FIG. 23D. Once the matching process is completed, the data is imported and the new resource is created.

5. Knowledge Boards

Knowledge boards enable users to create a report based on the information fields contained resource templates, and hence in the resources. Users can customize this to display specific selected columns and filter information according to specific keywords or values. The resulting display in a table in the format of columns (fields) and rows (resources) which dynamically displays a real-time data from across the workspace.

Figure 24B:
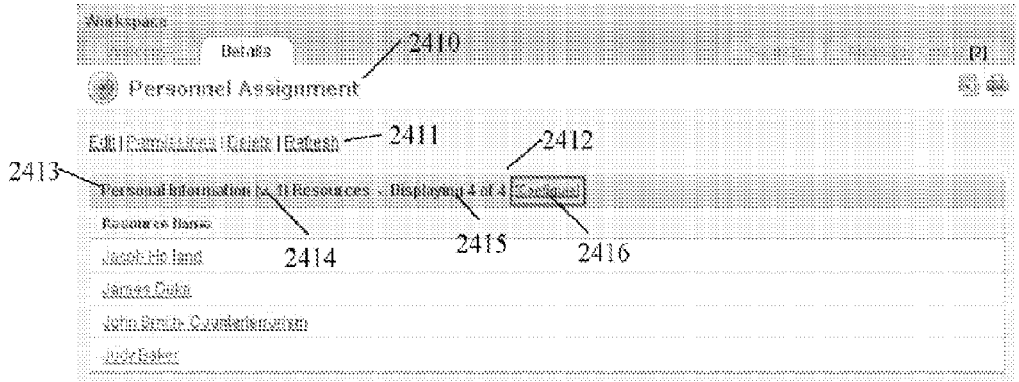

FIGS. 24A-24E show the set up of knowledge boards. When the user selects the knowledge board option (hidden) under the create button 1314 (FIG. 13), a knowledge board dialog is displayed, as shown in FIG. 24A. The user can enter a title 2401, description 2402, and which resource templates 2403 to include in the knowledge board. The user selects the create button 2404 to create the knowledge board, the reset button 2405 to start over, and the cancel button 2406 to close and return to the previous screen. Once created, a new knowledge board entry 1315 (FIG. 13) will be added to the navigator screen 1301. The knowledge board is stored in the T_OBJ_DASHBOARD 322, T_OBJ_DASHBOARD_RES_TMPLT 323, T_OBJ_DASHBOARD_FIELD_DEFAULT 324, and T_OBJ_DASHBOARD_FIELD_TMPLT 325 tables.

When the knowledge board is selected, a knowledge board window is displayed, as shown in FIG. 24B, which includes the title 2410 of the knowledge board, editing buttons 2411, and the selected resource display screen 2412. The title bar of the resource display screen includes the resource template name 2413, version number 2414, and total number of resources 2415 the user has permission to view. This information on the resources and the resource templates are stored in the T_OBJ_RESOURCE 329 and T_RES_TMPLT 335 tables. The link of a resource to a resource template is stored in the Resource_Kit_ID field in the entries of the T_OBJ_RESOURCE table 329. Once filtering is added, the numbers will show the number of resources displayed out of the total available resources.

Figure 24C:
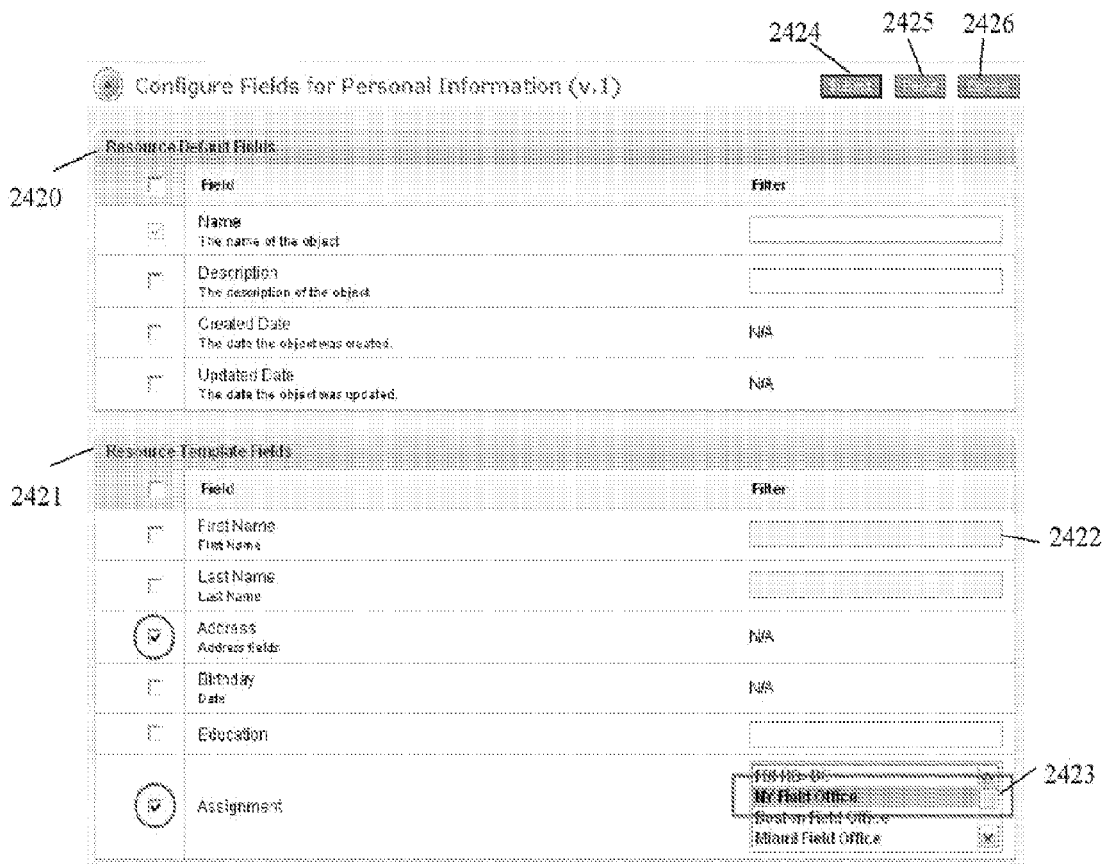

To customize the report, the configure button 2416 is selected, and a configure dialog is displayed, as shown in FIG. 24C. The configure dialog is divided into two parts. The first part 2420 contains the resource default fields, and the second part 2421 contains the resource template fields. Customization of the selected fields to be displayed as columns is completed by a check mark. The title name of the resource is displayed by default. Checking the top box in each group will select/deselect all fields in the list. To filter each field by a specific keyword, the word is typed into the field 2422 on the right or selected from a list 2423. The user selects the submit button 2424 to upload the updated knowledge board, the reset button 2415 to start over, and the cancel button 2426 to close and return to the previous screen. Here, the Name field in the resources, and the Address and Assignment fields in the resource templates, are selected to be in the report, with the Assignment field filtered to show only those in the NY Field office.

Figure 24D:
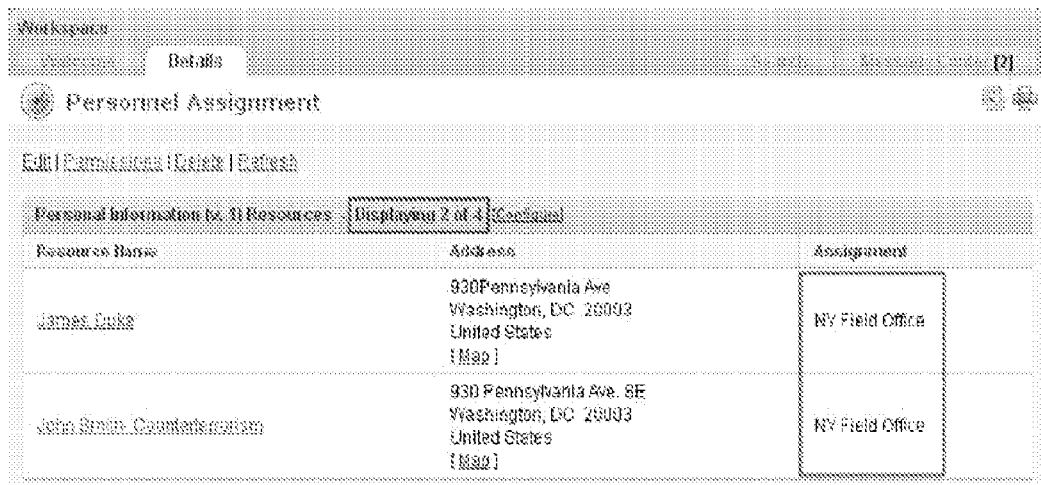
Figure 24E:
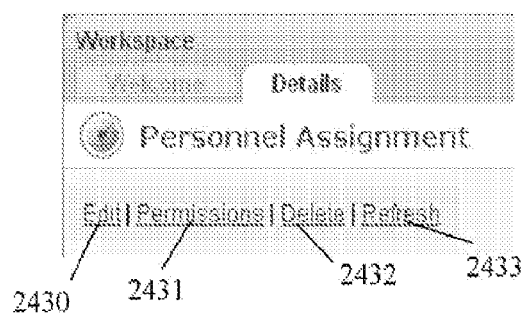

Once submitted, the knowledge board with the newly added fields is displayed, as shown in FIG. 24D, according to the configured filter. The knowledge board shows the resource's name, address, and assignment fields for assignments in the NY field office. As illustrated in FIG. 24E, the knowledge board can be managed by selecting the edit option 2430, the permissions option 2431, the delete option 2432, or the refresh option 2433. Selecting the edit option 2430 reopens the create dialog (FIG. 24A) and allows the user to modify the title 2401, description 2402, and select/deselect/add resources 2403. Selecting the permissions option 2431 allows the user to share the knowledge board with other groups and/or individual users. Selecting the delete option 2432 removes the knowledge board from view and archives it in storage. The knowledge board is automatically refreshed every time it is opened. Some changes may happen while the knowledge board is displayed. To ensure the data is fully updated, the user can select the refresh button 2433 at any time while viewing it. The knowledge board report can be exported to an Excel spreadsheet. Change to data in this Excel export document will not affect, change, or update data stored in the system.

6. Operations (Initiatives)

The operations process structure enables users to bring to others at each step in the process those resources (tools and information) needed to accomplish that task. In the operations view, users can build the various structures that will provide the framework for working with the information and tools stored in the system. The operations structure enables the use of resources (shared from the agencies that created and maintained them) within one or multiple procedures to accomplish a task.

The operations structure might be a timeline listing hours or days with the information presented in steps, reports and requests for assistance. Or, additional "views" might be step-by-step plans for responding to different types of emergencies, Concept of Operations plans, a National or Regional Response Plan, a mutual aid procedure, or any other formats that may be relevant to operations of this organization or group of organizations.

The main benefit of the operations view is that the information created and maintained in the agencies view can be shared with one or multiple operations and re-used as many times as required (different operational plans) without the need to duplicate the information and struggle to keep it current. Operations enable multiple viewing, usage and organization of the same data/information by different users for different activities.

With resources and knowledge board reports being shared in the operations view, any changes, updates or additions will be immediately distributed and shared within all the processes and windows where these resources are being used, thereby eliminating the need to alert users via telecommunication or electronic mail.

Figure 25A:
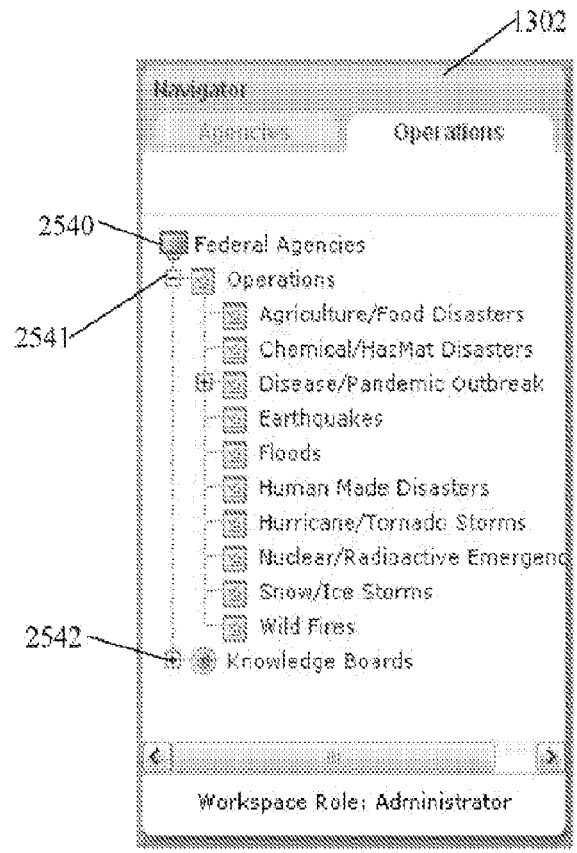
FIGS. 25A-25F show the set up of an operation.
Figure 25B:
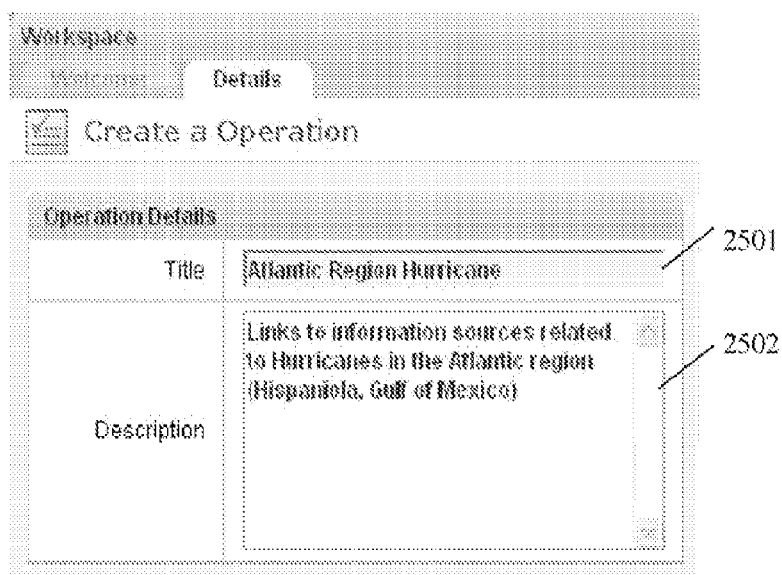

FIGS. 25A-25F show the set up of an operation. The operations structure is displayed in the navigator 1302 (FIG. 13) as shown in FIG. 25A. Federal Agencies 2540 is the workspace. Under the workspace is the operation hierarchy 2541. Also part of the workspace, but not in the operation hierarchy, are the knowledge boards 2542. To create a new operation entry, the user selects the New Operation option 1316 in the Actions section 1306a of the overview screen 1301 (FIG. 13). A create an operation dialog is displayed, as shown in FIG. 25B. The user enters the title of the operation entry 2501 and a description 2502, which are stored in the T_OBJ_DATA table 318 and the T_OBJ_INITIATIVE table 327.

Figure 25C:
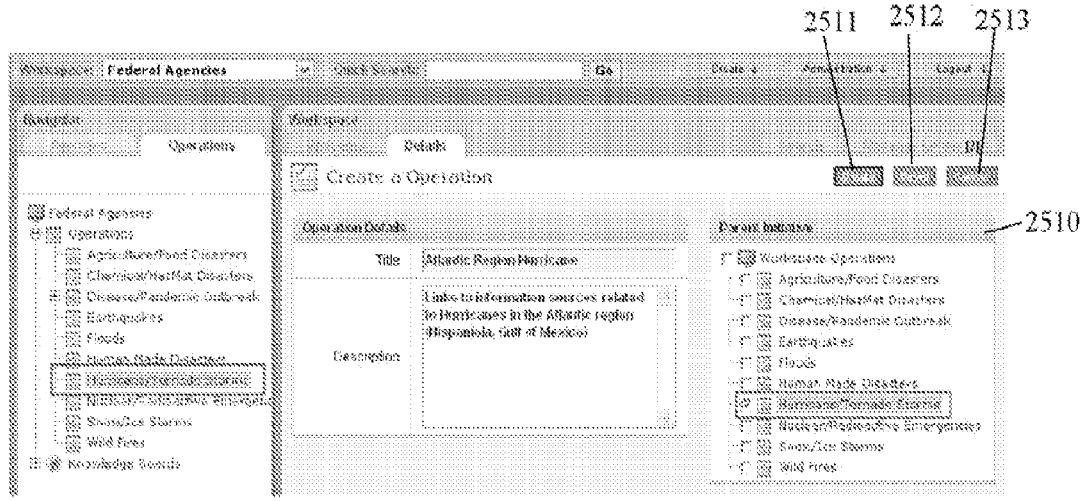

When creating a new operation entry, the system will automatically set the default placement in a parent/daughter hierarchy, as shown in FIG. 25C. The system displays the structure of the navigator's operation layout and places the new entry as a daughter to the operation where the user is when selecting the create option. At any time, the user can elect to reposition the new entry by selecting any of the check boxes 2510. The new sub-element (daughter) will carry the permissions set up of the parent.

Once the user completes the entry of the title and description of the parent, he may choose the create button 2511 to finish and create the new entry, the reset button 2512 to clean the fields and start again, or the cancel button 2513 to terminate the operation and return to the previous screen.

Figure 25D:
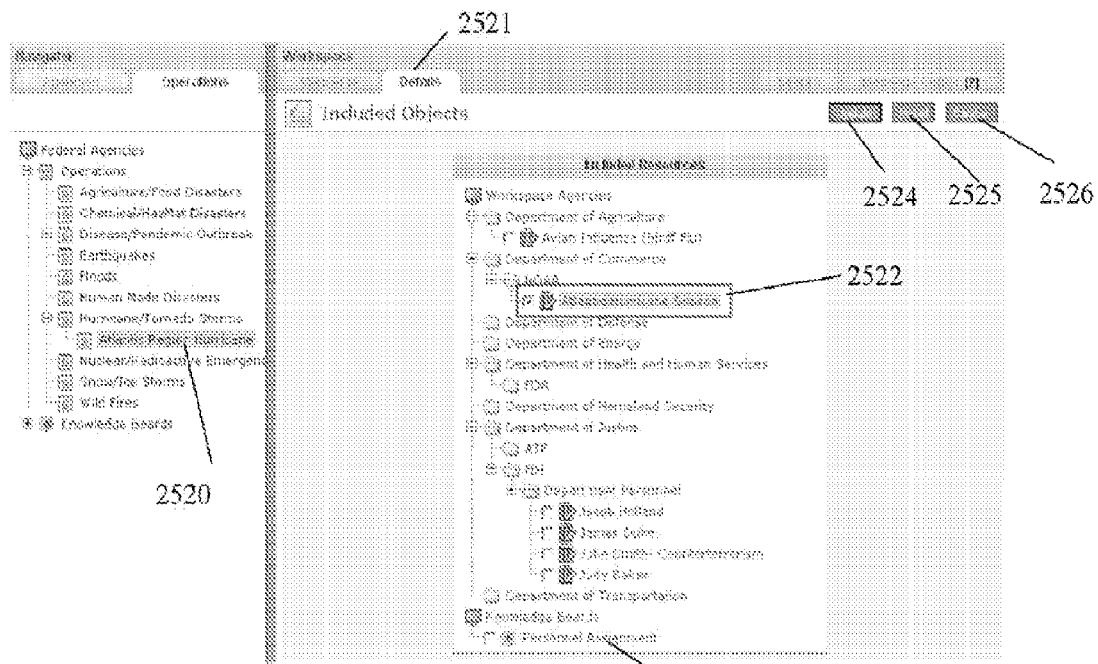

As shown in FIG. 25D, after selecting the create button 2511, the system will create the new operation entry 2520 in the navigator and provide an opportunity to include objects in the operation, i.e., associating resources and knowledge boards available from various agencies. An include objects dialog is displayed on the right side in FIG. 25D. The included objects details tab 2521 displays a full list of all resources/objects the user has permission to access. The user selects the resources 2522 and knowledge boards 2523 to be assigned as objects (available from various agencies) to this operation element. The user selects the update button 2524 to finish and add objects to the new entry, the reset button 2525 to clean the fields and start again, and the cancel button 2526 to terminate the operation and return to the previous screen. Each object related to the operation is stored in an entry in the T_OBJ_INITIATIVE_DATA_OBJECT table 328, which references the operation in the Initiative_ID field and the object in the Data_Object_ID field.

Figure 25E:
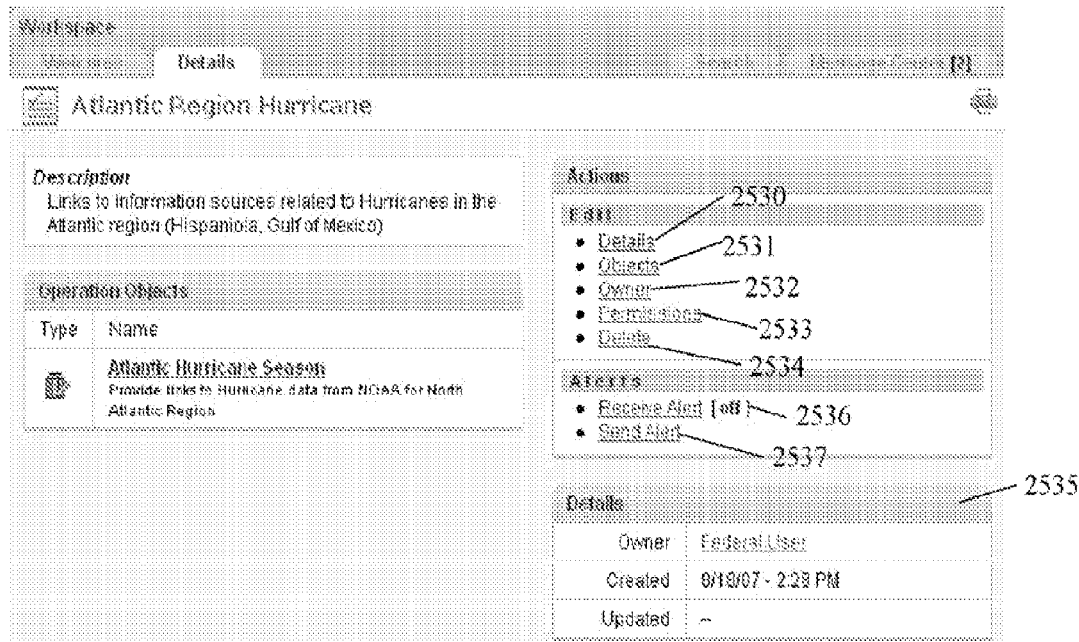
Figure 25F:
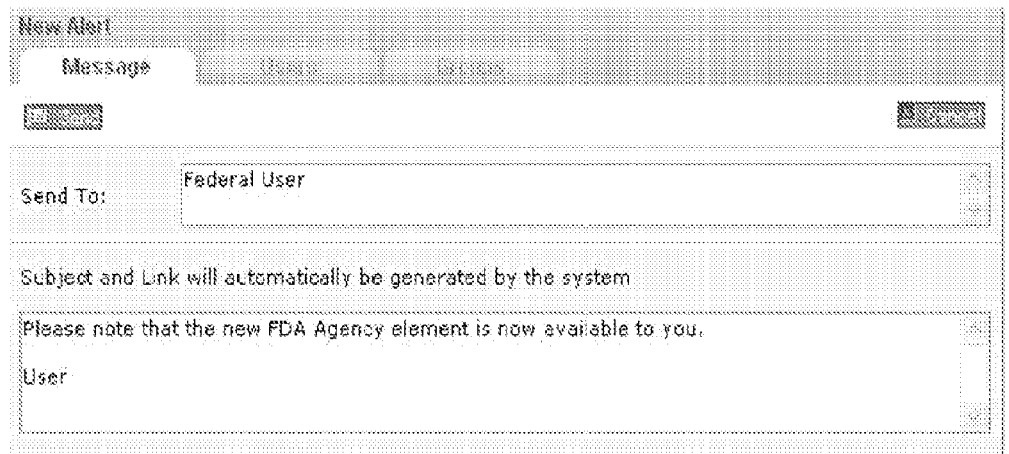

Once created, the operation is displayed as shown in FIG. 25E. Here, an example operation, Atlantic Region Hurricane, is shown with one object, the resource, Atlantic Hurricane Season. All operation elements can be managed by selecting any of the following options: details 2530, objects 2531, owner 2532, permissions 2533, or delete 2534. Selecting the details option 2530 opens a window similar to the create window shown in FIG. 25B, which allows users to change the title, description, or reposition the operation under another parent. Selecting the objects option 2531 opens an include object window shown in FIG. 25D, which allows the user to switch, add, or remove resources or knowledge boards from the navigator screen by selecting or deselecting checkboxes. Selecting the owner option 253 provides users the option to reassign the ownership responsibility for the operation object to another user. This feature provides accountability for maintenance of the system's elements by ensuring there is always a specific user associated with each entry. Selecting the permissions option 2533 provides users with the option to change the pre-assigned permissions that were granted during the object's creation and inherited from the parent operation. Users can add or remove groups or individual users, or change the permission level for viewer, user, manager, or administrator roles. Selecting the delete option 2534 archives the operation entry and removes it from view. Each change to the operation is marked as an update and is displayed in the details window 2535

Users can select to be alerted of any changes to the operation objects. Selecting the receive alerts option 2536 toggles the option on and off. When toggled to on, an alert entry is generated within the message center. To send an alert to other users, the send alert option 2537 is selected. This opens a message window, shown in FIG. 25F, where groups or users are selected and a message to accompany the alert can be typed.

7. Search

Figure 26:
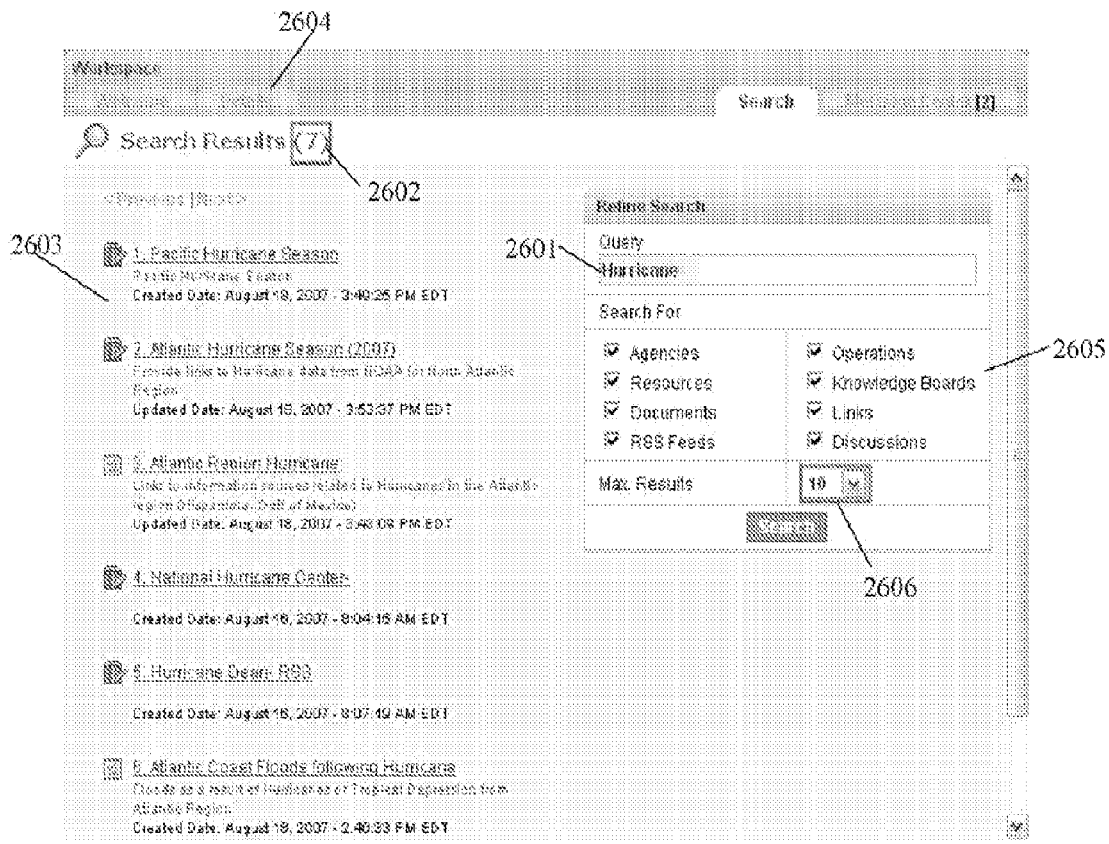
FIG. 26 shows a search results screen.

A quick search function provides users with the ability to enter a keyword to be searched upon at any time. All the data and information entered into the fields in the workspace are searchable, including titles, description, data fields, and names and descriptions of uploaded files. FIG. 26 shows a search results screen. The search results screen provides the following information: the search keyword 2601; the total number of entries found 2602; and the list of the entries found during the search 2603. Selecting any of the highlighted titles of the entries opens the element in a details window 2604 (hidden). The user can refine the search by modifying the query term, select to limit the search 2605 for a specific entry like resources or document, and select the number of entries 2606 to be displayed in each screen.

8. Message Center

The message center displays alerts generated by the system, and messages from other groups and/or user of the system. The message center displays alerts and messages to a specific user, generated from all workspaces. This provides each user with an awareness of activities within other workspaces to which they have access.

Figure 27A:
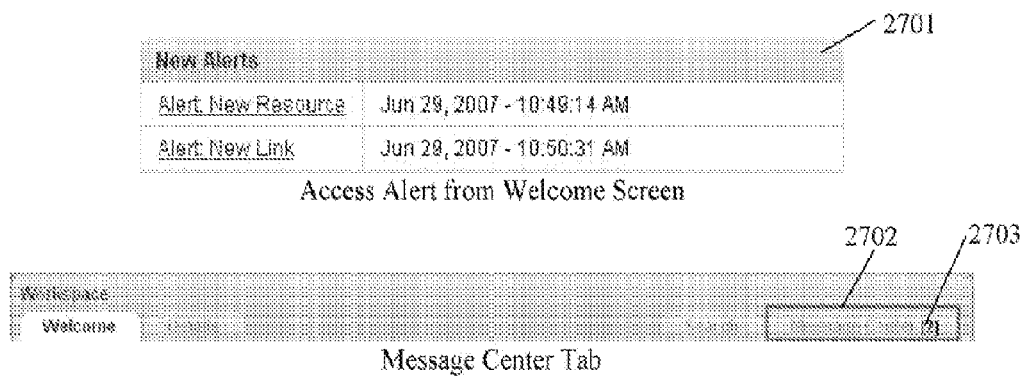
FIG. 27A shows how a user enters the message center.

FIG. 27A shows how a user enters the message center. A user may enter the message center by selecting any of the alerts 2701 presented in the overview screen or by selecting the message center tab 2702 from the menu bar. The message center tab displays the number of new messages 2703. The message center is updated frequently by the system, and the number of new unread messages will reflect the changes. The messages are stored in the T_MESSAGE 314, T_MESSAGE_USER 315, T_MESSAGE_GROUP 316, and T_MESSAGE_RECIPIENT 317 tables. As illustrated in FIG. 27B, a user can select a refresh button 2704 while working in the message center to check for new alerts and messages that have very recently arrived.

a. Alerts

FIG. 28 shows the set up of alerts. Alerts are the messages generated within the system regarding changes for which the user have requested alerts, or initiated by other users wanting to alert the user of changes made in specific objects, including agencies, operations, resources, or knowledge boards. The alert message entry contains an identification 2801 if the message is new, the message originator (system or user) 2802, the subject of the message 2803, workspace 2804 where the message was generated from, and the date and time 2805.

Selecting an alert will display the message. The message includes a brief description of the nature of the alert and a link to the element. Selecting the link opens the element in the workspace window. If an alert was sent by another user, the message will contain the name of the sender and message the user typed. Each alert is stored in an entry in the T_OBJ_DATA_ALERT_USER table 319, which references the object in the Object_ID field and the user in the User_ID field.

b. Messages

Figures 29B, 29C:
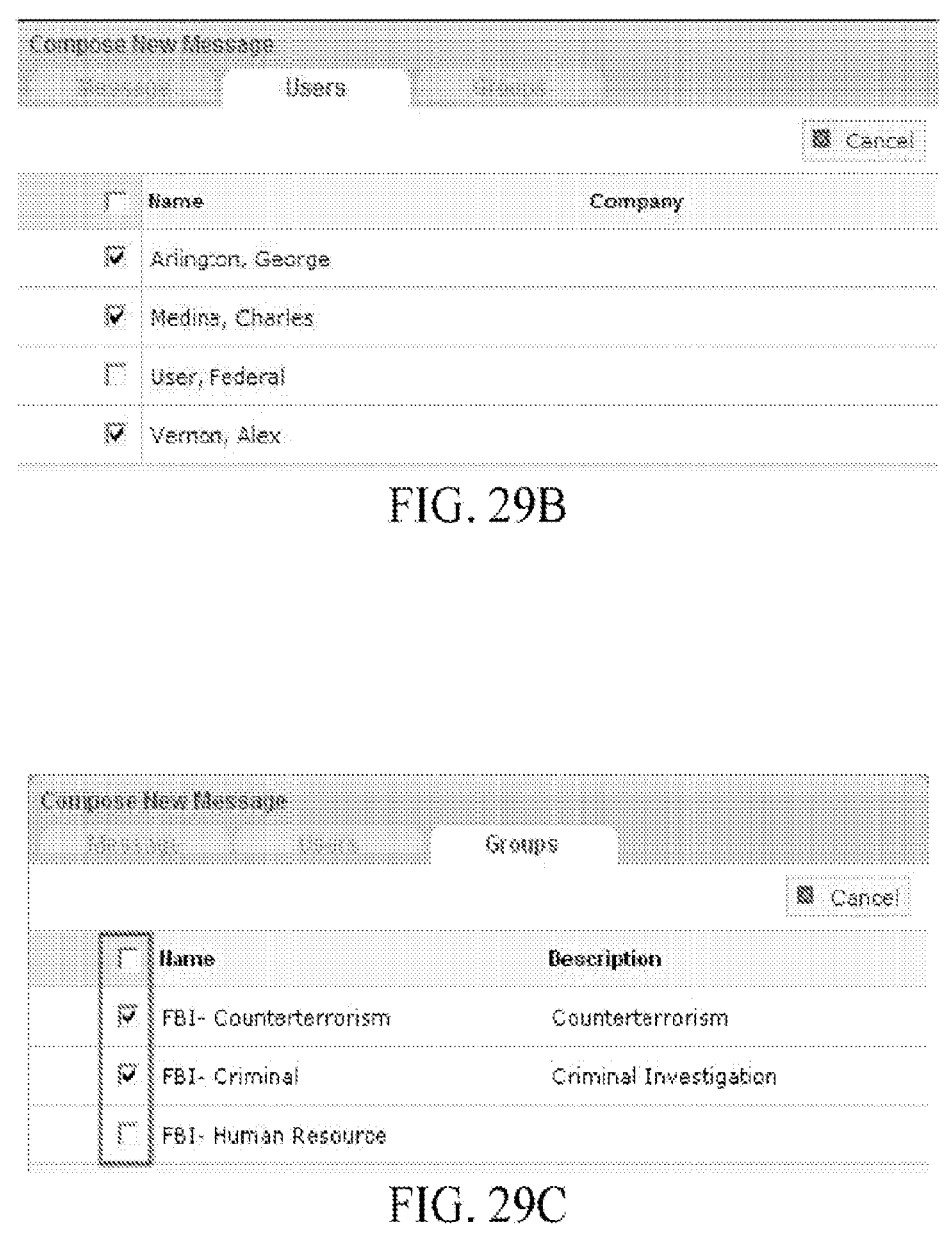
Figures 29D, 29E:
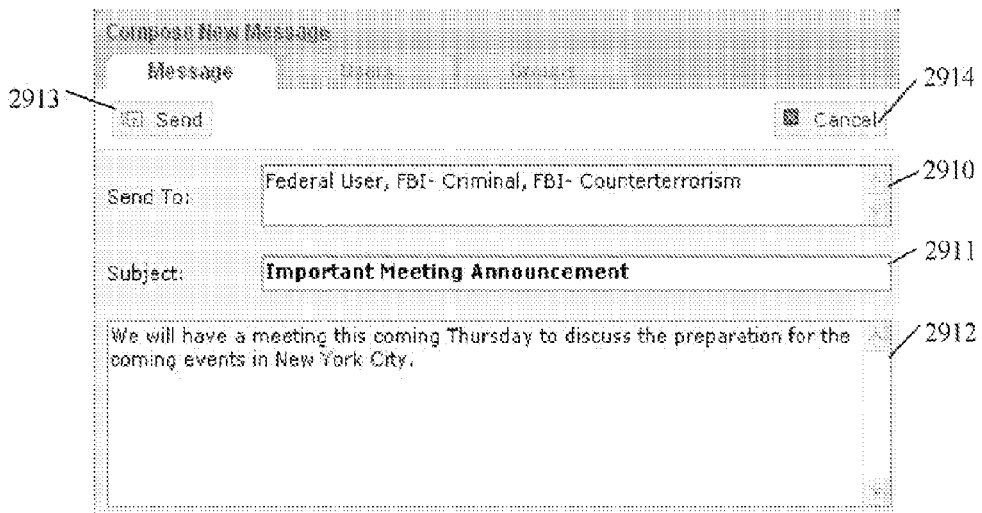

FIGS. 29A-29F show the set up of messages. Messages can be exchanged between users or groups of users utilizing the message center email-like option. To send a message, the new message icon 2806 (FIG. 28) in the message center screen is selected, and a compose new message dialog is displayed, shown in FIG. 29A. The messages are stored in the T_MESSAGE table 314, which references the workspace in the Workspace_ID field. The users tab 2901 can be selected to select individual users as recipients, as shown in FIG. 29B. Here, the users George Arlinton, Charles Medina, and Alex Vernon are selected as recipients. Each user is stored in an entry in the T_MESSAGE_USER table 315, which references the message in the Message_ID field and the user in the User_ID field. The groups tab 2902 can be selected to select groups of users, as shown in FIG. 29C. Each group is stored in an entry in the T_MESSAGE_GROUP table 316, which references the message in the Message_ID field and the group in the Group_IF field. Each individual user and each user in a group are also stored as an entry in the T_MESSAGE_RECIPIENT table 317. When a user reads the message, this is marked in this table. The users and groups names are then displayed in the send to field 2910, as shown in FIG. 29D. The subject 2911 and message 2912 are then typed in. The send button 2913 is selected to send the message, or the cancel button 2914 is selected to terminate and return to the message center screen.

As shown in FIG. 29E, messages can be replied to the sender by selecting the reply icon 2920, replied to all addresses by selecting the reply all icon 2921, or forwarded to other users and/or groups by selecting the forward icon 2922. A compose new message window is then displayed, shown in FIG. 29F, with the previous message displayed and with space to type a new message. When forwarding, users and groups need to be selected as recipients. The message center is not an external email program and cannot be used to send anything outside the system.

9. Permissions

User access to information in the system is based upon roles and responsibilities that are setup within the permissions. For each workspace, a user can be set up as a viewer, a user, a manager, or an administrator. These set ups are performed by a system or users' administrator. Users might be set up differently in different workspaces, and therefore will have different roles in each workspace. This set up of roles in workspaces supersedes any set up in permissions.

With the Viewer role, a user has view-only permission to see selected objects as assigned. The user cannot perform any functions, such as create, details, or delete. With the User role, a user can create new objects like agencies, operations, resources, and knowledge boards within objects as assigned. The user cannot change roles or permissions, and will not see objects created by other users that are not shared. With the Manager role, the user can see all the permissions and can assign permissions only to objects for which they have permission to change. With the Administrator role, the user can see all the permissions and can assign permissions to anyone at any level. Users who create an object are automatically granted full permission to that object. They can grant any of their permission levels to other users or groups they share.

If users can access the permission setup, by definition they have permission to assign rights to any of the groups of users or individual users that are visible to them. Permissions are assigned per object and will be automatically transferred to all sub-objects that are created later. The system does not adjust permissions when objects are repositioned to/from other parent objects. After re-positioning an object, users must view and update the permissions and attributes for the moved object(s). Available permissions include read, create, update, and delete. Read permission allows a user to view object elements, including agencies, resources, operations, and knowledge boards (data fields, documents, links, or discussions in resources) only but does not allow the user to make changes. Create permission allows a user to create domains, resources, initiatives, and knowledge boards. The user cannot change details documents or links details. Update permission allows a user to modify the objects (agency, operation, resource), as well as change details, documents, links, and owners. Delete permission allows a user to delete/archive the object, to reposition the object, and grant permissions to other users or groups.

FIG. 30 shows the set up of permissions. A user selects the groups tab 3001 or users tab 3002 to set up permissions for groups of users or individual users, respectively. The permission level for each group or user is then selected. The permissions are stored in the T_OBJ_DATA_PERM_GROUP 320 and T_OBJ_DATA_PERM_USER 321 tables.

10. Personal Setup

Figure 31B:
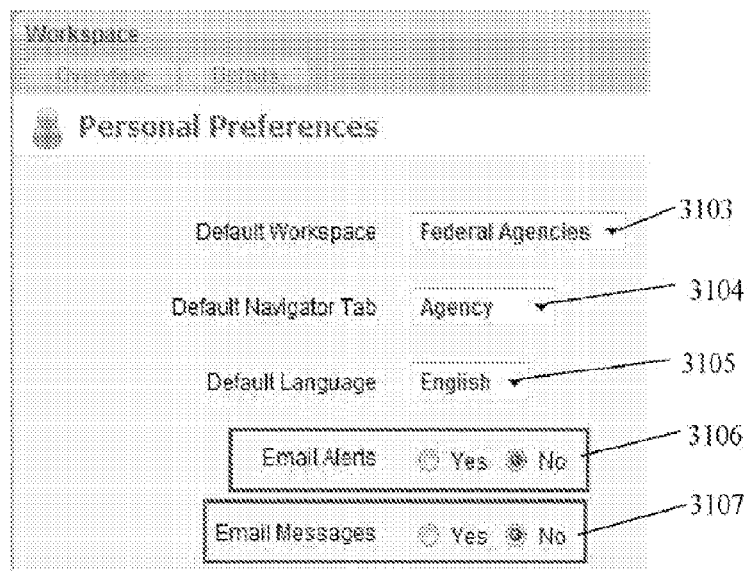
Figure 31C:
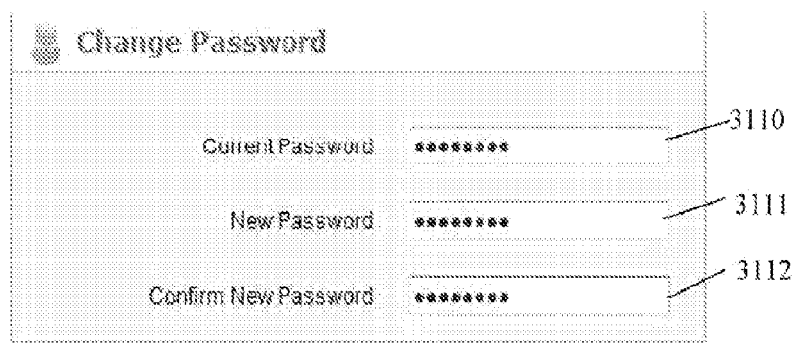

FIGS. 31A-31C illustrate the set up of user's personal preferences and password. The preferences are stored in the T_USER_PROFILE table 341 and the T_USER_PREFERENCES table 344. The set up the personal preferences, the user selects Personal Preferences 3101 from the Administration pull down menu 1321 (FIG. 13), as illustrated in FIG. 31A. A personal preferences dialog is displayed, as shown in FIG. 31B. The user sets the default workspace 3103 (if they belong to more than one), default navigator tab 3104 (operation or agency), the default language 3105, whether to forward alerts to their registered email account 3106, and whether to forward message to their registered email account 3107. The user can then select an update button (not shown) to submit the changes, or a reset button (not shown) to start over.

Users can elect to change the password for their account by selecting the Change Password 3102 (FIG. 31A) from the Administrator pull down menu 1321. A change password dialog is displayed, as shown in FIG. 31C. The user enters the current password 3110, the new password 3111, and a confirmation of the new password 3112. The user then selects an update button (not shown) to submit the changes, or a reset button (not shown) to start over.

11. Logout

To ensure that the session has terminated on the user's workstation and no other users can access the user's account, the user selects the Logout button 1320 (FIG. 13). The system will terminate the session. The administrator also sets a timeout period for the system. If there is no activity on an open session for the timeout period defined by the administrator, the system will automatically log out the user and terminate the session.

12. Map Feature

Figure 32:
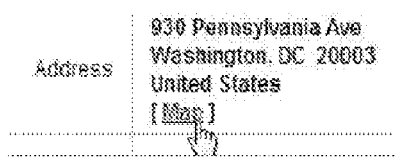
FIG. 32 shows the display a map option.

When utilizing the predefined address field in resources, the system provides the option to display a map based on the address information, as shown in FIG. 32. The default map option is set by the administrator, and can be a mapping application provided on the Internet or a proprietary mapping application.

E. System Management

In addition to the management of the system, as described above, a system administrator can set up a number of parameters for supporting applications, including: document management, email management, encryptions management, mapping management, search management, and security management. These functions are designed to provide enhanced services to users and administration of the system. An administrator accesses these functions through the system managers screen, shown in FIG. 33A.

1. Document Manager

Figure 33A:
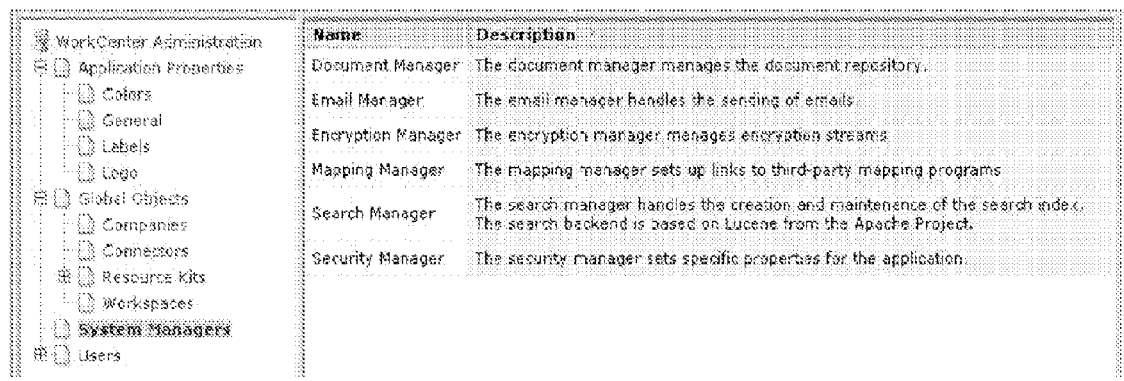
FIG. 33A shows a system managers screen.
Figure 33B:
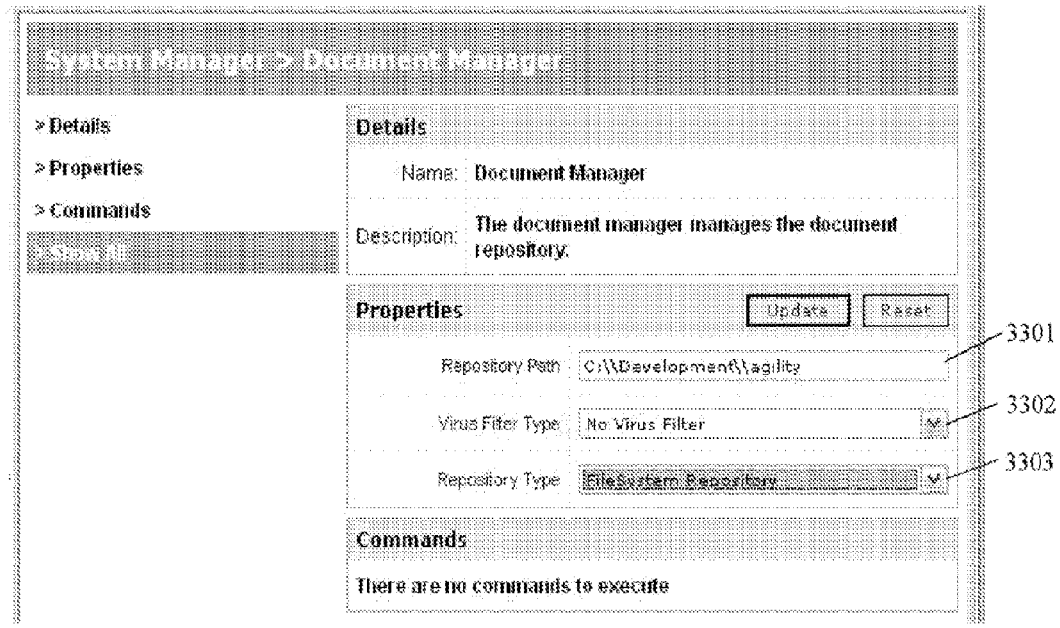
FIG. 33B shows the set up of the document manager.

The document manager provides a record of each document. As each document is uploaded into the system, the system records the time it was uploaded, the originator (person who uploads) of the document, and the time. As the system is designed to provide a full accountability and compliance with regards to the information stored within the system, the system maintains any previous version/revision of a document loaded into it as well as all archived documents. The document management provides the tools to view, archive, replace, and revive all types of documents loaded in the system. FIG. 33B shows the set up of the document manager. The administrator selects the location of the files depository 3301, virus protection software 3302, and type of repository architecture 3303.

2. Security Manager

The security manager is designed to set up the network's environment. As the server is part of a private or public network, and all users have to access it through a network, it is critical that the server cold be configured to limit the access of unauthorized users to the server. These are done by identifying the type of connections used by authorized users and limit the access of all other types of data (including random packets used by hackers) from reaching the server. This is done by opening the appropriate ports for the type of protocols used by the application. Also, the system can define if information will be encrypted while it is transferred over the network and what type of encryption to use.

Figure 33C:
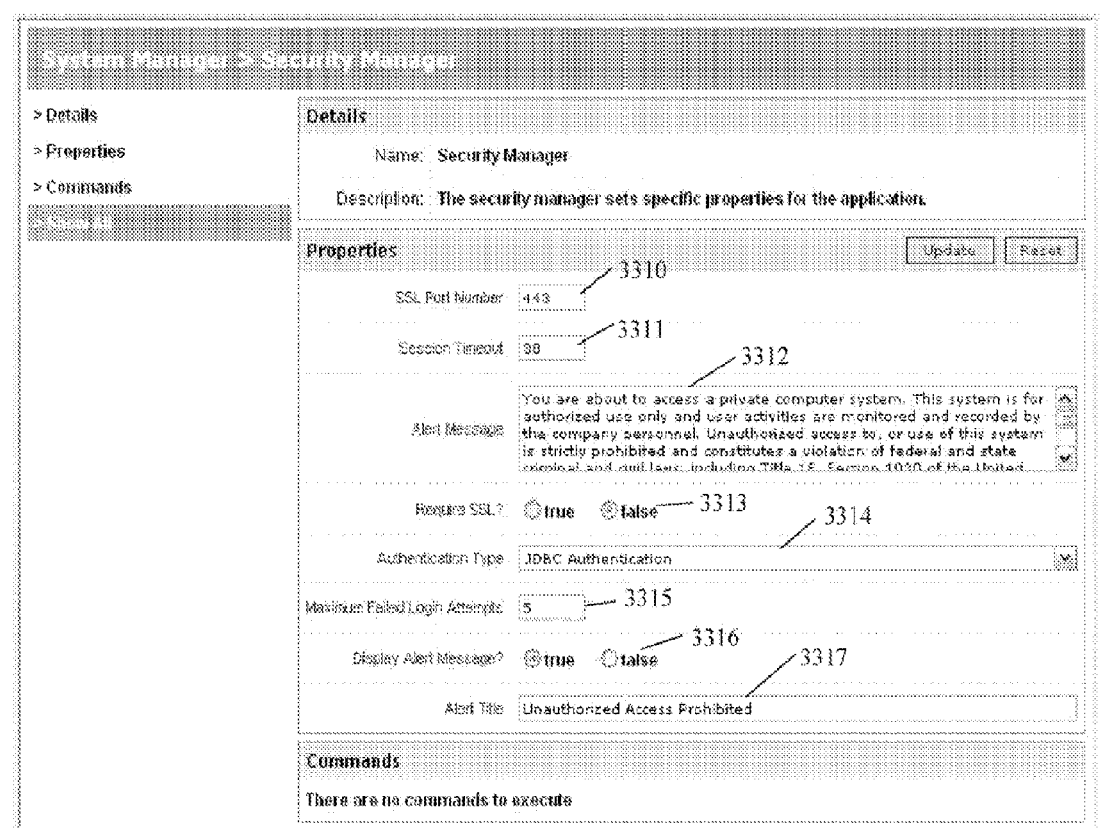

FIG. 33C shows the set up of the security manager. The administrator enters the port number 3310, session timeout duration 3311, alert message 3312 to be displayed, whether SSL encryption is required 3313, the authentication type 3314, the maximum failed login attempts allowed 3315, whether to display the alert message 3316 if the number of maximum failed login attempts has been exceeded, and the alert title 3317.

3. Encryption Manager

One of the key elements of the system is the depository of files (documents, images, etc.). As every system that is networked, there is a danger of malicious penetration and removal of sensitive information. To protect from that, the stored information could be encrypted while it is stored and only be decrypted after delivery to authorized users. The administrator of the system can choose the option to encrypt and what encryption technology to use.

Figure 33D:
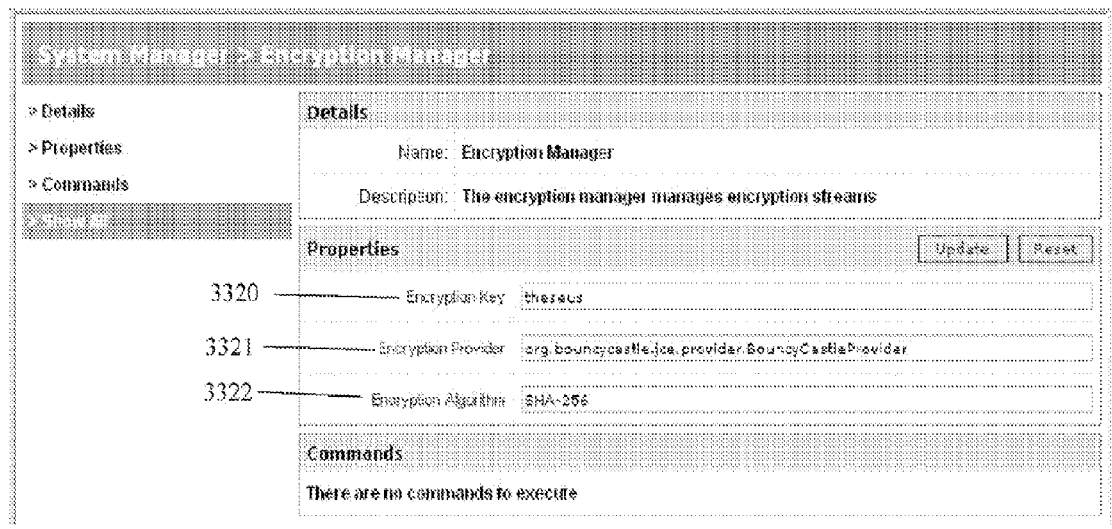
FIG. 33D shows the set up of the encryption manager.

FIG. 33D shows the set up of the encryption manager. The administrator can set up encryption key 3320, the encryption provider 3321, and the encryption algorithm 3322.

4. Mapping Manager

The mapping management allows the administrator to provide a link to their choice of a mapping (GIS) system. The ability to provide a tool to link to a mapping system enables users to define areas or locations by either geographical coordinates or street addresses, and let the system display a map or an aerial photograph that represent the location.

Figure 33E:
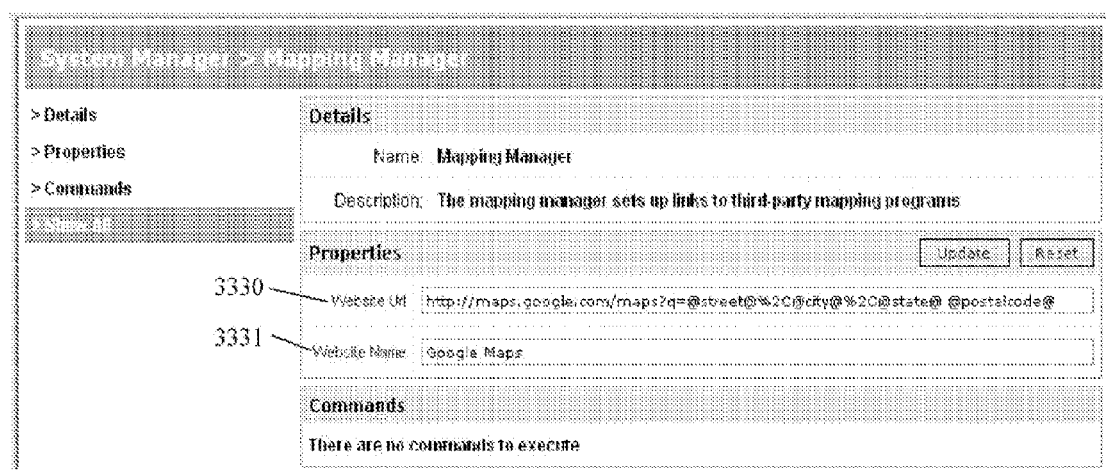
FIG. 33E shows the set up of the mapping manager.
Figure 34:
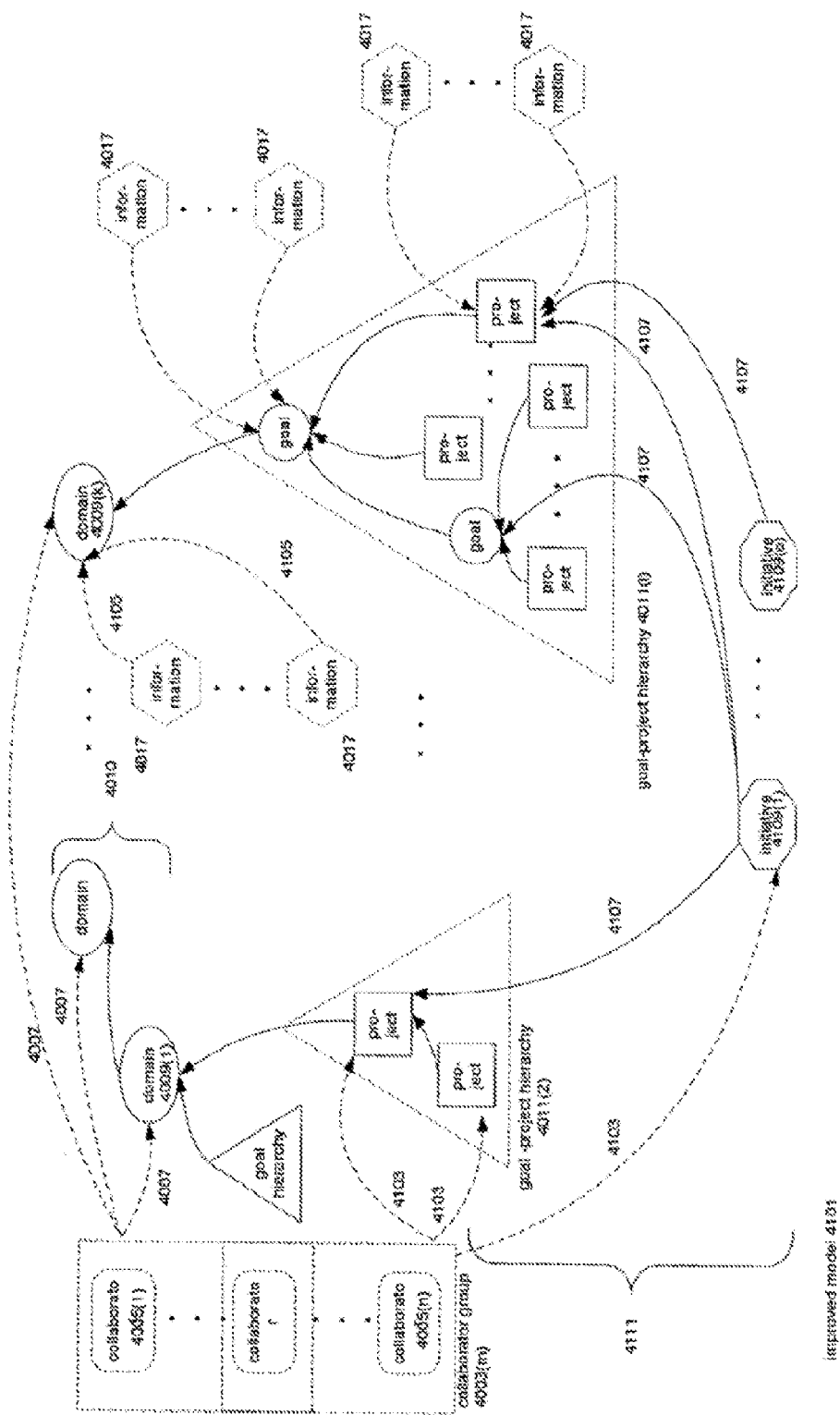
FIG. 34 shows a diagram of a prior art collaboration model.

FIG. 33E shows the set up of the mapping manager. The administrator can set up the website URL 3330 for the link to the mapping service, and the website name 3331 of the server that is providing the mapping service.

5. Email Manager

The email manager allows the administrator to set a mail server on the system and define the name and address of the administrator. The role of the mail server is to provide users with the option to send alerts and messages from the system to their preferred mail client on their PC, PDA, or cell phone. These options allow users to get updated alerts without the need to be logged into the application. Mobile users can be alerted to changes in information or operation procedures critical to their operation while they are away from their primary computer system.

Figures 33F, 33G:
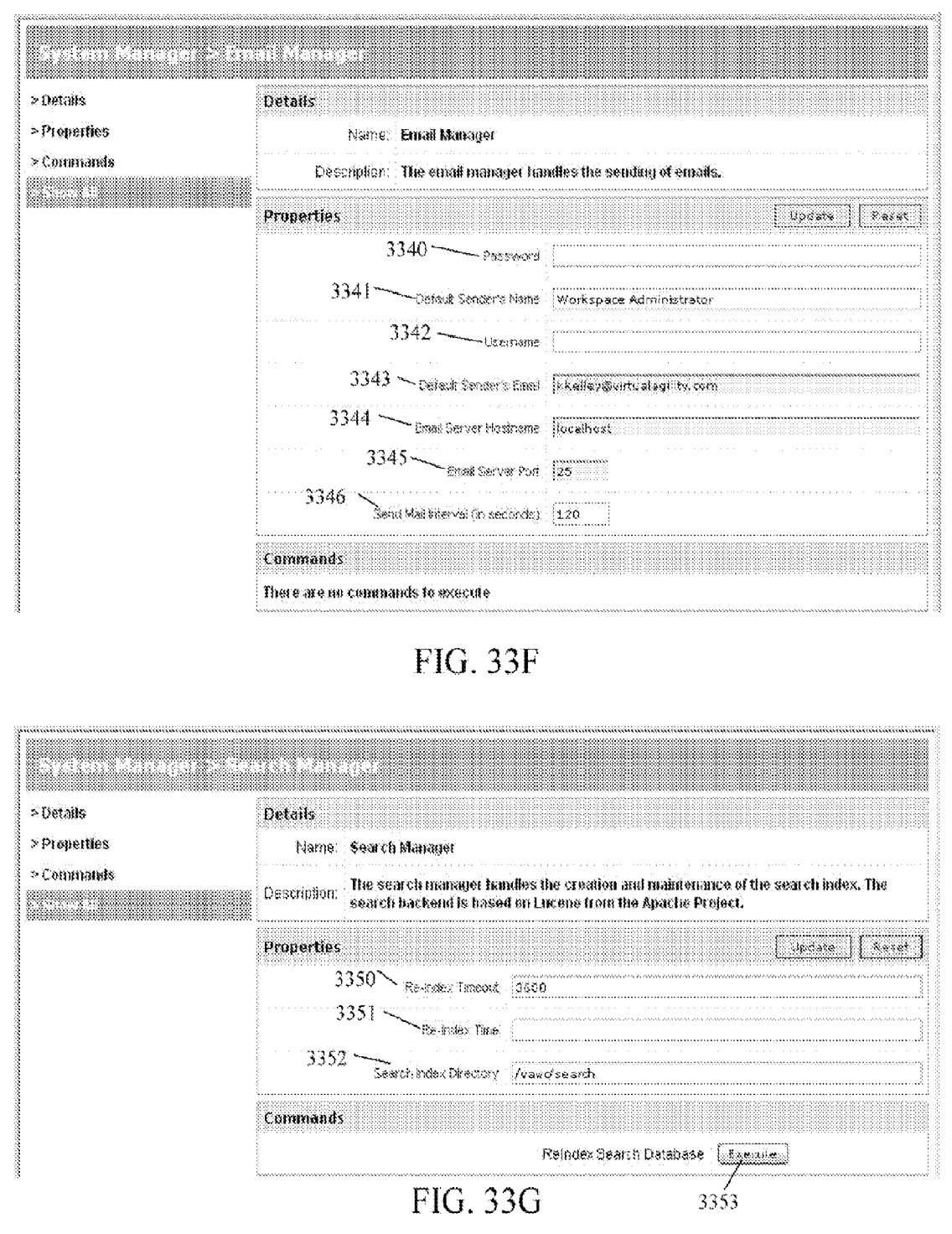

FIG. 33F shows the set up of the email manager. The administrator can set up for the mail server the password 3140, default sender's name 3341, username 3342, default sender's email 3343, email server hostname 3344, email server port 3345, and the send mail interval 3346.

6. Search Manager

The search engine of the system indexed the entries within the system as keywords. This provides users the ability to locate any type of information by inquiring the database. The inquiry results are displayed to the searching users and provide links for to the presented results. This helps users to allocate requested information without an extensive knowledge of the structure which is critical in many environments where the users may have limited training or no previous knowledge of parts of the system.

FIG. 33G shows the set up of the search manager. The administrator sets up the re-index timeout 3350, the re-index time 3351 (frequency of re-indexing), and the search index direction 3352. The administrator can choose to manually execute a reindexing of the search database by selecting the execute button 3353.

Connectors

The problem of making information sources that require parameterized information requests available to the system for collaborative work of the parent application is solved by the addition of connectors to the system of the parent application. A connector in this context represents a class of parameterized information requests for an information source and provides a mechanism for specifying particular instances of the class. The connectors are implemented in a presently-preferred embodiment by extending the tables and the user interfaces of the system of the parent application.

In the context of the present application, the following definitions are useful:

Information request:
    a request that a client of an information source provides to the information source to obtain information provided by the information source.

Parameterized information request:
an information request that includes a request parameter.
Request parameter:
a portion of an information request that indicates to the information source what information is to be obtained.
Query request parameter:
a request parameter that is expressed using a language that is interpreted by the information source.
Bind parameter:
a portion of a request parameter that is replaced by a value before the information request that contains the request parameter is used in an information request.

In the context of the present system, it is useful to refer to the following roles for persons using the present system:
User: any person using the system.
Administrator: a user who specifies connectors. An Administrator may also perform the actions of a Query specialist.
Query specialist: a user who specifies parameterized information requests. A Query specialist may also perform the actions of a GUI specialist
GUI specialist: a user who specifies GUI elements such as resource templates. A GUI specialist may also perform the actions of a Manager.
Manager: a user who specifies resources. A Manager may also perform the actions of a Collaborator.
Collaborator: a user who uses resources.

Figure 36:
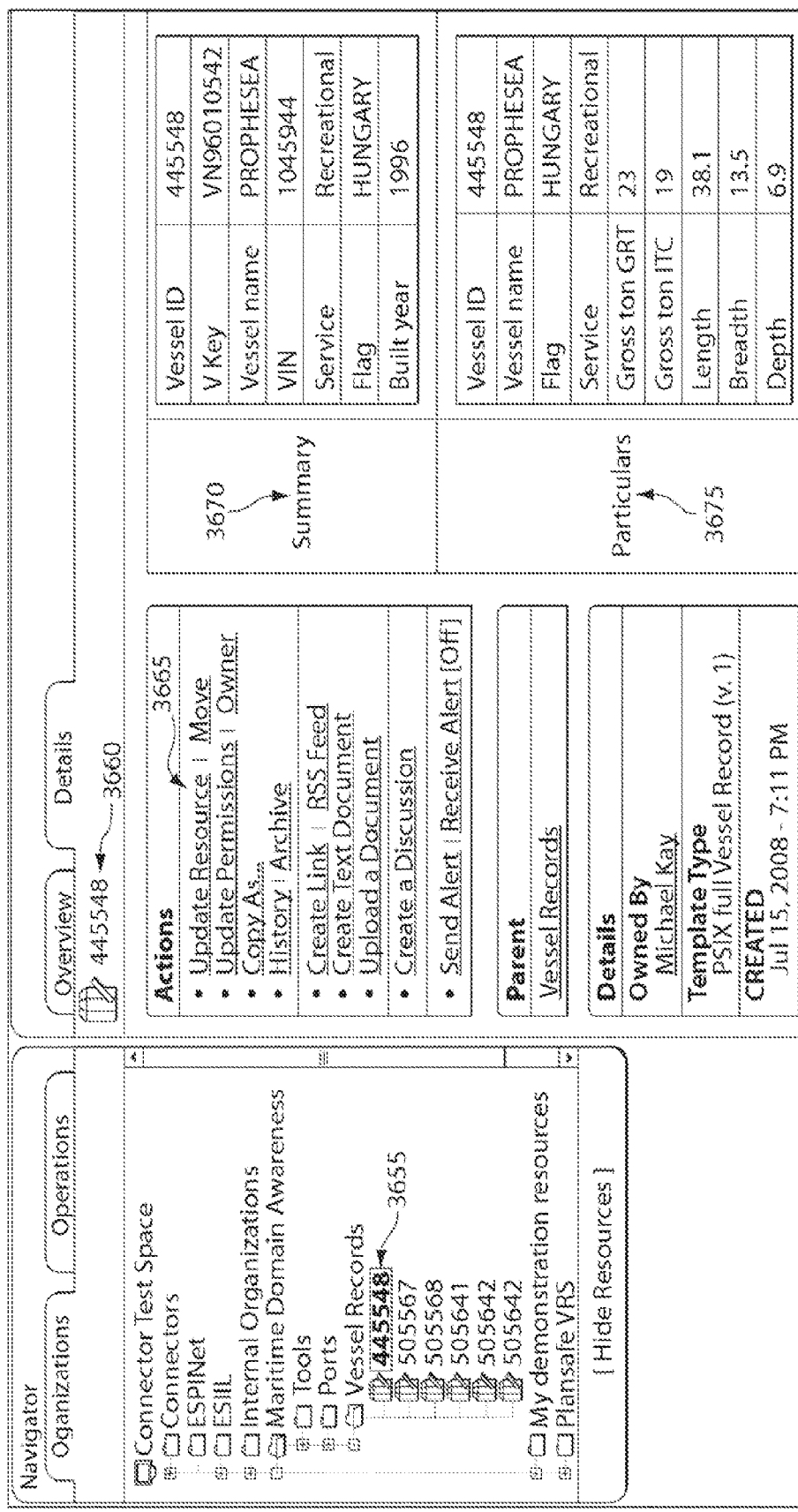
FIG. 36 shows an example of the GUI for connectors.

FIG. 36 shows the interface for making a parameterized information request used by a collaborator in a system for collaborative work to which connectors have been added to make parameterized information requests. The parameterized information requests in this example access an information source that provides information about vessels in US seaports. The class of requests represented by the example connector permits the collaborator to specify by selection a vessel ID number and returns the results of several different parameterized requests to the information source for information about the vessel identified by the ID number. The vessel ID number provided by the collaborator is used as the value of a bind parameter in the requests in FIG. 36.

As shown at 3655, the collaborator can select from a list of vessel identifiers. Here, the collaborator has selected vessel 445548, as shown. The system then makes instances of the parameterized information requests represented by the connector in which the vessel identifier 445548 has been used as a bind value in the requests and provides them to the information source. The information source responds with the results of the requests. The desired results of two distinct requests are displayed at 3670 and 3675. The result at 3670 is the "Summary" data about the vessel. The result at 3675 is the "Particulars" data about the vessel.

Additional specifications for connectors and parameterized information requests are easily added to the system by an Administrator. The Administrator adds a connector by specifying access values needed to access the information source, and specifying request parameters for the parameterized information requests to be added. The specifications for the parameterized information requests are then available for a GUI specialist to use in specifying resource templates. Once a connector has been specified and has been associated with one or more resource templates, a collaborator can include the connector among the resources available to him or her in the same fashion that the collaborator can include a document, a web page, or an RSS feed.

Connectors thus allow users to obtain and to share information obtained by parameterized information requests, while freeing them from dealing with the special complexities of such requests.

Overview of Connector Specification

Users in different roles—System Administrators, GUI specialists, and Managers and Collaborators—can specify connectors, parameterized information requests, and templates and resources that specify parameterized information requests, and use those resources. Specifications for bind parameters bind the bind parameter to specific values or to the values of user input fields. An additional feature of the connectors is that the connector specification can specify how the response received from the information source should be displayed to a user.

Administrators can specify connectors and parameterized information requests to give users access to information sources that respond to parameterized information requests. GUI templates are extended to allow GUI specialists to specify information requests and connectors via additional types of fields in a template. Managers can specify resources employed by collaborators using template specifications that specify connectors and their parameterized information requests.

Specifications for bind parameters are supported at more than one level.
An Administrator specifying a connector can specify bind parameters at the connector level. For example, giving a "default" vessel identifier value for an ocean-going vessel.
A GUI specialist specifying a template can override a binding specified for a connector in the resource template. For example, changing a binding from a default value for a vessel identifier to a different value, or to be the value of a "Vessel ID" field for input from a Manager.
A Manager specifying a resource using a Resource template can override a binding specified in the first or second level. For example, the Manager can change the binding to get information about a particular vessel.

Short Example of GUI Interface for a Connector

Figure 37:
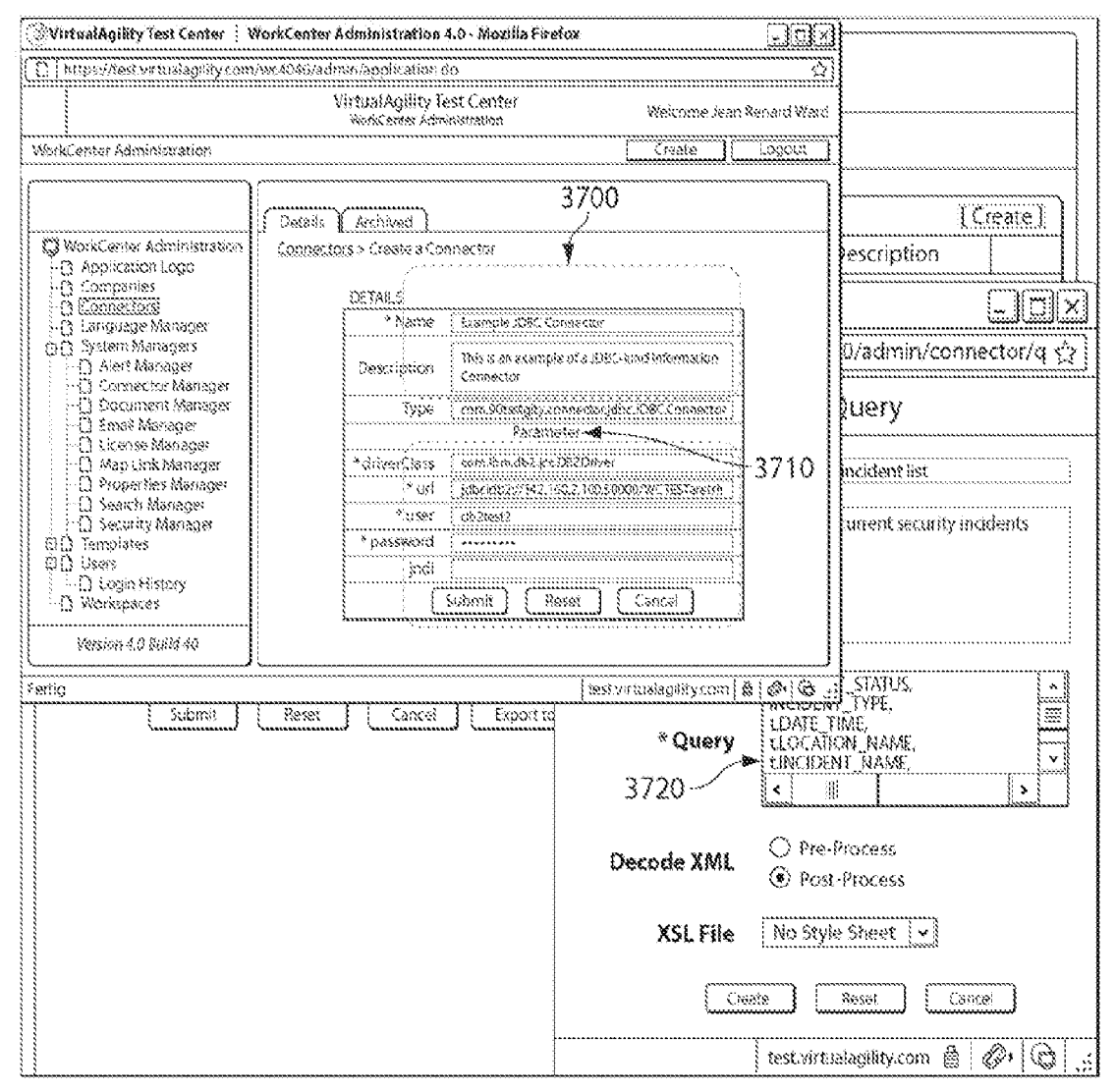

FIG. 37 demonstrates how the specification of a connector in the present system is made less complex with an example of the Administrator GUI interface for viewing a connector specification specification. The GUI interfaces for connectors are described in detail below.
3700 shows the name and description specified by the Administrator for this connector.
3710 shows access values specified by the Administrator for the system to access the information source, such as a username and a password.
3720 shows a portion of the query request parameter, specified by the Administrator or Query specialist in the SQL language, for a parameterized information request. The same query request parameter is shown in full at 3500 in FIG. 35.

Preferred Embodiment Architecture

Figure 38:
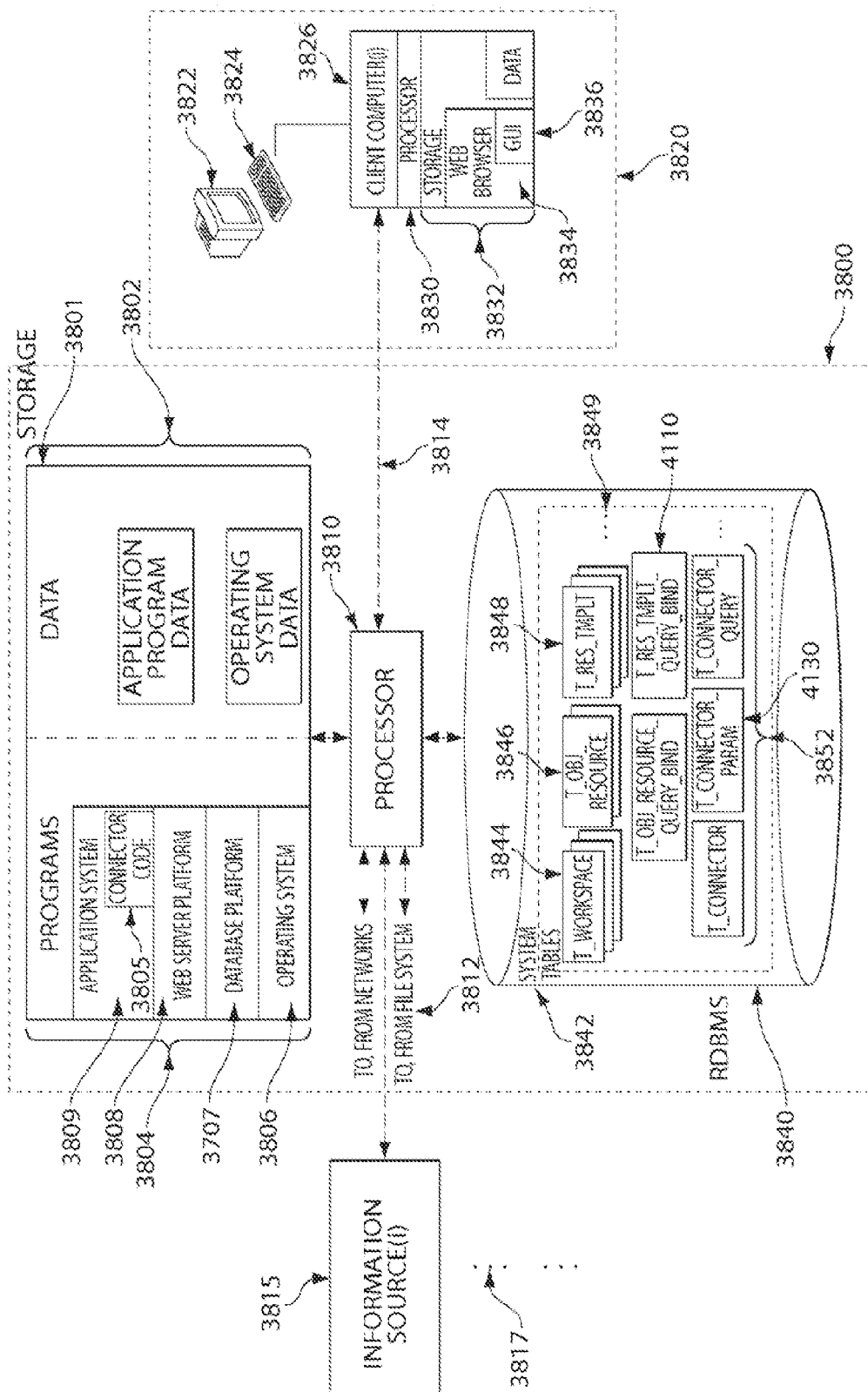
FIG. 38 shows a system of the parent in which a presently-preferred embodiment of the present invention has been implemented.

FIG. 38 illustrates the presently-preferred client-server-type architecture embodiment of the system of the parent application as modified for connectors. 3800 shows the server part, and 3820 the client part of the architecture.

Starting with the client part, 3822 shows a client computer such as a personal computer with a display, and one of its input devices, a keyboard 3824. There may be a number of such clients. 3826 illustrates major components of the client computer: a processor 3830 and local storage 3832. The storage holds software programs and data, as shown. One software program is a standard web browser 3834. 3836 illustrates that the client part of the GUI interface of the present system is implemented using the web browser. The web browser program communicates with the software components of the present system on the server component 3800 via a network connection 3814. The network connection may be over the Internet, a local network, or a combination of networks.

Turning to the server part, the server contains a processor 3810. The processor has storage 3801. The storage contains software programs 3804 and data 3802. As shown in FIG. 38, the data contains both operating system data and application program data for a number of programs, such as local data for the software programs of the present system.

The programs 3804 in the storage 3801 include a number of kinds of programs, such as the operating system 3806, database platform 3807, a web server platform 3808, and the application system of this invention 3809. Shown also is the connector code 3805 for software of the connectors which is added to the software of the system of the parent. The server part of the software of the present system is implemented using the web server platform.

The processor also has a relational data base system (RDBMS) 3840. The database tables for a presently-preferred embodiment are illustrated at 3842. A number of the tables of the parent system are shown in exemplary fashion, including the T_WORKSPACE table 346 and associated tables for workspaces 3844, the T_OBJ_RESOURCE table 329 and associated tables for resources 3846, the T_RES_T-MPLT table 337 and associated tables for templates 3848. The ellipses at 3849 refer to other tables of a presently-preferred embodiment.

Also illustrated at 3852 are the table additions and extensions for the system of the present application. As shown, these include the T_CONNECTOR, T_CONNECTOR_PARAM, and T_CONNECTORY_QUERY tables. Further tables are illustrated by the ellipses on the right of 3852. 4110 shows the T_RES_TMPLT_QUERY_BIND table, an additional table for the present system that is used to extend the resource templates of the parent system for bind parameters, and the T_OBJ_RESOURCE_QUERY_BIND table 4130, an additional table used to extend the resources of the parent system for bind parameters.

Returning to the processor 3810, network and other interfaces to and from other systems and components are shown at 3812. As shown, these include interfaces to a local file system, networks such as the Internet, and an interface to information sources 3815. The system can have interfaces to a number of information sources, as shown by the ellipses at 3817.

Figure 39:
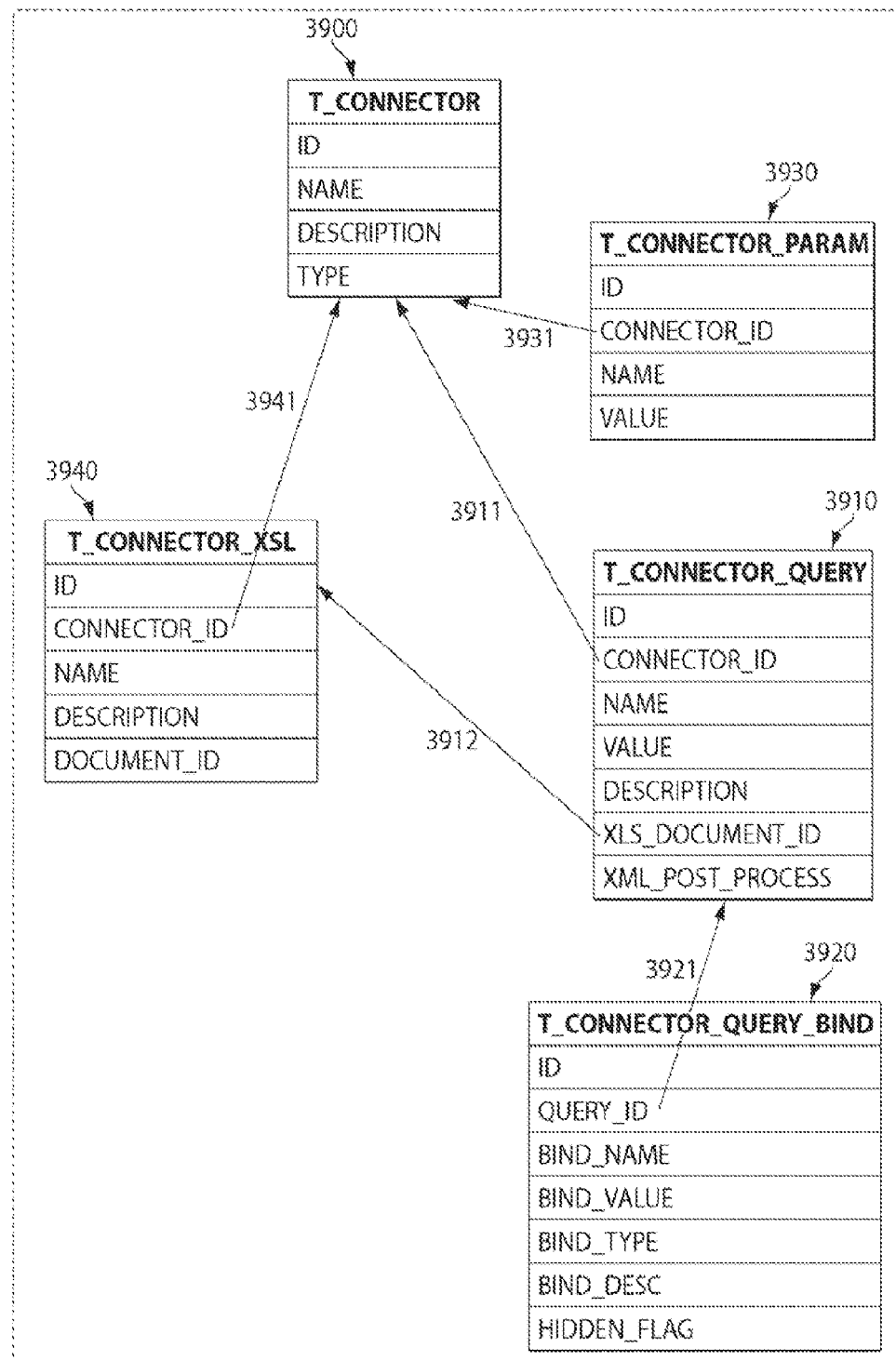
FIG. 39 shows tables used to represent connectors in a presently-preferred embodiment.

FIG. 39 provides an overview of the additional tables of the present system that specify connectors. FIG. 39 is a simplified E-R diagram: E-R diagrams are explained for FIG. 3A through FIG. 4K of the parent application The tables of FIG. 39 are described in detail below. Fields that relate to database maintenance and certain general details are omitted from FIG. 39 for clarity, as they will be readily understood from other description. The dotted outline around the tables indicates that these have been added in the present system, and not present in the parent system.

The T_CONNECTOR table 3900 contains a record for each connector specified in the system. A given connector provides access to exactly one information source. However there is no limit on the number of connectors which can access a given information source.

Turning to the T_CONNECTOR_PARAM table 3930: Access to a particular information source may require a number of access parameters. Access parameters are attributes of the particular information source. For example, an information source may require two access parameters "username" and "password" with particular values to permit access.

To avoid confusion regarding the word "parameter", access parameters will be referred to as "access values" in the remainder of this presentation.

The T_CONNECTOR_PARAM table 3930 contains records for access values for information sources used by connectors. A given connector has a record in the table for each access value (if any) that the connector uses to access the information source associated with the connector. The connector a T_CONNECTOR_PARAM record belongs to is determined by the record's CONNECTOR_ID value, as shown by arrow 3931.

Turning to the T_CONNECTOR_QUERY table 3910: There may be any number of request parameters specified for a given connector. In a presently-preferred embodiment, the request parameters are query request parameters. Each query request parameter for a connector has a record in T_CONNECTOR_QUERY table 3910. Each such record is associated with exactly one connector record in the T_CONNECTOR table 3900 by the CONNECTOR_ID value, as shown by arrow 3911.

Turning to the T_CONNECTOR_QUERY_BIND table 3920: There may be a number of bind parameters specified for a given query request parameter. T_CONNECTOR_QUERY_BIND table 3920 contains a record for each specification for a bind parameter for a request parameter record in the T_CONNECTOR_QUERY table. Each such record is associated with exactly one record of the T_CONNECTOR_QUERY table 3910 by the QUERY_ID value in the T_CONNECTOR_QUERY_BIND record, as shown by arrow 3921.

Turning to the T_CONNECTOR_XSL table 3940: An XSL stylesheet specifies how to process responses from the information source for presentation to a user. Any number of XSL stylesheet documents can be associated with a particular connector, including none. The T_CONNECTOR_XSL table contains a record for each specification of an XSL document. Each record of the T_CONNECTOR_XSL table specifies one XSL document specification, and is associated with exactly one connector record in 3900 by the CONNECTOR_ID value, as shown by arrow 3941. Information on XSL stylesheet documents can be found on the World Wide Web at www.w3.org/Style/XSL. (Reference fetched 6 Mar. 2009)

Each request parameter record of the T_CONNECTOR_QUERY table may be associated with a record of the T_CONNECTOR_XSL table by the XSL_DOCUMENT_ID value of the T_CONNECTOR_QUERY record, as shown by arrow 3912. The record of the T_CONNECTOR_QUERY table and the associated record (if any) of the T_CONNECTOR_XSL table are both associated with the same connector record of the T_CONNECTOR table by the respective CONNECTOR_ID values.

Figure 40:
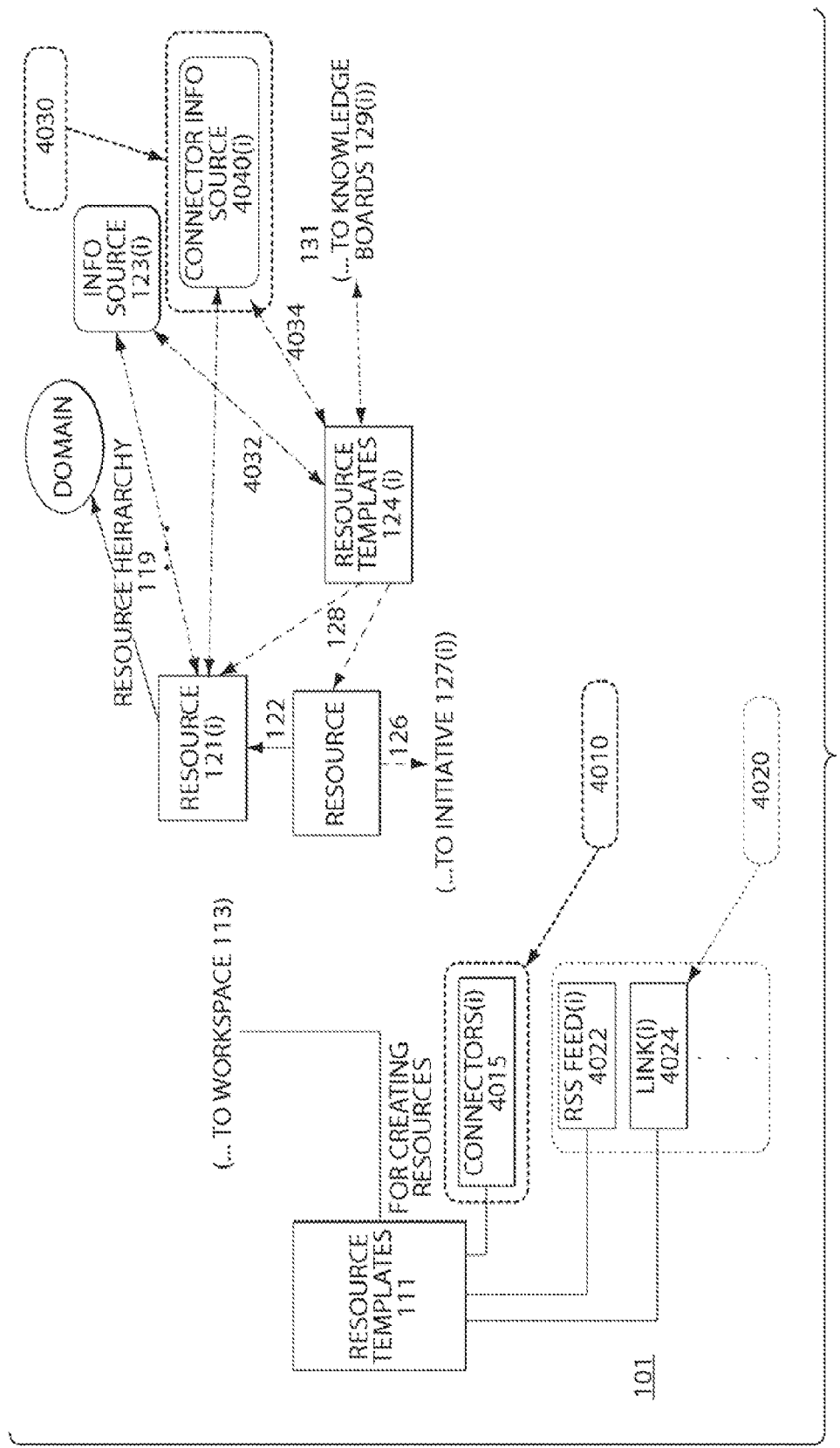
FIG. 40 shows how connectors relate to the system of the parent application.

FIG. 40 shows in overview the extensions for the presently-preferred embodiment of the present invention. The extensions are shown as additions to the presentation of FIG. 1, described above for the system of the parent application. Two excerpts of FIG. 1 are reproduced in FIG. 40. Elements with the same numbers as FIG. 1 of the parent application represent the same elements in FIG. 40. New elements of FIG. 40 have new numbers. Additional elements not present in the parent system are outlined in dotted lines as at 4010 and 4040.

FIG. 40 shows the database tables of system 111 having resource templates (table 111) used with workspaces (table 113). The parent application describes how templates are used to relate information sources to resources, however FIG. 1 of the parent application did not show that detail: the detail is shown here with exemplary information source such as the RSS Feeds 4022 and Links 4024: the ellipses below 4024 in FIG. 40 refer to further kinds of information sources of the parent and present systems.

As already described, in the present system, a number of tables, shown at 4010 have been added to represent connections. These include a connector table 4015 and other tables (not shown).

Turning to the excerpted part of FIG. 1 near resources 121, FIG. 40 shows resources 121 belonging to a resource hierarchy 119 belonging to a domain of the parent system. Resource templates 124 are related to knowledge boards 129 and to resources 121 as described in the parent application. Also shown are information sources 123.

In the present system, connectors are shown at 4040 as an additional kind of information source. A connector is associated with a resource when a resource template 124 containing a connector-type field is used as the resource template to create the resource. This aspect of becoming associated is illustrated by the dotted lines at 4032 and 4034 for information sources that are specified as connectors and for other information sources.

Overview of Tables for Implementing Parameterized Information Requests

Figure 41:
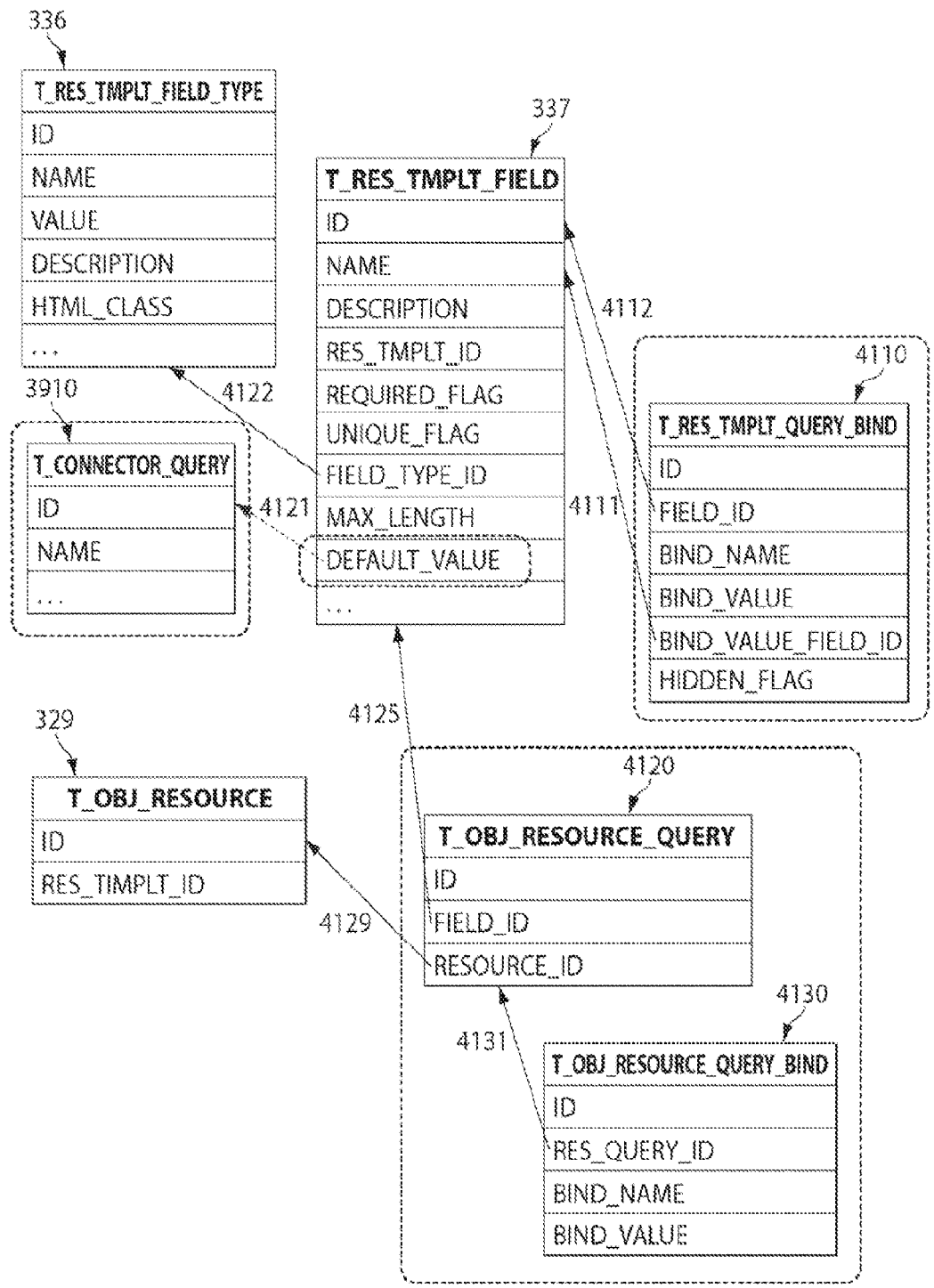
FIG. 41 shows additions to the tables of figures FIG. 4D and FIG. 4G of the parent application.

FIG. 41 shows additions to the tables of figures FIG. 4D and FIG. 4G of the parent application.

The additional tables of the present system in FIG. 41 have a dashed outline around them. 337, 336, and 329 in FIG. 41 show respectively the T_RES_TMPLT_FIELD, T_RES_TMPLT_FIELD_TYPE, and T_OBJ_RESOURCE tables described for the parent system. 3910 shows the T_CONNECTOR_QUERY table of FIG. 39.

The T_RES_TMPLT_FIELD_TYPE table 336 is extended by an additional record entry indicating a connector-type field. A field in a template that has the connector type represents a query request parameter that is specified by a record in T_CONNECTOR_QUERY. The template field will be used to display the results of a parameterized information request made by the query request parameter's connector using the query request parameter associated with the resource template field.

A connector-type field in a template is associated with a particular query request parameter for the information source the connector relates to. A number of bind parameters for the query request parameter may be associated with the connector-type field of the template.

A connector-type field in a resource is associated with the connector-type field in the resource template used to specify the resource. A number of bind parameter specifications may be associated with the connector-type field of the resource specification.

The T_RES_TMPLT_FIELD table 337 is extended for a presently-preferred embodiment of the invention from the implementation of the parent system by the addition of a DEFAULT_VALUE field. When a record in the table has the connector type, the DEFAULT_VALUE field specifies the ID of a record in T_CONNECTOR_QUERY. DEFAULT_VALUE thus relates the record for the connector-type resource template field to the query request parameter and the connector specified in a T_CONNECTOR_QUERY record. This association is shown by dashed-line arrow 4121.

The additional table T_OBJ_RESOURCE_QUERY 4120 associates each connector field specified in a resource with the specification for that connector field in the resource template used to create the resource. Each record of the T_OBJ_RESOURCE_QUERY table is associated with a record of the T_OBJ_RESOURCE table by the value RESOURCE_ID as indicated by arrow 4129, and to a connector field record of the T_RES_TMPLT_FIELD table by the value of FIELD_ID as indicated by arrow 4125. There is only one T_OBJ_RESOURCE_QUERY record associated with a connector-type field in a given resource.

The records of the additional table T_RES_TMPLT_QUERY_BIND 4110 specify bindings for bind parameters for connector-type fields in a template. The number of T_RES_TMPLT_QUERY_BIND records associated with a connector-type field record in table T_RES_TMPLT_FIELD 337 is determined by the number of bind parameters in the query request parameter for the connector-type field.

When a connector-type field is specified in a resource, the collaborator using the resource may have the present system perform a parameterized information request to the information source indicated by the connector. The parameterized information request will use the specified query request parameter and will use the bind parameter values specified in the T_RES_TMPLT_QUERY_BIND table records in the query request parameter, except when it is overridden by a binding specified in a resource created using the resource template. Each record in the T_RES_TMPLT_QUERY_BIND table is associated with its connector-type field record in the T_RES_TMPLT_FIELD table by the FIELD_ID value, as shown by arrow 4112. Each record in the T_RES_TMPLT_QUERY_BIND table that specifies a binding to the value of a template field is associated with the record for that template field by the BIND_VALUE_FIELD_ID record, as shown by arrow 4111.

The additional table T_OBJ_RESOURCE_QUERY_BIND 4130 holds binding specifications for the resource for the bind parameters of connectors. Each record of the T_OBJ_RESOURCE_QUERY_BIND table 4130 is associated with exactly one record of the T_OBJ_RESOURCE_QUERY table by the value of RES_QUERY_ID as indicated by arrow 4131. The number of T_OBJ_RESOURCE_QUERY_BIND records associated with the T_OBJ_RESOURCE_QUERY record is determined by the number of bind parameters specified for the query request parameter in the connector for the connector field. The BIND_NAME column of the T_OBJ_RESOURCE_QUERY record is the name of the bind parameter, and the BIND_VALUE is any value specified for the binding in the resource.

Details of Additions to Tables

The T_CONNECTOR table and other tables contain additional fields for general database management, such as ARCHIVED_DATE, CREATED_DATE, UPDATED_BY, and OBJ_VERSION. These are used in the same fashion as the fields described above for tables of the system of the parent application, and are omitted from this discussion for clarity.

Tables of the Connector Class

Each record of the T_CONNECTOR table 3900 represents a connector. A given connector represents only one information source. The fields in the table's entries are as follows:

| Name | Type | Description |
| --- | --- | --- |
| ID | varchar2(32) | record identifier for this connector |
| NAME | varchar2(128) | name of the connector |
| DESCRIPTION | varchar2(4000) | description of the connector |
| TYPE | varchar2(128) | type of information source: i.e. JDBC, etc. |

In this and in other tables, the value ID field is a unique identifier for the record and the entity the record represents.

Accessing an information source may require specific access values. Each record in T_CONNECTOR_PARAM table 3930 specifies an access value needed to access the information source used by the connector indicated by CONNECTOR_ID. There is a record in T_CONNECTOR_PARAM for each attribute that the connector specified in the record needs to access the information source. The fields in the table's entries are as follows:

| Name | Type | Description |
| --- | --- | --- |
| ID | varchar2(32) | record identifier |
| NAME | varchar2(128) | name of the access value |
| VALUE | varchar2(4000) | value of the access value |
| CONNECTOR_ID | varchar2(32) | connector ID from T_CONNECTOR: this is the connector this access value specification "belongs to" |

The records of T_CONNECTOR_QUERY table 3910 specify query request parameters for entries of connectors in the T_CONNECTOR table. There is an entry for each such query request parameter. Each entry references the connector's record in the T_CONNECTOR table 3900. There may be a number of such query request parameters for a given entry in the T_CONNECTOR table 3900. The fields in the table's entries are as follows:

| Name | Type | Description |
| --- | --- | --- |
| ID | varchar2(32) | record identifier |
| CONNECTOR_ID | varchar2(32) | connector ID from T_CONNECTOR: this is the connector this query request parameter specification "belongs to" |
| NAME | varchar2(128) | name of the query request parameter |
| VALUE | varchar2(4000) | request parameter value, e.g.: For JDBC connectors, this is an expression in the SQL language. For SOAP connectors, this is the name of a SOAP method for the information source. |
| DESCRIPTION | varchar2(4000) | description of the query request parameter |
| XSL_DOCUMENT_ID | varchar2(32) | document ID from T_CONNECTOR_XSL |
| XML_POSTPROCESS | char(1) | binary value indicating optional pre-processing for an XML response for character encodings not compliant with XML. Post-processing indicates that pre-processing will not be done. No-post-processing indicates that pre-processing will be done. |

A number of bind values may be specified for bind parameters of a query request parameter. The records of T_CONNECTOR_QUERY_BIND table 3920 specify bindings to values for particular bind parameters of the query request parameter of a record in the T_CONNECTOR_QUERY table 3910. There is a bind parameter specification record in table 3920 for each bind parameter of the query request parameter of the record in the T_CONNECTOR_QUERY table. The fields in the table's entries are as follows:

| Name | Type | Description |
| --- | --- | --- |
| ID | varchar2(32) | record identifier |
| QUERY_ID | varchar2(32) | record ID from T_CONNECTOR_QUERY: this is the request parameter this query binding "belongs to" |
| BIND_NAME | varchar2(128) | name of a variable in the query. For query request parameters in the SQL language, this is a variable preceded by a colon. For query request parameters expressed in SOAP, this is the name of a parameter of the SOAP method. |
| BIND_VALUE | varchar2(1000) | optional default value for variable |
| BIND_TYPE | varchar2(16) | type of binding: text, etc. |
| HIDDEN_FLAG | char(1) | reserved for future use: not used in the presently-preferred embodiment |

A number of XSL documents may be associated with a given connector. The T_CONNECTOR XSL table 3940 associates an XSL document with a particular query request parameter of the T_CONNECTOR_QUERY table 3910. An XSL document contains script code for formatting information: the script of the XSL document for a connector can be used to format information returned from the information source of the connector for displaying the information to a user.

An exemplary XSL document is shown in FIG. 42 at 4200. XSL documents are also referred to as "stylesheets": the keyword "stylesheet" can be seen at 4210. 4220 shows a segment of script code in the JavaScript language: the script code indicates that an item should be displayed in a pop-up window of a standard web browser. 4230 shows a portion of the XSL referring to displaying an item in a green color.

A given XSL document record of the T_CONNECTOR_XSL table may be associated with a number of records of the T_CONNECTOR_QUERY table 3910. A record in the T_CONNECTOR_QUERY table may have a single XSL document associated with it, or none. The fields of the entries in the records of the T_CONNECTOR_XSL table are as follows:

| Name | Type | Description |
| --- | --- | --- |
| ID | varchar2(32) | record identifier |
| NAME | varchar2(128) | name of the XSL document in the system |
| DESCRIPTION | varchar2(4000) | description of the XSL document |
| CONNECTOR_ID | varchar2(32) | connector ID from T_CONNECTOR: for each connector, there is an optional set of XSL documents for use with responses to requests of that Connector. This value identifies the connector this XSL document record "belongs to". |
| DOCUMENT_ID | varchar2(32) | identifier of the file in the file system of the server for the XSL document |

Tables of the Resource Template Class

The present system supports connector-type fields associated with a particular query request parameter in resource templates.

The T_RES_TMPLT_FIELD table 337 is extended for a presently-preferred embodiment of the invention from the implementation of the parent system by the addition of a DEFAULT_VALUE field. The fields in the table's entries are as follows:

| Name | Type | Description |
| --- | --- | --- |
| ID | varchar2(32) | record identifier |
| NAME | varchar2(128) | name of data field |
| DESCRIPTION | varchar2(2000) | description of data field |
| RES_TMPLT_ID | varchar2(32) | resource template ID from T_RES_TMPLT |
| FIELD_TYPE_ID | varchar2(32) | field type ID from T_RES_TMPLT_FIELD_TYPE |
| MAX_LENGTH | number(10.0) | maximum text length |
| REQUIRED_FLAG | char(1) | set if value required for field |
| SEQUENCE_NUM | number(4.0) | display sequence number |
| DEFAULT_VALUE | varchar2(4000) | Default value for this field. If the field is a connector field, DEFAULT_VALUE contains instead The ID value the query request parameter record for the connector in the T_CONNECTOR_QUERY table. |

Specification for bind parameter values may be associated with the query request parameters of a connector-type field of a resource template.

The records of T_RES_TMPLT_QUERY_BIND table 4130 specify bind parameter specifications of the resource template. These bind parameter specifications override the bind parameter specification for the particular bind parameter of the T_CONNECTOR_QUERY_BIND table for a connector used in the resource template. The fields in the table's entries are as follows:

| Name | Type | Description |
| --- | --- | --- |
| ID | varchar2(32) | record identifier |
| FIELD_ID | varchar2(32) | ID for a connector field in the resource template |
| BIND_NAME | varchar2(128) | name of query variable in a query |
| BIND_VALUE | varchar2(4000) | default value for bind parameter. This value is used if there is no value from the field defined in BIND_VALUE_FIELD_ID |
| BIND_VALUE_FIELD_ID | varchar2(32) | field ID for a field in the resource template If defined, the value of this field is the replacement value for the bind parameter. |
| HIDDEN_FLAG | char(1) | binary value indicating whether this binding should be visible to the Collaborator updating the instance of the resource template |

Tables of the Resource Class

Specifications for bind parameter values may be associated with resource GUI elements associated with request parameters belonging to connectors. The association is made in two stages: a first association from the field in the resource to the field in the resource template used to specify the resource, and a second association from a bind parameter specification to the first association.

The T_OBJ_RESOURCE_QUERY table 4120 relates a connector field in a template to the resource specified using the resource template. The fields of the table's records are as follows:

| Name | Type | Description |
| --- | --- | --- |
| ID | varchar2(32) | record identifier |
| FIELD_ID | varchar2(32) | field ID for a connector field record from T_RES_TMPLT_FIELD/ |
| RESOURCE_ID | varchar2(32) | resource ID from T_OBJ_RESOURCE: this is the resource the field "belongs to" |

The records of the T_OBJ_RESOURCE_QUERY_BIND table 4130 specify bindings for bind parameters for the query request parameter of a a connector field used in a resource. The fields in the T_OBJ_RESOURCE_QUERY_BIND table's entries are as follows:

| Name | Type | Description |
| --- | --- | --- |
| ID | varchar2(32) | record identifier |
| RES_QUERY_ID | varchar2(32) | ID from T_OBJ_RESOURCE_QUERY |
| BIND_NAME | varchar2(128) | name of query variable in query |
| BIND_VALUE | varchar2(1000) | default value for variable |

Overview of User Interfaces

The following section describes in overview how connectors are specified in a presently-preferred embodiment. The implementation will subsequently described in more detail below.

An Administrator can specify connectors and their parts, including query request parameters for parameterized information requests. The connectors can then be used by a GUI specialist in the specification of resource templates: the GUI specialist can further specify bindings in the resource template for the query request parameters. The resource templates can then be used by a Manager to create resources: the Manager can also specify bindings in the resource. Collaborators can then use the resources, and the system creates instances of the parameterized information requests that belong to the classes defined by the connectors to get information from information sources.

In the system of the present application, a resource template may include a field of type connector. Such fields are associated with query request parameters belonging to connectors; when a collaborator has a resource which includes the query request parameter, the collaborator can specify that the system of the present application make a parameterized information request which includes the query request parameter and bindings for any bind parameters in the query request parameter. The present system then uses the query request parameter with the specified bindings to make a instance of a parameterized information request and to provide it to the information source associated with the connector. When the information source returns a result, the result is displayed in the resource template field associated with the query request parameter.

FIG. 36 illustrates how a Collaborator uses an exemplary resource. The example is for an information source that can provide current information about shipping vessels in US ports. 3650 shows a portion of the Collaborator GUI for this exemplary resource. In this example, a Collaborator selects a Vessel Records resource in the navigation plane on the left—in this example, the Vessel Record "445548" at 3365—and the system creates particular instances of parameterized information requests using the vessel ID, provides them to the information source, and displays the results in the resource on the right.

In this example, 3660 shows the Title of the resource, which in this example is the vessel identifier 445548. 3670 and 3675 show information provided by the information source for two of the specified information requests that use the vessel identifier as a binding value for bind parameters. 3670 shows the display of the information response for a getVesselSummary request, with information shown including the Vessel ID, Vessel Name, type of service—shown as "Recreational"—and the flag of registry for the vessel. 3675 shows the display of the information response for a getVesselParticulars request, with information shown including the Vessel ID, Gross ton weight of the vessel, and length, breadth and beam dimensions of the vessel.

To see information about another vessel, the Collaborator selects another Vessel Record resource in the navigation pane on the left. The system then displays the results for parameterized information requests for that vessel ID in a resource on the right.

To "refresh" the information about a vessel—e.g. the vessel may have left port, and thus the current information may have changed—the Collaborator selects the same Vessel Record again, and the system creates new instances of the parameterized information requests, and displays the new results. Alternatively in the presently-preferred embodiment, the Collaborator may use the "refresh page" feature of the Collaborator's standard web browser.

Thus for the Collaborator, accessing current information in a useful fashion from this complex information source has been made easy.

In overview, creating the resource of the example in FIG. 36 was done in the following steps:

An Administrator specified a connector with a number of query request parameters for getting information the information source providing information about shipping vessels in US ports.

A GUI specialist then specified a resource template using the connector in a number of connector fields for different query request parameters. In the resource template, the GUI specialist specified an input field for a Manager to enter the vessel ID for a vessel, and several connector fields using the value of the vessel ID as the bind value for a bind parameter for the query request parameters in the connector fields.

A Manager then created several resources for getting current information about particular vessels, so that a Collaborator could use the resources.

Further details of FIG. 36 will now be described: 3665 points to a GUI element to let a Manager update the resource. Updating a resource refers to changing the specification of the resource, such as to change the bind value in a bind parameter specification of the resource. For a user who is on a Collaborator and not a Manager, the Update element at 3665 is not available in the GUI, and is not shown in the GUI.

In this example, to specify a resource for obtaining information on a different vessel, a Manager creates a new resource as described in the section Resources of the parent application, selects the resource template previously specified for information about vessels, and enters the vessel ID number into the Title field of this example template whose value is used as the bind value for the connector fields in the new resource. The new resource then will get information from the information source using the new vessel ID value for the bind parameters in the query request parameters specified in the resource template used to specify the resource.

Figure 43:
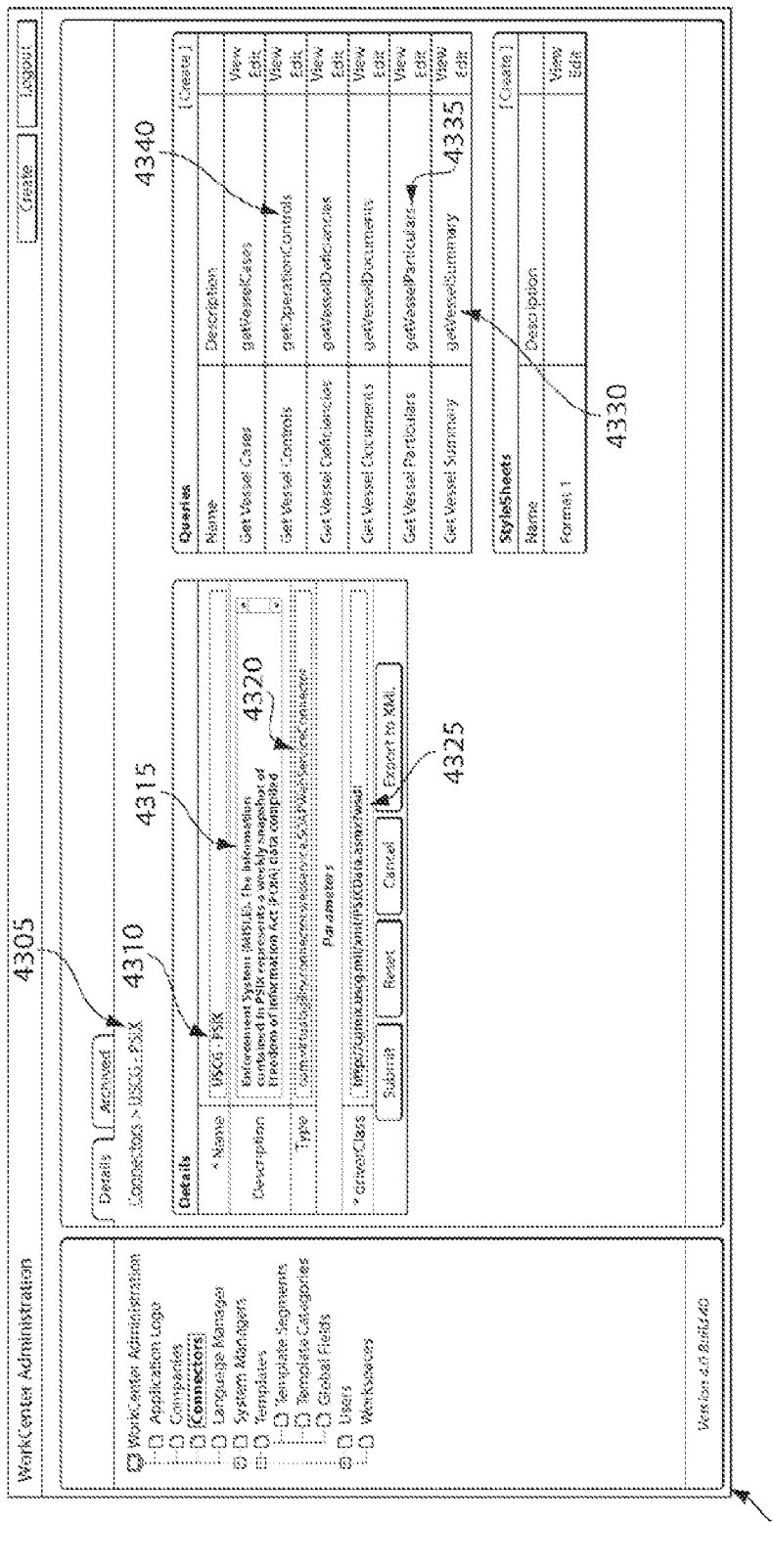
FIG. 43 shows an example of the GUI for viewing and editing the specification of a connector.

FIG. 43 illustrates in overview the specification of an example connector and the class of parameterized information requests represented by the connector. The example of 43 is for a connector for the information source that can provide information about vessels at US ports.

4300 in FIG. 43 shows a portion of the Administrator GUI to view and edit the specification of connector. 4305 displays the name part of the connector specification: a the name value can be changed by typing a value into the input field 4310 labeled "Name". The name value is required, as indicated by the red asterisk next to the "Name" label. The field 4315 labeled "Description" shows the description for the connector. At 4320 the GUI shows the type of this connector: this is a SOAP-type connector, as indicated by the value of the Java class shown at 4320. That class was determined for the particular connector when the connector was defined. At 4325, the GUI shows the URI for the WSDL file of the SOAP information source. The WSDL file for a SOAP information source specifies the queries that the SOAP information source will accept. The system of a presently-preferred embodiment automatically processes the WSDL specification of 4325 in XML language.

Information on processing standardized WSDL specifications for web services accessed by SOAP can be found at www.w3.org/TR/wsdl on the World Wide Web (reference fetched on 6 Mar. 2009). In part, a WSDL file specifies in the XML language, the names of a number of SOAP methods that the particular web service may permit to be called, the method parameters including any request parameters of each method, and a description of the information that the web service may provide in response to each method being called.

4300 shows a number of query request parameters that have been specified for this connector, as seen on the right side of 4300. Three are referenced at 4330, 4335, and 4340, for query request parameters named getVesselParticulars, getVesselSummary, and getOperationControls.

Details of User Interfaces

Figure 44:
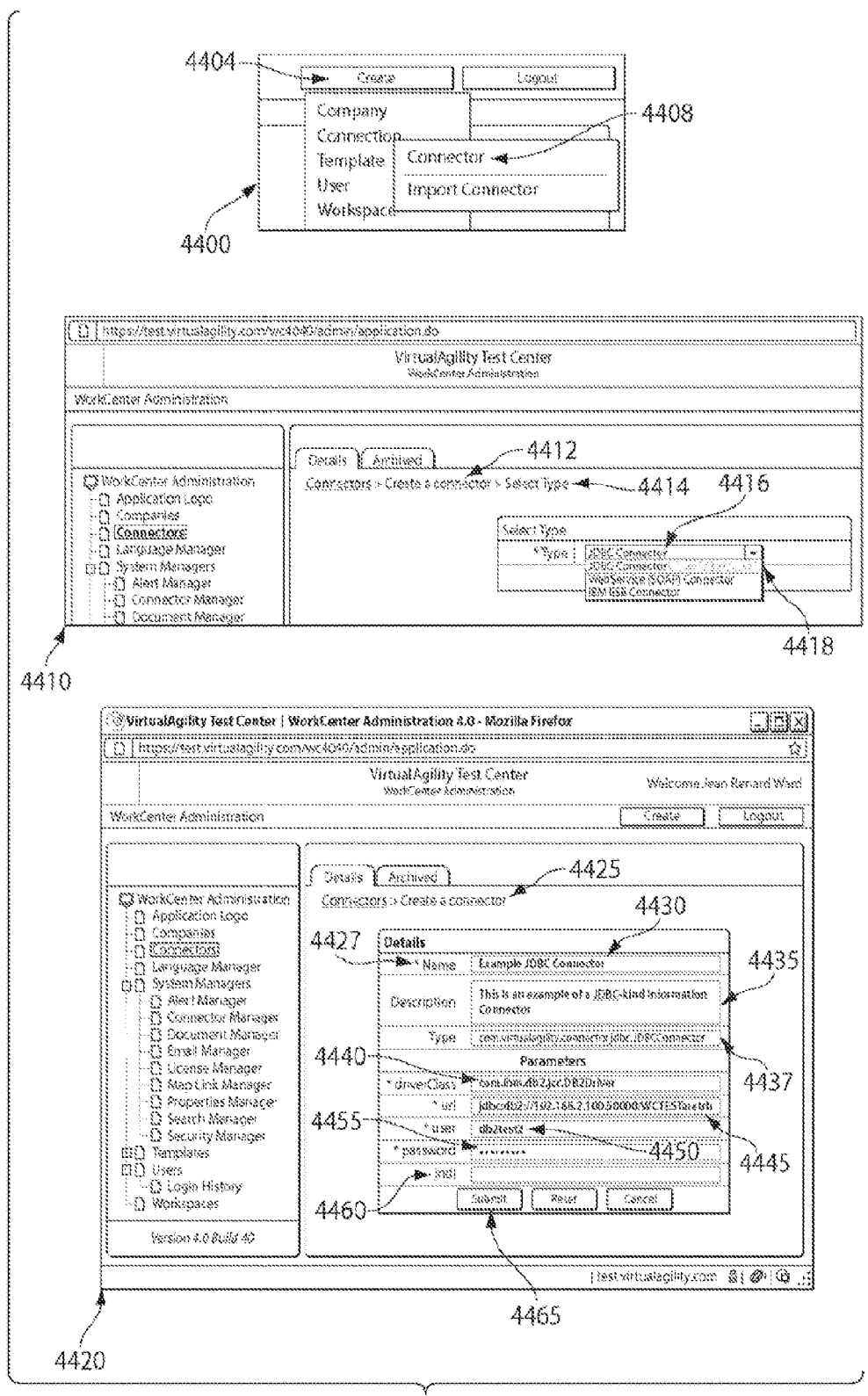
FIG. 44 shows details of the GUI for specifying a connector.

The Administrator interface for specifying a connector is illustrated for an example that is a JDBC-type connector starting with FIG. 44. Specifying a connector creates a record in T_CONNECTOR table 3900 and further records in associated tables, as will be described.

4400 shows the first part of this Administrator interface. The Administrator selects a "Create" menu from a drop-down menu icon 4404 in an Administrator GUI interface. Through a two-level menu list as shown, the Administrator selects first "Connector" from a menu that includes Company, Connector, Template, User and Workspace, and then "Connector" 4408 from a second menu list that includes "Connector" and "Import Connector", as shown. The "Import Connector" selection allows a connector to be specified by uploading an XML file with the specification data for the connector in an export/import format file supported by the system: this feature is described below.

4410 shows the next part of the interface. The interface indicates "Create a Connector" 4412 to show that the Administrator is creating a connector, and that the current action is to "Select Type" 4414 for the type of the connector to be created. The Administrator selects the type from a drop-down list 4418: shown are the options of a JDBC-type connector, a SOAP-type connector, or an ESB-type connector. The type selected by the Administrator is shown at 4416 "JDBC Connector". Connector types for additional kinds of information sources may be added to the present system. The type of connector will be stored as a string value in the TYPE column of the record created in the T_CONNECTOR table 3900.

4420 shows the next part of the interface for specifying a connector. At 4425, the GUI interface indicates that this is part of specifying a connector. The Administrator enters specification values in a number of fields. At 4430 the Administrator enters a name for the connector in the field labeled "Name". The red asterisk at 4427 indicates that this value is required. At 4435, the Administrator enters an optional description for the connector. At 4440, the GUI interface shows a string value for the type of the connector: this is determined by the type selected at 4418. The type value shown is the class name of a Java software code class for accessing the information source of the connector.

The name value of 4427 will be written to the NAME column of a new record in the T_CONNECTOR table 3900. Similarly, the "Description" value will be written to the DESCRIPTION column of the new record.

Below the type value are several GUI fields for the Administrator to enter values used to obtain access to the information source associated with a particular connector. Here, the values are those required for a JDBC-type connector.

Each value required to obtain access to the information source associated with the connector is written to a separate record in the T_CONNECTOR_PARAM table 3930. The NAME column of the record identifies which the kind of access values, the VALUE column receives the values, and the CONNECTOR_ID column receives the ID value of the T_CONNECTOR record for the connector the value is associated with.

At 4445, the Administrator enters the character string that is the name of the Java software driver class for accessing the particular information source of this connector. At 4450, the Administrator enters the URL that specifies the network address of the particular information source. The URL is expressed in a standard form that includes information about the network protocol to be used to communicate with the information source.

At 4450 and 4455, the Administrator enters two access values, the security authentication information—in this example, a username and a password—required for access to the information source. As shown, the GUI interface does not show the actual characters of the password value as it is entered. At 4460, the Administrator may enter a value that is required if the information source requires JNDI (Java Native Directory Interface) information. Information regarding JNDI can be found at en.wikipedia.org/wiki/Jndi on the World Wide Web (referenced fetched 21 Feb. 2009).

After entering the necessary information, the Administrator clicks on the "Submit" button at 4464, and the data is written to the T_CONNECTOR and T_CORRECTOR_PARAMS tables. As shown, the Administrator can also click on "Cancel" and not create a connector record, or click on Reset and start entering data for this GUI dialog from the beginning.

Figure 45:
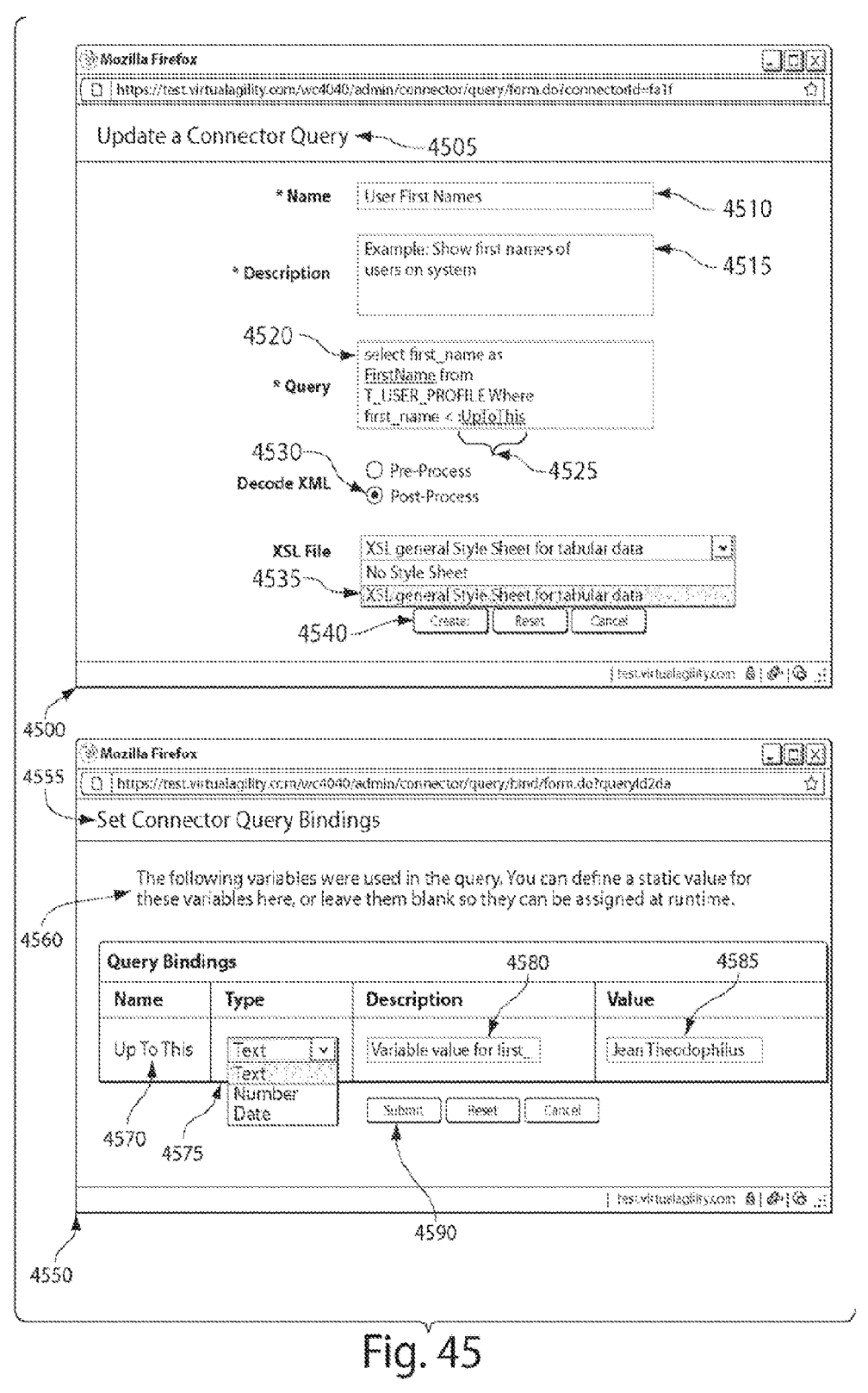

A further step in specifying a connector is specifying one or more query request parameters for the class of parameterized information requests defined by the connector. In a presently-preferred embodiment, the request parameters are query request parameters. This is illustrated in the example of a JDBC-type connector in FIG. 45, which shows further parts of the interface.

4500 shows the interface for specifying a query request parameter for a connector: this indicated by the text in the GUI at 4505 referring to a "Connector Query". The Administrator enters a value for the name of the connector in the GUI field labeled "Name" at 4510. This value will be stored in the NAME column of a new record in table T_CONNECTOR_QUERY 3910 for the new parameterized information request.

The Administrator enters a required string value for the description for the new parameterized information request in the field labeled "Description" at 4520. This value will be stored in the DESCRIPTION column of the new record in table T_CONNECTOR_QUERY 3910. Similarly, the Administrator enters a query request parameter in the field at 4520 labeled "Query". This string value will be stored in the VALUE column of the new record in table T_CONNECTOR_QUERY. Since the example is a JDBC-type connector, the string must be a valid expression in the SQL language dialect for the information source associated with the connector: the exemplary SQL expression shown is for obtaining the first names of users of a system from an RDBMS table, up to an character string value: the character string value will be specified by a value for a bind parameter.

4525 points to the variable ":UpToThis": the colon ahead of the variable's name indicates that it is a bind parameter. The interface for specifying the bind value for a bind parameter is presented below.

At 4530, the Administrator specifies whether responses to the information request are to be pre-processed by the system to translate any character encodings in the response that are not according to the standards for XML-format responses: some information sources include "raw" data values from an RDBMS in the response, without transforming character encodings according to the proper standard. If post-processing is selected, then no special processing will be done. This value will be stored in the new record in the T_CONNECTOR_QUERY table in column XML_POST_PROCESS.

Figure 46:
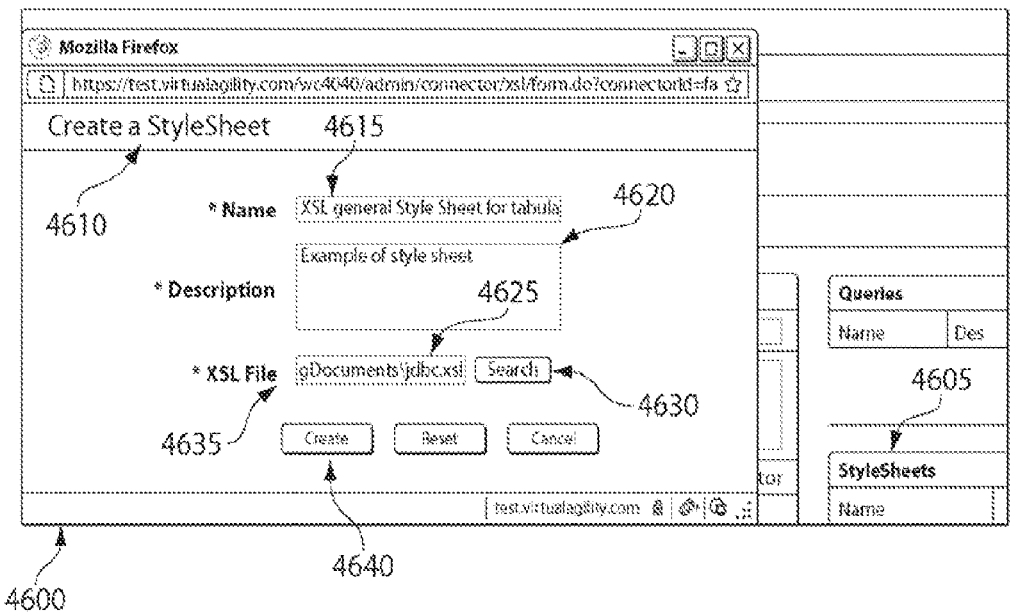
FIG. 46 shows an example of the GUI for uploading and using an XSL document file.

4535 is a drop-down list of XSL stylesheet documents that have been uploaded and specified for this connector: uploading XSL stylesheet documents is described for FIG. 46. The Administrator may select any of the XSL documents, or "No StyleSheet". An exemplary XSL document is shown in FIG. 42.

After entering the necessary information, the Administrator clicks on the "Create" button at 4540, and the data is written to a new record of the T_CONNECTOR_QUERY table as described. The CONNECTOR_ID value of the new record is set to the ID value of the T_CONNECTOR record for the connector the new T_CONNECTOR_QUERY record is associated with. As shown, the Administrator can also click on "Cancel" and not create a parameterized information request, or click on Reset and start entering data for this GUI dialog from the beginning.

4550 shows the GUI for specifying the default bind parameter binding value for any bind parameters in the SQL expression entered at 4525. This is indicated by the "Bindings" text in the GUI at 4555, and the explanation text at N45X60 referring to the variables used in the query request parameter and to the choices of specifying a static value for the binding here or specifying the binding to be done at run-time as specified in a resource template which has a template field for the query request parameter or in a resource which uses the resource template field. Bindings specified in a template field override those specified in the connector and bindings specified in a resource override those specified in the resource template field or specified in the connector. In the exemplary expression of 4525, there is one variable, and thus one bind parameter "UpToThis" is shown at 4570. The name of the variable, in this example "UpToThis", will be entered in the BIND_NAME column of a new record in the T_CONNECTOR_QUERY_BIND table 3920.

4574 is a drop-down selection list for the type of value for the binding: choices of Text, Number, or Date are shown. The Administrator selects one of the available value types, here "text": this value is entered into the BIND TYPE column of the new record in the table T_CONNECTOR_QUERY_BIND. The Administrator may enter a description for the bind parameter at 4580: this description is entered into the BIND_DESC column of the new record.

The Administrator may also enter a value in the "Value" field at 4585. The format of the value must be according to the type of the binding selected at 4575. If the Administrator specifies a value at 4585, the value is entered into the BIND_VALUE column of the new record in the T_CONNECTOR_QUERY_BIND table 3920.

After entering the necessary information, the Administrator clicks on the "Submit" button at 4575, and the data is written to the new record of the T_CONNECTOR_QUERY_BIND table as described. The QUERY_ID column of the record is set to the ID of the record in the T_CONNEC- TOR_QUERY record with which this T_CONNECTOR_QUERY_BIND record is associated. As shown, the Administrator can also click on "Cancel" and not create a new record, or click on Reset and start entering data for this GUI dialog from the beginning.

FIG. 46 at 4600 shows the Administrator or GUI specialist interface for uploading an XSL script document file as described above. Part of the GUI interface for defining a connector is shown at 4605: as part of this GUI interface, the GUI specialist can click on a "Create Stylesheet" button (not shown), and a pop-up GUI 4600 is displayed. As indicated by the title referring to "Create a Style Sheet" in this GUI interface at 4610, this GUI interface allows a GUI specialist to specify and upload an XSL document file.

The GUI specialist enters a name for the XSL document in the field labeled "Name" at 4615. This value will be entered in column NAME of a new record of the T_CONNECTOR_XSL table. The GUI specialist enters a description for this XSL document at the field labeled "Description" at 4620. This value will be entered in column DESCRIPTION of the new record in the T_CONNECTOR_XSL table.

4630 is a "Search . . . " button of the web browser the GUI specialist is using. The GUI specialist can click on this button and use the standard "File Dialog" feature of the browser to select an XSL file to be uploaded for this specification. The browser shows the local file pathname for the file at 4635.

After entering the necessary information, the GUI specialist clicks on the "Create" button at 4640. The web browser uploads the XSL file (if any) and the data is written to the new record of the T_CONNECTOR_XSL table as described. The file specified at 4635 is uploaded and stored on the system. A unique identifier for the uploaded file is stored in the new record in column DOCUMENT_ID. The CONNECTOR_ID value of the new record is set to the ID value of the T_CONNECTOR record the new T_CONNECTOR_XSL record 'belongs to'. As shown, the GUI specialist can also click on "Cancel" and not create a new record, or click on Reset and start entering data for this GUI dialog from the beginning.

Exporting and Importing Specifications

Figure 47:
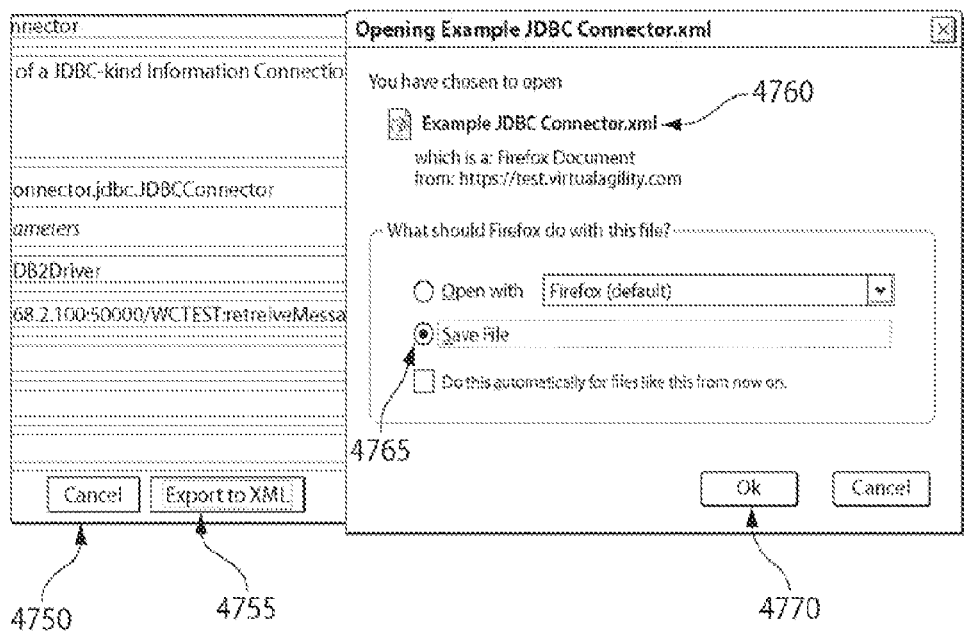
FIG. 47 shows an example of saving a specification to an export/import file.

FIG. 47 at 4750 illustrates a further feature in a presently-preferred embodiment. Specifications for many types of objects in the system can be saved for archiving or potential re-use by exporting them to a specification file. The specification un the file is in the XML language. Specifications can also be specified by importing the specification from such a specification file. The example shown at 4750 is for the Administrator interface for saving the specification for a connector.

A portion of the connector GUI interface for an Administrator is shown in the left part of 4750. The Administrator can click on an "Export to XML" link at 4755: a pop-up GUI interface appears for the standard "file download" dialog of the Administrator's web browser. The Administrator has the option of saving the file, or opening a copy of it from a temporary location with a program. The default name for the file is the name of the connector, with a file extension ".xml" as shown at 4760. At 4765 the Administrator can select that the file should be saved in the local filesystem of the Administrator's client computer. When the Administrator clicks on the "OK" button at 4770, the file is downloaded to the Administrator's client computer and saved.

A similar GUI interface allows specifications for a number of system objects to be specified by uploading and importing a specification file.

Connection-Type Fields in Templates

Figure 48:
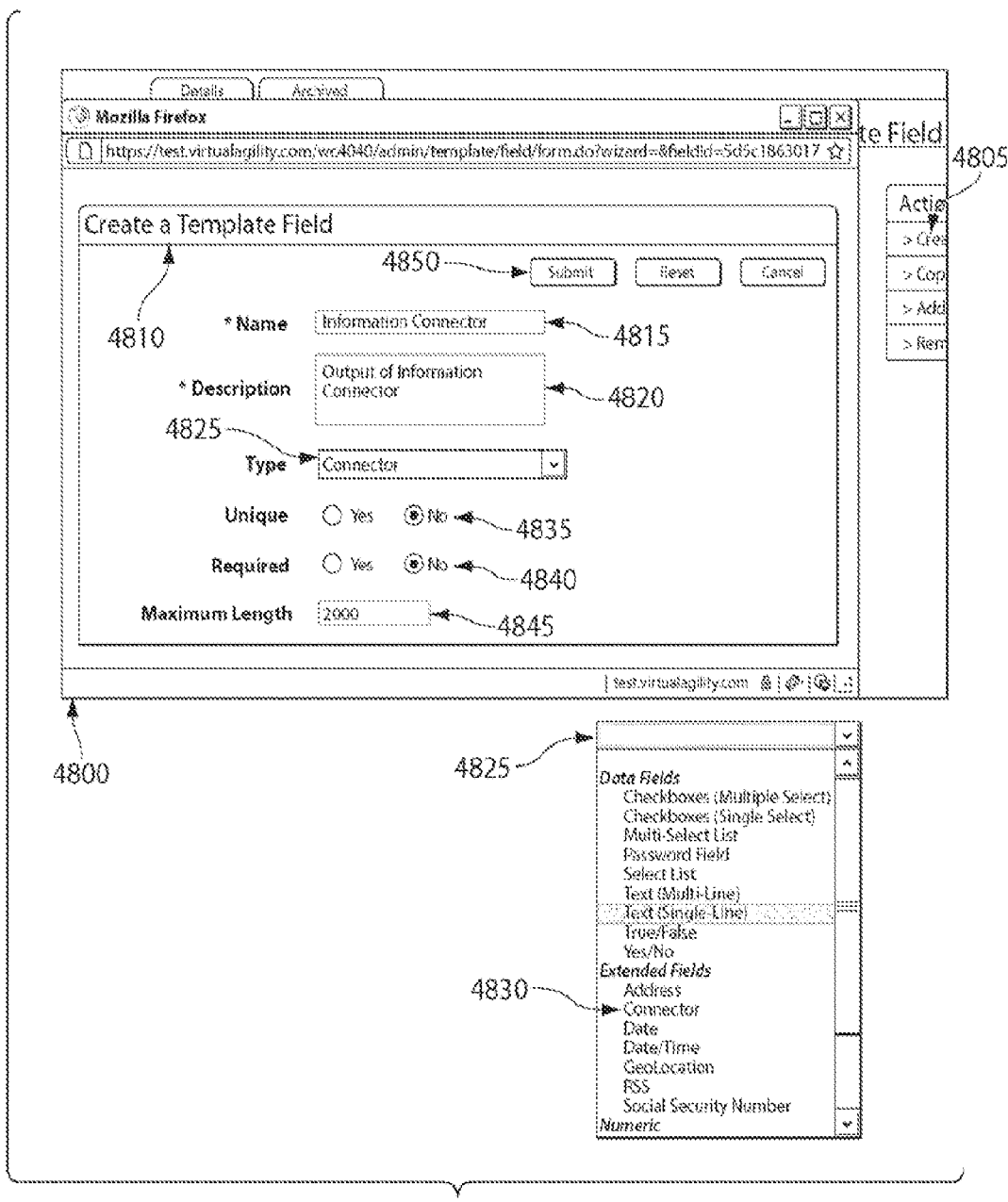
FIG. 48 shows the GUI for specifying a connector field in a template.

The GUI specialist interface for specifying a connector-type field in a template is illustrated starting at 4800 in FIG. 48.

4805 shows a portion of the GUI interface for specifying a template. A GUI specialist can click on a GUI option (shown in part) to create a field and add it to the resource template specification: a pop-up GUI interface 4800 appears. The function of this pop-up interface indicated by the title at 4810 "Create a Template Field". The GUI specialist enters a name for the resource template field in the GUI field at 4815. This value will be entered into column NAME for a new record of the T_RES_TMPLT_FIELD table, in the same fashion as in the system of the parent application. The GUI specialist enters a description for the new template field at 4820 in the GUI field labeled "Description": this value will be entered into the DESCRIPTION column of the new record.

At 4825, the GUI specialist selects the type of field to be created. The GUI specialist selects from a drop-down GUI list, shown in the fragment of the GUI below 4800. Several types of template fields are shown, including Data Fields that include type Select List, Text (Single-Line), True/False, and others. Also shown are Extended Fields 4830 including template field types Address, Date, RSS, and Connector, and Numeric fields. For a connector-type field, the GUI specialist selects Connector from the list: the selected type appears in the field 4825 in 4800.

The type value selected will be entered in column FIELD_TYPE_ID in the new record of the T_RES_TMPLT_FIELD table. The value entered is the record ID for the corresponding record in the T_RES_TMPLT_FIELD_TYPE table 336. An additional record for the "Connector" field type has already been added in the present system to the records in table T_RES_TMPLT_FIELD_TYPE.

At 4840, the GUI specialist selects from two radio-button values specifying whether this template field is required in a resource using the new template. The value selected will be stored as the value in the REQUIRED_FLAG column in the new record of the T_RES_TMPLT_FIELD table. At 4835, the GUI specialist also selects from two radio-button values specifying whether this template field must have a unique name in a resource that is using the resource template to which the field belongs. The value selected will be stored in the UNIQUE_FLAG column in the new record.

At 4845, the GUI specialist can enter a maximum length for this template field. The value will be stored in the MAX_LENGTH column of the new record of the T_RES_TMPLT_FIELD table.

After entering the necessary information, the GUI specialist clicks on the "Submit" button at 4850, and the data is written to new record of the T_RES_TMPLT_FIELD table as described. The RES_TMPLT_ID value of the new record is set to the ID value of the T_RES_TMPLT record with which the new T_RES_TMPLT_FIELD record is associated. As shown, the GUI specialist can also click on "Cancel" and not create a new record, or click on Reset and start entering data for this GUI dialog from the beginning.

Figure 49:
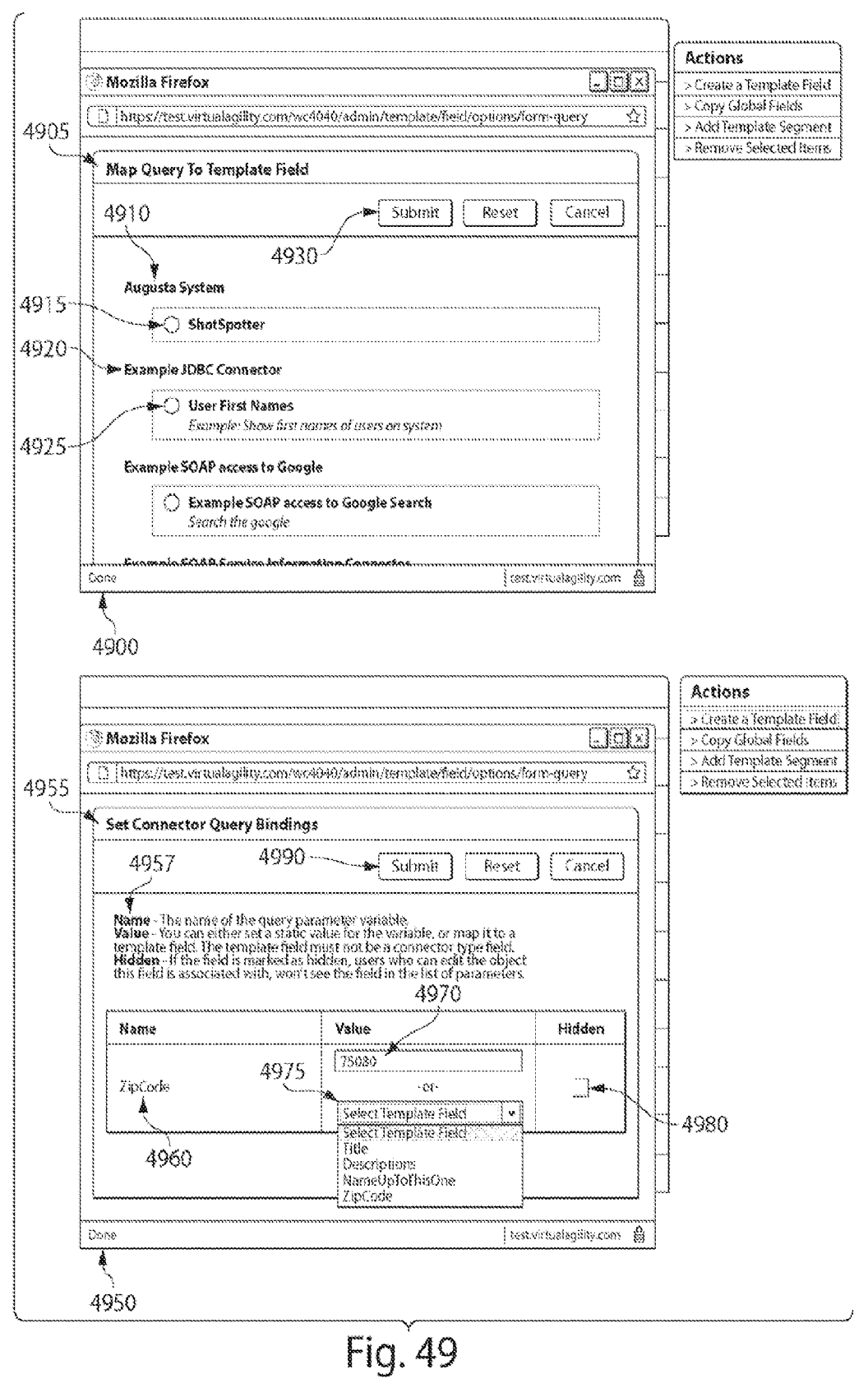

FIG. 49 shows the GUI for the next step in specifying a template field of type connector. As indicated by the title text at 4905 "Map Query to Template Field", the GUI specialist selects a particular query request parameter request to be associated with the resource template field specified as described for 4800 in FIG. 48

The GUI of FIG. 49 shows all the query request parameters that have been specified for each connector. The query request parameters are shown in groups according to the connectors they are associated with: a radio button GUI element is next to the name of each request, so that the GUI specialist can select one of the query request parameters associated with the connector. At 4910 we see the name of the connector "Augusta System", for which one query request parameter, "ShotSpotter" 4915, has been specified. Also shown at 4920 is the name of the connector "Example JDBC Connector", and below that 4925, which specifies the one query request parameter that been specified for it, named "User First Names". Below the name "User First Names" is the text of the description for that query request parameter. Other connectors and their query request parameters are shown continuing downwards in the GUI dialog: the dialog is scrollable using command key functions of the GUI specialist's Web Browser.

After entering the necessary information, the GUI specialist clicks on the "Submit" button at 4930, and the record identifier of the parameterized information request selected in dialog 4900 is entered as the value for the DEFAULT_VALUE field of the new record of the T_RES_TMPLT_FIELD table. As shown, the GUI specialist can also click on "Cancel" and not create a new template field, or click on Reset and start entering data for this GUI dialog from the beginning.

4950 shows the next GUI interface, a dialog for specifying a bind parameter for each bind parameter of the parameterized information request selected for the connector field using GUI dialog 4900. This is indicated by the title 4955 "Set Connector Query Bindings". Text at 4957 explains the use of this GUI dialog, referring to a bind parameter variable name, the choice of a specific value to be used or the name of a template field whose value to be used in the binding, and the option of making the binding hidden for Managers who create a resource using the resource template specification of this template field.

4960 shows the one variable name "ZipCode" specified for the exemplary parameterized information request. The GUI specialist can specify a fixed value to be used for the binding in "Value" field 4970, or select a field of the resource template in the drop-down GUI list 4975: the system shows the names of all the available fields of the resource template for the GUI specialist to select from. If a field is selected, then the value in the "Value" field 4970 is ignored. At 4980, the GUI specialist can check a GUI check box to indicate that the binding should be hidden from Managers who create a resource using the resource template specification of this template field.

The name of the bind parameter of 4960 will be entered in the BIND_NAME column of the new record of the T_RES_TMPLT_QUERY_BIND table 4110, the value of 4970 will be entered into the BIND_VALUE column, the resource template field selected (if any) will be entered into the BIND_VALUE_FIELD_ID column, and the selection of the "hidden" option at 4980 will be entered into the HIDDEN_FLAG column. A bind parameter specification specifies a binding either to a specific value, or to a value that the Manager may enter into a specific field of the resource GUI—the two options are mutually exclusive. In the presently-preferred embodiment, if the GUI specialist inadvertently both enters a value and selects a field, the selection of a field is used and not the value that was entered.

After entering the necessary information, the GUI specialist clicks on the "Submit" button at 4990, and the data is written to new record of the T_RES_TMPLT_QUERY_BIND table as described. The FIELD_ID value of the new record is set to the ID value of the T_RES_TEMPLATE_FIELD record the new T_RES_TMPLT_QUERY_BIND record 'belongs to'. As shown, the GUI specialist can also click on "Cancel" and not create a new record, or click on Reset and start entering data for this GUI dialog from the beginning.

The GUI specialist thus has considerable freedom and flexibility in specifying resource templates. The GUI specialist thus can reduce greatly the burden of complexity that a Manager or Collaborator encounters. For example, the GUI specialist can specify an appropriate bind value for a bind parameter, and further set the bind parameter to be "hidden": the Manager will then neither need to specify the bind value for that bind parameter, nor will the Manager even be distracted by the bind parameter being visible to the Manager. As a further example, the GUI specialist can specify the same field as the source of a bind value for bind parameters for a number of connector fields in the resource template, and thus allow the Manager to specify a value only once in that one field to set a bind value for a number of connector fields for obtaining a number of kinds of information related to the value. Further, the GUI specialist can make individual fields of the resource template "hidden" from the Manager when the field does not need to be visible to the Manager and would be a distraction.

The hierarchy of bind specifications also contributes to reducing the burden of complexity. For a given instance of a parameterized information request for a resource, the bind value for a given bind parameter will be the bind value specified for the resource in the T_OBJ_RESOURCE_QUERY_BIND table. If no bind value is specified there, the bind value will be value specified for the resource template in the T_RES_TMPLT_QUERY_BIND table. If no bind value is specified there, the bind value will be the value specified for the query request parameter for the connector in the T_CONNECTOR_QUERY_BIND table.

Figures 1, 50:
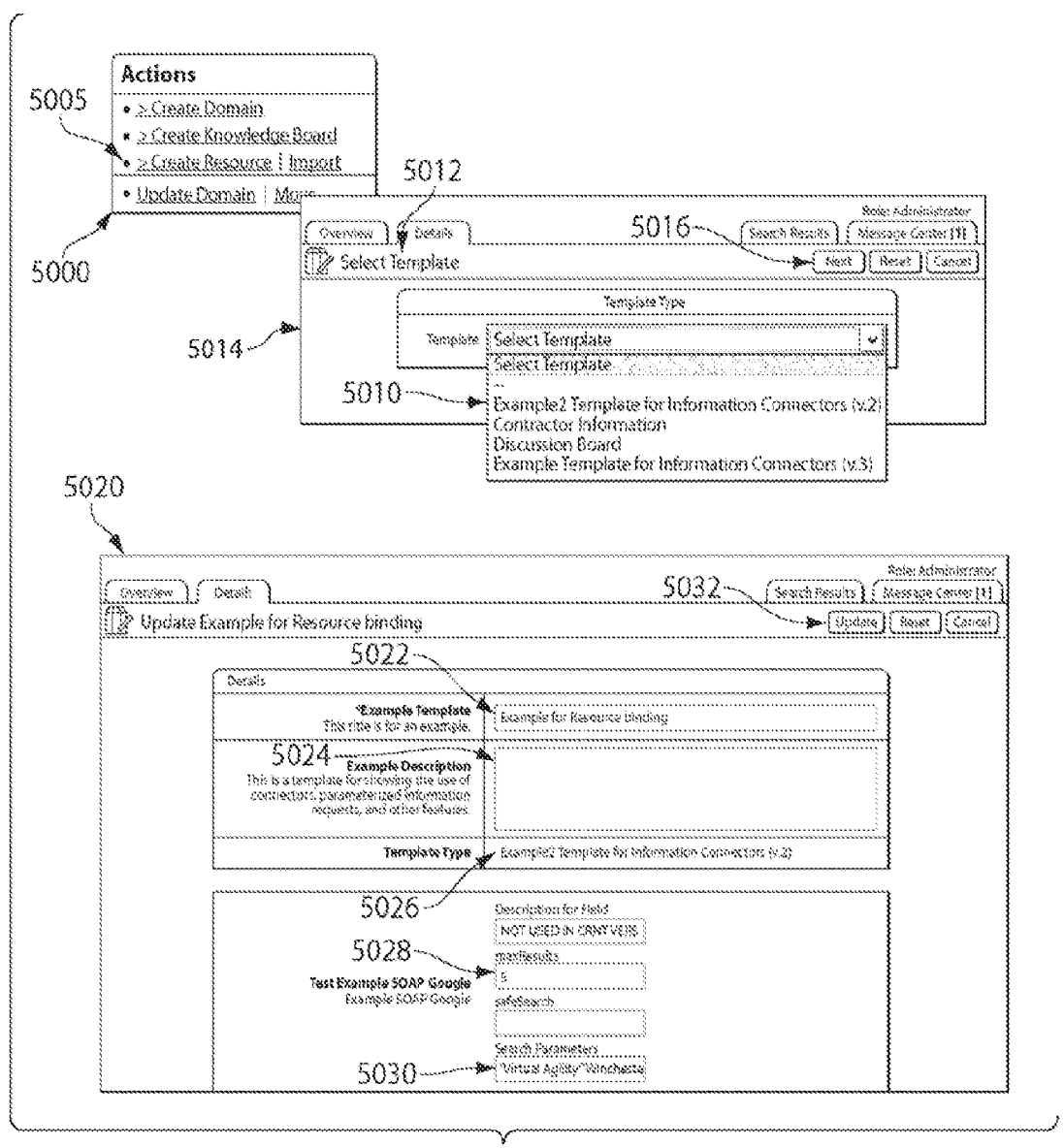
FIG. 50 shows an example of the GUI for specifying bind parameters in a resource.

FIG. 50 illustrates the interface for a Manager to specify a resource that using a resource template specification with a resource template field of type connector. The general GUI for specifying resources is described in the section Resources of the parent application.

5000 shows the first step of creating a resource: the Manager clicks on the "Create Resource" link 5005 in the system interface.

The next step is to select the resource template to be used for the resource. This is shown at 5014: the title at 5012 says "Select Template". 5010 is a drop-down select list for the available templates. The Manager selects the template to be used to specify the new resource. In this example, the Manager will select the template named "Example 2 . . . " from the list. Then the Manager clicks on the "Next" link at 5016.

The next GUI interface is shown at 5020. The same GUI interface of 5020 is used both for creating a new resource specification, and for updating an existing resource specification. 5020 shows the GUI dialog being used to update an existing resource.

For fields that are connector-type fields, the Manager can specify overriding bind values for bind parameters specified in the resource template that are bound to a value in the resource template specification. If the resource template specified a binding to the value of a field (BIND_VALUE_FIELD_ID of T_RES_TMPLT_QUERY_BIND), rather than to a fixed value (BIND_VALUE of T_RES_TMPLT_QUERY_BIND, the Manager cannot specify an overriding bind value.

5022 shows the title field for the resource: in this example, the Manager may change the value of this field from the default value specified in the resource template by entering a value into this field. 5024 shows the description field for this resource. 5028 and 5030 show two of four bind value specifications of the resource template that may be overridden by entering new values in this GUI. 5028 shows the field for entering a bind value to override the binding of the bind parameter named "maxResults" specified in the resource template. 5030 shows the field for entering a bind value to override the binding of the bind parameter named "Search Parameters" in the resource template.

The connector-type field in the resource template of this example is associated with a parameterized information request for requesting information from a commercial search-engine service. In the example of 5020, the parameterized information request will have bind parameter values specifying a maximum of 5 search-hit results as shown by the value for "maxResults" at 5028, and a bind parameter specifying a search for information on the keyphrases "Virtual Agility" and "Winchester", as shown by the value for "Search Parameters" at 5030.

Updated or new information is written to the T_OBJ_RESOURCE table and associated tables as described. Binding specifications for the resource are set according to the binding specification of the resource template used to specify the resource, as follows:

When a resource is created using a resource template, a record is created in the T_OBJ_RESOURCE_QUERY table 4120 for each connector field in the resource template. The values in the FIELD_ID and RESOURCE_ID columns are set as described previously for the T_OBJ_RESOURCE_QUERY table.

Further, a T_OBJ_RESOURCE_QUERY_BIND record is created for every T_RES_TMPLT_QUERY_BIND record associated with the connector-type field. The RES_QUERY_ID value of the new record is set to the ID value of the corresponding T_OBJ_RESOURCE_QUERY record for the resource. The BIND_NAME and BIND_VALUE fields of the new T_OBJ_RESOURCE_QUERY_BIND record are set to be the same as the BIND_NAME and BIND_VALUE fields for the corresponding T_RES_TMPLT_QUERY_BIND record.

The Manager may then change the BIND_VALUE value for the T_OBJ_RESOURCE_QUERY_BIND records associated via the T_OBJ_RESOURCE_QUERY records with the resource. Values are then written to the records for the resource as described when the Manager clicks on the button at 5032.

After entering the necessary information, the Manager clicks on the button at 5032: the resource is updated or created according to the circumstance of updating or creating a new resource, as previously described. As shown, the Manager can also click on "Cancel" and not specify a new resource binding field, or click on Reset and start entering data for this GUI dialog from the beginning.

5040 shows the resource with the bind parameter specification set as described for 5020. 5042 shows the result displayed for the connector-type field at 5042. In this example, the information returned by the search engine is for the keyphrases "Winchester" and "Virtual Agility".

CONCLUSION

The foregoing Detailed Description has described to those skilled in the relevant technologies how to make and use Applicants' apparatus for specifying a class of parameterized information requests and using the apparatus to make instances of the class. The Detailed Description has further disclosed how to use the parameterized information requests in an improved system for providing a user with a graphical user interface that specifies information resources and has disclosed graphical user interfaces for making the apparatus for specifying a class of parameterized information requests. In all cases, the disclosures have set forth the best mode presently known to the applications for practicing their techniques.

It will, however, be immediately apparent to those skilled in the relevant technologies that the principles of Applicants' techniques may be implemented in many other ways. For example, Applicants' techniques for dealing with parameterized information requests have been added to a pre-existing system and many of the characteristics of the preferred embodiment are determined by the system in which the preferred embodiment is implemented. That is particularly the case as regards the manner in which the connectors relate to resource templates and to resources. Additionally, in the preferred embodiment, the only request parameters are query request parameters and bind parameters and template connector fields are related to the queries. Embodiments with other kinds of request parameters may have other kinds of relationships between request parameters and other parts of the system. Further, there are many ways of implementing the objects used to represent connectors other than those disclosed herein. For example the objects need not be implemented as rows in database tables, and if they are, the subdivision of information among the tables may be different from that of the preferred embodiment.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. Apparatus for specifying a class of parameterized information requests and making instances of parameterized information requests that belong to the class, the apparatus being implemented in a system having a processor and data storage accessible to the processor and the apparatus comprising:
    objects in the data storage including a connector object in the data storage that represents the class of parameterized information requests;
    a request parameter object in the data storage that defines a request parameter for parameterized information requests belonging to the class, the request parameter comprising a bind parameter that is replaced by a bind value before the requested parameter is used in an instance of a parameterized information request; and
    an information source access object in the data storage that specifies attributes of an information source which will receive the instances of the parameterized information requests that belong to the class, the processor responding to an input specifying creation of an instance of the class of parameterized information requests represented by the connector object by using the request parameter defined in the request parameter object and the attributes of the source of information to make the instance of the class.

2. The apparatus set forth in claim 1 wherein:
    the request parameter object defines a plurality of request parameters;
    the input further specifies a request parameter of the plurality of request parameters; and
    the processor further responds to the input by using the specified request parameter to make the instance of the class.

3. The apparatus set forth in claim 1 wherein the apparatus further comprises:
    a bind parameter object in the data storage that specifies the bind value for the bind parameter; and the processor further uses the bind value specified for the bind parameter in making the instance of the class.

4. The apparatus set forth in claim 3 wherein: the bind parameter object specifies a default value for the bind value.

5. The apparatus set forth in claim 3 wherein:
the bind parameter object specifies a first overriding value for the bind value which is employed in a user interface which belongs to a particular class that uses the connector object and which overrides a default value for the bind value.

6. The apparatus set forth in claim 5 wherein:
the bind parameter object specifies a second overriding value for the bind value which is employed in a particular instance of the user interface and which overrides both the default value and any first overriding value.

7. The apparatus set forth in claim 6 wherein:
the first overriding value is provided by the particular instance of the user interface.

8. The apparatus set forth in claim 3, further comprising:
a bind parameter object in the data storage that is associated with the request parameter and specifies a value for the bind parameter in the request parameter; and
the processor further uses the bind value specified for the bind parameter in the request parameter in making the instance of the class when the input specifies the particular request parameter.

9. The apparatus set forth in claim 8 wherein:
the bind value specified for the bind parameter is provided by an instance of a user interface which uses the connector object.

10. The apparatus set forth in claim 1 wherein the processor provides the instance of the parameterized information request to the information source specified in the information source access object and receives a response from the source of information and the apparatus further comprises:
a response processing object in the data storage that specifies how the response resulting from the instance is to be processed and the processor processes the response as specified by the response processing object.

11. The apparatus set forth in claim 1 wherein:
the request parameter is a query that is interpreted by the information source.

12. The apparatus set forth in claim 1 wherein:
the data storage is a relational database system accessible to the processor; and
the objects are rows in tables of the relational database system.

13. A system for providing a user with a graphical user interface, the graphical user interface permitting specification of an information resource belonging to one of a plurality of different kinds of information resources and the system responding to the specification by providing the information resource to the user, the system being implemented using a processor that produces and responds to inputs from the graphical user interface and has access to the information resource and to a storage device, the system comprising:
a specification in the graphical user interface of an information resource that is obtained using an instance of a parameterized information request and objects in the storage device including a connector object in the storage device that represents a class of the parameterized information requests to which the instance belongs;
a request parameter object in the storage that defines a request parameter for parameterized information requests belonging to the class, the request parameter comprising a bind parameter that is replaced by a bind value before the request parameter is used in the instance of the parameterized information request; and
an information source access object in the storage device that specifies attributes of the information, the processor responding to the specification by using the request parameter defined in the request parameter object and the attributes of the source of information to make the instance.

14. A graphical user interface for specifying a class of parameterized information requests, the graphical user interface being implemented using a processor that produces and responds to inputs from the graphical user interface and has access to a storage device, the class of parameterized information requests being specified by objects in the storage device, the objects including a connector object that represents the class of the parameterized information requests, a request parameter object that defines a request parameter for parameterized information requests belonging to the class, and an information source access object that specifies attributes of an information source which will receive instances of the parameterized information request belonging to the class, and the graphical user interface comprising:
a connector specification interface for specifying the connector object that represents the class of parameterized information requests;
a request parameter specification interface for specifying a request parameter for parameterized information requests belonging to the class, the request parameter comprising a bind parameter that is replaced by a bind value before the request parameter is used in an instance of a parameterized information request; and
an information source access specification interface that specifies the attributes of the information source, the processor responding to the connector specification interface by producing the connector object, to the request parameter specification interface by producing the request parameter object for the request parameter and to the information source access object specification interface by producing the information source access object for the attributes of the information source.

15. The graphical user interface for specifying the class of parameterized information requests set forth in claim 14 wherein the objects in the storage device further include a template object that makes instances of parameterized information requests belonging to the class represented by the connector object available to a class of graphical user interfaces, the graphical user interfaces in the class including a specifier for an information resource that is returned by an instance of the class of parameterized information requests and the graphical user interface further comprises:
a request parameter mapping interface that maps the request parameter to the template object and the processor responds to the request parameter mapping interface by mapping the request parameter object to the template object.

* * * * *